United States Patent
Mukai et al.

(10) Patent No.: US 8,264,584 B2
(45) Date of Patent: Sep. 11, 2012

(54) IMAGE CAPTURING APPARATUS, ADDITIONAL INFORMATION PROVIDING SERVER, AND ADDITIONAL INFORMATION FILTERING SYSTEM

(75) Inventors: Tsutomu Mukai, Osaka (JP); Yoichi Ikeda, Osaka (JP); Masaru Yamaoka, Osaka (JP); Takahiro Sato, Osaka (JP); Mitsuaki Oshima, Kyoto (JP)

(73) Assignee: Panasonic Corporation, Osaka (JP)

( * ) Notice: Subject to any disclaimer, the term of this patent is extended or adjusted under 35 U.S.C. 154(b) by 351 days.

(21) Appl. No.: 12/598,660

(22) PCT Filed: May 30, 2008

(86) PCT No.: PCT/JP2008/001383
§ 371 (c)(1),
(2), (4) Date: Nov. 3, 2009

(87) PCT Pub. No.: WO2008/149537
PCT Pub. Date: Dec. 11, 2008

(65) Prior Publication Data
US 2010/0149399 A1 Jun. 17, 2010

(30) Foreign Application Priority Data

May 31, 2007 (JP) ................................ 2007-144806

(51) Int. Cl.
*H04N 5/222* (2006.01)
*H04N 5/76* (2006.01)
(52) U.S. Cl. .................. 348/333.02; 348/231.3
(58) Field of Classification Search ............. 348/333.01, 348/333.02, 333.05, 231.1, 231.2, 231.3
See application file for complete search history.

(56) References Cited

U.S. PATENT DOCUMENTS

| | | | |
|---|---|---|---|
| 6,222,583 | B1 | 4/2001 | Matsumura et al. |
| 2002/0045988 | A1 | 4/2002 | Yokota |
| 2003/0020816 | A1* | 1/2003 | Hunter et al. .............. 348/231.3 |
| 2005/0107952 | A1 | 5/2005 | Hoshino et al. |

(Continued)

FOREIGN PATENT DOCUMENTS

EP 1 193 626 4/2002

(Continued)

OTHER PUBLICATIONS

International Search Report issued Aug. 19, 2008 in International (PCT) Application No. PCT/JP2008/001383.

(Continued)

*Primary Examiner* — Kelly L Jerabek
(74) *Attorney, Agent, or Firm* — Wenderoth, Lind & Ponack, L.L.P.

(57) ABSTRACT

Only landmark information desired by a user out of a plurality of landmark information transmitted from a map server is displayed. An image capturing apparatus (102) includes: an imaging unit (114) that captures a digital image; a communication unit (112) that obtains a plurality of additional information from a predetermined map server (120) that holds the plurality of additional information each corresponding to an object included in the digital image captured by the imaging unit (114); a display-information extracting unit (113) that selects additional information to be displayed from among the plurality of additional information obtained by the communication unit (112); and an overlaying display processing unit (116) and a display unit (117) that display only the additional information selected by the display-information extracting unit (113) from among the plurality of additional information, to be overlaid on the digital image captured by the imaging unit (114).

12 Claims, 70 Drawing Sheets

U.S. PATENT DOCUMENTS

| | | |
|---|---|---|
| 2005/0107993 A1 | 5/2005 | Cuthbert et al. |
| 2006/0195858 A1 | 8/2006 | Takahashi et al. |
| 2007/0110336 A1 | 5/2007 | Arakawa |

FOREIGN PATENT DOCUMENTS

| | | |
|---|---|---|
| EP | 1 622 081 | 2/2006 |
| JP | 10-267671 | 10/1998 |
| JP | 11-86035 | 3/1999 |
| JP | 2001-215871 | 8/2001 |
| JP | 2001-216309 | 8/2001 |
| JP | 3225882 | 8/2001 |
| JP | 2002-074403 | 3/2002 |
| JP | 2002-108873 | 4/2002 |
| JP | 2002-304641 | 10/2002 |
| JP | 2004-328077 | 11/2004 |
| JP | 2005-098912 | 4/2005 |
| JP | 2005-515513 | 5/2005 |
| JP | 2005-181611 | 7/2005 |
| JP | 2006-318356 | 11/2006 |
| RU | 2 250 182 | 4/2005 |
| WO | 01/27822 | 4/2001 |
| WO | 2004/095374 | 11/2004 |

OTHER PUBLICATIONS

Official Decision of Grant mailed Apr. 27, 2012 in corresponding Russian Application No. 2009141616 (with English translation).

* cited by examiner

FIG. 4

| Data | Description |
|---|---|
| 123456.00 | = Universal time coordinated (UTC) 12:34:56.00 |
| 4567.123456,N | = Latitude 45 degrees 67.123456 minutes north (north latitude) |
| 13512.012345,E | = Longitude 135 degrees 12.012345 minutes east (east latitude) |
| 020.0,T | = Traveling direction (degree) due north |
| 10° | = Image-capturing range information 1 |
| 170° | = Image-capturing range information 2 |
| 00-10-F2-15-10-20 | = ID of image capturing apparatus |

FIG. 12

| Zoom ratio | Display field |
|---|---|
| × 1 to × 3 | First field (short distance) |
| × 3 to × 6 | Second field (middle distance) |
| × 6 to × 10 | Third field (far distance) |

FIG. 15

Primary transmission data: columns 155–210
Image-capturing range: columns 165–200

Set 1:

| Level | 155 | 160 | 165 | 170 | 175 | 180 | 185 | 190 | 195 | 200 | 206 | 210 |
|---|---|---|---|---|---|---|---|---|---|---|---|---|
| First hierarchical level  | 0 | 0 | 0 | 0 | 0 | 1 | 0 | 0 | 0 | 0 | 0 | 0 |
| Second hierarchical level | 2 | 0 | 1 | 0 | 0 | 0 | 1 | 1 | 0 | 1 | 0 | 1 |
| Third hierarchical level  | 2 | 1 | 1 | 0 | 1 | 0 | 1 | 1 | 1 | 0 | 0 | 0 |
| Fourth hierarchical level | 4 | 10 | 5 | 2 | 0 | 1 | 5 | 0 | 5 | 2 | 2 | 1 |
| Fifth hierarchical level  | 7 | 15 | 7 | 5 | 1 | 4 | 10 | 1 | 8 | 6 | 6 | 8 |

Set 2:

| Level | 155 | 160 | 165 | 170 | 175 | 180 | 185 | 190 | 195 | 200 | 206 | 210 |
|---|---|---|---|---|---|---|---|---|---|---|---|---|
| First hierarchical level  | 0 | 0 | 0 | 0 | 0 | 0 | 0 | 0 | 1 | 0 | 0 | 0 |
| Second hierarchical level | 0 | 0 | 0 | 0 | 0 | 0 | 0 | 1 | 0 | 0 | 0 | 2 |
| Third hierarchical level  | 2 | 1 | 0 | 2 | 2 | 2 | 0 | 2 | 1 | 0 | 0 | |
| Fourth hierarchical level | 4 | 1 | 2 | 3 | 3 | 6 | 6 | 4 | 3 | 2 | 1 | |
| Fifth hierarchical level  | 8 | 8 | 10 | 15 | 7 | 8 | 15 | 6 | 7 | 8 | 8 | |

Set 3:

| Level | 155 | 160 | 165 | 170 | 175 | 180 | 185 | 190 | 195 | 200 | 206 | 210 |
|---|---|---|---|---|---|---|---|---|---|---|---|---|
| First hierarchical level  | 0 | 0 | 0 | 0 | 0 | 1 | 0 | 0 | 0 | 0 | 0 | 0 |
| Second hierarchical level | 0 | 0 | 1 | 1 | 0 | 1 | 0 | 1 | 2 | 0 | 1 | 2 |
| Third hierarchical level  | 2 | 1 | 1 | 2 | 3 | 2 | 2 | 0 | 2 | 2 | 1 | 3 |
| Fourth hierarchical level | 5 | 1 | 6 | 2 | 4 | 4 | 1 | 3 | 3 | 2 | 2 | 4 |
| Fifth hierarchical level  | 8 | 7 | 3 | 5 | 10 | 5 | 5 | 5 | 4 | 1 | 1 | 5 |

FIG. 24

| Data | Description |
|---|---|
| 123456.00 | = Universal time coordinated (UTC) 12:34:56.00 |
| 4567.123456,N | = Latitude 45 degrees 67.123456 minutes north (north latitude) |
| 13512.012345,E | = Longitude 135 degrees 12.012345 minutes east (east latitude) |
| 020.0,T | = Traveling direction (degree) due north |
| 10° | = Image-capturing range information 1 |
| 170° | = Image-capturing range information 2 |
| 00-10-F2-15-10-20 | = ID of image capturing apparatus |
| www.community.com | = Internet forum address |
| ID-0123456 | = Forum user ID |

FIG. 27
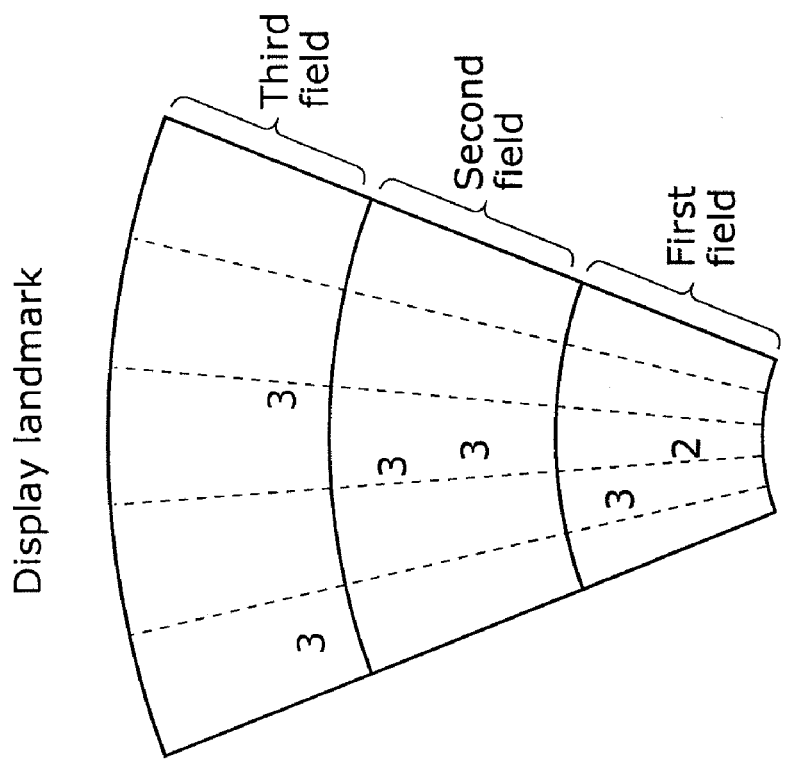
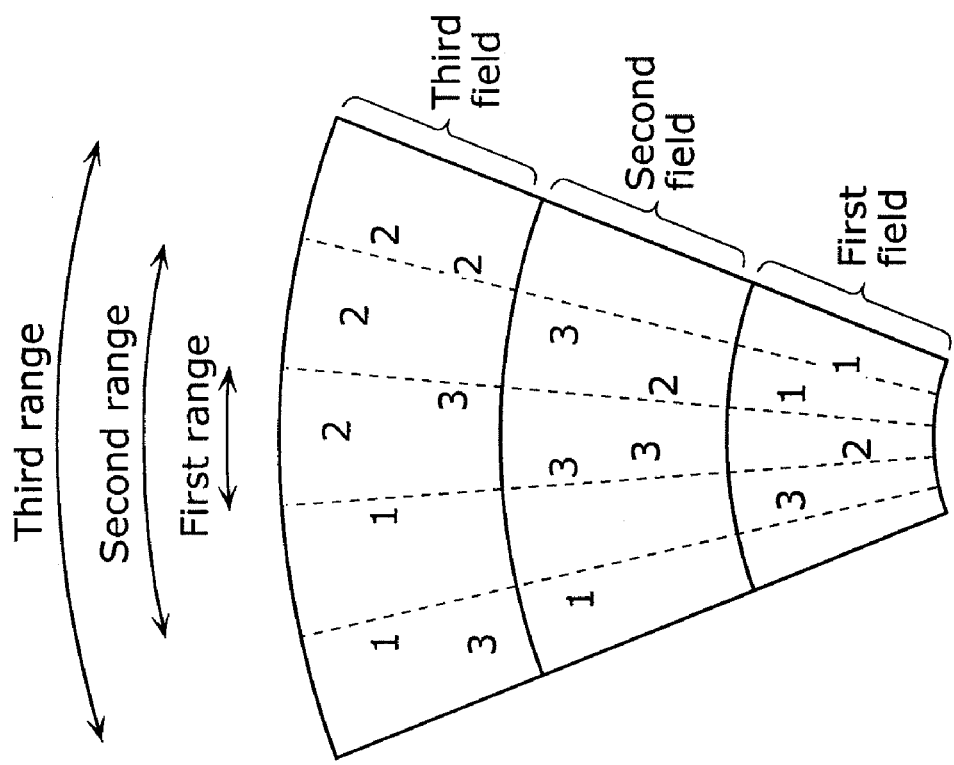

FIG. 29

| Data | Description |
|---|---|
| 123456.00 | = Universal time coordinated (UTC) 12:34:56.00 |
| 4567.123456,N | = Latitude 45 degrees 67.123456 minutes north (north latitude) |
| 13512.012345,E | = Longitude 135 degrees 12.012345 minutes east (east latitude) |
| 020.0,T | = Traveling direction (degree) due north |
| 10° | = Image-capturing range information 1 |
| 170° | = Image-capturing range information 2 |
| 00-10-F2-15-10-20 | = ID of image capturing apparatus |
| FILTER-DATA | = Filter data |

FIG. 34

| Data | Description |
| --- | --- |
| 123456.00 | = Universal time coordinated (UTC) 12:34:56.00 |
| 4567.123456,N | = Latitude 45 degrees 67.123456 minutes north (north latitude) |
| 13512.012345,E | = Longitude 135 degrees 12.012345 minutes east (east latitude) |
| 020.0,T | = Traveling direction (degree) due north |
| 10° | = Image-capturing range information 1 |
| 170° | = Image-capturing range information 2 |
| 00-10-F2-15-10-20 | = ID of image capturing apparatus |
| 102.4 | = Altitude information |

FIG. 36

| Data | Description |
|---|---|
| 123456.00 | = Universal time coordinated (UTC) 12:34:56.00 |
| 4567.123456,N | = Latitude 45 degrees 67.123456 minutes north (north latitude) |
| 13512.012345,E | = Longitude 135 degrees 12.012345 minutes east (east latitude) |
| 020.0,T | = Traveling direction (degree) due north |
| 10° | = Image-capturing range information 1 |
| 170° | = Image-capturing range information 2 |
| 00-10-F2-15-10-20 | = ID of image capturing apparatus |
| 102.4 | = Altitude information |
| 15.36 | = Elevation angle information |

FIG. 37

| Data | Description |
|---|---|
| 123456.00 | = Universal time coordinated (UTC) 12:34:56.00 |
| 4567.123456,N | = Latitude 45 degrees 67.123456 minutes north (north latitude) |
| 13512.012345,E | = Longitude 135 degrees 12.012345 minutes east (east latitude) |
| 020.0,T | = Traveling direction (degree) due north |
| 10° | = Image-capturing range information 1 |
| 170° | = Image-capturing range information 2 |
| 2 | = Maximum displayed landmark count per field |
| 00-10-F2-15-10-20 | = ID of image capturing apparatus |

FIG. 46
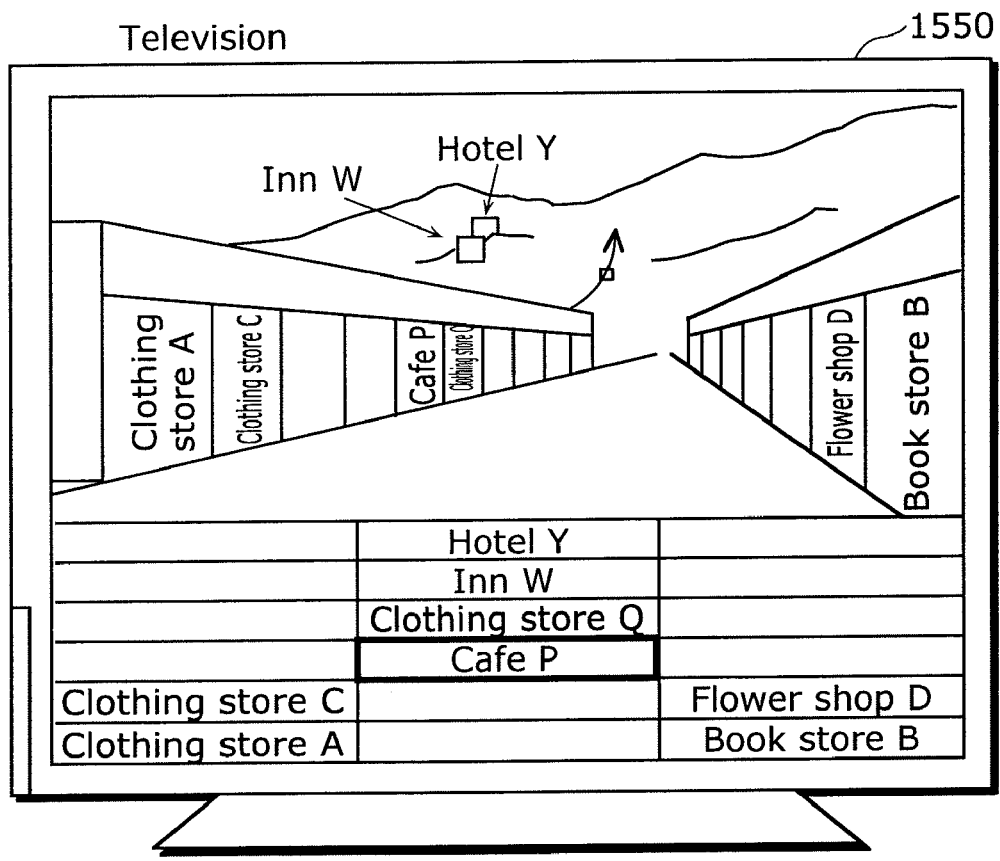
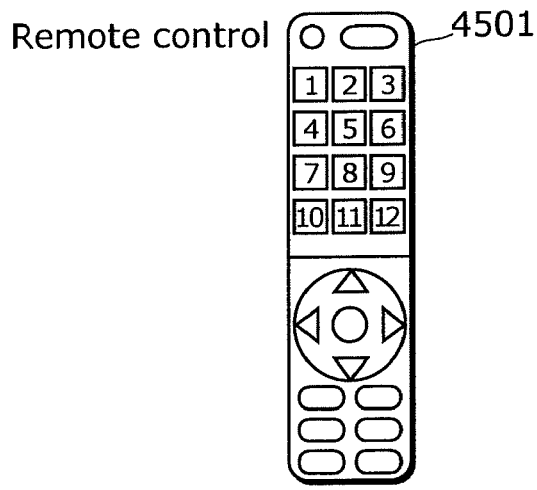

FIG. 47
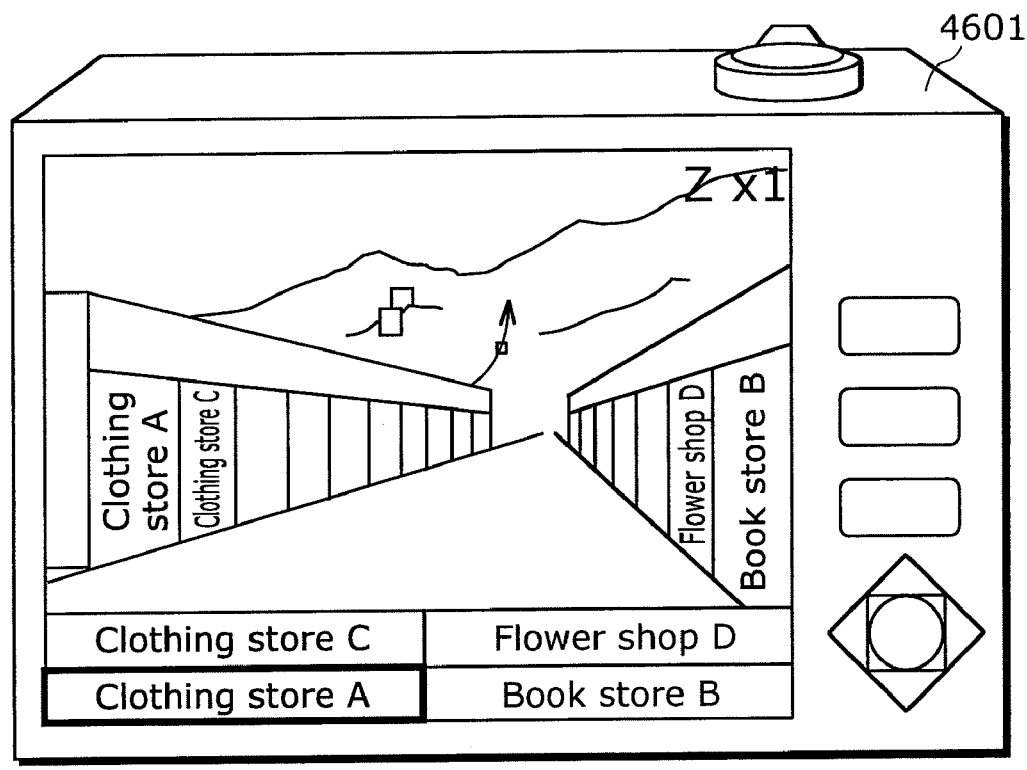
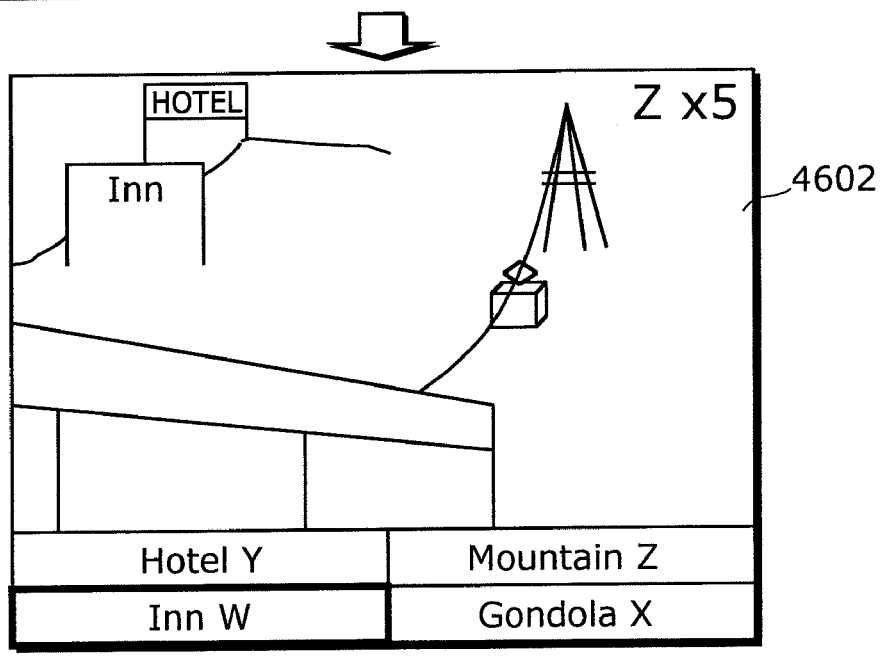

FIG. 49
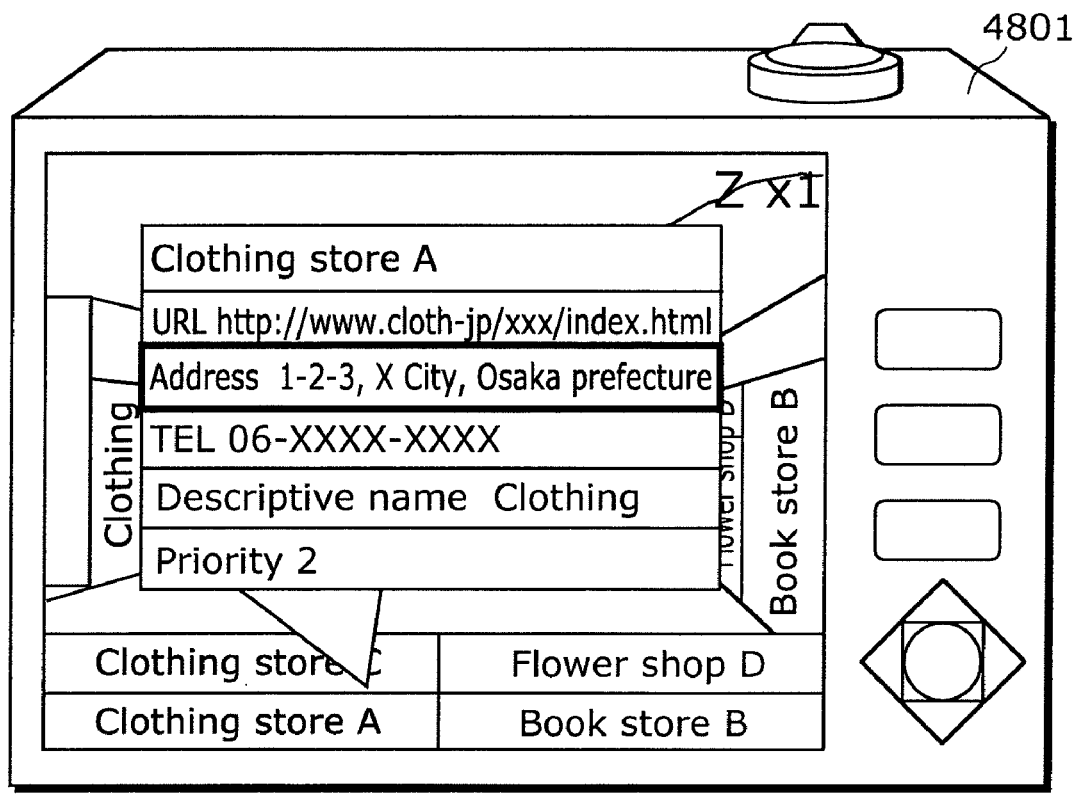
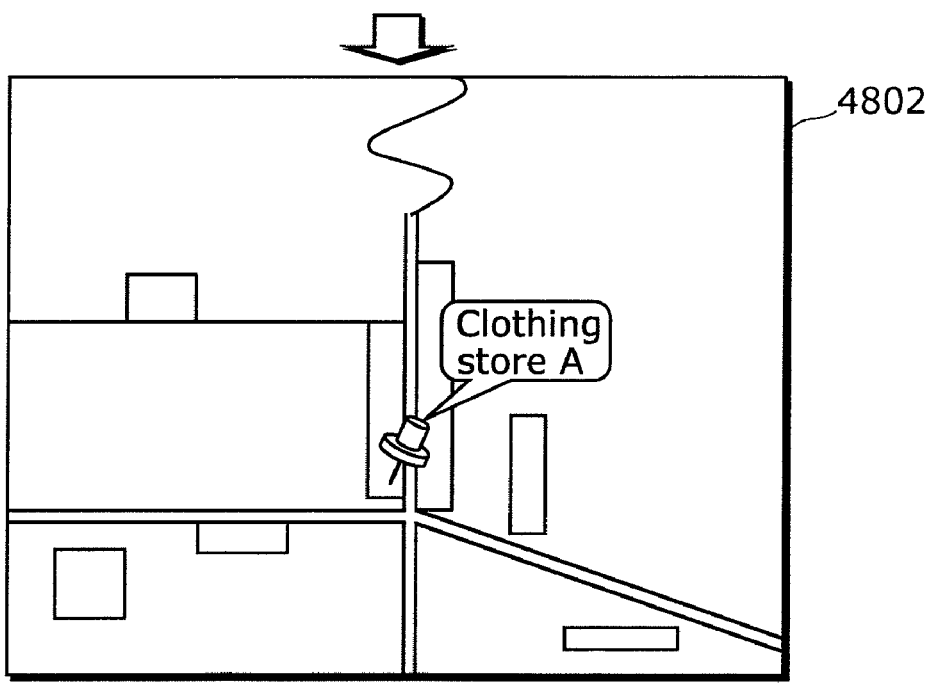

FIG. 72

| Data | Description |
|---|---|
| 123456.00 | = Universal time coordinated (UTC) 12:34:56.00 |
| 4567.123456,N | = Latitude 45 degrees 67.123456 minutes north (north latitude) |
| 13512.012345,E | = Longitude 135 degrees 12.012345 minutes east (east latitude) |
| 020.0,T | = Traveling direction (degree) due north |
| 10° | = Image-capturing-range information 1 |
| 170° | = Image-capturing-range information 2 |
| 00-10-F2-15-10-20 | = ID of image capturing apparatus |
| www.community.com | = Internet forum address |
| ID-0123456 | = Forum user ID |
| FILTER-DATA | = Filter data |
| 102.4 | = Altitude information |
| 15.36 | = Elevation angle |
| 2 | = Maximum displayed landmark count per field |
| × 3 | = Zoom information |
| 55 degrees | = Wide angle information |
| 10 | = Displayable maximum length of name of landmark |
| ...... | ...... |

IMAGE CAPTURING APPARATUS, ADDITIONAL INFORMATION PROVIDING SERVER, AND ADDITIONAL INFORMATION FILTERING SYSTEM

TECHNICAL FIELD

The present invention relates to an image capturing apparatus, such as a camera, for filtering landmark information to be displayed in an image in which a plurality of landmark information on a captured subject overlap each other.

BACKGROUND ART

Conventionally, there are scene display systems that display, on displays for displaying scene images captured by image capturing apparatuses, descriptive information (landmark information) of the scenes to be overlaid on the scenes. The descriptive information includes, for example, the names of the scenes. Such scene display systems make it possible for the user to know, for example, the name of a building in a travel destination by aiming an image capturing apparatus at the building.

The scene labeling system in Patent Reference 1 includes a scene labeling terminal that obtains scene information, and a scene labeling server that is connected to the scene labeling terminal through a communication network. Patent Reference 1 discloses a technique that makes it possible to know the name of a landmark in an image captured by a user using an image capturing apparatus, by displaying labeling information transmitted from the scene labeling server, in a position corresponding to a position of the landmark in the image, to be overlaid on a scene obtained by the scene labeling terminal. The scene labeling system in Patent Reference 1 discloses the technique for supporting the user to verify a travel route in a car navigation system, thus making it easier to associate an actual scene with the image.

FIG. 1 illustrates the configuration of the scene labeling system disclosed in Patent Reference 1. The scene labeling terminal 5112 obtains an image-capturing position, a camera angle, a focal distance, and other information while an image is being captured, and transmits the information to the scene labeling center 5113. The scene labeling center 5113 previously generates map data in a computer as three-dimensional data. The scene labeling center 5113 generates an computer graphics image of the scene viewed from the scene labeling terminal 5112 in a three-dimensional space in the computer, based on the information received from the scene labeling terminal 5112, while capturing the image. The scene labeling center 5113 obtains geographical information represented by the names of constructions included in the scene, from the generated computer graphics image, and transmits the geographical information to the scene labeling terminal 5112.

The scene labeling terminal 5112 displays the received geographical information overlaid on the image, in respective positions where the constructions included in the image that is an actual scene seem to be displayed.

Patent Reference 1: Japanese Patent No. 3225882

DISCLOSURE OF INVENTION

Problems that Invention is to Solve

However, in Patent Reference 1, landmarks are displayed in an overlaying manner for clarifying a correspondence between an actual scene and the captured image of the scene. Thus, when the scene labeling terminal 5112 is used for viewing a plurality of landmark information and the plurality of landmark information, such as the names of a construction and a facility, is displayed in an image in the overlaying manner, increase in the number of landmarks included in the captured image results in increase in the number of landmarks to be displayed in the image capturing apparatus. Since an image displayed on the image capturing apparatus is small, the user has difficulty in viewing the image including a large number of landmarks. Thus, there is a problem of degradation in viewability of the display by the user. For example, when the images of buildings are captured from a distance, the names of buildings closer to the user are all displayed. Thus, there is a problem that the user has difficulties in understanding a correspondence between the buildings and the landmarks.

Furthermore, since there is no vertical correlation between (i) a distance from a conventional image capturing apparatus to a construction and (ii) an image of the construction captured by the image capturing apparatus, there is a problem of a difficulty in displaying a plurality of landmark information in a position of the actual construction in the overlaying manner. In order to solve the problem, in Patent Reference 1, a view space is created by using the computer graphics images. In other words, in Patent Reference 1, the scene labeling center 5113 previously creates the map data in the computer as three-dimensional data in order to obtain the landmark information of the captured scene. Next, the scene labeling terminal 5112 (image capturing apparatus) transmits position information, a camera angle, a focal distance, and image size information to the scene labeling center 5113. Then, the scene labeling center 5113 obtains a view space viewed from the image capturing apparatus, and obtains information of the constructions present in the view space. Furthermore, every time the position information, camera angle, focal distance, and image size information are changed, the view space needs to be calculated for obtaining information of the constructions. Accordingly, there is a problem of an enormous increase in the calculation by the server to obtain the landmark information.

Furthermore, the scene labeling system in Patent Reference 1 includes an image processing unit that divides the obtained image into sub-fields each including subjects. Since the image capturing apparatus needs to extract edges, there is a problem of an enormous increase in an amount of the calculation by the image capturing apparatus.

Means to Solve the Problems

The present invention has been conceived in view of such situations, and uses the following units to solve the aforementioned problems.

In other words, the image capturing apparatus includes: an imaging unit configured to capture a digital image; an additional-information obtaining unit configured to obtain a plurality of additional information from a predetermined holding device that holds the plurality of additional information, the plurality of additional information each corresponding to an object included in the digital image captured by the imaging unit; a selecting unit configured to select one of the plurality of additional information to be displayed, from among the plurality of additional information obtained by the additional-information obtaining unit; and a display unit configured to display only the additional information overlaid on the digital image captured by the imaging unit, the additional information being selected by the selecting unit from among the plurality of additional information.

Thereby, the image capturing apparatus can prevent excessive additional information from being displayed while useful additional information is displayed, and display the optimum number of additional information.

Effects of the Invention

The present invention makes it possible to prevent excessive additional information from being displayed and display the optimum number of additional information.

BRIEF DESCRIPTION OF DRAWINGS

FIG. 4 shows an example of data to be transmitted from an image capturing apparatus to a map server.

FIG. 12 illustrates an example of a correspondence table between zoom ratios and display fields.

FIG. 15 illustrates an example of a filtering method using hierarchical levels.

FIG. 24 shows an example of data to be transmitted from an image capturing apparatus to a map server according to Embodiment 3 of the present invention.

FIG. 27 is an example of displayed landmarks according to priorities.

FIG. 29 shows an example of data to be transmitted from an image capturing apparatus to a map server according to Embodiment 4 of the present invention.

FIG. 34 shows an example of data to be transmitted from an image capturing apparatus to a map server.

FIG. 36 shows an example of data to be transmitted from an image capturing apparatus to a map server.

FIG. 37 shows an example of data to be transmitted from an image capturing apparatus to a map server.

FIG. 46 illustrates an example of a method for displaying landmark information in an overlaying manner.

FIG. 47 illustrates an example of a method for displaying landmark information in an overlaying manner.

FIG. 49 illustrates an example of a method for displaying landmark information in an overlaying manner.

FIG. 72 shows an example of a format of data to be transmitted from an image capturing apparatus to a map server.

NUMERICAL REFERENCES

Figure 1:
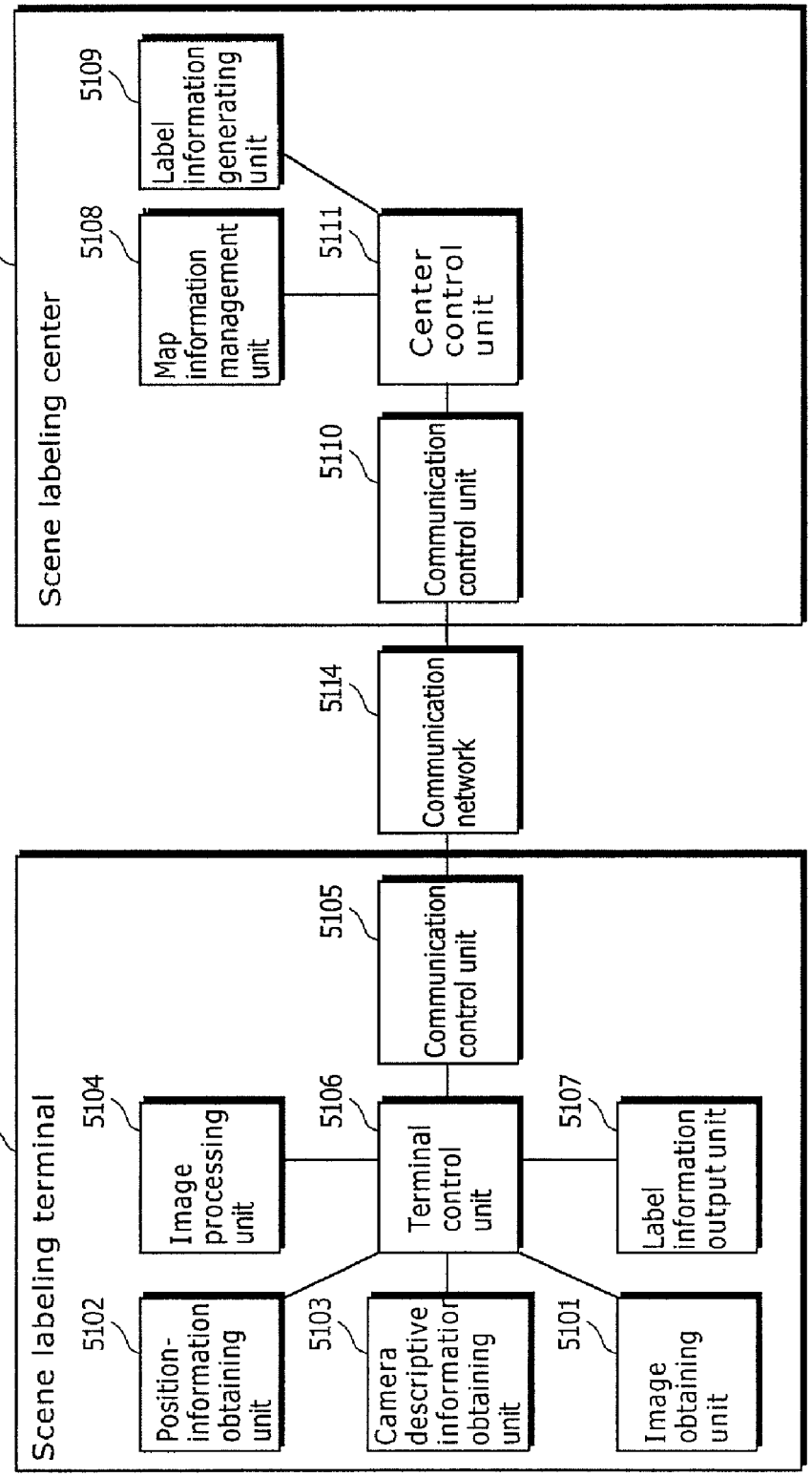
FIG. 1 illustrates a configuration of a prior art.

102 Image capturing apparatus
103 Position-information obtaining unit
104 Position-information detecting unit
105 Position-information output unit
106 Image-capturing direction obtaining unit
107 Image-capturing direction detecting unit
108 Image-capturing direction output unit
109 Filter-information detecting unit
110 Filter-information output unit
111 Filter-information obtaining unit
112 Communication unit
113 Display-information extracting unit
114 Imaging unit
115 Image processing unit
116 Overlaying display processing unit
117 Display unit
118 Map database
119 Landmark-information extracting unit
120 Map server
121 Image-capturing-apparatus descriptive information generating unit
122 Image-capturing range information obtaining unit
550 Rail

BEST MODE FOR CARRYING OUT THE INVENTION

A scene filtering system according to Embodiment 1 of the present invention will be described with reference to drawings.

Embodiment 1

An image capturing apparatus (an image capturing apparatus 102) according to Embodiment 1 includes: an imaging unit (an imaging unit 114 and an image processing unit 115) configured to capture a digital image; an additional-information obtaining unit (a communication unit 112) configured to obtain a plurality of additional information from a predetermined holding device (a map server 120) that holds the plurality of additional information, the plurality of additional information each corresponding to an object included in the digital image captured by the imaging unit; a selecting unit (a display-information extracting unit 113) configured to select one of the plurality of additional information to be displayed, from among the plurality of additional information obtained by the additional-information obtaining unit; and a display unit (an overlaying display processing unit 116 and a display unit 117) configured to display only the additional information overlaid on the digital image captured by the imaging unit, the additional information being selected by the selecting unit from among the plurality of additional information.

Thus, only the selected, useful additional information is displayed together with the digital image, from among all of the plurality of additional information including the corresponding objects included in the digital image. Thus, too many number of the additional information can be prevented from being displayed while the useful additional information is displayed, and an appropriate count of the additional information can be displayed.

Furthermore, the image capturing apparatus according to Embodiment 1 further includes: an image-capturing position obtaining unit (a position-information obtaining unit 103) configured to obtain an image-capturing position in which the imaging unit captures the digital image; and an image-capturing direction obtaining unit (an image-capturing direction obtaining unit 106) configured to obtain an image-capturing direction in which the imaging unit captures the digital image, wherein the additional-information obtaining unit is configured to obtain, from a predetermined additional information storing device, each of the plurality of additional information associated with the obtained image-capturing direction and the obtained image-capturing position, the predetermined additional information storing device storing the plurality of additional information of the objects captured in the digital image, in association with image-capturing directions and image-capturing positions, and the digital image being captured in the image-capturing direction with respect to the image-capturing position.

Thus, the image capturing apparatus specifies a field captured in the digital image, and specifies each object included in the digital image and including a position in the specified field. Upon obtainment of the image-capturing position and direction, the image capturing apparatus obtains additional information included in each of the objects and corresponding to the obtained image-capturing position and direction. Thereby, for example, the digital image is transmitted to an additional information storing device for detailed analysis on the transmitted digital image while the image-capturing position and direction are not notified. This process eliminates the need for a complicated mechanism including obtainment of the necessary additional information by the image capturing apparatus. Thus, the image capturing apparatus can obtain the necessary additional information with the simple mechanism.

Furthermore, in the image capturing apparatus according to Embodiment 1, the plurality of additional information respectively includes positions of the objects, the imaging unit is configured to obtain a zoom ratio used when capturing the digital image, and the selecting unit is configured to select a corresponding one of the plurality of additional information which includes a position at a distance from the obtained image-capturing position, the distance becoming longer as the obtained zoom ratio for enlargement is higher and having a predetermined correspondence with the zoom ratio.

Thus, an image is captured at a ratio that enables significant enlargement. When the user is interested in an object that is more distant, the additional information of the object can be more precisely displayed.

Furthermore, the image capturing apparatus according to Embodiment 1 further includes an image-capturing direction obtaining unit configured to obtain an image-capturing direction in which the imaging unit captures the digital image, and wherein the selecting unit is configured to calculate a position range based on the image-capturing position, the image-capturing direction, and the zoom ratio that have been obtained, the position range (i) being included in a range in which the distance from the obtained image-capturing position is associated with the obtained zoom ratio and (ii) being oriented in the image-capturing direction with respect to the obtained image-capturing position, and select a corresponding one of the plurality of additional information that includes a position included in the calculated position range.

Thus, the image capturing apparatus displays additional information in a position in a range determined by the image-capturing position and image-capturing direction in which the image has been captured. Thereby, the image capturing apparatus selects and displays the additional information indicating that not only a distance to an object for which the additional information is displayed but also the image-capturing position and image-capturing direction are taken into account. That is, useful additional information can be selected and displayed more precisely and reliably.

Furthermore, additional information located within a certain range having a moderate width is displayed, so that such useful additional information can be displayed more reliably.

Furthermore, the image capturing apparatus according to Embodiment 1 further includes a camera shake detecting unit configured to detect a camera shake caused by a photographer shaking the image capturing apparatus, wherein the display unit is configured to continuously display a corresponding one of the plurality of additional information that is displayed when the camera shake detecting unit starts to detect the camera shake, while the camera shake detecting unit detects the camera shake of the photographer.

Thus, the camera shake is detected. When the obtained zoom ratio is not appropriate for use in selecting additional information to be displayed, additional information that has been displayed immediately before it becomes inappropriate and that is used when detection of additional information is started is continuously displayed, thereby preventing the display of the additional information from becoming unreadable. Thus, even when the display is continuously readable and then the camera shake occurs, the appropriate display becomes possible.

Furthermore, in the image capturing apparatus according to Embodiment 1, the plurality of additional information respectively includes positions of the objects, the imaging unit is configured to obtain a focal distance used when capturing the digital image, and the selecting unit is configured to select a corresponding one of the plurality of additional information which includes a position at a distance from the obtained image-capturing position, the distance becoming longer as the obtained focal distance is longer and having a predetermined correspondence with the focal distance.

Thus, when an image is captured at a farther distance with a farther focal distance and the user is interested in an object that is more distant, the additional information of the object that is at a farther distance and that interests the user can be more precisely and reliably displayed.

Furthermore, the image capturing apparatus according to Embodiment 1 further includes a person recognizing unit configured to recognize a person whose image is being captured; and a person focusing unit configured to focus the person recognized by the person recognizing unit, wherein the imaging unit is configured to obtain a zoom ratio used when capturing the digital image, and the selecting unit is configured to select a corresponding one of the plurality of additional information in a position at a distance from the obtained image-capturing position, the distance becoming longer as the obtained zoom ratio for enlargement is higher and having a predetermined correspondence with the zoom ratio, when the imaging unit captures the digital image by focus the person using the person focusing unit.

Thus, when the person recognizing unit recognizes a person and the person focusing unit focuses the person, in the case where an image is captured at a focal distance where any useful additional information is not shown to the user, one or more of the plurality of additional information is selected according to a zoom ratio, not the focal distance. Thus, since the image capturing apparatus has a function for recognizing a person and focusing the person, the additional information can be appropriately selected according to the zoom ratio, and the selected additional information can be displayed.

Furthermore, in the image capturing apparatus according to Embodiment 1, the plurality of additional information respectively includes positions of the objects, the imaging unit is configured to obtain a view angle used when capturing the digital image, and the selecting unit is configured to select a corresponding one of the plurality of additional information corresponding to a position in a predetermined range determined by viewing the obtained view angle from the obtained image-capturing position.

Thus, the additional information of the object that is in a predetermined range and interests the user when the digital image viewed from an image-capturing position with the view angle is displayed is selected. Accordingly, necessary additional information can be selected and displayed more appropriately.

Furthermore, in the image capturing apparatus according to Embodiment 1, the selecting unit is configured to select corresponding one or more of the plurality of additional information each corresponding to a position included in a sub-field, for each of the sub-fields obtained by dividing a field per predetermined unit angle, the field being determined by viewing the obtained view angle from the obtained image-capturing position, and the plurality of additional information having a predetermined count.

Furthermore, in the image capturing apparatus according to Embodiment 1, each of the plurality of additional information includes hierarchical information specifying a hierarchical level including a corresponding one of the objects, from among hierarchical levels including a lower hierarchical level and a higher hierarchical level, the lower hierarchical level including an object being a portion of an object of the higher hierarchical level, and the selecting unit is configured to select one or more of the hierarchical levels to be selected from among the hierarchical levels, the one or more of the hierarchical levels each having a total count of the plurality of additional information not larger than a predetermined count, the plurality of additional information (i) each including the hierarchical information indicating one of the hierarchical levels and (ii) each corresponding to the position included in the sub-field, and select corresponding one or more of the plurality of additional information included in the selected one or more of the hierarchical levels.

Thus, one or more of the plurality of additional information having the count and being in an appropriate hierarchical level can be selected and displayed.

Furthermore, in the image capturing apparatus according to Embodiment 1, the plurality of additional information respectively includes positions of the objects, and the selecting unit is configured to select a corresponding one of the plurality of additional information corresponding to a position in a predetermined view space determined by viewing the obtained image-capturing direction from the obtained image-capturing position.

Furthermore, in the image capturing apparatus according to Embodiment 1, the selecting unit is configured to select a corresponding one of the plurality of additional information corresponding to a position included in a mesh, for each of meshes obtained by dividing the view space.

Furthermore, in the image capturing apparatus according to Embodiment 1, the selecting unit is configured to select corresponding one or more of the plurality of additional information respectively corresponding to positions included in a sub-field and having a predetermined count, for each of sub-fields obtained by dividing the view space, the sub-fields respectively having different distances from the obtained image-capturing position.

Furthermore, in the image capturing apparatus according to Embodiment 1, each of the plurality of additional information includes hierarchical information specifying a hierarchical level including a corresponding one of the objects, from among hierarchical levels including a lower hierarchical level and a higher hierarchical level, the lower hierarchical level including an object being a portion of an object of the higher hierarchical level, and the selecting unit is configured to select one or more of the hierarchical levels from among the hierarchical levels, the one or more of the hierarchical levels each having a total count of a plurality of selection information not larger than a predetermined count, the plurality of selection information (i) each including a corresponding one of the plurality of hierarchical information specifying a corresponding one of the hierarchical levels (ii) respectively including the positions included in the divided sub-fields, and select corresponding one or more of the plurality of additional information included in the selected one or more of the hierarchical levels.

Furthermore, in the image capturing apparatus according to Embodiment 1, the selecting unit is configured to select corresponding one or more of the plurality of additional information, in the sub-fields, ranging from additional information corresponding to a position having a smallest angle from the obtained image-capturing direction to additional information corresponding to a position having a predetermined number-th smallest angle from the obtained image-capturing direction, when the count of the plurality of additional information corresponding to the positions in the sub-fields exceeds the predetermined count.

Furthermore, in the image capturing apparatus according to Embodiment 1, the plurality of additional information respectively includes categories of the objects, and the selecting unit is configured to select a corresponding one of the plurality of additional information belonging to a predetermined category, from among the plurality of additional information obtained by the additional-information obtaining unit.

Furthermore, in the image capturing apparatus according to Embodiment 1, the categories include at least one of a genre, a popularity ranking, and a retrieval order.

Furthermore, the image capturing apparatus according to Embodiment 1 further includes: an identification information holding unit configured to hold user identification information for identifying a user; and a user information obtaining unit configured to transmit the held user identification information to an information providing server that holds predetermined category correspondence information between the user identification information and the category, and obtain a corresponding one of the categories corresponding to the category correspondence information to which the transmitted user identification information is corresponded, wherein the selecting unit is configured to select a corresponding one of the plurality of additional information using the obtained category as the predetermined category.

Furthermore, the image capturing apparatus according to Embodiment 1 further includes: a user information receiving unit configured to receive the predetermined category as the predetermined category from a user, wherein the selecting unit is configured to select a corresponding one of the plurality of additional information, based on a category included in the corresponding one of the plurality of additional information and the received category.

Furthermore, in the image capturing apparatus according to Embodiment 1, the plurality of additional information respectively includes heights of the objects, and the selecting unit is configured to select a corresponding one of the plurality of additional information having a height not shorter than a predetermined height.

Thus, the additional information of the object that (i) is easy to view, (ii) easily interests the user, and (iii) is higher is selected and displayed so that the additional information that easily interests the user and is necessary can be precisely displayed.

Furthermore, in the image capturing apparatus according to Embodiment 1, the selecting unit is configured to select one or more of the plurality of additional information having a predetermined count for each of sub-fields respectively including positions, the sub-fields (i) being obtained by dividing a predetermined view space determined by viewing the obtained image-capturing direction from the obtained image-capturing position and (ii) having different distances from the image-capturing position.

Furthermore, in the image capturing apparatus according to Embodiment 1, the plurality of additional information respectively includes height hierarchical level categories for categorizing the plurality of additional information into height hierarchical levels, according to each of the heights of the objects, the heights being included in the plurality of additional information, and the selecting unit is configured to select a corresponding one of the height hierarchical level categories for each of the sub-fields, the height hierarchical level categories having the predetermined count, and select a corresponding one of the plurality of additional information including the selected height hierarchical level category.

Furthermore, in the image capturing apparatus according to Embodiment 1, the selecting unit is configured to select corresponding one or more of the plurality of additional information ranging from additional information having a longest height to additional information having a predetermined number-th longest height, when the count of the plurality of additional information corresponding to the positions of the sub-fields exceeds the predetermined count.

Furthermore, in the image capturing apparatus according to Embodiment 1, the plurality of additional information respectively includes positions of the objects, and the image capturing apparatus further comprises a resolution obtaining unit configured to obtain a resolution when the display unit perform the displaying, and the selecting unit is configured to select corresponding one or more of the plurality of additional information from among the plurality of additional information corresponding to a position in a predetermined field determined by viewing the obtained image-capturing direction from the obtained image-capturing position, based on the image-capturing position, the image-capturing direction, and the resolution that are obtained, the corresponding one or more of the plurality of additional information having a count determined according to a resolution correspondence between a resolution and a count of the plurality of additional information, and the count of the plurality of additional information being increased as the resolution is higher.

Furthermore, in the image capturing apparatus according to Embodiment 1, the plurality of additional information respectively includes positions of the objects, the image capturing apparatus comprises a display area information detecting unit configured to obtain a dimension of a display area of the display unit, and the selecting unit is configured to select corresponding one or more of the plurality of additional information from among the plurality of additional information corresponding to a position in a predetermined field determined by viewing the obtained image-capturing direction from the obtained image-capturing position, based on the image-capturing position, the image-capturing direction, and the dimension of the display area that are obtained, the corresponding one or more of the plurality of additional information having a count determined according to a display-area correspondence between a dimension of the display area and a count of the plurality of additional information, and the count of the plurality of additional information being increased as the dimension of the display area is larger.

The image capturing apparatus according to Embodiment 1 further includes a detailed-information obtaining unit configured to transmit an identifier for identifying a corresponding one of the plurality of additional information to a predetermined detailed-information holding device that holds detailed information of the corresponding one of the plurality of additional information, and obtain the detailed information of the corresponding one of the plurality of additional information identified by the transmitted identifier, from the detailed-information holding device.

The image capturing apparatus according to Embodiment 1 further includes a detailed-information obtaining unit configured to transmit an identifier for identifying a corresponding one of the plurality of additional information to a predetermined storage address holding device that holds a storage address of detailed information of the corresponding one of the plurality of additional information, obtain the storage address of the detailed information of the corresponding one of the plurality of additional information identified by the transmitted identifier, from the storage address holding device, and obtain the detailed information by accessing an access destination indicated by the obtained storage address.

Furthermore, in the image capturing apparatus according to Embodiment 1, the detailed information of the corresponding one of the plurality of additional information: is information other than information included in the corresponding one of the plurality of additional information; and includes at least one of (i) a web content related to a corresponding one of the objects on the Internet, (ii) a computer graphics (CG) model of the corresponding one of the objects, and (iii) a similar image showing the corresponding one of the objects that has been previously captured, and the detailed-information obtaining unit is configured to obtain the detailed information that is identified by the identifier included in the corresponding one of the plurality of additional information and that is stored in a server on a predetermined network connected to the image capturing apparatus.

The image capturing apparatus according to Embodiment 1 further includes a detailed-information request receiving unit configured to receive a detailed-information obtainment request of an operator, wherein the detailed-information obtaining unit is configured to obtain the detailed information when the detailed-information request receiving unit receives the detailed-information obtainment request.

Furthermore, in the image capturing apparatus according to Embodiment 1, the detailed-information-request receiving unit is configured, when a zoom operation for enlarging an image of a corresponding one of the objects included in the digital image is performed, to receive the zoom operation as the detailed-information obtainment request of the detailed information of the corresponding one of the objects shown in the enlarged digital image.

Thus, with the zoom operation for enlarging the image of the object that interests the user, the detailed information obtainment request can be received naturally and simply.

Furthermore, in the image capturing apparatus according to Embodiment 1, the plurality of additional information respectively includes positions of the objects, the selecting unit is configured, when a zoom ratio is changed according to an operation of the operator, to select a corresponding one of the plurality of additional information to be displayed again by the display unit based on the changed zoom ratio, the zoom ratio being used when the imaging unit captures the digital image, and the detailed-information-request receiving unit is configured to receive the operation as the detailed-information obtainment request, when a count of the plurality of additional information that are selected according to the operation using the changed zoom ratio is not higher than a predetermined count.

Furthermore, an additional information providing server (a map server 120) according to Embodiment 1 includes: a database (a map database 118) that holds a plurality of additional information of objects; a receiving unit configured to receive, from a predetermined other device, an image-capturing position and an image-capturing direction in each of which a digital image is captured; an additional information extracting unit (a landmark-information extracting unit 119) configured to extract, from the database, one or more of the plurality of additional information corresponding to objects included in the digital image, according to whether or not positions of the objects correspond to the image-capturing position and the image-capturing direction that are received by the receiving unit, based on received information; and a transmitting unit configured to transmit the extracted one or more of the plurality of additional information to the other device.

Furthermore, in the additional information providing server according to Embodiment 1, the additional information extracting unit is configured to extract periphery additional information of an object having a position in a periphery of an image area of the digital image, as a portion of the plurality of additional information, after extracting the one or more of the plurality of additional information, and the transmitting unit is configured to transmit the extracted one or more of the plurality of additional information and the extracted periphery additional information to the other device.

Furthermore, the additional information providing server according to Embodiment 1 receives, from the other device, a zoom ratio used when the digital image is captured in the image-capturing direction with respect to the image-capturing position that are received, and extracts, from the database, a corresponding one of the plurality of additional information of an object in a position included in a predetermined sub-field that is at a distance from the obtained image-capturing position, the distance becoming longer as the obtained zoom ratio for enlargement is higher and having a predetermined correspondence with the zoom ratio, and the sub-field being included in a field being in a predetermined position and oriented in the image-capturing direction with respect to the image-capturing position.

Furthermore, in the additional information providing server according to Embodiment 1, the receiving unit is configured to receive a focal distance used when the digital image is captured, and the additional information extracting unit is configured to extract, from the database, a corresponding one of the plurality of additional information of a object in a position included in a predetermined sub-field that is at a distance from the obtained image-capturing position, the distance becoming longer as the obtained focal distance is longer and having a predetermined correspondence with the focal distance, and the sub-field being included in a field being oriented in the image-capturing direction with respect to the image-capturing position.

Furthermore, in the additional information providing server according to Embodiment 1, the receiving unit is configured to receive a view angle used when the digital image is captured, and the additional information extracting unit is configured to extract, from the database, a corresponding one of the plurality of additional information corresponding to an object including a position in a predetermined field determined by the image-capturing direction and the view angle with respect to the image-capturing position.

Furthermore, in the additional information providing server according to Embodiment 1, the plurality of additional information respectively includes categories of the objects, and the additional information extracting unit is configured to extract only a corresponding one of the plurality of additional information belonging to a predetermined category from among the categories.

Furthermore, in the additional information providing server according to Embodiment 1, the plurality of additional information respectively includes heights of the objects, and the additional information extracting unit is configured to extract only a corresponding one of the plurality of additional information having a height not shorter than a predetermined height.

Furthermore, in the additional information providing server according to Embodiment 1, the receiving unit is configured to receive a resolution used when the digital image is captured, and the additional information extracting unit is configured to extract only corresponding one or more of the plurality of additional information having a count determined according to a resolution correspondence between a zoom ratio and a count of the plurality of additional information, and the count of the plurality of additional information being increased as the received resolution is higher.

Furthermore, in the additional information providing server according to Embodiment 1, the receiving unit is configured to receive, from the other device, a dimension of a display area in which the digital image is displayed, and the additional information extracting unit is configured to extract only corresponding one or more of the plurality of additional information having a count determined according to a predetermined display-area correspondence between a dimension of a display area and a count of the plurality of additional information, and the count of the plurality of additional information being increased as the dimension of the display area is larger.

Furthermore, the additional information providing server according to Embodiment 1 includes: a descriptive information holding unit configured to hold descriptive information of a photographer; and an identification information receiving unit configured to receive, from the other device, identification information for identifying the photographer who captures the digital image, wherein the additional information extracting unit includes a descriptive information obtaining unit configured to obtain the descriptive information of the photographer from the descriptive information holding unit, the descriptive information being identified by the received identification information.

Furthermore, the additional information providing server according to Embodiment 1 includes: an identifier receiving unit configured to receive, from the other device, an identifier for identifying a corresponding one of the plurality of additional information; and a detailed-information transmitting unit configured to transmit a storage address to the other device, the storage address storing detailed information of the corresponding one of the plurality of additional information identified by the received identifier.

Furthermore, the additional information providing server according to Embodiment 1 includes: an identifier receiving unit configured to receive an identifier for identifying a corresponding one of the plurality of additional information held by the additional information providing server; and a detailed-information transmitting unit, upon receipt of the identifier, configured to obtain, from a predetermined detailed-information database, detailed information of the corresponding one of the plurality of additional information identified by the received identifier, and transmit the obtained detailed information to the other device.

Furthermore, in the additional information providing server according to Embodiment 1, the detailed information is: information other than information included in the corresponding one of the plurality of additional information; and includes at least one of (i) a web content related to a corresponding one of the objects on the Internet, (ii) a computer graphics (CG) model of the corresponding one of the objects, and (iii) a similar image showing the corresponding one of the objects that has been previously captured, and the additional information providing server comprises a database that stores the detailed information.

Furthermore, an additional information filtering system (a system 101) according to Embodiment 1 includes: an image capturing apparatus (image capturing apparatus 102) configured to capture a digital image; and an additional information providing server (map server 120) that transmits a plurality of additional information of objects captured by the image capturing apparatus, to the image capturing apparatus, the image capturing apparatus including: an imaging unit (imaging unit 114 and image processing unit 115) configured to capture the digital image; an image-capturing position obtaining unit configured to obtain an image-capturing position in which the imaging unit captures the digital image; an image-capturing direction obtaining unit configured to obtain an image-capturing direction in which the imaging unit captures the digital image; a transmitting unit configured to transmit the image-capturing position and the image-capturing direction that are obtained, to the additional information providing server; an additional-information obtaining unit configured to obtain the plurality of additional information from the additional information providing server, the plurality of additional information each corresponding to the objects included in the digital image captured by the imaging unit; a selecting unit configured to select a corresponding one of the plurality of additional information to be displayed, from among the plurality of additional information obtained by the additional-information obtaining unit; and a display unit configured to display the corresponding one of the plurality of additional information overlaid on the digital image captured by the imaging unit, the corresponding one of the plurality of additional information being selected by the selecting unit, and the additional information providing server including: a receiving unit configured to receive, from the image capturing apparatus, the image-capturing position and the image-capturing direction; a database that holds the plurality of additional information of the objects included in the digital image; an additional information extracting unit configured to extract, from the database, one or more of the plurality of additional information, according to whether or not positions of the objects correspond to the image-capturing position and the image-capturing direction that are received by the receiving unit, based on received information; and a transmitting unit configured to transmit the extracted one or more of the plurality of additional information to the image capturing apparatus.

Furthermore, in the image capturing apparatus according to Embodiment 1, the display unit is configured to display the corresponding one of the plurality of additional information selected by the selecting unit horizontally in a portion of the image capturing apparatus, the portion corresponding to a direction in an orientation of a position of a corresponding one of the objects of the selected additional information with respect to the obtained image-capturing position.

Furthermore, in the image capturing apparatus according to Embodiment 1, the display unit is configured to display the corresponding one of the plurality of additional information selected by the selecting unit vertically in a portion of the image capturing apparatus, the portion corresponding to a distance to a position of a corresponding one of the objects of the selected additional information with respect to the obtained image-capturing position.

Furthermore, in the image capturing apparatus according to Embodiment 1, the display unit is configured to display: the digital image obtained by the image capturing unit; a box on the displayed digital image; and only a corresponding one of the plurality of additional information of the objects to be overlaid on the digital image, the corresponding one of the plurality of additional information being included in the displayed box, from among the plurality of additional information selected by the selecting unit.

Furthermore, in the image capturing apparatus according to Embodiment 1, the box to be displayed is a rectangle having a height equal to a height of the digital image displayed by the display unit, and the display unit is configured to display the box horizontally in a center of the displayed digital image.

Furthermore, the scene filtering system according to an A aspect of Embodiment 1 includes: an imaging unit configured to capture a digital image; an image-capturing position information obtaining unit configured to obtain position information indicating a place in which the imaging unit captures the digital image; an image-capturing direction obtaining unit configured to obtain a direction in which the imaging unit captures the digital image; an additional-information obtaining unit configured to obtain a plurality of additional information based on the place and the direction in which the imaging unit captures the digital image, the plurality of additional information (i) being represented by names of subjects and others and (ii) corresponding to subject information included in the digital image captured by the imaging unit; a selecting unit configured to select a corresponding one of the plurality of additional information to be displayed, from among the plurality of additional information obtained by the additional-information obtaining unit; and a display unit configured to display the corresponding one of the plurality of additional information overlaid on the digital image captured by the imaging unit, the corresponding one of the plurality of additional information being selected by the selecting unit.

Furthermore, the scene filtering system according to an B aspect of Embodiment 1 includes: an image capturing apparatus configured to capture a digital image; and an additional information providing server that transmits a plurality of additional information on subjects, wherein the image capturing apparatus includes: an image-capturing position information obtaining unit configured to obtain position information indicating a place in which the imaging unit captures the digital image; an image-capturing direction obtaining unit configured to obtain a direction in which the imaging unit captures the digital image; a transmitting unit configured to transmit the place and the direction that are obtained, to the additional information providing server; an additional-information obtaining unit configured to obtain, from the additional information providing server, the plurality of additional information based on the place and the direction in which the imaging unit captures the digital image, the plurality of additional information being represented by names of subjects and corresponding to subject information included in the digital image captured by the imaging unit; and a selecting unit configured to select a corresponding one of the plurality of additional information to be displayed, from among the plurality of additional information obtained by the additional-information obtaining unit; and a display unit configured to display the corresponding one of the plurality of additional information overlaid on the digital image captured by the imaging unit, the corresponding one of the plurality of additional information being selected by the selecting unit, and the additional information providing server includes: a database that holds a plurality of additional information on objects; a receiving unit configured to receive the place and the direction that are obtained; an additional information extracting unit configured to extract, from the database, corresponding one or more of the plurality of additional information for each of the subjects included in the digital image, according to received information; and a transmitting unit configured to transmit the extracted information.

According to the A and B aspects, the image capturing apparatus can display only information according to an objective of the user, thus enabling the user to view the improved list of a plurality of landmark information. Furthermore, since the map server that transmits the landmark information does not need to calculate a view space of the image capturing apparatus, the map server can reduce an amount of the calculation for obtaining landmark information. Furthermore, without the calculation of a view space, the landmark information to be displayed by the image capturing apparatus can be displayed in a manner so that the user can understand a correspondence between the landmark information and the actual scene. Furthermore, the image capturing apparatus can reduce an amount of calculation.

FIGS. 2 to 14, 38 to 44, 45, and 47 to 50 are drawings according to Embodiment 1.

Figure 2:
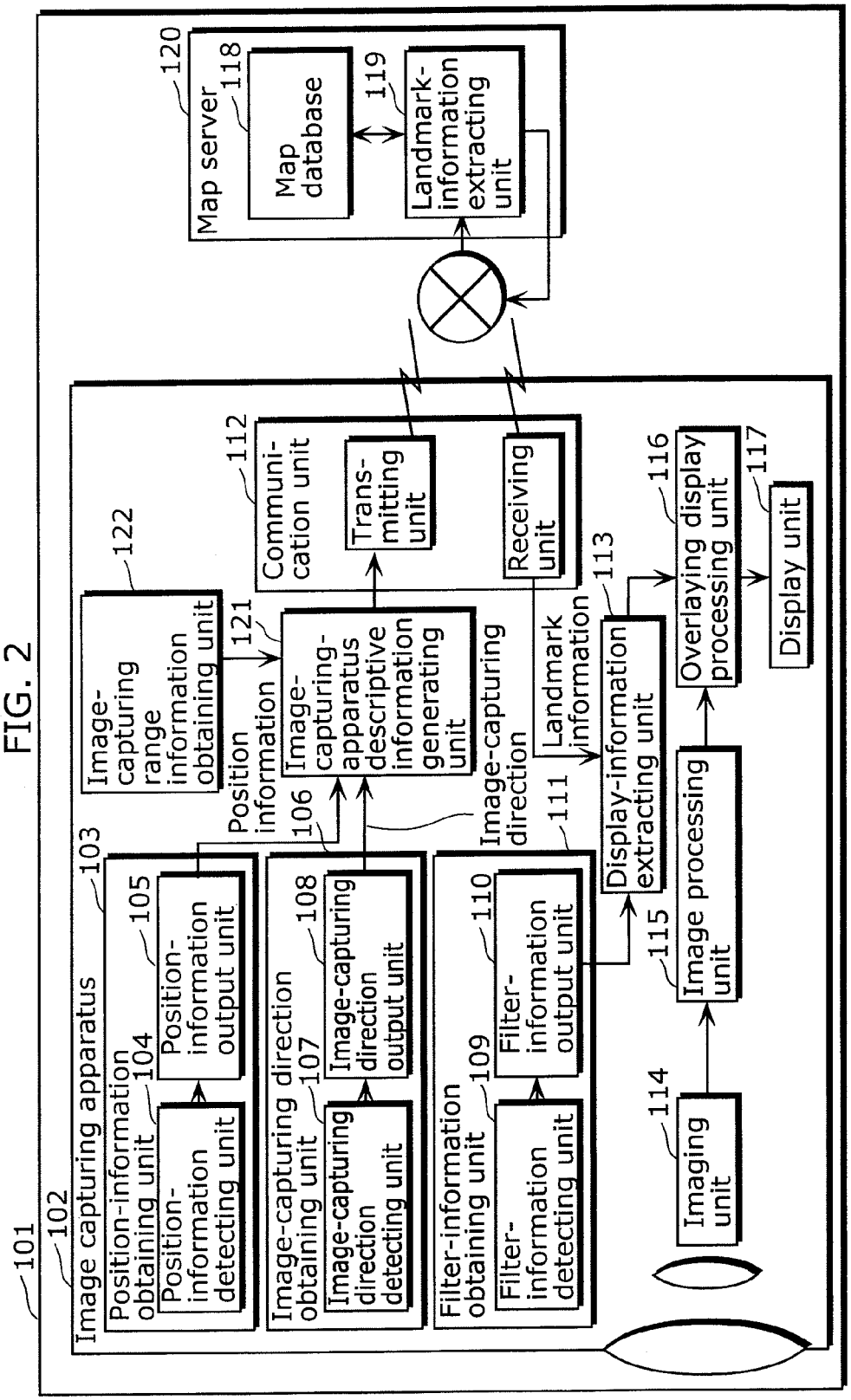
FIG. 2 illustrates a configuration of Embodiment 1 of the present invention.

FIG. 2 illustrates a configuration of Embodiment 1 of the present invention.

An entire configuration of Embodiment 1 (the system 101) mainly includes the image capturing apparatus 102 and the map server 120.

The image capturing apparatus 102 generates auxiliary information on the image capturing apparatus 102, using an image-capturing-apparatus descriptive information generating unit 121, and transmits the generated auxiliary information to the map server 120 through the communication unit 112. The image capturing apparatus 102 is assumed to be, as a representative example, a digital still camera.

The image capturing apparatus 102 includes a position-information obtaining unit 103, an image-capturing direction obtaining unit 106, a filter-information obtaining unit 111, an image-capturing-apparatus descriptive information generating unit 121, an image-capturing range information obtaining unit 122, a communication unit 112, a display-information extracting unit 113, an imaging unit 114, an image processing unit 115, an overlaying display processing unit 116, and a display unit 117.

The position-information obtaining unit 103 includes a position-information detecting unit 104 that obtains position information of the image capturing apparatus 102, and a position-information output unit 105 that outputs the position information. The position-information obtaining unit 103 is a device that determines and outputs the position of the image capturing apparatus 102.

Global Positioning System (GPS) is desirably used as a representative method for detecting position information by the position-information detecting unit 104. However, obtaining position information by the position-information detecting unit 104 is not solely limited to the use of GPS. In addition to GPS, an acceleration sensor and a direction sensor can be used as a technique of determining a position where GPS cannot be used, and brings the same advantage as the use of GPS.

Furthermore, a method described as follows may be used as a method for detecting position information by the position-information detecting unit 104. In other words, when a place where the users large in number capture images, such as a sightseeing area, position information may be included in a sign and others in advance, and the user may manually obtain such position information. Thereby, position information may be obtained even when position information from GPS is not available. Furthermore, measurement error in information can be expected to be minimized with such a technique. Furthermore, position information may be stored in a QR code that is to be displayed on a sign, and the position information may be read by capturing the QR code. Thereby, the user does not have to manually input the position information, thus improving the convenience and preventing the user from wrongly inputting the position information. Furthermore, without generating such a QR code with position information, the same advantage as GPS can be obtained by broadcasting information on position information from a wireless base station including a wireless LAN and a short-range radio system, and obtaining the position information by the image capturing apparatus through the communication unit 112.

Furthermore, a communication unit for obtaining position information may be separately provided, besides the communication unit 112 in FIG. 2. Such configurations are for further improving precision of obtaining position information with use of a wireless communication method in which communication is only possible in a short range for obtaining the position information.

Furthermore, the position-information obtaining unit 103 may be a device separate from the image capturing apparatus 102. For example, using a function for determining position information installed in a mobile phone, the position information may be transmitted from the mobile phone to the image capturing apparatus 102 in a short-range communication. Thereby, the image capturing apparatus 102 does not have to additionally include a sensor for obtaining position information, and thus an advantage of achieving miniaturization and weight reduction of the image capturing apparatus 102 can be expected.

Next, the image-capturing direction obtaining unit 106 includes an image-capturing direction detecting unit 107 that obtains direction information indicating an orientation of a lens of the image capturing apparatus 102, and an image-capturing direction output unit 108 that outputs image-capturing direction information. The image-capturing direction obtaining unit 106 is a device that detects and outputs the direction information of the image capturing apparatus 102. An electromagnetic compass may be used as a method for detecting an image-capturing direction.

Next, the image-capturing range information obtaining unit 122 obtains information (range information) in a range captured by the image capturing apparatus 102. The range information is a range to be captured by the image capturing apparatus 102. Although the image-capturing range information obtaining unit 122 desirably obtains, for example, information of "10 to 270 degrees", the information is not limited to such a range but may be zoom information of the lens and wide angle information of a camera. Furthermore, when the image capturing apparatus 102 uses a zoom function and others and has limitations in functions capable of being used by the image capturing apparatus 102, the image capturing apparatus 102 may obtain information of a largest range to be capable of being captured by the image capturing apparatus 102. This is because, when the image capturing apparatus 102 obtains landmark information, even in the case where a range to be captured is changed according to selection of a switch and change in a zoom ratio, the image capturing apparatus 102 smoothly displays landmark information.

Here, the information obtained by the image capturing apparatus 102 for extracting landmark information, such as position information and image-capturing direction information that are determined by the image capturing apparatus 102 is collectively referred to as image-capturing-apparatus descriptive information.

Next, the image-capturing-apparatus descriptive information generating unit 121 will be described. Information generated by the position-information obtaining unit 103, the image-capturing direction obtaining unit 106, and the image-capturing range information obtaining unit 122 is transmitted from a transmitting unit included in the communication unit 112 (FIG. 2) to the map server 120 as a packet (referred to as image-capturing-apparatus descriptive information) added with a header by the image-capturing-apparatus descriptive information generating unit 121. In other words, the image-capturing-apparatus descriptive information generating unit 121 obtains each information generated, and transmits the obtained information as the image-capturing-apparatus descriptive information to the map server 120.

Although an address of the map server 120 is desirably registered in a memory of the image capturing apparatus 102 in advance, the address may be changed according to registration by the user. Thereby, the image-capturing-apparatus descriptive information may be transmitted to the map server 120 having a new address, even when the address of the map server 120 is changed. Furthermore, even when another map server newly starts a service, system transition of the user becomes easier.

Next, the communication unit 112 transmits the position information obtained by the position-information obtaining unit 103 and the image-capturing direction information obtained by the image-capturing direction obtaining unit 106, to the map server 120.

The communication unit 112 desirably should use a wireless LAN, but not necessarily limited to this. The communication unit 112 may use a base-station communication, such as a mobile phone, a PHS, and a Worldwide Interoperability for Microwave Access (WiMAX). Alternatively, it may temporarily transmit the image-capturing-apparatus descriptive information to another communication device, and the other communication device may transmit the image-capturing-apparatus descriptive information to the map server 120. For example, a possible configuration is that the image capturing apparatus 102 (image-capturing direction obtaining unit 106) transmits the image-capturing-apparatus descriptive information to a mobile phone using the short-range communication, such as a wireless LAN, UWB, and ZigBee, and then the mobile phone transmits the image-capturing-apparatus descriptive information transmitted to the mobile phone, to the map server 120. The communication unit 112 of the image capturing apparatus 102 can be miniaturized by the processes of transmitting data from the image capturing apparatus 102 to another communication device in the short-range communication and then transmitting the image-capturing-apparatus descriptive information from the other communication device to the map server 120. Furthermore, available time of the image capturing apparatus 102 can be prolonged because electric power consumed for transmission of the image-capturing-apparatus descriptive information can be minimized.

Furthermore, when the image capturing apparatus 102 including the communication unit 112 having the aforementioned configuration cannot communicate with the map server 120 due to deterioration in a radio wave environment, position information and image-capturing information may be temporarily stored in a memory of the image capturing apparatus 102. After the communication with the map server 120 is enabled, the communication unit 112 may transmit the position information and the image-capturing information that are stored to the map server 120, and the image capturing apparatus 102 may add the landmark information obtained from the map server 120, to a header of the captured image. Alternatively, the position information and image-capturing information may be transmitted by performing proximity communication with another device (for example, a mobile phone) that can communicate with the map server 120 so as to obtain the landmark information from the map server 120 through the other device.

Next, the map server 120 includes the map database 118 and the landmark-information extracting unit 119.

First, the map database 118 holds information on landmarks (landmark information) with position information. The map database 118 stores landmark information including an ID of each landmark, the name of the landmark, a latitude, a longitude, an address, a telephone number, a descriptive name, a hierarchical order, and a priority. The hierarchical order included in the landmark information is for hierarchically managing a plurality of landmark information. For example, landmark information of a building and landmarks of shop tenants in the building can be hierarchically stored by setting the same latitude and longitude to the building and the shop tenants as each landmark information, and setting a higher priority to a hierarchical order of the building than a hierarchical order of each of the shop tenants. Furthermore, the landmark information includes all data, descriptions, and metadata that are to be stored in the map database 118. Although the representative examples of the landmark information are the names of buildings and constructions, such as Building A, Temple B, Mountain C, descriptive information of eating places and leisure facilities, for example, URL information and coupon information of each of the eating places, contents created by the user through a map server, and metadata, the landmark information is not limited to such. For example, diaries that are written by the user and are included in a Social Network Service (SNS) linked to a map server, and content information, such as images, videos, and metadata are also referred to as landmark information.

Next, the landmark-information extracting unit 119 extracts landmark information included in the image captured by the image capturing apparatus 102 and landmark information of the periphery of the image, from the map database 118 based on the image-capturing-apparatus descriptive information obtained from the image capturing apparatus 102, and transmits the extracted information to the image capturing apparatus 102. Even when the user performs a panning or zooming operation on the image capturing apparatus 102 while the landmark-information extracting unit 119 transmits the landmark information of the periphery of the image, the image capturing apparatus 102 can display the landmark information without any wait time, using previously-transmitted information of the periphery of the image.

The landmark information transmitted by the map server 120 is limited to important information, such as the name of a building. Desirably, information such as URL or metadata should be retransmitted from the map server 120 when the image capturing apparatus 102 requests the information, or the image capturing apparatus 102 previously should specify a type of landmark information to be transmitted. Since such a process reduces an amount of data to be extracted by the landmark-information extracting unit 119 from the map database 118, an advantage of accelerating the extraction can be expected. Furthermore, since data size of the landmark information transmitted from the map server 120 to the image capturing apparatus 102 is reduced, an advantage of shortening a wait time for the image capturing apparatus 102 to obtain the landmark information can be expected.

Next, a receiving unit included in the communication unit 112 of the image capturing apparatus 102 transmits the landmark information received from the map server 120, to the display-information extracting unit 113.

The filter-information obtaining unit 111 includes a filter-information detecting unit 109 that detects information on filtering the landmark information obtained from the map server 120 to display only landmark information desired by the user, and a filter-information output unit 110 that transmits the information detected by the filter-information detecting unit 109.

Figure 3:
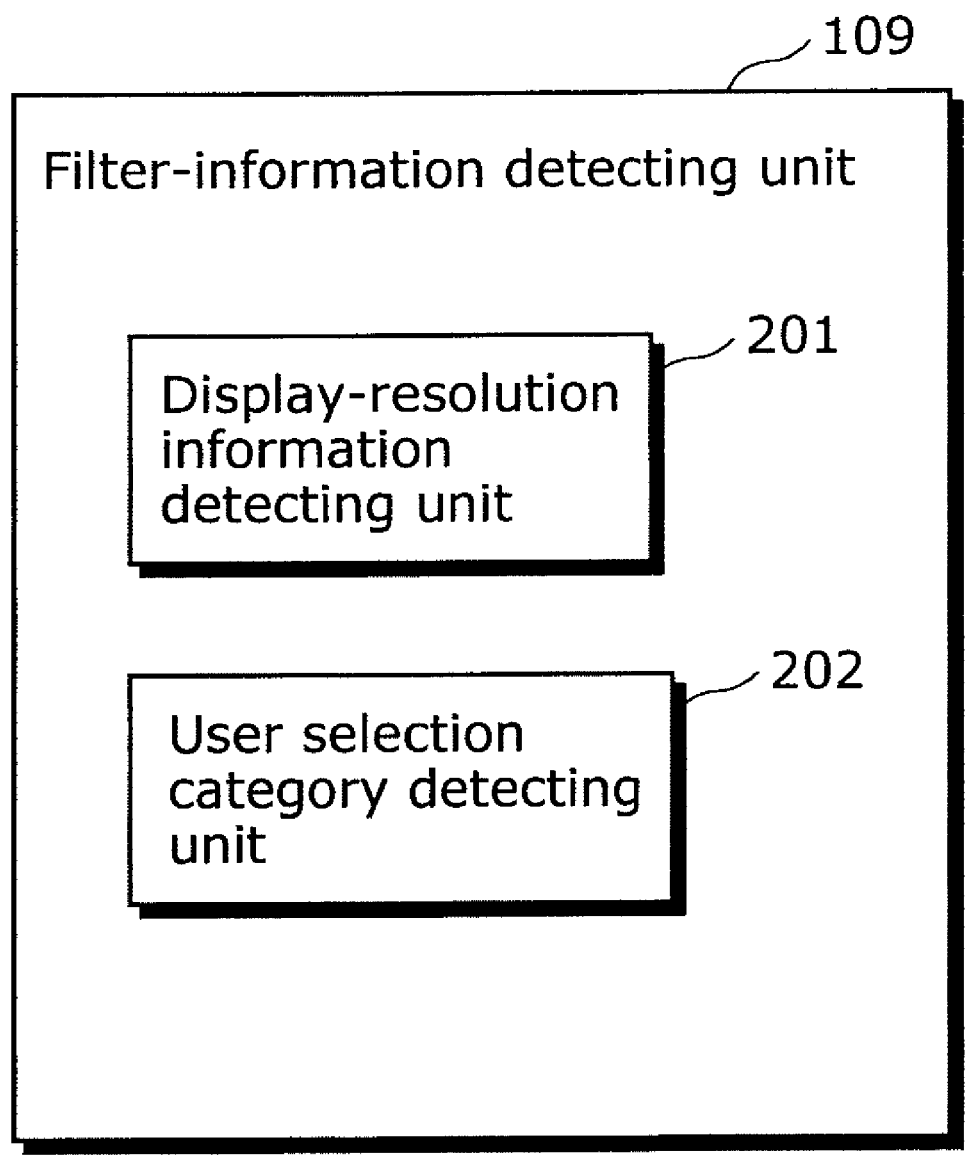
FIG. 3 illustrates a configuration of a filter-information detecting unit.

FIG. 3 illustrates details of the filter-information detecting unit 109.

The filter-information detecting unit 109 including a display-resolution information detecting unit 201 and a user category detecting unit 202 filters the resulting detection information obtained therefrom.

First, the display-resolution information detecting unit 201 is resolution information of the display unit 117 (FIG. 2) that displays image information captured by the image capturing apparatus 102 and the landmark information in an overlaying manner. The display-resolution information detecting unit 201 may be a storage for the resolution information.

Next, the user category detecting unit 202 detects category information of displayed landmarks according to the user. The following describes examples of categories of the displayed landmarks according to the user. The categories of landmarks include: the names of cities and regions; eating places represented by restaurants, cafes, and bars; accommodations; categories created by forums of map servers; categories of shopping and services as represented by supermarkets and convenience stores, rental services of movies and DVDs, drugstores, banks, shopping malls, and department stores; categories of transportation represented by airports, stations, and gas stations; categories of terrain represented by the names of mountains and rivers; categories of sightseeing areas represented by shrines and temples, and hot springs; categories of facilities, such as parks, schools, hospitals, libraries, and post offices; and categories of traffic information for displaying traffic information. However, the categories of landmarks are not limited to these.

Then, the display-information extracting unit 113 (FIG. 2) filters the landmark information based on filter information obtained from the filter-information obtaining unit 111. More specific methods for the filtering will be described later. The display-information extracting unit 113 transmits the filtered landmark information to the overlaying display processing unit 116.

The image capturing apparatus 102 obtains a scene through the imaging unit 114. After performing image processing, the image processing unit 115 transmits scene data to the overlaying display processing unit 116.

Next, the overlaying display processing unit 116 performs processing for displaying the landmark information extracted by the display-information extracting unit 113 to be overlaid on the scene data obtained by the image processing unit 115. When the landmark information is not displayed in the overlaying manner according to a user's operation, the overlaying display processing unit 116 transmits the image data from the image processing unit 115 to the display unit 117, without the overlaying display process.

Next, the display unit 117 displays the image-capturing information and the landmark information in the overlaying manner. Since the display unit 117 is equipped with buttons and a touch panel function, it may have a function of displaying more detailed landmark information in response to a user's operation.

FIG. 4 shows an example of a format of data to be transmitted from the image capturing apparatus 102 to the map server 120.

The data to be transmitted from the image capturing apparatus 102 to the map server 120 is added with a universal time coordinated, latitude information and longitude information indicating the captured position information, a traveling direction indicating an image-capturing direction due north, image-capturing range information, and ID information of the image capturing apparatus 102.

The ID information of the image capturing apparatus 102 is used for recognizing identification of the image capturing apparatus 102 that accesses the map server 120. The ID may be any ID that uniquely identifies the image capturing apparatus 102. The same advantage as the ID information can be obtained with use of a MAC address of a wireless communication device. Furthermore, the ID of the image capturing apparatus 102 is not necessarily limited to one ID. For example, when plural users share the image capturing apparatus 102, an ID may be created for each of the users.

The data format of data to be transmitted is not limited to the one described herein. The precision of position information can be improved using a correction calculation by a differential GPS (DGPS), with addition of GPS quality, a count of GPS satellites that can be received, age of DGPS, an ID of a reference GPS station, to the data format.

Hereinafter, modes of the image capturing apparatus will be described. The image capturing apparatus 102 has (i) a normal capturing mode for capturing images, (ii) a landmark-displaying capturing mode for displaying landmarks on a screen while obtaining information for capturing images and the periphery information, and (iii) a reproducing mode for reproducing the captured image on the screen. The user can set any mode through an operation interface.

When the user aims the image capturing apparatus 102 at a subject to be captured, the image capturing apparatus 102 displays an image including the subject and landmark information of the subject on a screen, in the landmark-displaying capturing mode. The following describes processing for obtaining landmark information of a subject to be captured in the landmark-displaying capturing mode by the image capturing apparatus 102.

Figure 5:
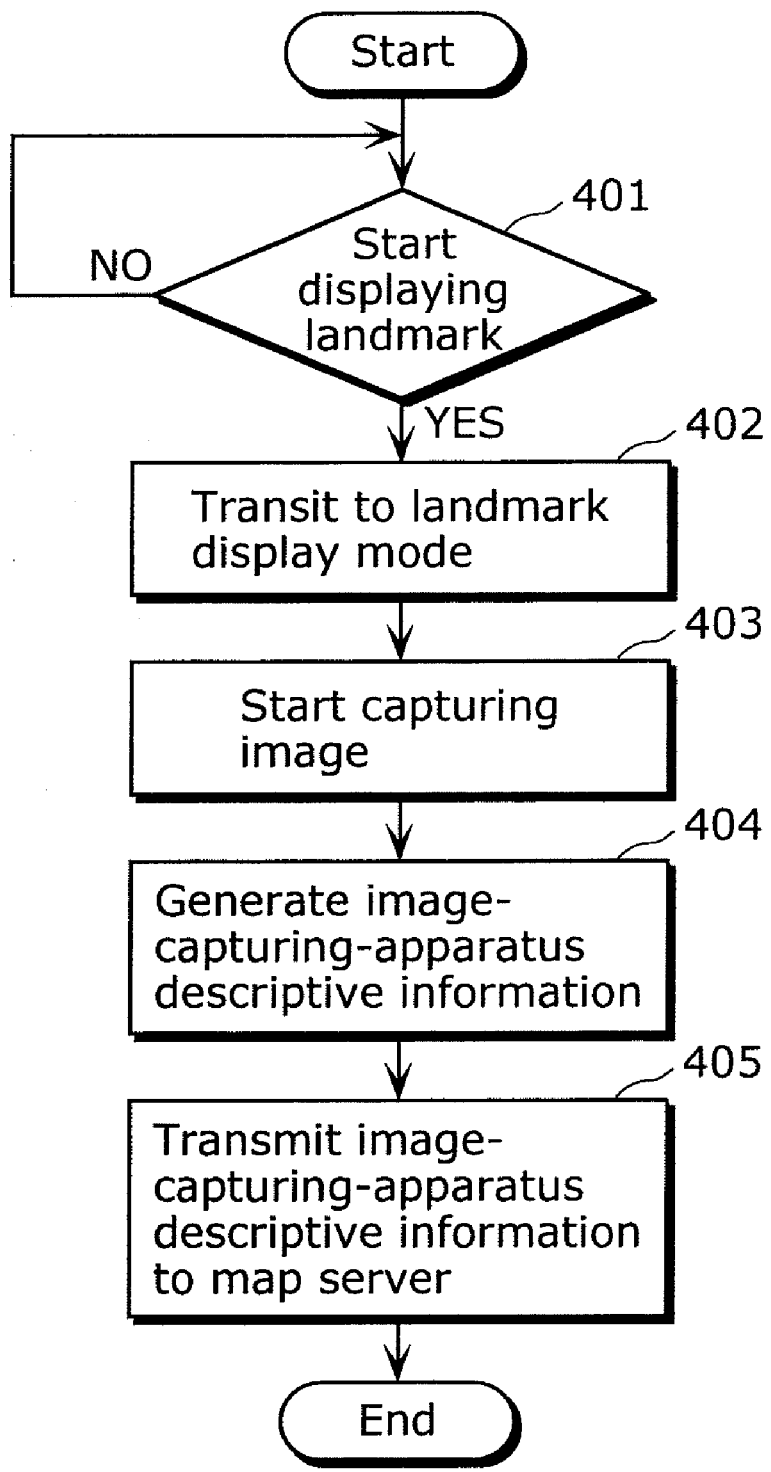
FIG. 5 shows a flowchart indicating an embodiment by an image capturing apparatus from capturing an image to transmitting image-capturing-apparatus descriptive information.

FIG. 5 shows a flowchart indicating processes by the image capturing apparatus 102 from capturing a scene to transmitting the image-capturing-apparatus descriptive information to the map server 120.

When the user switches a mode to a landmark display mode using a switch and other means (Step S401), the image capturing apparatus 102 transits to the landmark display mode (Step S402). The image-capturing-apparatus descriptive information generating unit 121 of the image capturing apparatus 102 (FIG. 2) generates the image-capturing-apparatus descriptive information (Step 404), and transmits the information to the map server 120 (405).

Hereinafter, a variation of the image capturing apparatus 102 will be described. Although the image-capturing-apparatus descriptive information includes position information of the image capturing apparatus 102 and information on an image-capturing direction, the position-information detecting unit 104 and the image-capturing direction detecting unit 107 may be separately provided in another device, by excluding them from a capturing main unit (image capturing apparatus 102). For example, a receiving unit (see the communication unit 112 in FIG. 2) of an image capturing apparatus (image capturing apparatus 102) may receive both or one of position information and an image-capturing direction that are obtained by a mobile phone including the position-information detecting unit 104 and the image-capturing direction detecting unit 107. Since the image capturing apparatus 102 including the short-range wireless communication device can obtain the both or one of position information and an image-capturing direction through the mobile phone, it does not include a detecting unit, such as a sensor for detecting position information and an image-capturing direction. Thus, there is an advantage of enabling miniaturization of the image capturing apparatus 102.

Hereinafter, details of a process of transmitting the image-capturing-apparatus descriptive information by the image capturing apparatus 102 in Step 405 will be described. The image capturing apparatus 102 transmits information to the map server 120 indicated by a network address. Here, the image capturing apparatus 102 uses a network address (URL) of the map server 120 stored in a storage region of the image capturing apparatus 102 as device setting information. The stored address of the map server 120 may be changed to any address by the user using the operation interface of the image capturing apparatus 102.

Figure 6:
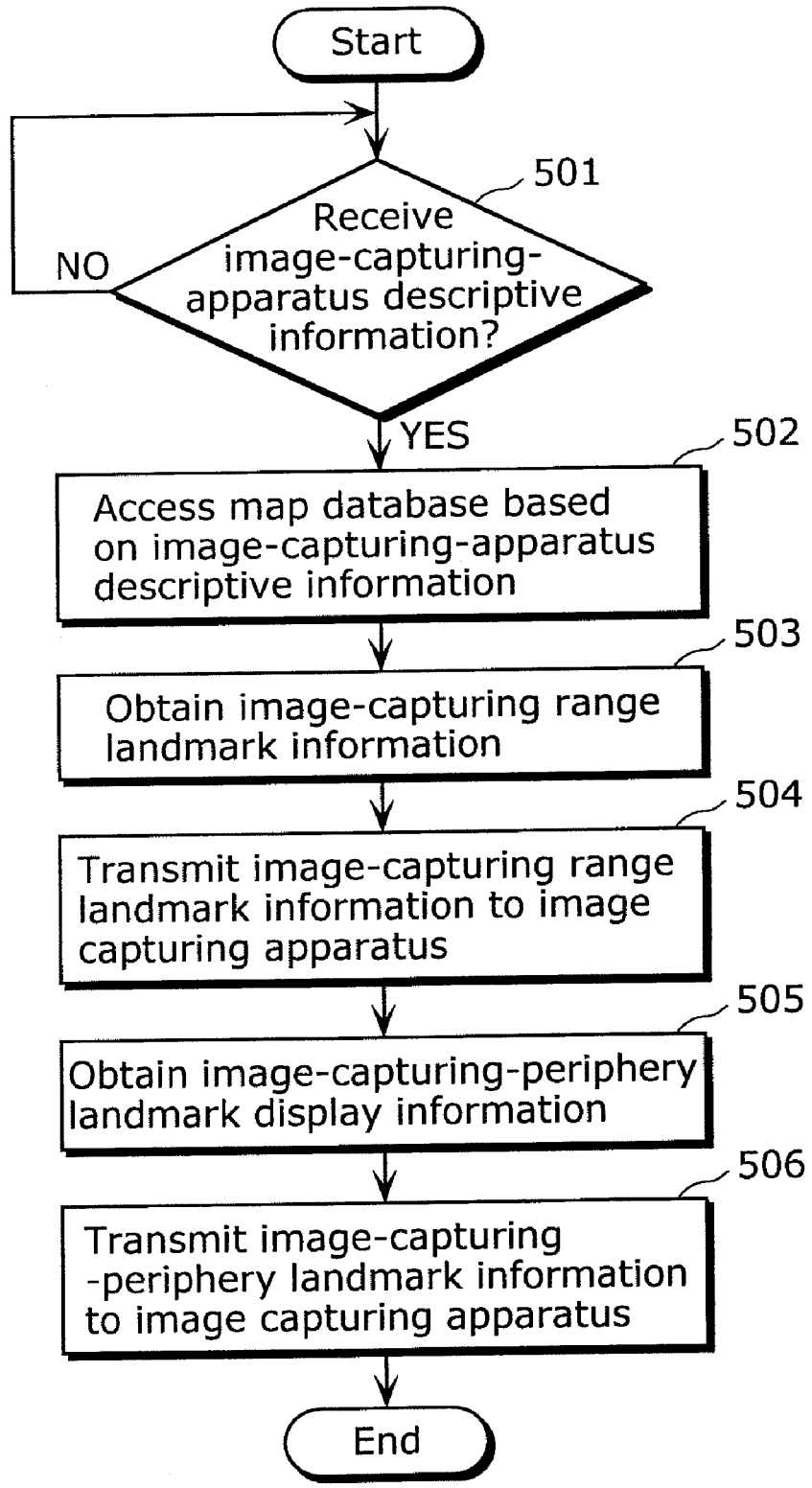
FIG. 6 shows a flowchart indicating an embodiment by a map server from obtaining landmarks to transmitting the landmarks to an image capturing apparatus.

FIG. 6 shows a flowchart indicating processes by the map server 120 from receiving the image-capturing-apparatus descriptive information to transmitting the landmark information to the image capturing apparatus 102.

The map server 120 first checks whether or not to receive the image-capturing-apparatus descriptive information (Step 501). After receiving the image-capturing-apparatus descriptive information, the map server 120 analyzes the image-capturing-apparatus descriptive information, accesses the map database (map DB) 118 (Step 502), and obtains the landmark information (image-capturing range landmark information) included in the scene captured by the image capturing apparatus 102 (Step 503). The map server 120 transmits the obtained image-capturing range landmark information to the image capturing apparatus 102 (Step 504). After transmitting the image-capturing range landmark information to the image capturing apparatus 102, the map server 120 obtains the landmark information in the periphery of the image-capturing range (image-capturing-periphery landmark information) (Step 505), and transmits the obtained image-capturing-periphery landmark information to the image capturing apparatus 102 (Step 506).

Next, a method in Step S505 for obtaining the landmark information by the map server 120 based on the image-capturing-apparatus descriptive information received in Step S503 will be described in detail.

Figure 7:
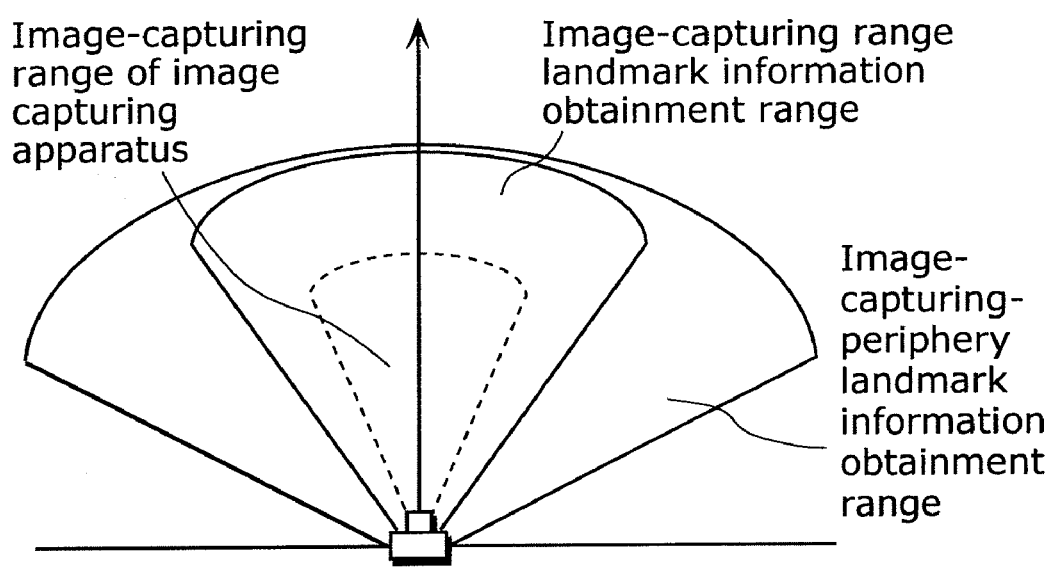
FIG. 7 illustrates ranges in which a map server obtains landmark information.

FIG. 7 illustrates areas in which the map server 120 obtains the landmark information based on the image-capturing-apparatus descriptive information.

The map server 120 receives the image-capturing-apparatus descriptive information including the position information and the direction information transmitted by the image capturing apparatus 102 (Step 501 in FIG. 6). Then, the landmark-information extracting unit 119 of the map server 120 extracts, from the map database 118, landmark information on a map in a range (image-capturing range landmark information obtainment range) that is slightly larger than an image-capturing range obtained from the image-capturing-apparatus descriptive information (an image-capturing range of the image capturing apparatus 102 that is represented by a broken line in FIG. 7) (Step 503).

The image-capturing range is a sector-shaped range as illustrated in FIG. 7. A position of a central angle of the sector represents a position of the image capturing apparatus 102. Furthermore, a bisector of the central angle of the sector, namely, an upward arrow in FIG. 7 matches an image-capturing direction in which the image capturing apparatus 102 captures an image. Furthermore, the central angle of the sector represents image-capturing range information included in the image-capturing-apparatus descriptive information.

Furthermore, a predetermined value held by the map server 120 is used as a radius of the sector representing an image-capturing range landmark information obtainment range, in other words, a distance from the image capturing apparatus 102 to an arc of the image-capturing range landmark information obtainment range.

A 5-kilometer radius from the image capturing apparatus 102 is desirably set as the predetermined value. Assuming that the image capturing apparatus 102 is positioned 1.5 meters above the ground, the 5-kilometer radius is approximately a distance to the horizon. However, the predetermined value is not necessarily 5 kilometers. For example, an altitude of a position of the image capturing apparatus 102 is calculated using the position information of the image capturing apparatus 102 and altitude information stored in the map server 120, and the image capturing apparatus 102 is assumed to be positioned, for example, 1.5 meters above the ground. Then, a distance from the image capturing apparatus 102 to the horizon calculated from the altitude of the image capturing apparatus 102 is set to a radius of a landmark extracted by the landmark-information extracting unit 119 included in the map server 120, namely, the predetermined value. Accordingly, a range of the landmark information can be more precisely narrowed.

Figure 8:
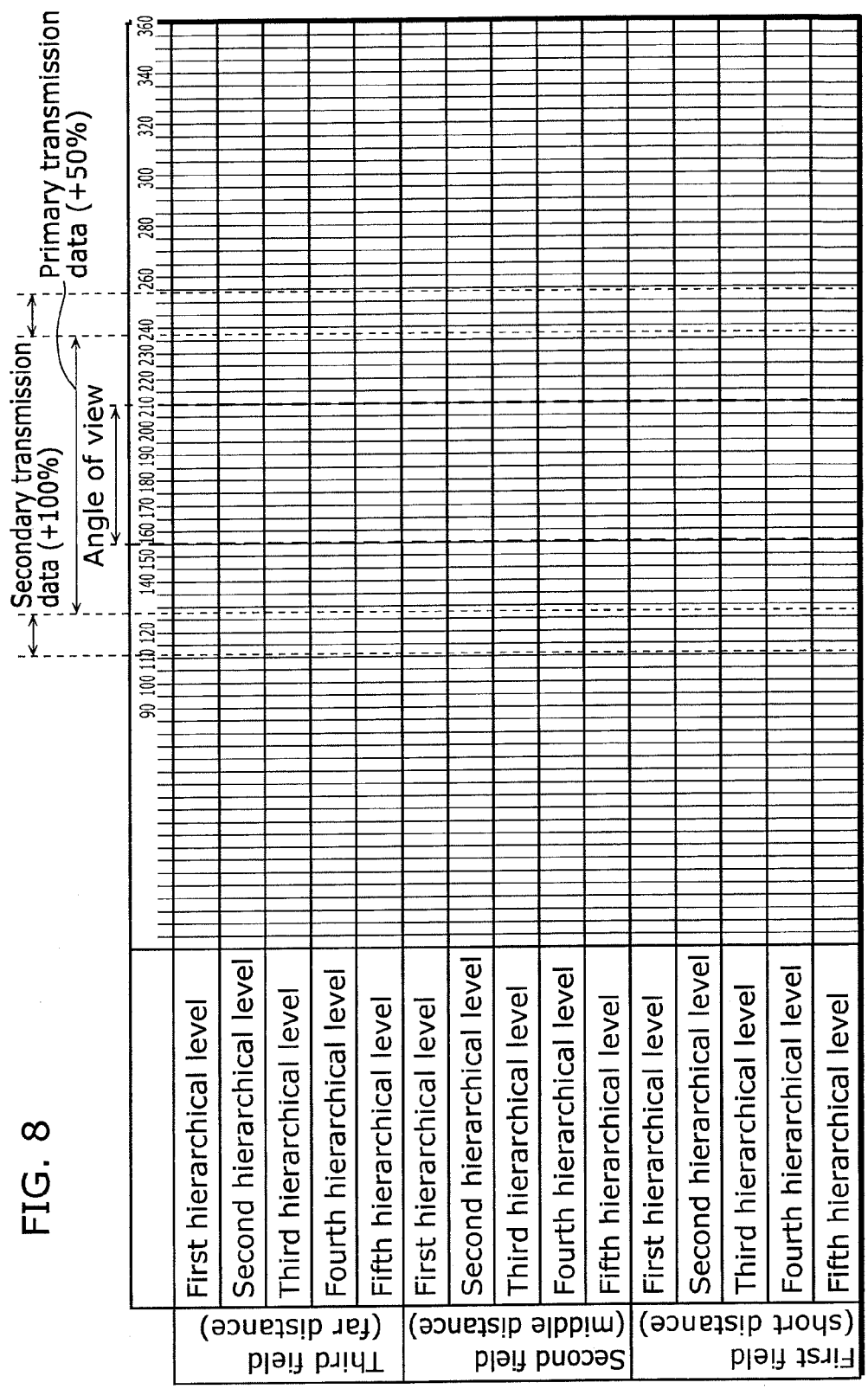
FIG. 8 shows an example of ranges of the landmark information to be transmitted from a map server to an image capturing apparatus.

FIG. 8 shows an example of a range of the landmark information to be transmitted from the map server 120 to the image capturing apparatus 102.

A image-capturing-periphery landmark information obtainment range shown in FIG. 7 has an angle of the sector that is wider than that of the image-capturing range landmark information obtainment range that is inside the image-capturing-periphery landmark information obtainment range. As illustrated in FIG. 8, the map server 120 first transmits the image-capturing range landmark information to the image capturing apparatus 102 (Step 504 in FIG. 6), obtains the landmark information in the image-capturing-periphery landmark information (Step 505), and transmits the obtained image-capturing-periphery landmark information to the image capturing apparatus 102 (Step 506). In order to implement the processes, a wait time until generating the landmark information of an image-capturing range is shortened, and the image capturing apparatus 102 holds the landmark information in the periphery of the image-capturing range. These processes will bring an advantage of enabling quick display of landmark information without waiting for a landmark information obtainment process by the map server 120 again when the image capturing apparatus 102 pans.

FIG. 8 shows an example in that: an angle of a sector covering the image-capturing-periphery landmark information obtainment range is 140 degrees within a range of approximately 250 to 110 degrees (250−110=140); an angle of a sector covering the image-capturing range landmark information obtainment range is 82 degrees (<140 degrees) within a range of approximately 237 to 155 degrees (237−155=82); and an angle of a sector covering the image-capturing range (angle of a view) is 55 degrees (<82 degrees<140 degrees) within a range of approximately 210 to 155 degrees (210−155=55).

The landmark-information extracting unit 119 (FIG. 2) extracts a plurality of landmark information from the map database 118, and transmits the extracted plurality of landmark information to the image capturing apparatus 102 that has transmitted the image-capturing-apparatus descriptive information.

The receiving unit (see the communication unit 112 in FIG. 2) of the image capturing apparatus 102 receives the plurality of landmark information transmitted from the map server 120, and the display unit 117 displays, on a screen held by the image capturing apparatus 102, a part of or all of the plurality of landmark information received by the receiving unit, together with the captured images obtained by the imaging unit 114 and the image processing unit 115. The image capturing apparatus 102 stores one of an all-landmark display mode in which all of the landmark information is displayed and a part-of-landmark display mode in which a part of the landmark information is displayed, in a storage region of a storing unit included in the image capturing apparatus 102, as landmark display setting information.

Such a landmark display setting allows the user to change the current display mode to any landmark display mode using the operation interface of the image capturing apparatus 102.

In other words, the image capturing apparatus 102 may change the landmark display setting information to be stored, in response to an operation of the operation interface.

Figure 9:
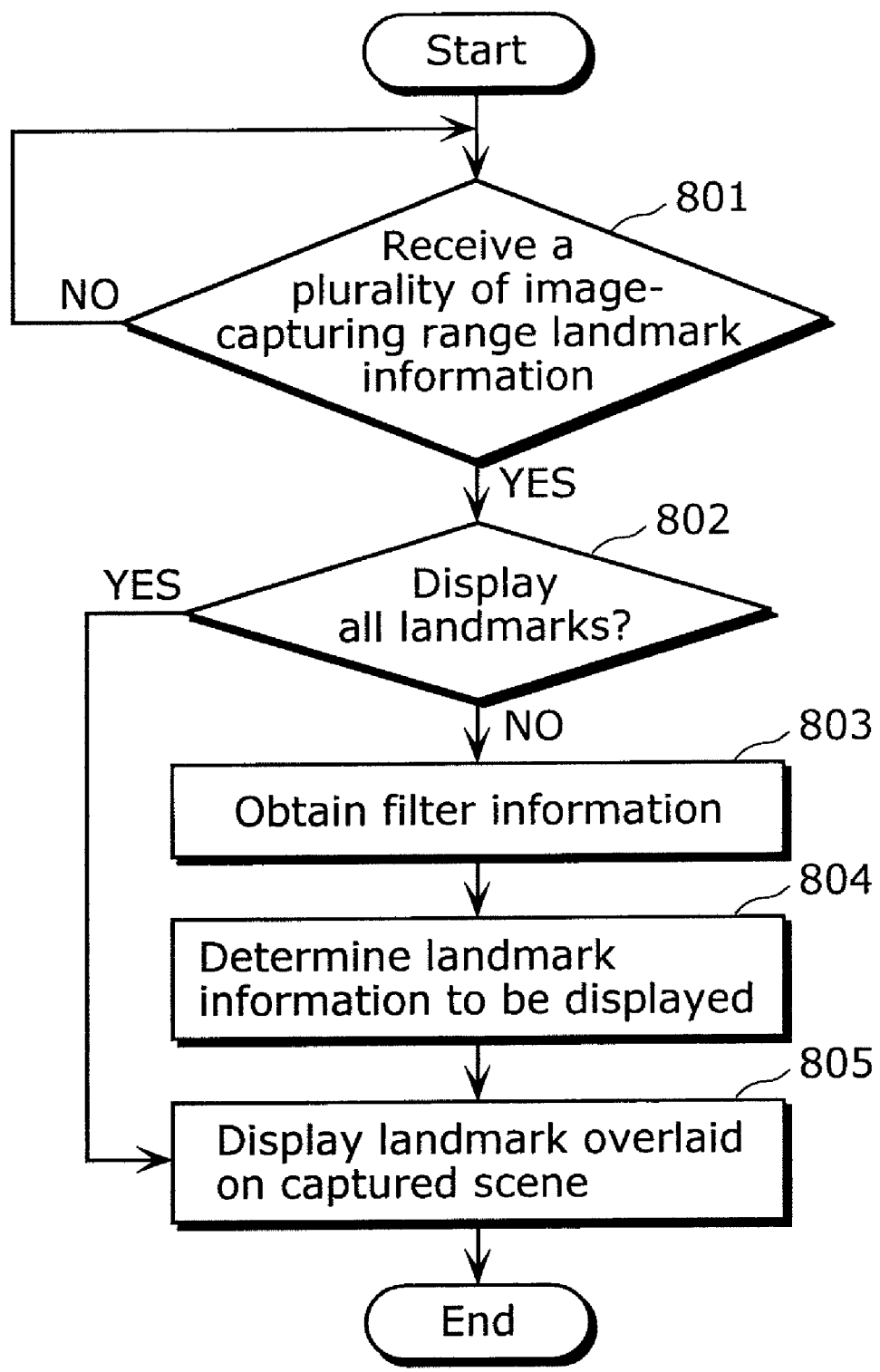
FIG. 9 shows a flowchart indicating an embodiment by an image capturing apparatus from obtaining landmarks to performing overlaying display.

FIG. 9 shows a flowchart of processing by the image capturing apparatus 102 for displaying landmark information and causing the display unit 117 to display the landmark information in the overlaying manner.

Since an operation performed by the image capturing apparatus 102 on the image-capturing range landmark information is basically the same operation as done on the image-capturing-periphery landmark information obtainment range, those landmark information are collectively referred to as landmark information, and the following describes a method for filtering the landmark information.

When the image capturing apparatus 102 receives a plurality of landmark information from the map server 120 (Yes in Step 801), it obtains filter information for filtering landmark information to be displayed from the received plurality of landmark information (Step 803). The filter information will be described later in detail. The image capturing apparatus 102 filters the received landmark information based on the filter information, and displays the landmark information to be overlay on a scene captured on a captured image, using the display unit 117.

The image capturing apparatus 102 checks whether or not to obtain the plurality of landmark information from the map server 120 (801). When the image capturing apparatus 102 receives the plurality of landmark information, it determines whether or not to display all landmarks to be received next. The image capturing apparatus 102 stores display settings of all landmarks in a storing unit for specifying whether or not all of the landmarks are to be displayed. When the display settings show that all of the landmarks are displayed (Yes in Step 802), all of the received landmarks are determined to be displayed. When the display settings show no display indication (No in Step 802), only a part of the landmarks are displayed, instead of all of the landmarks.

The display settings are desired to be set by the user. For example, the user switches a landmark display button so that the image capturing apparatus 102 can switch between the all-landmark display mode and a mode in which only a filtered landmark is to be displayed.

When all landmarks are to be displayed (Yes in Step 802), the image capturing apparatus 102 displays a captured scene obtained through a lens of the image capturing apparatus 102 and the landmark information obtained from the map server 120 in the overlaying manner using the overlaying display processing unit 116 (Step 805).

In contrast, when all landmarks are not to be displayed (Yes in Step 802), the image capturing apparatus 102 displays only the landmark information that has been filtered (Steps 803 to 805). The display-information extracting unit 113 first obtains information on filtering the landmark information, from the filter-information obtaining unit 111 (Step 803), and extracts the landmark information to be displayed, based on the obtained filter information (Step 804). The overlaying display processing unit 116 displays the extracted landmark information overlaid on a scene image obtained by the image processing unit 115 (Step 805).

The following describes the filtering method.

When the part-of-landmark display mode is set in the image capturing apparatus 102, the display-information extracting unit 113 extracts the landmark information to be displayed, from the plurality of landmark information received from the map server 120. The image capturing apparatus 102 performs filtering based on the image-capturing-apparatus descriptive information obtained from the constituent elements in the image capturing apparatus 102. More specifically, the image capturing apparatus 102 narrows a field in which landmark information is displayed, according to a zoom ratio of the image capturing apparatus 102 and a distance from a capturing position. In other words, the image capturing apparatus 102 narrows landmark information to a field corresponding to the distance, and changes the name of a landmark to be displayed according to a displayable resolution.

As described before, the map server 120 stores a plurality of landmark information that are hierarchically stored. More specifically, the map server 120 stores more detailed landmark information as the hierarchical level gets deeper (larger). For example, the names of buildings are stored in a higher hierarchical level, the name of one of the buildings is stored in a hierarchical level lower than the hierarchical level of the buildings, and the names of shop tenants in the building are stored in a hierarchical level further lower than the hierarchical level of the building. In other words, the map server 120 stores not only landmark information but also a hierarchical relationship between (i) a plurality of landmark information of all landmarks that are higher in rank and (ii) a plurality of landmark information of a part of the landmarks that is lower in rank. In this manner, the plurality of landmark information to be stored is hierarchically divided.

The image capturing apparatus 102 divides a space captured by the image capturing apparatus 102 into fields according to a distance from the image capturing apparatus 102 to display the landmark information transmitted from the map server 120. Then, the image capturing apparatus 102 determines the maximum landmark count that can be displayed per field, according to resolution information of the image capturing apparatus 102. The image capturing apparatus 102 increases the displayable maximum landmark count as an image to be displayed has a higher resolution.

Figure 10:
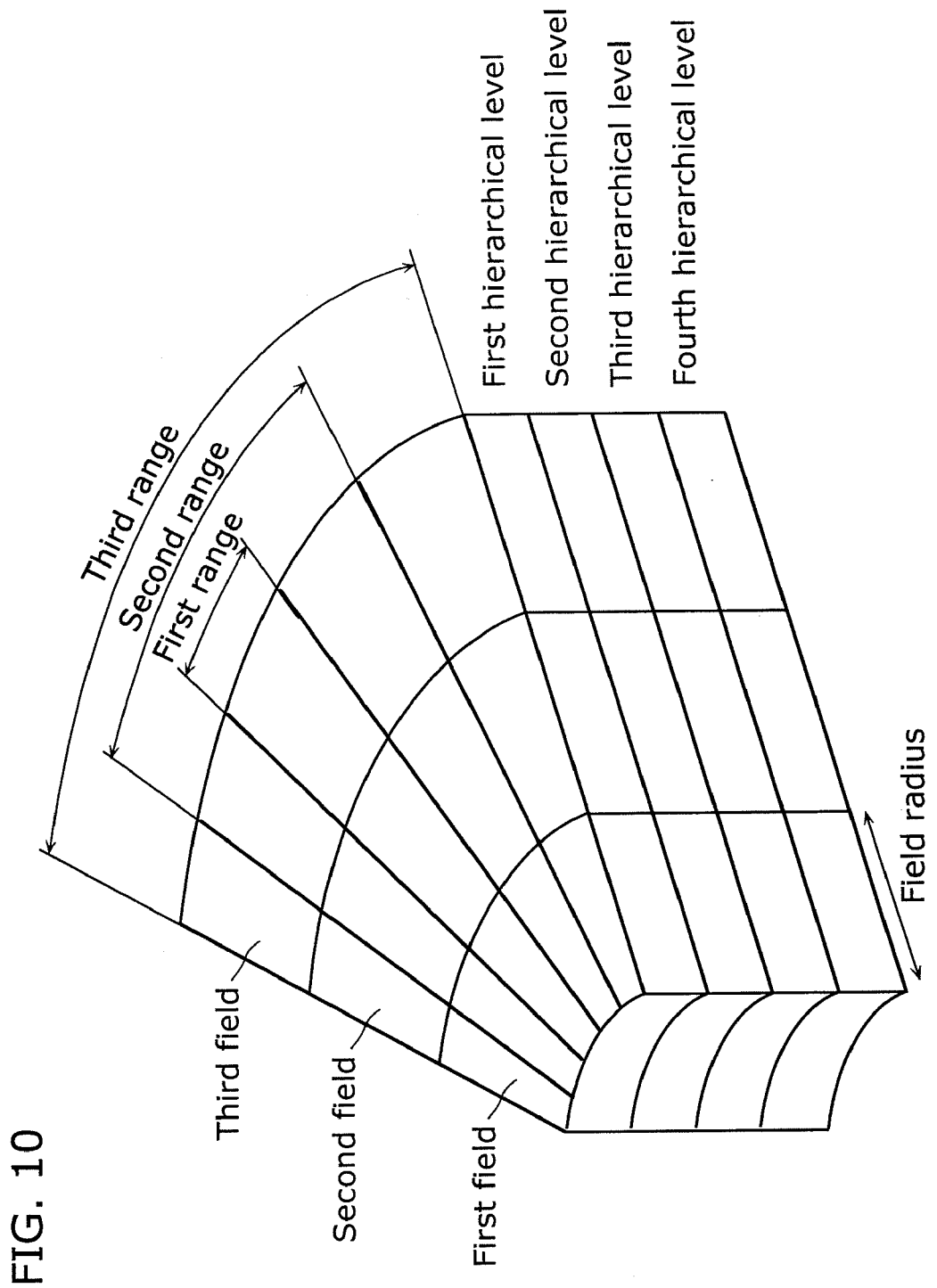
FIG. 10 illustrates an example of a mesh structure for use in filtering by an image capturing apparatus.

FIG. 10 illustrates the names of spaces that separate the plurality of landmark information.

The landmark information held by the map database 118 (FIG. 2) included in the map server 120 includes position information indicating to which space (mesh field) in FIG. 10 a position of a landmark of the landmark information belongs.

The proximity of the image capturing apparatus 102 is divided into fields according to whether or not a distance from the image capturing apparatus 102 is in a predetermined range, as illustrated in FIG. 10. FIG. 10 exemplifies a case where the proximity of the image capturing apparatus 102 is divided into 3 fields. The divided fields are defined as the first field at a short distance, the second field at a middle distance, and the third field at a far distance.

Furthermore, as illustrated in FIG. 10, the proximity of the image capturing apparatus 102 is divided into fields according to whether or not an angle with respect to an image-capturing direction of the image capturing apparatus 102 is in a predetermined range, and the image-capturing range is horizontally divided into these fields. Hereinafter, each of these divided fields is referred to as a range. Then, a range in proximity to the image-capturing direction is referred to as the first range, a range wider than the first range is referred to as the second range, and a much wider range that is wider than the second range is referred to as the third range.

Hereinafter, one space divided per field or range is referred to as a mesh field.

According to the zoom-in operation of the image capturing apparatus 102, a width of a range to be captured is reduced. When a zoom ratio is set larger, an angle of an image-capturing range is reduced. The image capturing apparatus 102 sets an angle of a range to be used for filtering to a smaller angle, according to such a characteristic. For example, assume a case where an image-capturing range is set to be divided into 3 ranges. When a zoom ratio is set larger, a width of a range to be used is reduced. In other words, when a zoom ratio is set larger, a width of a range to be used is relatively increased.

Here, a count of fields, ranges, hierarchical levels are not limited to the ones described herein. Furthermore, the image capturing apparatus 102 desirably has a multi-axial sensor for dividing a space into ranges. In other words, when performing a normal capturing operation, the image capturing apparatus 102 detects an orientation of the image capturing apparatus 102, using an electromagnetic compass for detecting a deviation in the horizontal direction. When the image capturing apparatus 102 is tilted by 90 degrees with respect to an orientation of the normal capturing operation for capturing an image that is vertically longer, desirably, the electromagnetic compass should be switched to an electromagnetic compass for detecting a deviation of the image capturing apparatus 102 in the horizontal direction, so that the electromagnetic compass is used for setting a direction in which the image capturing apparatus 102 is oriented and for separating ranges. Thereby, even when the image capturing apparatus 102 is rotated by 90 degrees, precise setting of the ranges and detection of an image-capturing direction become possible.

The image capturing apparatus 102 determines an upper limit of a count of landmarks to be displayed in one mesh field, according to a resolution in which the image capturing apparatus 102 captures an image. The higher the resolution becomes, the more the count of landmarks to be displayed per field increases.

The following describes an example when the upper limit of the count of landmarks to be displayed in one mesh field (the maximum landmark count to be displayed per mesh field) is 2. Hereinafter, there are cases where a mesh field is simply referred to as a field for convenience in writing.

The aforementioned points will be later described in detail.

Figure 11:
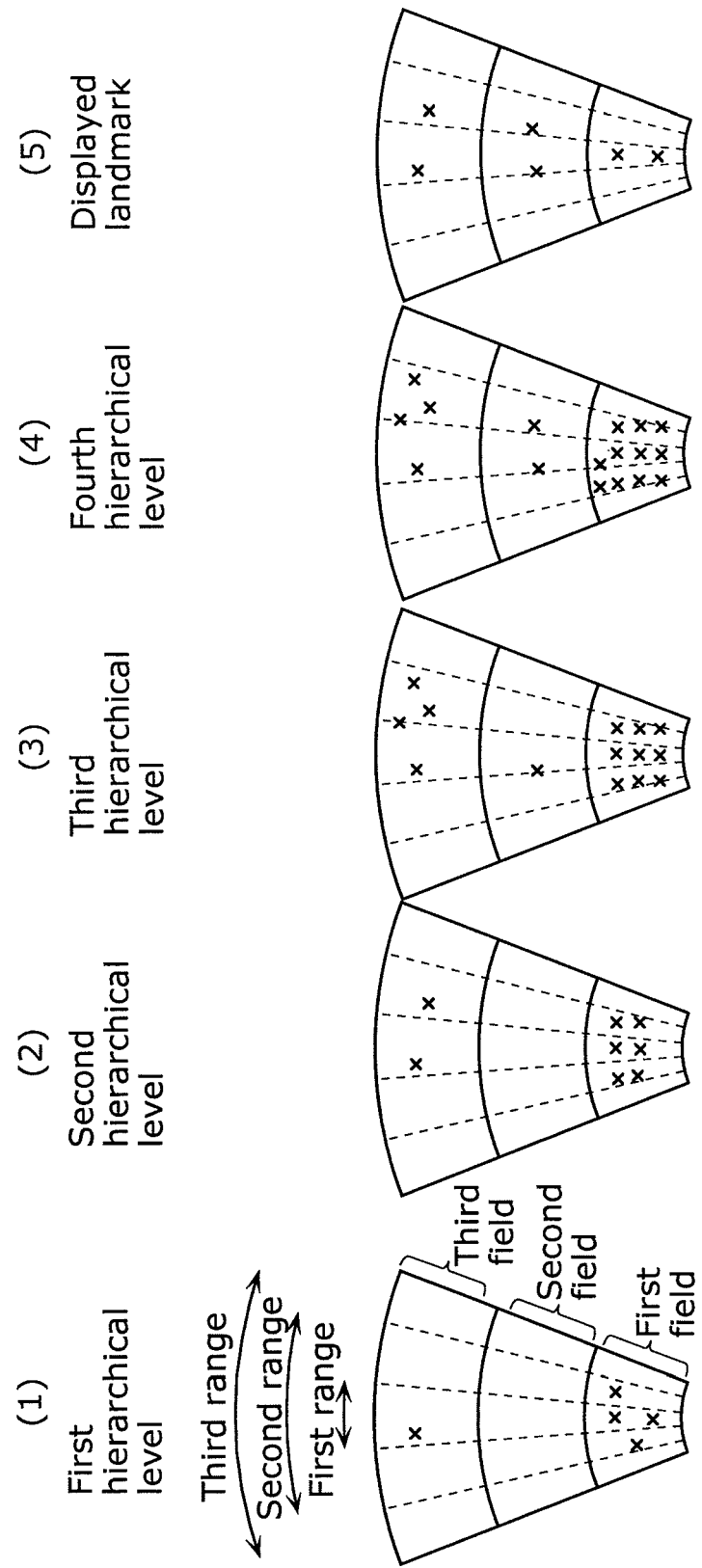
FIG. 11 illustrates an example of a display filtering method by an image capturing apparatus.

FIG. 11 illustrates a count of landmarks per hierarchical level and hierarchical levels of landmarks to be actually displayed.

Each landmark information held by the map database 118 (FIG. 2) included in the map server 120 includes hierarchical information indicating a hierarchical level to which a landmark of the landmark information belongs. The hierarchical information shows: (i) when a hierarchical level of a landmark is lower than other hierarchical levels of landmarks, a priority of the landmark is lower in rank; (ii) when the hierarchical level of the landmark is the same as those of the other landmarks, the landmark is in the same rank as those of the others; and (iii) when the hierarchical level of the landmark is higher than those of the other landmarks, the priority of the landmark is lower in rank. The hierarchical information corresponds to the hierarchical relationship described hereinbefore.

Then, the image capturing apparatus 102 extracts, through the display-information extracting unit 113, a part of the plurality of landmark information determined by the hierarchical information included in each landmark information, from among the plurality of landmark information obtained by the map server 120. In other words, it selects and displays one or more of the landmark information that have been extracted from the plurality of landmark information.

For example, in FIG. 11, the landmark information is represented by a cross mark within the first range in the third field. The landmark information belongs to the first hierarchical level, and includes hierarchical information indicating the first hierarchical level. Another landmark information that is represented by a cross mark within the second range in the third field of the second hierarchical level in FIG. 11 and that is different from the landmark information in the first hierarchical level shows an example of the landmark information belonging to the second hierarchical level.

The image capturing apparatus 102 displays even landmark information of a landmark that is in the deepest hierarchical level so as not to exceed the displayable count of landmarks per mesh field.

Then, when the count of landmarks in the highest rank, namely, the first hierarchical level in FIG. 11 exceeds the maximum landmark count to be displayed per mesh field, the image capturing apparatus 102 displays the landmarks so as not to exceed the maximum landmark count to be displayed per mesh field by prioritizing a mesh field in a range closer to the center of the ranges.

Assume a case where the maximum landmark count to be displayed per mesh field is 2. In the third field, since the count of landmarks in the first hierarchical level is 1, the count in the second hierarchical level is 2, and the count in the third hierarchical level is 4, the corresponding landmark information up to the second hierarchical level having the same count as the maximum landmark count to be displayed per mesh field is to be displayed. Furthermore, in the second field, the count of landmarks in the third hierarchical level is 1 and the count in the fourth hierarchical level is 2, the landmarks in the fourth hierarchical level are to be displayed. Furthermore, the count of landmarks in the first field of the first hierarchical level has already exceeds the maximum landmark count to be displayed. In this case, the image capturing apparatus 102 filters the landmarks to be displayed, according to the range. In other words, since the count of landmarks in the first field and in the first range is 2, and the count in the first field and in the second range is 4, the landmarks in the first field and in the first range are to be displayed.

Here, a field to be displayed may be extracted according to a zoom ratio of the image capturing apparatus 102.

FIG. 12 illustrates an example of a correspondence table between zoom ratios and display fields.

The image capturing apparatus 102 performs extraction according to a zoom ratio in the following procedure described with reference to FIG. 12.

The proximity of the image capturing apparatus 102 is divided into 3 fields by a distance from a capturing position, and the image capturing apparatus 102 has a zooming function for capturing images in a zoom ratio ranging from 1 to 10 times as an optical zoom function (physically lens-driven zooming). Thus, the image capturing apparatus 102 extracts landmark information: of the first field (short-distance field) in a zooming ratio of 1 to 3 times; of the second field (middle-distance field) in a zooming ratio of 3 to 6 times; and of the third field (far-distance field) in a zooming ratio of 6 to 10 times. In other words, the image capturing apparatus 102 extracts a landmark closer to the image-capturing position when the zooming ratio is lower, while extracting a landmark far from the image-capturing position when the zooming ratio is higher. Thereby, only the landmark information in a field that the user desires to know can be displayed, thus improving the convenience of the user.

Methods for selecting landmark hierarchical orders includes: a method for extracting landmarks in a hierarchical order not lower than the second hierarchical order; a method for extracting landmarks in a hierarchical order having the smallest count of landmarks; and a method for extracting landmarks in a hierarchical order that is predetermined by the user. Furthermore, the hierarchical order may be automatically selected so that the count of landmarks most approximates the maximum landmark count to be displayed.

Furthermore, a display field is not necessarily determined according to a zoom ratio. The display field may be changed according to a focal distance of the image capturing apparatus 102, instead of the zoom ratio. In other words, in FIG. 11, when the focal distance of the image capturing apparatus 102 is shorter, a landmark of a subject present in the first field is displayed. When the focal distance of the image capturing apparatus 102 is longer, a landmark of a subject present in the third field is displayed. When the image capturing apparatus 102 has an auto-focus function, the user can obtain landmark information of a subject that the user desires to know, without operating a zoom button of the image capturing apparatus 102.

Furthermore, when a human face is recognized, in the case where the image capturing apparatus 102 has a facial recognition focus function for focusing on the face and the facial recognition focus function is not activated, a display field in which landmarks are displayed may be determined according to the focal distance. When the facial recognition focus function is activated, the image capturing apparatus 102 may be equipped with a function for shifting to a mode for determining the display field with the zoom function of the image capturing apparatus 102. Thereby, when a face of a pedestrian appears within a scene, the focal distance is changed without sudden change in the display field, in the image capturing apparatus 102 equipped with the facial recognition focus function, thus leading to stabilization in a landmark display field.

Furthermore, when a count of the plurality of landmark information extracted using a capturing distance and hierarchical orders exceeds the maximum landmark count to be displayed, the image capturing apparatus 102 narrows down the count of landmark information by selecting one or more priorities. For example, methods for extracting landmarks using priorities includes: a method for extracting landmarks having a predetermined priority or more; a method for extracting landmarks having the highest priority; and a method for extracting landmarks having a priority predetermined by the user. Furthermore, the priorities may be automatically selected so that the count of landmarks most approximates the upper limit of the count of landmarks to be displayed.

Here, the image capturing apparatus 102 may extract a landmark based on sub-fields obtained by horizontally dividing a field in which a plurality of landmark information is displayed. For example, the image capturing apparatus 102 extracts landmark information included in a predetermined field by defining 30 degrees on the left as a left field, the central 30 degrees as a center field, and 30 degrees on the right as a right field when an angle of a view in the horizontal direction is square. Methods for setting a predetermined sub-field out of sub-fields in a horizontal direction includes: (i) a method for limiting a predetermined sub-field to a central sub-field; and (ii) a method set by the user using the operation interface of the image capturing apparatus 102. In particular, when the user sets fields, the user may set the horizontal sub-fields as setting information of the image capturing apparatus 102 before capturing images, or select the horizontal sub-fields and reset the sub-fields after the display unit 117 displays landmarks and the captured images.

The overlaying display processing unit 116 generates an image to be displayed on a screen by overlaying, on a captured image, all landmark information (in the all-landmark display mode) or landmark information (in the part-of-landmark display mode) extracted by the display-information extracting unit 113. Hereinafter, a representative method for displaying landmark information will be described.

Figure 38:
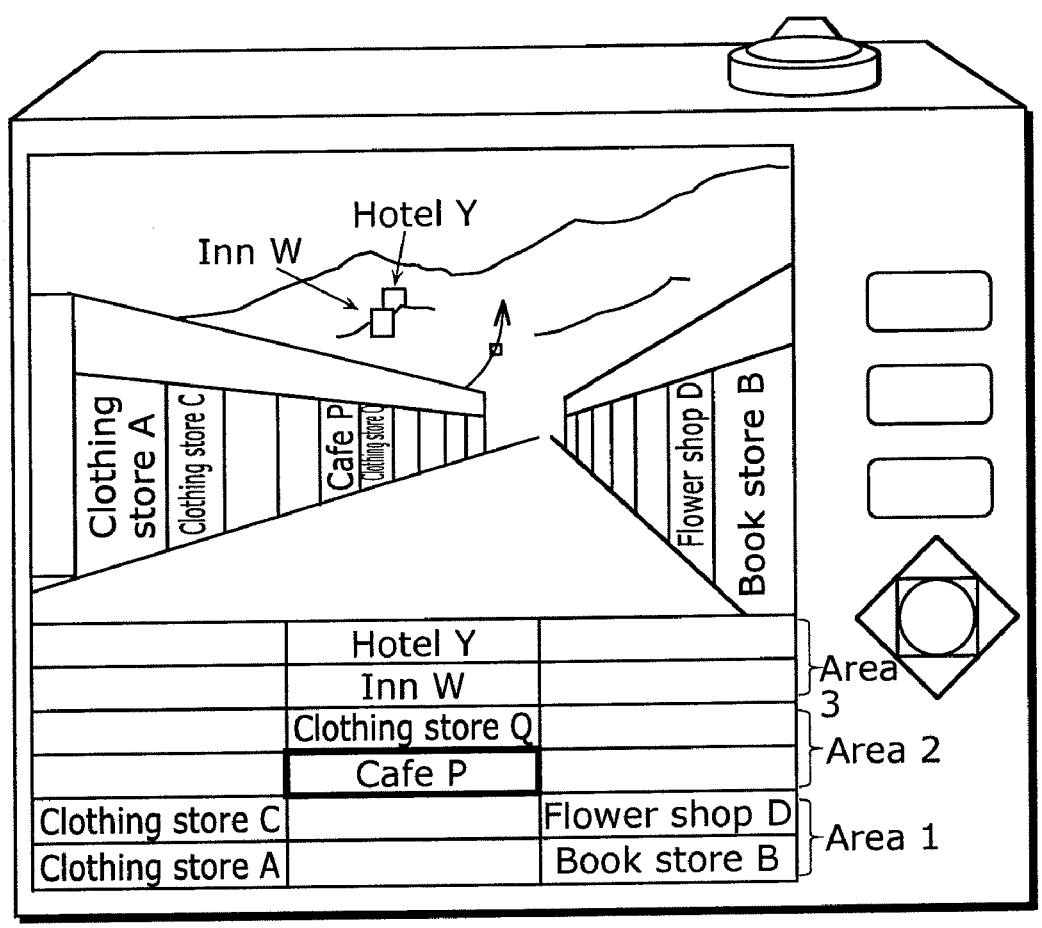
FIG. 38 illustrates an example of a method for displaying landmark information in an overlaying manner.

FIG. 38 illustrates an example of a landmark display screen.

The text, such as "Inn W" and "Hotel Y" that is in the upper portion of FIG. 38 and that is in a visual display area including a mountain ridge line and a road lined with Clothing store A and Clothing store C is text simply added for convenience in explanation, and not the text displayed by the image capturing apparatus 102.

On the other hand, a matrix of rectangle areas is a landmark display area for displaying landmark information by the image capturing apparatus 102. Furthermore, the text such as "Clothing store A" and "Clothing store C" in the landmark display area is text displayed by the image capturing apparatus 102 each as landmark information.

The image capturing apparatus 102 has an image display area in the upper portion and the landmark display area provided under the image display area. In the landmark display area, the names of landmarks are displayed horizontally in the same positions as those of the mesh fields having the captured subjects. Thus, the user can expect an advantage that correspondences between subjects and the respective landmarks are easy to follow. Furthermore, in the landmark display area, the landmarks distant from the image capturing apparatus 102 are displayed in the upper portion of the display area, and the landmarks closer to the image capturing apparatus 102 are displayed in the lower portion of the display area. Furthermore, in the landmark display area, the landmarks in the same area that are distant from the image capturing apparatus 102 are displayed in the upper portion of the display area, and the landmarks in the same area that are closer to the image capturing apparatus 102 are displayed in the lower portion of the display area. Thus, with an area allocated to a subject and by changing displayed portions in the area, the user can expect an advantage of knowing an approximate distance between the image capturing apparatus 102 and the subject, and visually knowing a relative perspective between the image capturing apparatus 102 and the subject.

Furthermore, the image capturing apparatus 102 marks or highlights the name of a landmark that is the closest to an image capturing direction and the most frontward of the image capturing apparatus 102. A cursor is desirably put on the name of the landmark, as an example of the marking. Since the user frequently accesses the landmark information that is in the center of the display area and located frontward, an advantage of eliminating the need for the user moving the cursor in a mode of landmark details display can be expected.

Furthermore, a linear distance between the image capturing apparatus 102 and a subject, or a pathway distance necessary for accessing the subject may be displayed next to the name of the landmark. Knowing a distance to a subject allows the user to consider a means of transportation for accessing the subject.

Furthermore, the landmark display area may be provided not in the lower portion of a screen but in the upper portion, left end, and right end of the screen. When the landmark display area is provided in the left end or right end of the screen, the names of landmarks of subjects in a direction between the image-capturing position and the subjects are aligned from side to side, and the names of landmarks of subjects are aligned from the upper portion to the lower portion in the display area according to each distance from the image-capturing position to the subjects.

Figure 39:
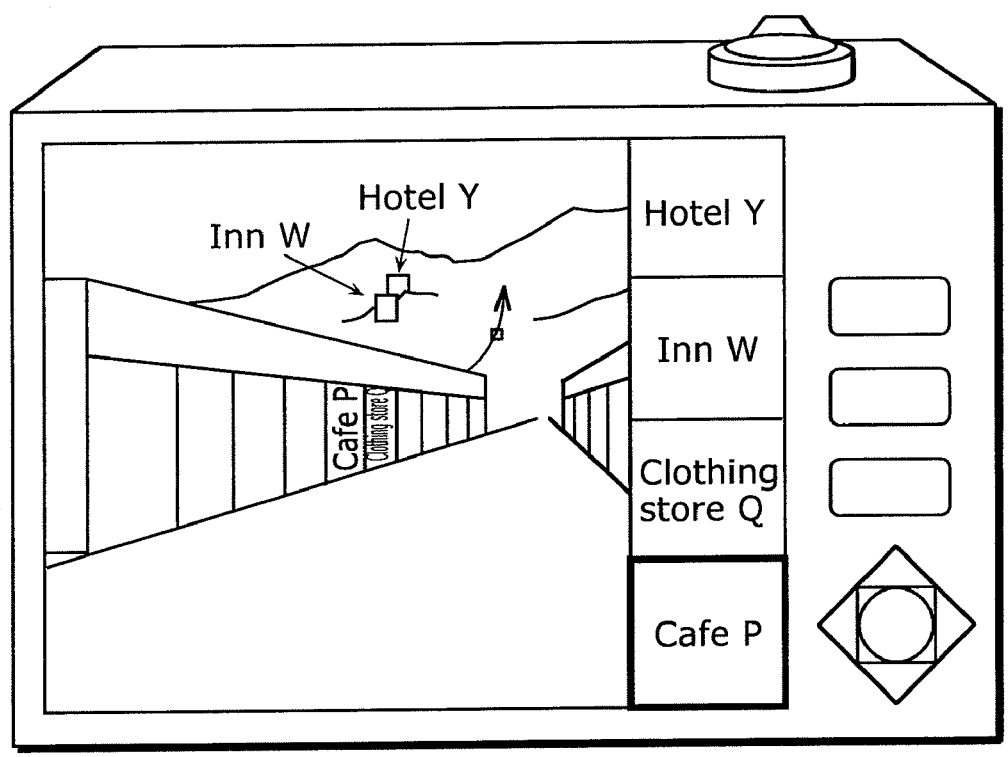
FIG. 39 illustrates an example of a method for displaying landmark information in an overlaying manner.

FIG. 39 illustrates an example of a screen display when landmarks are displayed in the right end of the screen. FIG. 39 is a drawing that displays landmarks by aligning them from the lower portion to the upper portion of the screen, in an order from a landmark closer to the image-capturing position.

Thereby, a relative relationship between a display position of a landmark and a distance from the image capturing apparatus 102 to a subject becomes understandable. Furthermore, the user can visually understand information for determining which subject is more distant than other subjects, even when the unaided eye cannot distinguish which one is more distant from others. Furthermore, landmarks may be horizontally divided into columns.

Figure 40:
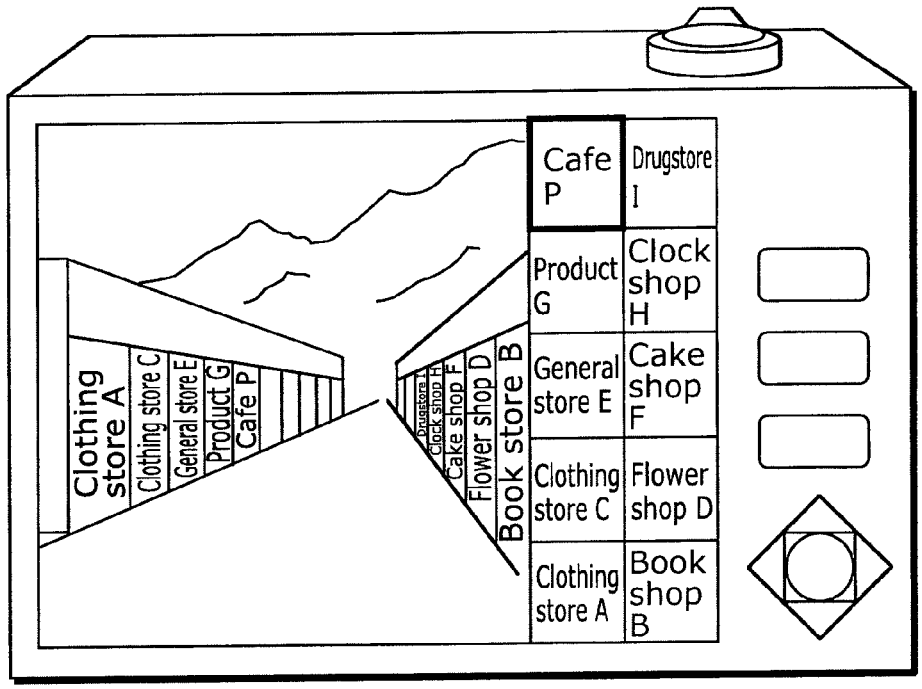
FIG. 40 illustrates an example of a method for displaying landmark information in an overlaying manner.

FIG. 40 illustrates an example of a display when landmarks are displayed in 2 columns. Displaying landmarks in columns will bring an advantage of facilitating the understanding of landmark positions in a horizontal direction.

Figure 41:
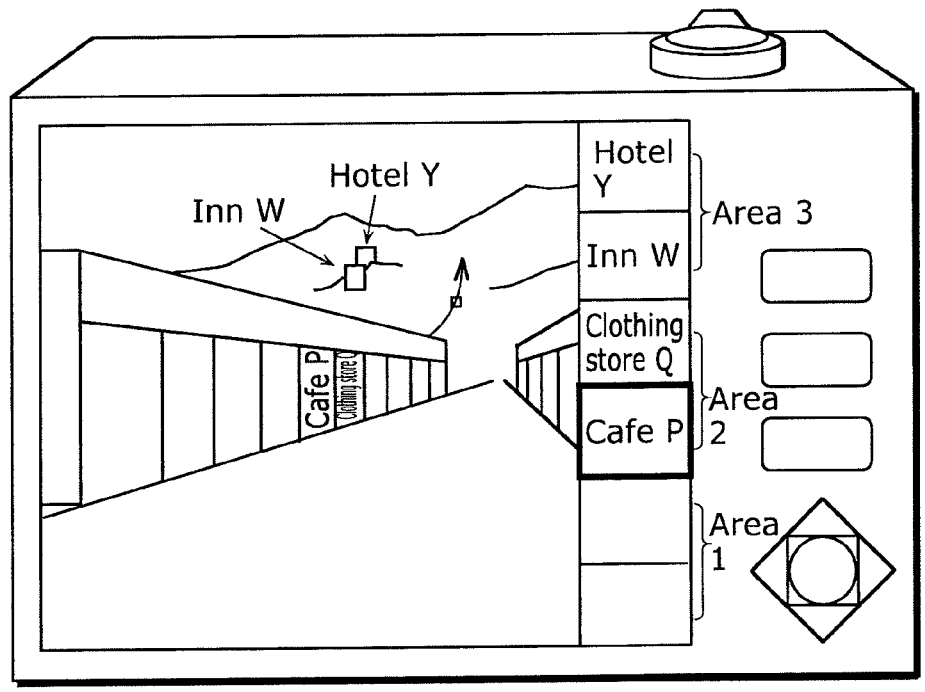
FIG. 41 illustrates an example of a method for displaying landmark information in an overlaying manner.

FIG. 41 illustrates an example of a display that displays landmarks respectively in display portions corresponding to the areas.

As illustrated in FIG. 41, the names of landmarks of subjects in a third area that is the farthest from the image capturing apparatus 102 may be displayed in the upper right of the display, the names of landmarks of subjects in a second area may be displayed in the right middle of the display, and the names of landmarks of subjects in a first area that is the closest to the image capturing apparatus 102 may be displayed in the lower right of the display. Thereby, the user can easily know in which area a landmark indicating information of a subject is present. Thus, when the image capturing apparatus 102 is used in a neighborhood including a large count of landmarks, such as high-rises, the chance of wrongly understanding a relationship between a subject and the landmark will be reduced.

Landmarks to be displayed on a screen may be further filtered by the user setting a genre of a landmark to be displayed, as a method for displaying landmark information in the overlaying manner.

Figure 42:
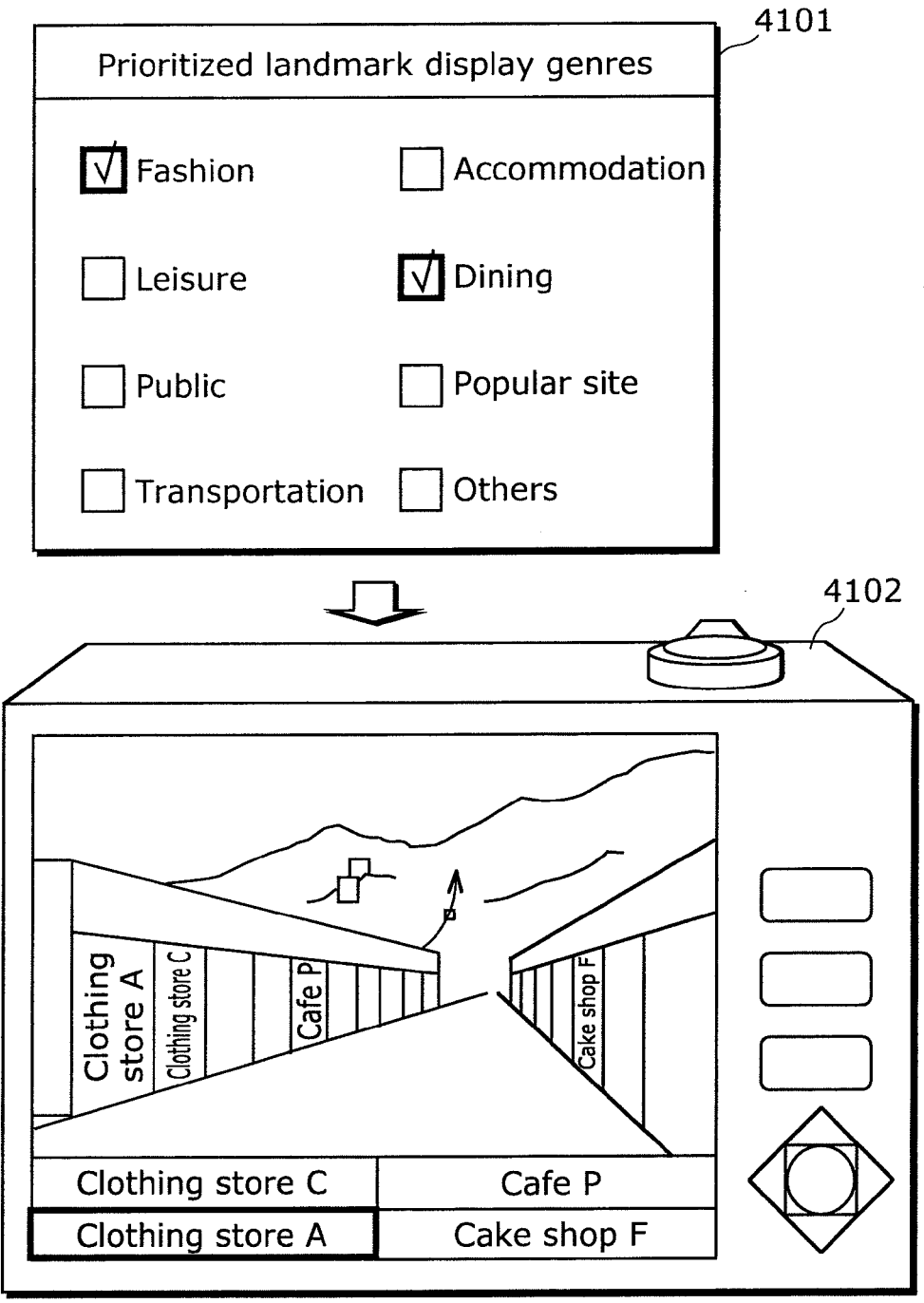
FIG. 42 illustrates an example of a method for displaying landmark information in an overlaying manner.

FIG. 42 illustrates an example of an operation menu screen.

Before capturing an image, the user may select a genre of a landmark to be displayed with higher priority, using an operation menu of the image capturing apparatus 102, so that the landmark that matches a preference of the user can be displayed.

In the example of FIG. 42 for setting a genre of a landmark that are displayed with higher priority, "fashion", "leisure", "public", "transportation", "accommodation", "dining", "popular site", and "others" are displayed as selectable genres. However, the genres are not limited to such. Furthermore, when an image is captured, with regard to "popular site" among choices of the genres, landmarks having the larger URL hit count may be displayed with higher priority, and landmarks having the larger search count in search services for searching for websites of landmarks included in an image of the image capturing apparatus 102 may be displayed. Furthermore, when "others" are selected among the choices of the genres, the user may input any genre keyword using a software keyboard to be displayed on a screen, so that landmarks that are related to the genre keyword and are included in the landmark information may be displayed with higher priority.

Figure 43:
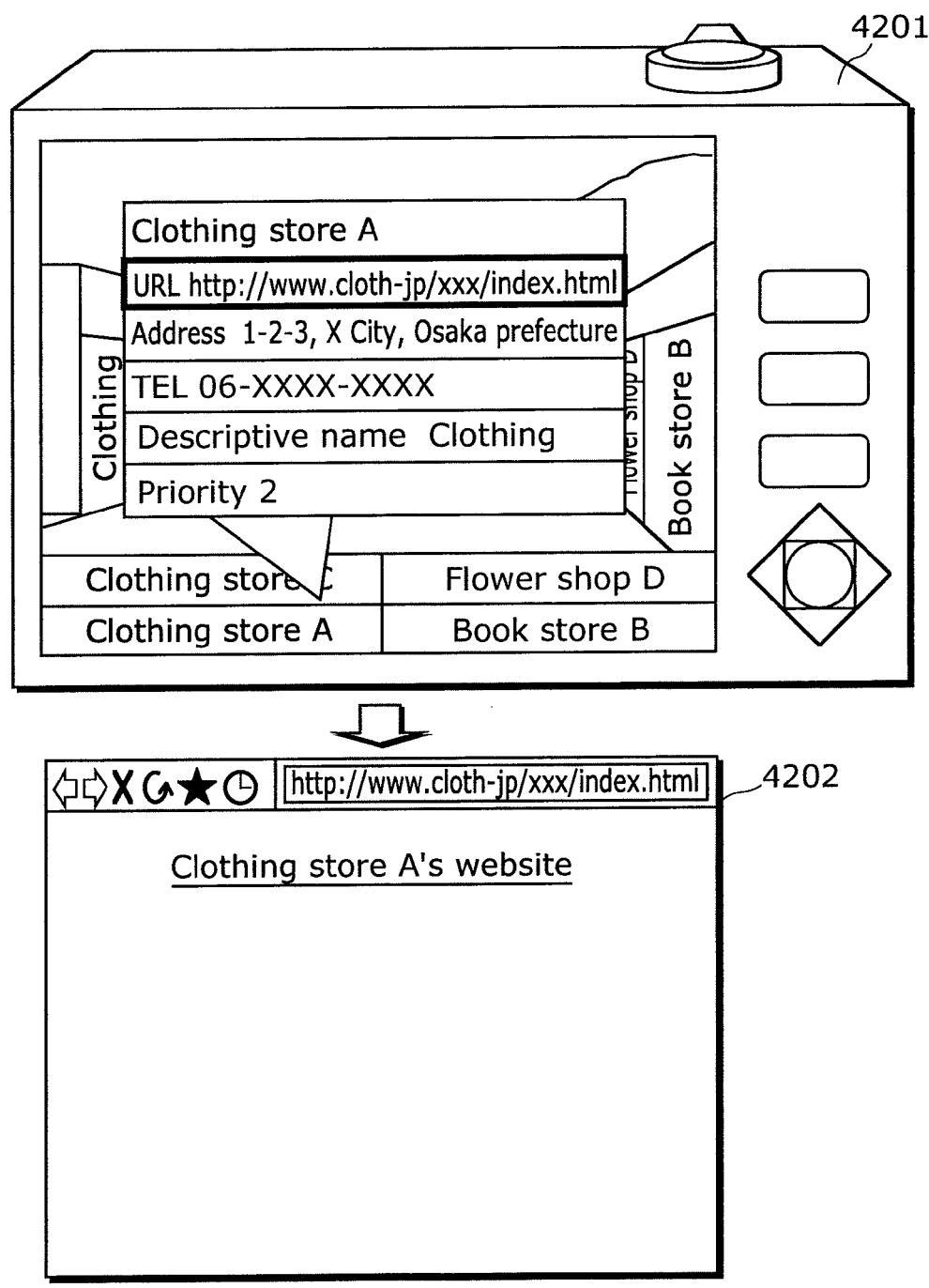
FIG. 43 illustrates an example of a method for displaying landmark information in an overlaying manner.

FIG. 43 illustrates an example of a method for displaying detailed information of a subject.

The user selects a landmark using the operation interface of the image capturing apparatus 102 so that detailed landmark information can be displayed. For example, there is a method for selecting a landmark by displaying a cursor for selecting a landmark within a landmark display area, and moving the cursor using an arrow key (movable from side to side and up and down) as provided in a large number of digital still cameras. Once a landmark is selected, a landmark detailed information display area is displayed on the screen, and the ID, landmark name, landmark URL, latitude, longitude, address, telephone number, descriptive name, hierarchical order, and priority are displayed in the landmark detailed information display area.

Here, a screen of the image capturing apparatus 102 may be a touch screen that can detect a finger touch by the user, and a landmark may be selected with a touch of the touch screen. Since the touch screen eliminates the need for a cursor key to select a landmark, it produces an advantage of miniaturizing the image capturing apparatus 102 and enlarging an area of the display screen.

When the selected landmark has URL information of the landmark and the URL is displayed in the landmark detailed information display area, the user displays a website indicated by the URL on the screen, using the operation interface of the image capturing apparatus 102. When the user selects a landmark URL using an operation key of the image capturing apparatus 102, with the landmark URL being displayed in the landmark detailed information display area, a web browser provided in the image capturing apparatus 102 is activated, the website indicated by the selected URL is read from the Internet, and the website is displayed on the screen.

When there is a difficulty in incorporating a web browser into the image capturing apparatus 102, the selected landmark URL may be transmitted to an external device that incorporates a web browser, such as a mobile phone.

The image capturing apparatus 102 may transmit its unique ID, when accessing a landmark URL. An ID clarifies which image capturing apparatus accesses a website. When an image capturing apparatus accesses a website of an eating place, for example, the image capturing apparatus can display coupon information of the eating place that is different from the one obtained by a normal access of a PC through the Internet. This is because an access from an image capturing apparatus indicates that the user having the image capturing apparatus is highly likely closer to the subject, thus making it possible to effectively attract more customers to the subject for advertisement. Besides that, an advertisement of a limited offer may be displayed only to a user who accesses the website from an image capturing apparatus, by taking advantage that the image capturing apparatus is highly likely closer to the subject. Thereby, a convenience of the user and an efficient advertisement of a service provider can be achieved.

Although FIG. 43 shows a method that the user selects a landmark using the operation interface of the image capturing apparatus 102 so that detailed landmark information can be displayed, as long as a count of landmarks is not larger than a predetermined value, the landmark with detailed information may be displayed. Thereby, the user can omit processes of displaying detailed information, such as selecting a landmark and pressing down a detailed display button.

Furthermore, aside from the detailed display, when a count of landmarks to be displayed is not larger than the predetermined value, information of a URL may be displayed by accessing the URL of the landmark. With this function, the user can know more detailed information of a subject, because an amount of information of the URL is larger than the description of detailed display.

Figure 44:
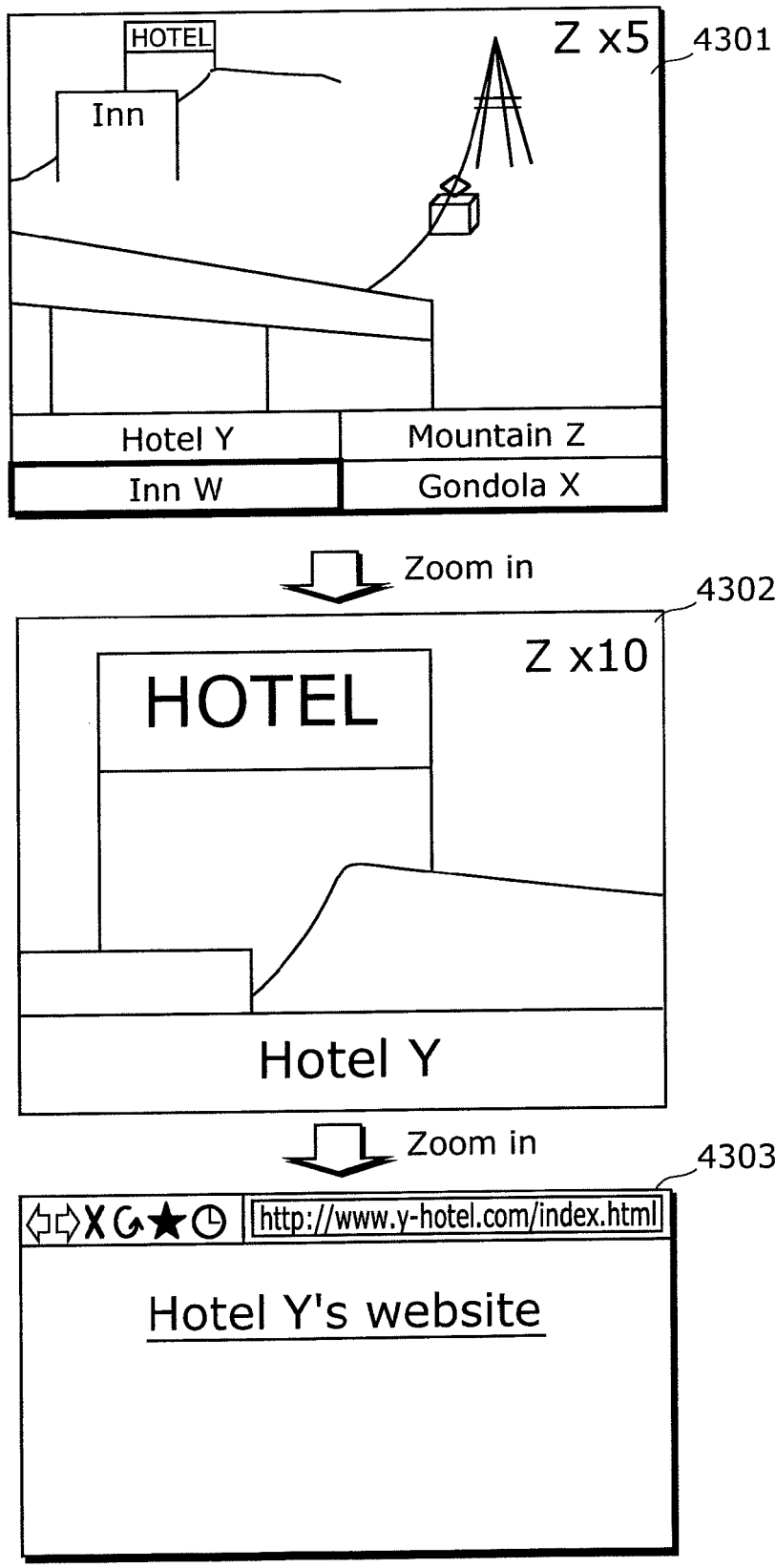
FIG. 44 illustrates an example of a method for displaying landmark information in an overlaying manner.

FIG. 44 illustrates a variation in which the image capturing apparatus 102 accesses a URL through a zoom operation.

As illustrated in FIG. 44, only one landmark is displayed in a largest zoom ratio on a screen through the zoom operation of the image capturing apparatus 102. When the user further zooms in, the web browser may be activated, so that the user can automatically access the URL of the landmark displayed on the screen. As such, the user can smoothly access a URL of a landmark using only the zoom operation. When a landmark enlarged on the screen has no URL information, the web browser desirably should not be activated.

FIG. 47 illustrates another configuration for the overlaying display method according to an aspect of the present invention.

A display area for displaying the names of landmarks included in the landmark information is provided in the lower portion of the screen. Subjects captured and the names of landmarks respectively corresponding to the subjects are displayed in a manner horizontally matching each other in the display area of the screen. Furthermore, the names of landmarks of the subjects are displayed according to each distance from a capturing position to a corresponding one of the subjects, from top to bottom in the display area. For example, when landmarks are displayed as indicated by an arrow in FIG. 47, the distances to the respective subjects displayed as the landmarks are longer in the order from the first row to the second row.

A landmark display method zoomed in a 1× magnification is exemplified on a display screen 4601, and a landmark display method zoomed in a 5× magnification is exemplified on a display screen 4602. The image capturing apparatus 102 displays a closer landmark in a lower magnification ratio, while displaying a farther landmark in a higher magnification ratio.

Changing a display area for landmarks according to a zoom ratio, for example, makes it possible for the user who desires to know the names in a distant region through zooming in, to display only farther landmark information by displaying farther landmarks using the zoom function, without displaying closer landmarks.

When the name of a landmark to be displayed has the text exceeding a predetermined character count, the image capturing apparatus 102 may display the landmark by omitting the excessive portion of the name, and reducing the name. Thereby, even when a subject has a long name, the landmark and the subject may be displayed in the overlaying manner while maintaining a horizontal relationship between the subject and the landmark.

Furthermore, the information map server (map server) may previously add an abbreviated name to a landmark having a long name, and the abbreviated information and the formal name may be transmitted to the image capturing apparatus 102. Thus, the image capturing apparatus 102 can display a landmark having a long name using an abbreviated name, and further display detailed information by a user's operation.

When the map server having higher computational capability holds the abbreviated name and the formal name and transmits these information to the image capturing apparatus 102, the response speed of the image capturing apparatus 102 for displaying a landmark may be increased, and the convenience of the user may be improved.

Furthermore, the map server that previously registers a landmark with the formal name and the abbreviated name can display the landmark in the abbreviated format that is easy to follow by the user.

The image capturing apparatus 102 may transmit, to the map server 120, the image-capturing-apparatus descriptive information together with information for calculating a displayable length of the name of a landmark. The map server 120 may determine the abbreviated name based on the information.

Resolution information is desirably necessary for knowing the length of the name of a landmark to be displayable. When an image capturing apparatus having a higher resolution displays a landmark, the name of the landmark is abbreviated to a relatively longer name. Furthermore, when an image capturing apparatus having a lower resolution displays a landmark, the name of the landmark is abbreviated to a shorter name. Thereby, the landmark may be displayed with a length according to a resolution of a display.

Figure 45:
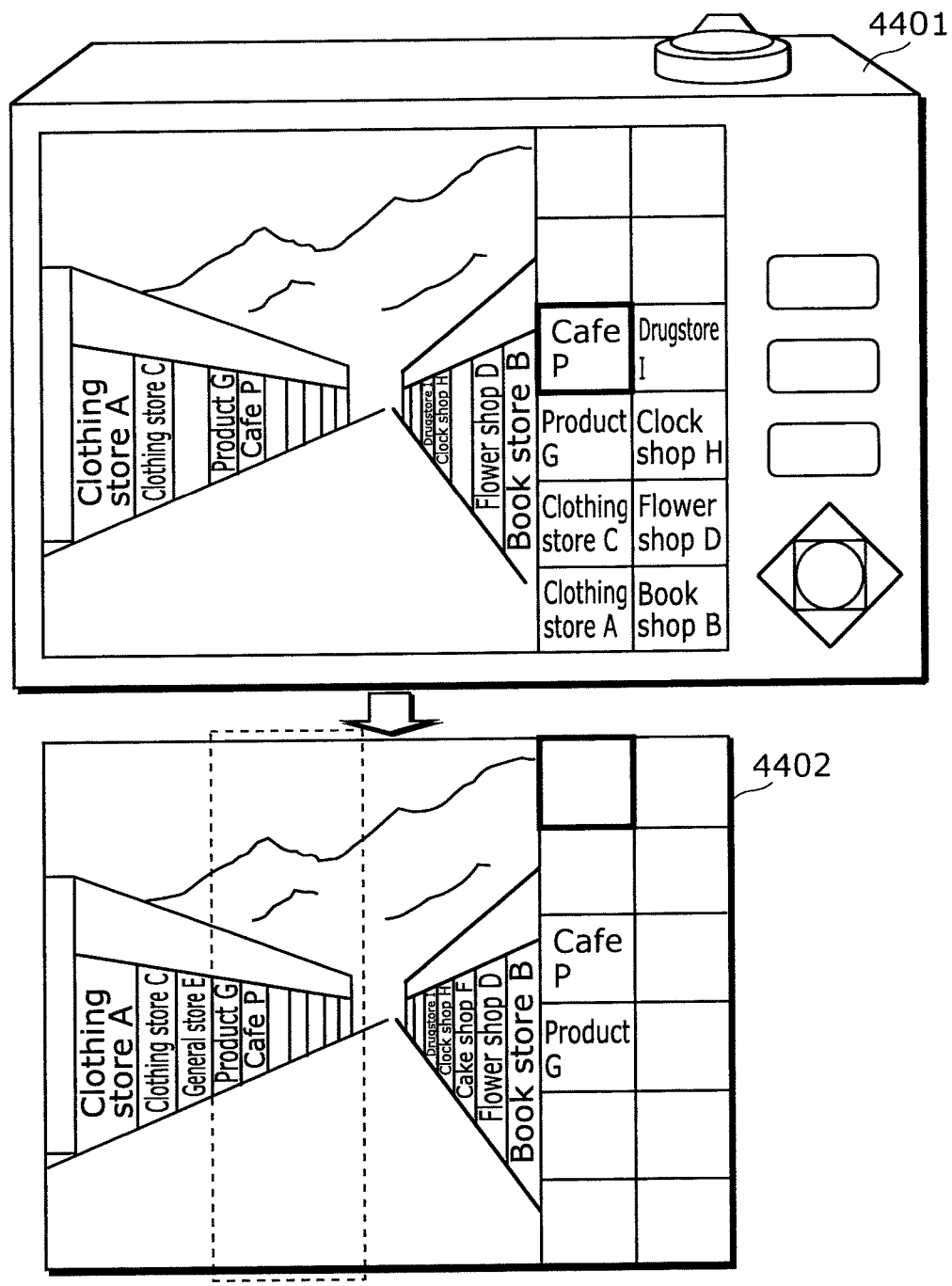
FIG. 45 illustrates an example of a method for displaying landmark information in an overlaying manner.

Landmarks to be displayed on a screen may further be filtered by limiting a position of the landmarks to be displayed in a horizontal direction. For example, as illustrated in FIG. 45, the image capturing apparatus 102 displays a rectangle in the center of the screen from the upper to the lower portions. Then, a closer landmark is displayed in a lower zoom ratio, while a farther landmark is displayed in a higher zoom ratio. This configuration can narrow down a count of landmarks, rather than a case of only performing filtering according to a zoom ratio. Furthermore, desired is a system in which a width of the rectangle that narrows landmarks may be changed to any width using a zoom button or a cursor key of the image capturing apparatus 102 through the operation interface, and a rectangle may desirably be selected from among rectangles that are provided in advance. Thereby, only a count of landmarks in a range that the user desires to know may be displayed. Furthermore, more detailed information may be displayed by narrowing the display range.

Furthermore, the display unit of the image capturing apparatus 102 may be equipped with a touch panel function so that the user can change a display range of landmarks according to a width determined with a touch of 2 fingers. Thus, the user can select a landmark display range, not only in the center but also in a portion of the right end of the screen, thus bringing an advantage of widening choices of a landmark display range.

Figure 48:
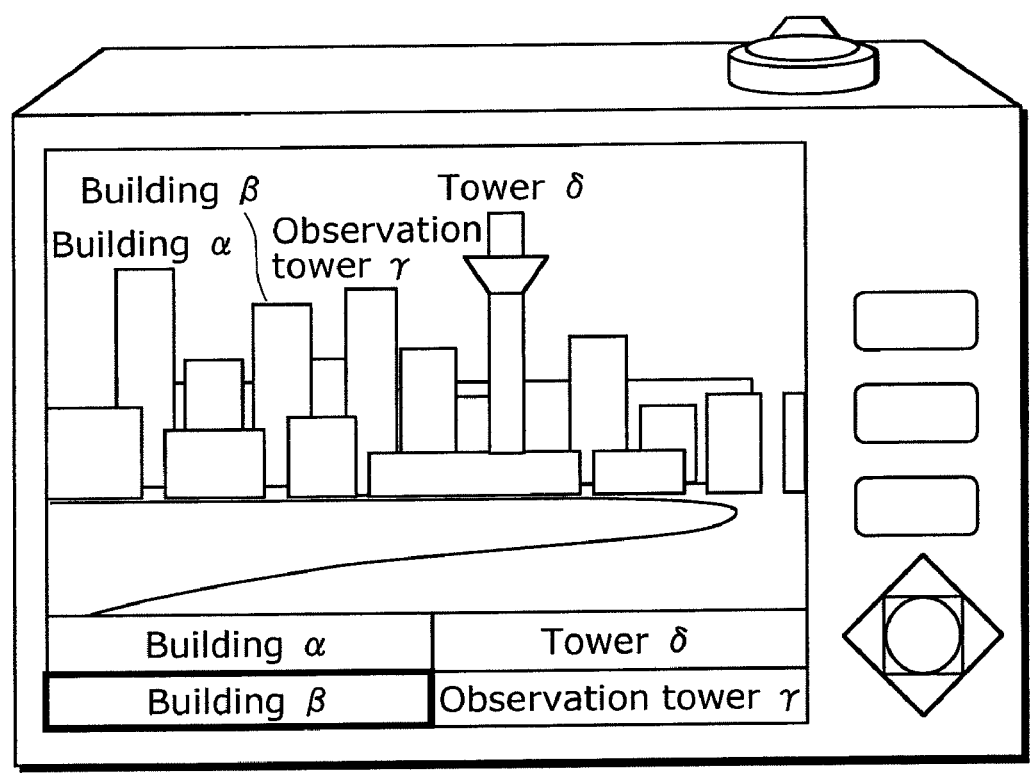
FIG. 48 illustrates an example of a method for displaying landmark information in an overlaying manner.

FIG. 48 illustrates a variation in which the image capturing apparatus 102 filters landmarks according to height information included in the landmark information.

The image capturing apparatus 102 may further filter landmarks to be displayed on the screen, according to height information included in the landmark information. When a point where landmarks are closely-spaced is captured, for example as illustrated in FIG. 48, the landmarks narrowed down by the filtering according to a zoom ratio are displayed in an order from a landmark having the larger height information. There are few higher landmarks that are entirely hidden by other landmarks. Thus, landmarks having the larger height information are selected and displayed with higher priority so as to avoid displaying the landmarks that are out of sight of the user (capturing screen).

Although the names of landmarks of subjects are displayed according to each distance from a capturing position to a corresponding one of the subjects, from top to bottom in the display area in Embodiment 1, whether the landmark display area is displayed or not may be changed according to a user operation using the operation interface of the image capturing apparatus 102. For example, there is another configuration in which the landmark display area is displayed immediately after the user performs an operation, and the landmark display area is not displayed after a predetermined time from the start of display. Thus, the landmarks may be displayed only when the user needs them.

FIG. 49 illustrates a variation of displaying map information on the periphery of a landmark by the image capturing apparatus 102.

The image capturing apparatus 102 may display map information on the periphery of a landmark of particular landmark information that is displayed in detail as illustrated in FIG. 49. Thus, geography on the periphery of the landmark can be viewed.

Figure 50:
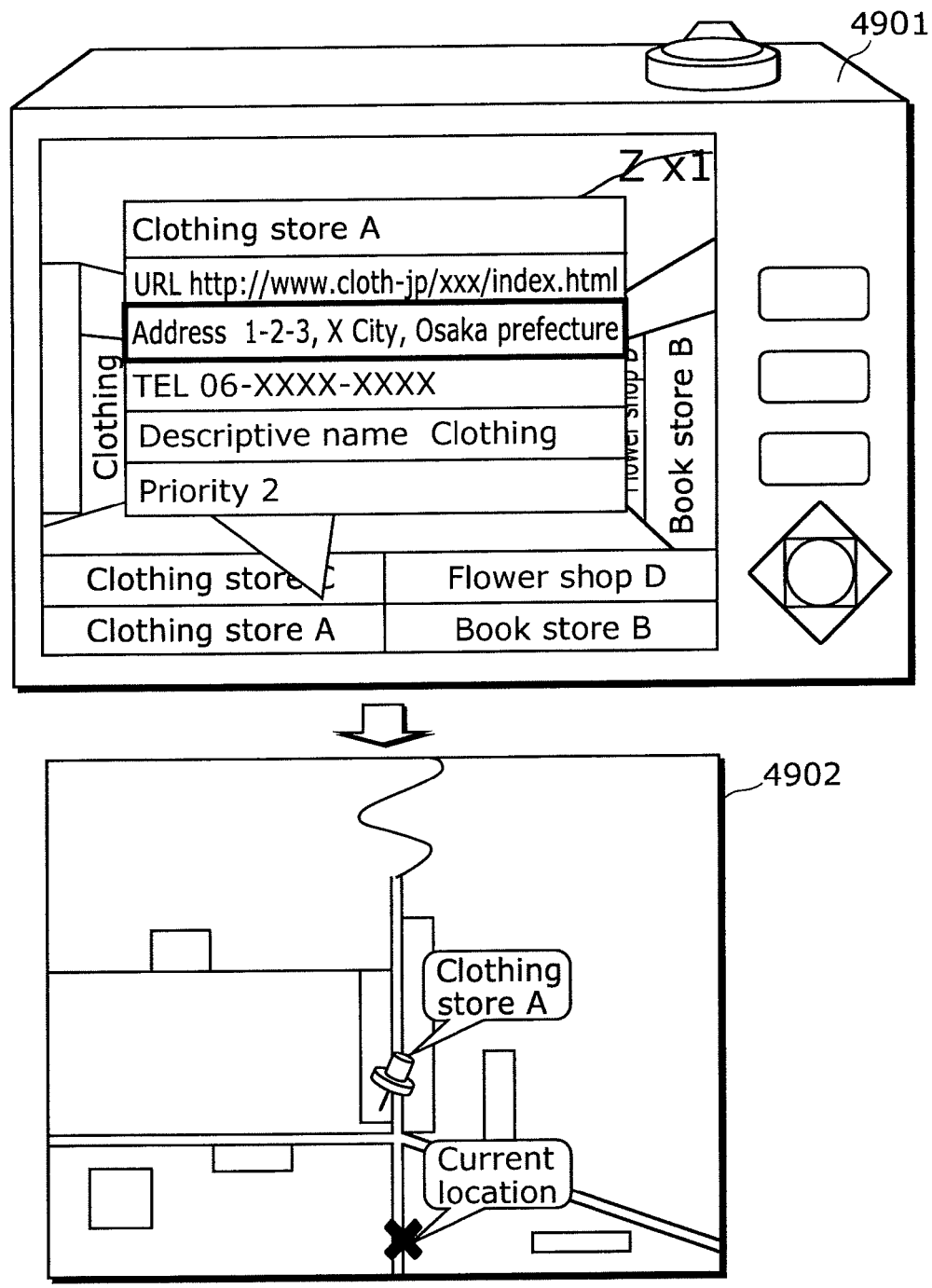
FIG. 50 illustrates an example of a method for displaying landmark information in an overlaying manner.

FIG. 50 illustrates a variation of displaying position information of the image capturing apparatus 102 together with the map information by the image capturing apparatus 102.

The image capturing apparatus 102 may display the position information of the image capturing apparatus 102 together with the map information as illustrated in FIG. 50. Thereby, there is an advantage of facilitating the understanding of (i) a physical access route from a current location to a landmark that is displayed in detail and (ii) a relative position relationship between the location and the landmark.

FIG. 45 illustrates a variation of displaying a rectangular area by the image capturing apparatus 102.

When a landmark display range is desired to be narrowed down, the image capturing apparatus 102 may display a rectangular area as illustrated in FIG. 45 by operating a zoom button while displaying a captured image, and display the landmark information limited to the rectangular area. The rectangular area may be set in the center of the display by operating the zoom button, thus causing 2 bilaterally symmetric ranges in the display. Alternatively, an area in which landmark information is displayed may be determined by positioning the rectangular area using the zoom button and further moving the rectangular area from side to side using the cursor key. Normally, a zoom button is used for enlarging and reducing a display area of landmark information when an image is captured. Thus, the configuration of changing the display area by operating the zoom button allows the user to intuitively change the display area.

Figure 13:
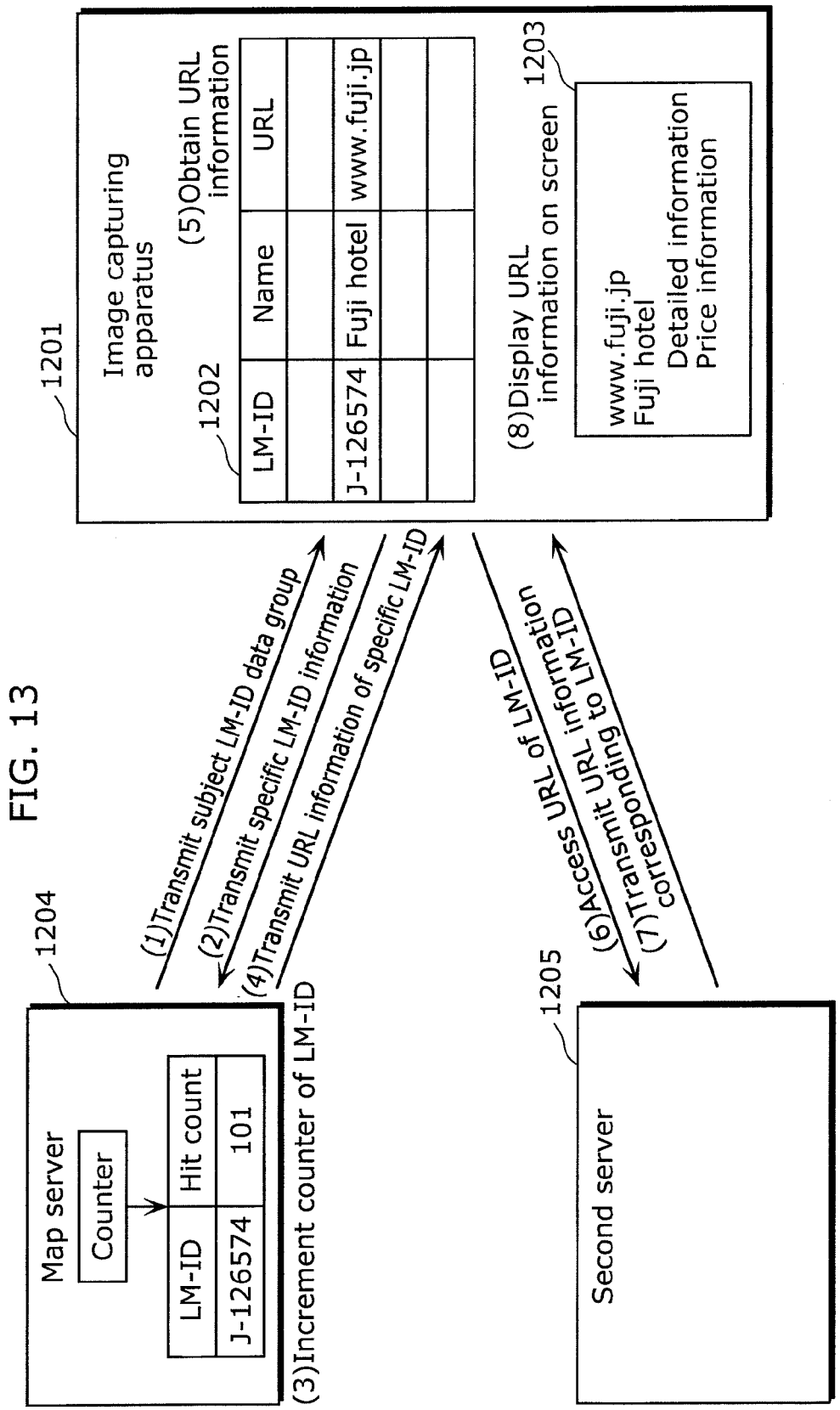
FIG. 13 illustrates an example of a method for obtaining detailed information of a landmark.

FIG. 13 illustrates a variation of an image capturing apparatus 1201 and others.

Displaying detailed information of a landmark via accessing the Internet with the user operation will be described with reference to FIG. 13. A database held by a map server 1204 holds an ID unique to the landmark and the URL information. The map server 1204 does not add the URL information to landmark information to be transmitted to the image capturing apparatus 1201.

The image capturing apparatus 1201 stores data including an ID and the name of a landmark (LM-ID) other than URLs, as data 1202 (1). Suppose that the LM-ID is "3-126574" that identifies Fuji Hotel as the name of a landmark.

The user operations for accessing the URL information of Fuji Hotel will be hereinafter described.

When the user requests URL information of Fuji Hotel with a click on an icon of Fuji Hotel that is displayed in the overlaying manner, the image capturing apparatus 1201 transmits specific LM-ID information to the map server 1204 (2). In other words, the image capturing apparatus 1201 transmits the LM-ID of 3-126574 of Fuji Hotel. The map server 1204 holds detailed information of the LM-ID and the counter. When the image capturing apparatus 1201 transmits a request for transmission of the detailed information of the LM-ID to the map server 1204, the map server 1204 counts up the URL hit count (3) while transmitting the URL information of the LM-ID. After counting up the hit count, the map server 1204 transmits the URL information of the transmitted ID to the image capturing apparatus 1201 (4). Here, the map server 1204 that has received the ID of Fuji Hotel increments the hit count of Fuji Hotel, and transmits the URL information of Fuji Hotel to the image capturing apparatus 1201. When the image capturing apparatus 1201 obtains the URL information from the map server 1204 (5), it accesses a second server 1205 that is a destination of the URL (6). In response to the access, the second server 1205 transmits information of the URL destination to the image capturing apparatus 1201 (7). The image capturing apparatus 1201 that has obtained the information of the URL destination displays the detailed information described in the URL destination on the screen as illustrated on a display screen 1203 (8).

With the configuration in FIG. 13, the map server 1204 can know the landmark information of the URL accessed by the user. Thereby, the map server 1204 can know information of popular landmarks and charge a person who manages a URL of a subject that is accessed by the image capturing apparatus 1201, thus bringing an economic advantage for a person who manages the map server 1204. Furthermore, when the map server 1204 transmits the URL information to the image capturing apparatus 1201, it can also transmit additional information related to the landmark information whose access is requested by the user.

Figure 14:
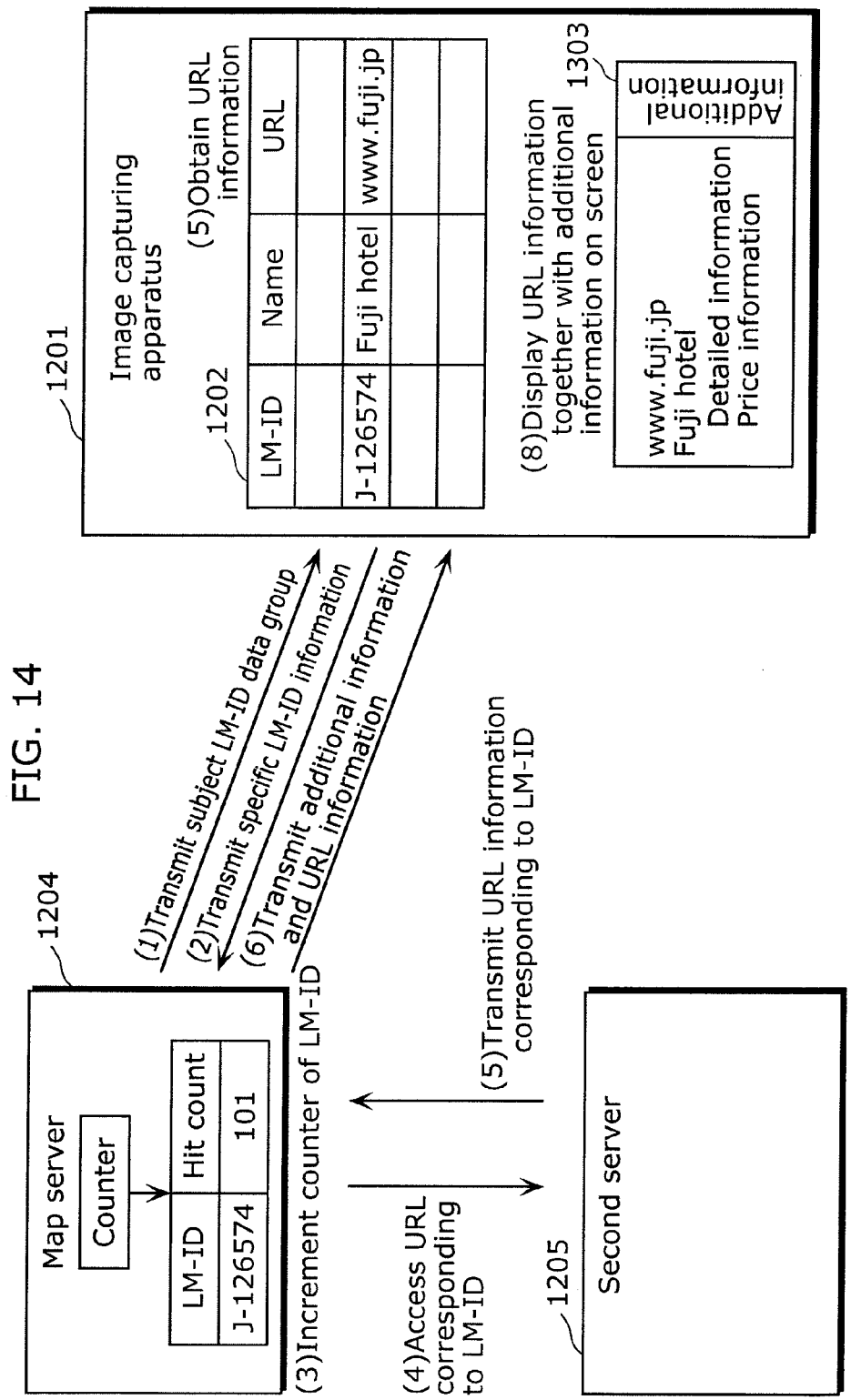
FIG. 14 illustrates an example of a method for obtaining detailed information of a landmark.

FIG. 14 illustrates a variation of the image capturing apparatus 1201 and others.

Furthermore, the URL access by the image capturing apparatus 1201 may be performed according to a configuration in FIG. 14. First, the image capturing apparatus 1201 transmits information of a specific LM-ID to the map server 1204 (2). The map server 1204 increments a counter of the LM-ID (3), and accesses a URL corresponding to the LM-ID (4). In response, the second server 1205 transmits, to the map server 1204, information of the URL destination that corresponds to the LM-ID and that has been accessed by the map server 1204 (5). The map server 1204 transmits data including the information of the URL destination and additional information to the image capturing apparatus 1201 (6). The image capturing apparatus 1201 that has obtained the URL information displays the URL information and the additional information on the screen (8). With the configuration in FIG. 14, the map server 1204 can transmit, to the image capturing apparatus 1201, the additional information related to the landmark information whose access is requested by the user.

Although the additional information is desirably an advertisement related to landmark information that is requested for the access and others, the information is not limited to such. For example, when a landmark indicates an eating place and a hotel, a coupon can be displayed as additional information.

Furthermore, when the map server 1204 manages an access history of an other image capturing apparatus 1201, in the case where a user accesses the URL of Fuji Hotel, the map server 1204 may display landmark information accessed before and after accessed by an other user. Thereby, landmark information to which the user desires to access next can be recommended.

When the image capturing apparatus 1201 accesses a URL, the map server 1204 can manage an access history of the image capturing apparatus 1201 with the configuration of FIG. 14 for enabling the access via the map server 1204. Thereby, charging a person who manages a URL of a subject that is accessed by the image capturing apparatus 1201 becomes possible, thus bringing an economic advantage for the person who manages the map server 1204. Furthermore, the person who manages the map server 1204 can charge a person who requests an advertisement when the advertisement is posted on the website as additional information, thus bringing another economic advantage for the person who manages the map server 1204.

Embodiment 2

An additional information filtering system according to Embodiment 2 includes: an image capturing apparatus configured to capture a digital image; and an image display apparatus configured to display a plurality of additional information overlaid on the digital image, the plurality of additional information each corresponding to an object included in the digital image, the image capturing apparatus including: an imaging unit configured to capture the digital image; an image-capturing position obtaining unit configured to obtain an image-capturing position in which the imaging unit captures the digital image; an image-capturing direction obtaining unit configured to obtain an image-capturing direction in which the imaging unit captures the digital image; and an output unit configured to output the digital image captured by the imaging unit, the image-capturing position obtained by the image-capturing position obtaining unit, and the image-capturing direction obtained by the image-capturing direction obtaining unit, and the image display apparatus including: an input unit configured to input the digital image, the image-capturing position, and the image-capturing direction outputted by the output unit; an additional-information obtaining unit configured to obtain the plurality of additional information (i) each corresponding to a corresponding one of the objects included in the digital image and (ii) corresponding to the image-capturing position and the image-capturing direction inputted by the input unit; a selecting unit configured to select a corresponding one of the plurality of additional information to be displayed, from among the plurality of additional information obtained by the additional-information obtaining unit; and a display unit configured to display the corresponding one of the plurality of additional information overlaid on the inputted digital image, the corresponding one of the plurality of additional information being selected by the selecting unit.

Furthermore, the additional information filtering system according to Embodiment 2 includes: an image capturing apparatus configured to capture a digital image; an image display apparatus configured to display a plurality of additional information overlaid on the digital image; and an additional information providing server that transmits the plurality of additional information of the objects included in the digital image to the image display apparatus, the image capturing apparatus including: an imaging unit configured to capture the digital image; an image-capturing position obtaining unit configured to obtain an image-capturing position in which the imaging unit captures the digital image; an image-capturing direction obtaining unit configured to obtain an image-capturing direction in which the imaging unit captures the digital image; and an output unit configured to output the digital image captured by the imaging unit, the image-capturing position obtained by the image-capturing position obtaining unit, and the image-capturing direction obtained by the image-capturing direction obtaining unit, the image display apparatus including: an input unit configured to input the digital image, the image-capturing position, and the image-capturing direction outputted by the output unit; an additional-information obtaining unit configured to transmit the image-capturing position and the image-capturing direction inputted by the input unit to the additional information providing server, and obtain the plurality of additional information from the additional information providing server, the plurality of additional information (i) respectively corresponding to the objects included in the digital image and (ii) corresponding to the image-capturing position and the image-capturing direction that are transmitted; a selecting unit configured to select a corresponding one of the plurality of additional information to be displayed, from among the plurality of additional information obtained by the additional-information obtaining unit; and a display unit configured to display the corresponding one of the plurality of additional information overlaid on the inputted digital image, the corresponding one of the plurality of additional information being selected by the selecting unit, and the additional information providing server including: a database that holds the plurality of additional information of the objects; a receiving unit configured to receive the image-capturing position and the image-capturing direction that are transmitted; an additional information extracting unit configured to extract, from the database, one or more of the plurality of additional information (i) respectively corresponding to the objects included in the digital image and (ii) corresponding to the image-capturing position and the image-capturing direction that are received by the receiving unit; and a transmitting unit configured to transmit the extracted one or more of the plurality of additional information to the image display apparatus.

FIGS. 16, 17, 46, and 18 to 22 are drawings for Embodiment 2.

Figure 16:
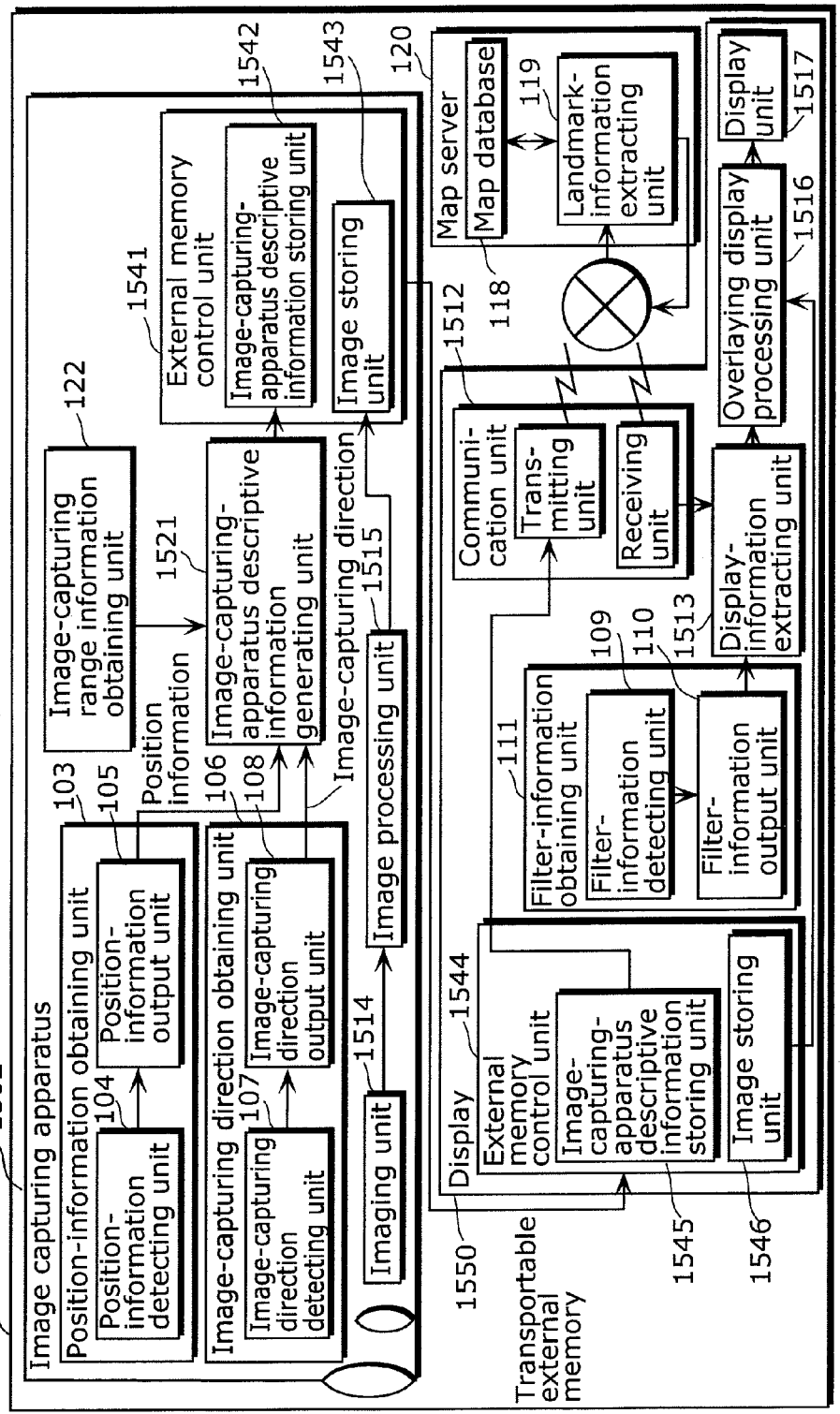
FIG. 16 illustrates a configuration of Embodiment 2 according to the present invention.

FIG. 16 illustrates a configuration of a system 1501 according to another embodiment of the present invention.

The system 1501 according to Embodiment 2 mainly includes an image capturing apparatus 1502, a display 1550, and the map server 120.

In Embodiment 2, landmark information is overlaid on an image captured by the image capturing apparatus 1502, and the resulting image is displayed. The configuration that separates the image capturing apparatus 1502 from the display 1550 can lead to enlargement of an area of the display 1550. Furthermore, as an application of this configuration, a display at home can combine an image captured when outside with landmark information, for example.

Figure 17:
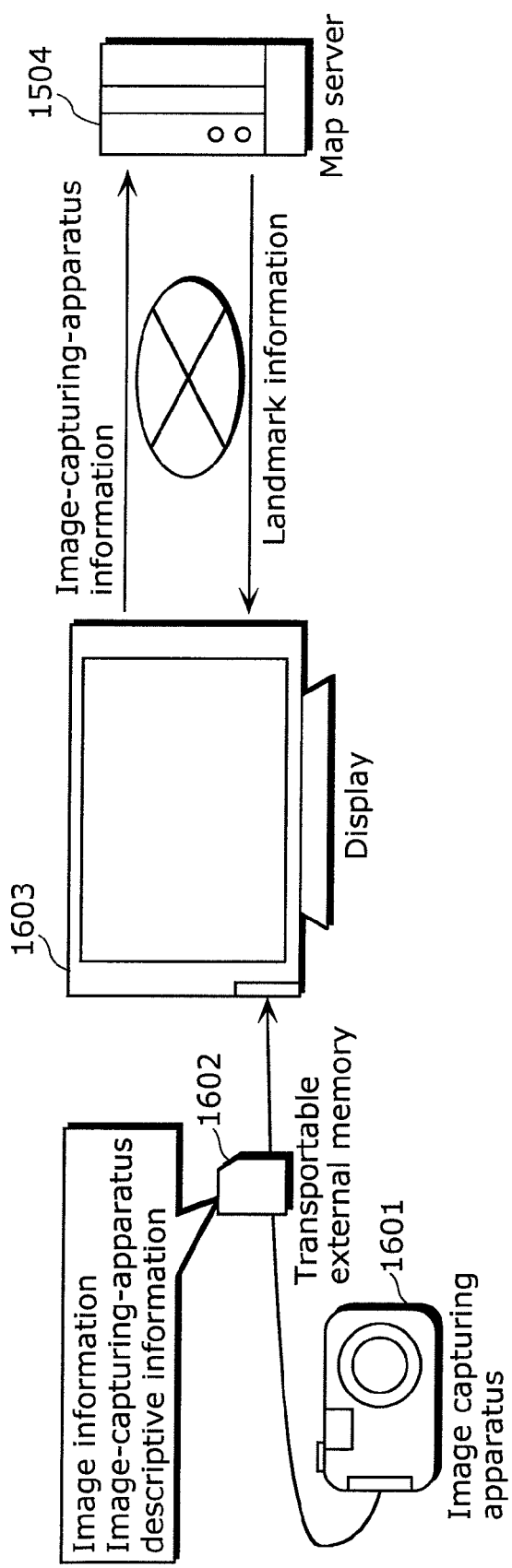
FIG. 17 illustrates a schematic drawing of a system according to Embodiment 2.

FIG. 17 illustrates an example of an application of Embodiment 2.

An image capturing apparatus 1601 transfers captured image information and capturing descriptive information to a display 1603 using a transportable external memory 1602. The display 1603 obtains landmark information from the map server 120, and performs an overlaying display. The display 1550 generally includes a processor higher in performance than the image capturing apparatus 1502, and a means for accessing the Internet. This configuration does not require the image capturing apparatus 1502 to include a device for accessing the map server 120, thus enabling the miniaturization of the image capturing apparatus 1502. Furthermore, the display 1603 having a screen larger than that of the image capturing apparatus 1502 can display a captured image displayed in the overlaying manner, and an operation button or a remote control of the display 1603 can set display items, thus improving the convenience of the user.

The image capturing apparatus 1502 includes a position-information obtaining unit 103, an image-capturing direction obtaining unit 106, an image-capturing range information obtaining unit 122, an image-capturing-apparatus descriptive information generating unit 1521, an external memory control unit 1541, an imaging unit 1514, and an image processing unit 1515.

The image capturing apparatus 1502 generates auxiliary information on the image capturing apparatus 1502, using the image-capturing-apparatus descriptive information generating unit 1521, and stores the generated image-capturing-apparatus descriptive information together with the captured image in a transportable external memory held by the external memory control unit 1541, using the external memory control unit 1541.

It is assumed that the image capturing apparatus 1502 is a digital still camera, and the transportable external memory held by the external memory control unit 1541 is a nonvolatile memory card, each as a representative example.

First, the position-information obtaining unit 103 is a device that measures and outputs a position of the image capturing apparatus 1502.

Next, the position-information obtaining unit 103 performs the same processing as the position-information obtaining unit 103 in FIG. 2 according to Embodiment 1. The image capturing apparatus 1502 including a communication unit such as a wireless LAN and a short-range radio system can receive information on position information to be broadcast from a wireless base station including a wireless LAN and a short-range radio system, without generating a QR code with position information, thus obtaining the same advantage as that of GPS.

Next, the image-capturing direction obtaining unit 106 is a device that detects direction information of the image capturing apparatus 1502 and outputs the detected direction information. The image-capturing direction obtaining unit 106 performs the same processing as the image-capturing direction obtaining unit 106 in FIG. 2 according to Embodiment 1.

The position-information detecting unit 104 and the image-capturing direction detecting unit 107 may be separated from the image capturing apparatus 1502 and be installed in another device. For example, a receiving unit of the image capturing apparatus (image capturing apparatus 1502) may receive both or one of position information and an image-capturing direction that are obtained by a mobile phone including the position-information detecting unit 104 and the image-capturing direction detecting unit 1502. Thereby, since the image capturing apparatus 1502 can obtain the both or one of position information and an image-capturing direction by including the short-range wireless communication device and from the mobile phone including the position information, it does not include a sensor for detecting position information and an image-capturing direction. Thus, there is an advantage of enabling miniaturization of the image capturing apparatus 1502.

Next, the image-capturing range information obtaining unit 122 obtains information in a range captured by the image capturing apparatus 1502. The image-capturing range information obtaining unit 122 performs the same processing as the image-capturing range information obtaining unit 122 in FIG. 2 according to Embodiment 1.

Then, when the image capturing apparatus 1502 detects a press of a shutter included in the image capturing apparatus 1502, the imaging unit 1514 obtains a scene image, the image processing unit 1515 performs image processing on the obtained scene image, and the resulting image data is stored in a transportable external memory through the external memory control unit 1541. The image-capturing-apparatus descriptive information generating unit 1521 transmits, to the external memory control unit 1541, information (referred to as image-capturing-apparatus descriptive information) generated by the position-information obtaining unit 103, the image-capturing direction obtaining unit 106, and the image-capturing range information obtaining unit 122 as image header data. The external memory control unit 1541 stores the image header data received from the image-capturing-apparatus descriptive information generating unit 1521 in a header portion of the image data stored in the transportable external memory.

The Exchangeable image file format (Exif) is a representative example as a format of an image header. An image header is desirably generated in accordance with such a standard.

The transportable external memory held by the external memory control unit 1541 of the image capturing apparatus 1502 may be inserted in and removed from the image capturing apparatus 1502 and the display 1550. Furthermore, the transportable external memory for storing the image-capturing-apparatus descriptive information and image information in the image capturing apparatus 1502 is removed from the image capturing apparatus 1502 and inserted into the display 1550. The display 1550 is assumed to be, as a representative example, a device having a larger display, such as a television and a PC.

Furthermore, the display 1550 includes an external memory control unit 1544, a filter-information obtaining unit 111, a communication unit 1512, a display-information extracting unit 1513, an overlaying display processing unit 1516, and a display unit 1517.

The display 1550 receives an input of the user through an operation interface included in the display 1550, so that the user can search for or specify image data that the user desires to view, among a plurality of image data stored in the transportable external memory.

First, the external memory control unit 1544 transmits the image data specified by the user from among the image data stored in the transportable external memory internally held by the display 1550, to the overlaying display processing unit 1516. Furthermore, the external memory control unit 1544 simultaneously transmits the image-capturing-apparatus descriptive information stored as image header data together with the image data, to the communication unit 1512.

Next, the communication unit 1512 attaches communication header information and others to the image-capturing-apparatus descriptive information to be transmitted, and transmits the resulting information from a transmitting unit included in the communication unit 1512 to the map server 120. Although an address of the map server 120 is desirably registered in an internal memory of the display 1550 in advance, the address may be changed according to an input operation by the user. Thereby, change in the address of the map server 120 can be supported, for example. Furthermore, even when another map server 120 newly starts a service, system migration of the user becomes easier.

The communication unit 1512 should desirably use a wireless or wired LAN, but is not necessarily limited to this. The communication unit 1512 may use a communication base station communication, such as a mobile phone, a PHS, and a WiMAX. Alternatively, it may temporarily transmit the image-capturing-apparatus descriptive information to another communication device, and the other communication device may transmit the image-capturing-apparatus descriptive information to the map server 120. For example, when the communication unit 1512 transmits the image-capturing-apparatus descriptive information to a mobile phone using the short-range communication, such as a wireless LAN, UWB, and ZigBee, the mobile phone can transmit the image-capturing-apparatus descriptive information to the map server 120. The communication unit 1512 of the display 1550 can be miniaturized by transmission of data from the display 1550 to another communication device in a short-range communication, and by transmission of the image-capturing-apparatus descriptive information from the other communication device to the map server 120. Furthermore, electric power consumed for transmission of the image-capturing-apparatus descriptive information by the display 1550 can be minimized.

First, the map server 120 transmits information on landmarks (landmark information) to the display 1550. The map server 120 performs the same processing as the map server 120 in FIG. 2 according to Embodiment 1. However, the landmark-information extracting unit 119 transmits all landmark information included in an image captured by the image capturing apparatus 1502, from the map database 118 based on the image-capturing-apparatus descriptive information obtained from the image capturing apparatus 1502.

Furthermore, a receiving unit included in the communication unit 1512 of the display 1550 transmits the landmark information received from the map server 120 to the display-information extracting unit 1513.

Next, the filter-information obtaining unit 111 includes: a filter-information detecting unit 109 that detects information on filtering only landmark information desired by the user from landmarks obtained from the map server 120; and a filter-information outputting unit 110 that transmits the information detected by the filter-information detecting unit 109. The filter-information obtaining unit 111 performs the same processing as the filter-information obtaining unit 111 in FIG. 2 according to Embodiment 1.

The configuration of the filter-information detecting unit 109 is the same as the configuration in FIG. 2 according to Embodiment 1.

Next, the display-information extracting unit 1513 filters the landmark information based on filter information obtained from the filter-information obtaining unit 111. The specific filtering method described in Embodiment 1 is applied to Embodiment 2. The display-information extracting unit 1513 transmits the filtered landmark information to the overlaying display processing unit 1516.

Upon receipt of an input for selecting an image from the user, the display 1550 performs a series of processes for transmitting the image-capturing-apparatus descriptive information to the map server 120 and receiving the landmark information from the map server 120. However, the landmark obtaining processes are not limited to such a timing. For example, when a transportable external memory is inserted in the display 1550 and when the user suspends an input for a predetermined period of time, the display 1550 may perform the landmark obtaining processes on all image data in the transportable external memory in the background according to an order defined by a File Allocation Table (FAT) of the image data or an order of image-capturing times of the image data. Obtaining landmarks before the user starts an operation or in an idling operation significantly reduces a wait time for obtaining landmarks when an image and a landmark are displayed in the overlaying manner, and thus the user can operate the display 1550 comfortably.

Next, the overlaying display processing unit 1516 performs processing for displaying the landmark information extracted by the display-information extracting unit 1513 to be overlaid on the scene image data obtained from the external memory control unit 1544. Depending on a user's operation, the overlaying display processing unit 1516 does not display the landmark information in the overlaying manner. In such a case, the overlaying display processing unit 1516 transmits the image data to the display unit 1517 as it is.

Next, the display unit 1517 displays the landmark information overlaid on the image-capturing information.

FIG. 46 illustrates the display 1550 and a remote control 4501. As illustrated in FIG. 46, the display 1550 has a main-unit operation button and the remote control 4501. Thus, the display 1550 may have a function for displaying detailed landmark information upon receipt of a user operation.

The format of data transmitted from the display 1550 to the map server 120 is the same as that of the format shown in FIG. 4 as an example of Embodiment 1.

The display 1550 has a normal reproducing mode for reproducing the captured image on the screen, and a landmark display mode for viewing an image while displaying a landmark on a screen as well as for obtaining detailed information on a landmark, so that the user can set any mode through an operation interface of the display 1550. When the user selects image data in the transportable external memory held by the display 1550 through the operation interface of the display 1550, the selected image and landmark information corresponding to the selected image are displayed on the screen as images in the landmark display mode. The following describes processing for obtaining landmark information included in a selected image in the landmark display mode.

Figure 18:
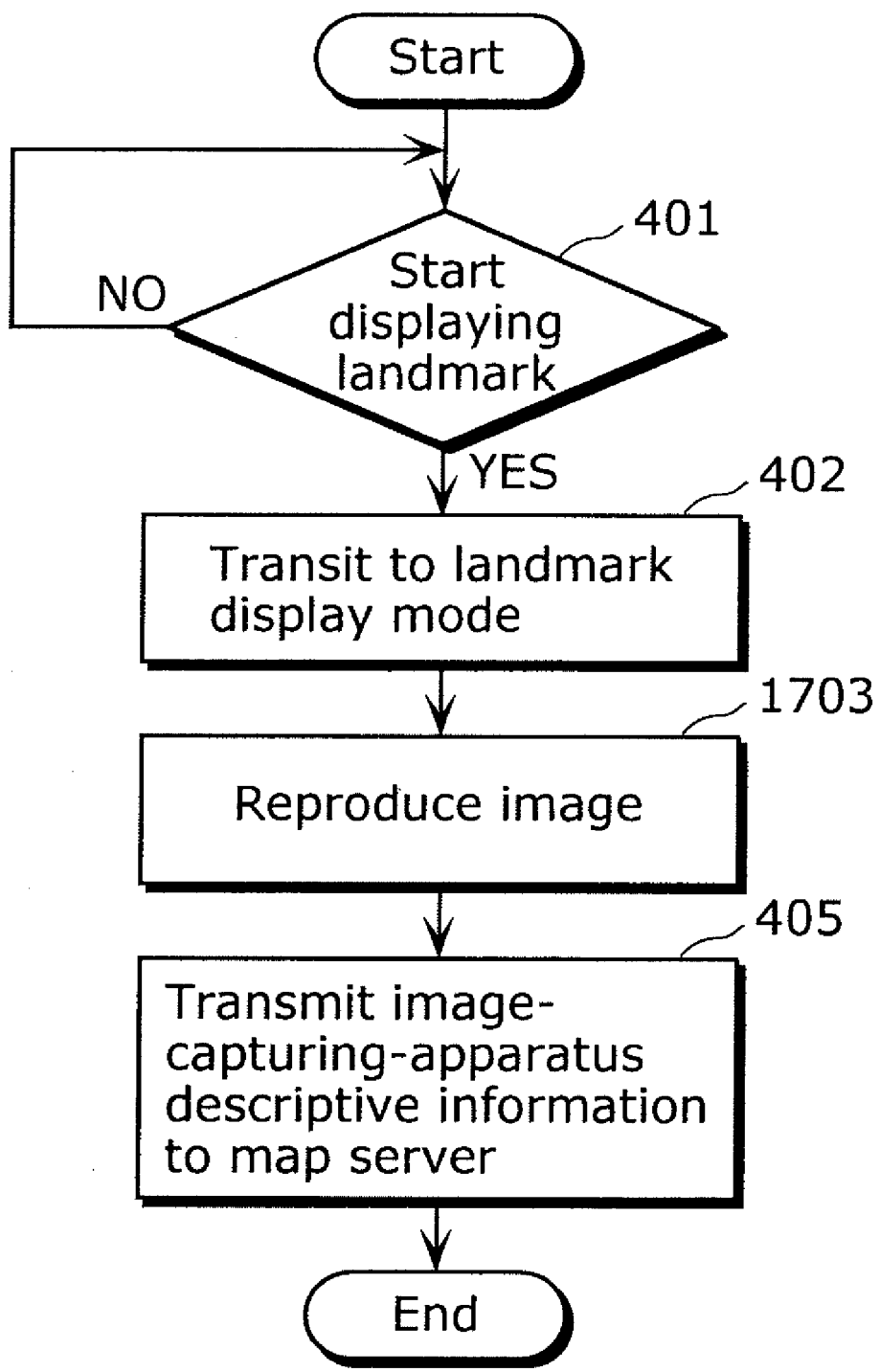
FIG. 18 shows a flowchart indicating an embodiment by an image capturing apparatus from capturing an image to transmitting image-capturing-apparatus descriptive information.

FIG. 18 shows a flowchart indicating processes by the display 1550 from reproducing scene image data to transmitting the image-capturing-apparatus descriptive information to the map server 120.

When a switch or an other mean switches to the landmark display mode (401), the display 1550 transits to the landmark display mode (402). Then, the communication unit 1512 of the display 1550 transmits the image-capturing-apparatus descriptive information to the map server 120 (405).

A network address (URL) of the map server 120 to be used is stored in an internal storage region of the display 1550, as device setting information. The address of the map server 120 may be changed to any address by the user using the operation interface of the display 1550.

Figure 19:
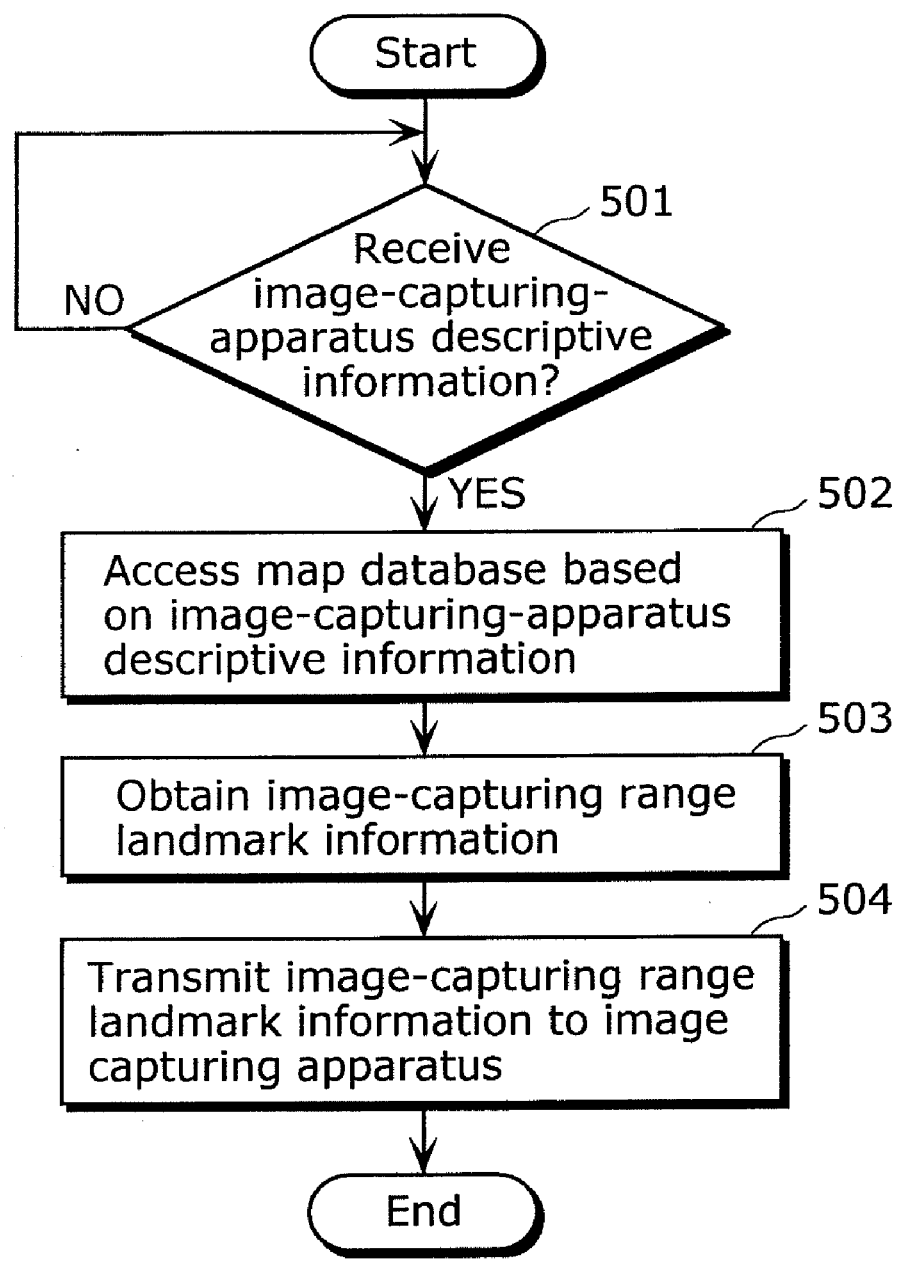
FIG. 19 shows a flowchart indicating an embodiment by a map server from generating landmarks to transmitting the landmarks to an image capturing apparatus.

FIG. 19 shows a flowchart indicating processes by the map server 120 from receiving the image-capturing-apparatus descriptive information to transmitting the landmark information to the image capturing apparatus 1502.

The map server 120 first checks whether or not to receive the image-capturing-apparatus descriptive information (501).

After receiving the image-capturing-apparatus descriptive information, the map server 120 analyzes the image-capturing-apparatus descriptive information, accesses the map database (map DB) 118 (502), obtains landmark information (image-capturing range landmark information) included in a scene of the image data (503), and transmits the landmark information to the display 1550 (504).

A method for obtaining landmark information by the map server 120 based on image-capturing-apparatus descriptive information is the same as the method according Embodiment 1.

FIG. 7 illustrates ranges for obtaining the landmark information by the map server 120 based on the image-capturing-apparatus descriptive information. FIG. 7 according to Embodiment 1 will be used for Embodiment 2.

The map server 120 receives the image-capturing-apparatus descriptive information including the position information and the direction information transmitted by the display 1550. Then, the landmark-information extracting unit 119 of the map server 120 extracts, from the map database 118, landmark information on a map that is in a range slightly larger than an image-capturing range obtained from the image-capturing-apparatus descriptive information. The image-capturing range is a sector-shaped range. A position of a central angle of the sector represents a position of the image capturing apparatus 1502. Furthermore, a bisector of the central angle of the sector matches an image-capturing direction in which the image capturing apparatus 1502 captures an image. Furthermore, the central angle of the sector represents image-capturing range information included in the image-capturing-apparatus descriptive information. Furthermore, a predetermined value held by the map server 120 is used as a radius of a sector, in other words, a distance from the image capturing apparatus 1502 to an arc of the image-capturing range landmark information obtainment range. The predetermined value is desirably set within a 5-kilometer radius from the image capturing apparatus 1502. Assuming that the image capturing apparatus 1502 is positioned 1.5 meters above the ground, the 5-kilometer radius is approximately a distance to the horizon.

The landmark-information extracting unit 119 extracts a plurality of landmark information from the map database 118, and transmits the extracted plurality of landmark information to the display 1550 that has transmitted the image-capturing-apparatus descriptive information.

The receiving unit of the display 1550 (see the communication unit 1512 in FIG. 16) receives the landmark information transmitted from the map server 120, and displays, on a screen held by the display 1550, a part of or all of the landmark information received by the receiving unit together with the captured images obtained by the external memory control unit 1544. The display 1550 stores one of an all-landmark display mode in which all of the landmark information are displayed and a part-of-landmark display mode in which a part of the landmark information is displayed, in an internal storage region as landmark display setting information.

Such a landmark display setting allows the user to change the current display mode to any landmark display mode using the operation interface of the display 1550.

A flowchart of the display 1550 for displaying landmark information and causing the display unit 1517 to display the landmark information in the overlaying manner is the same as the flowchart shown in FIG. 9 as an example of Embodiment 1.

The method for filtering landmark information according to Embodiment 1 will be applied to Embodiment 2.

Figure 20:
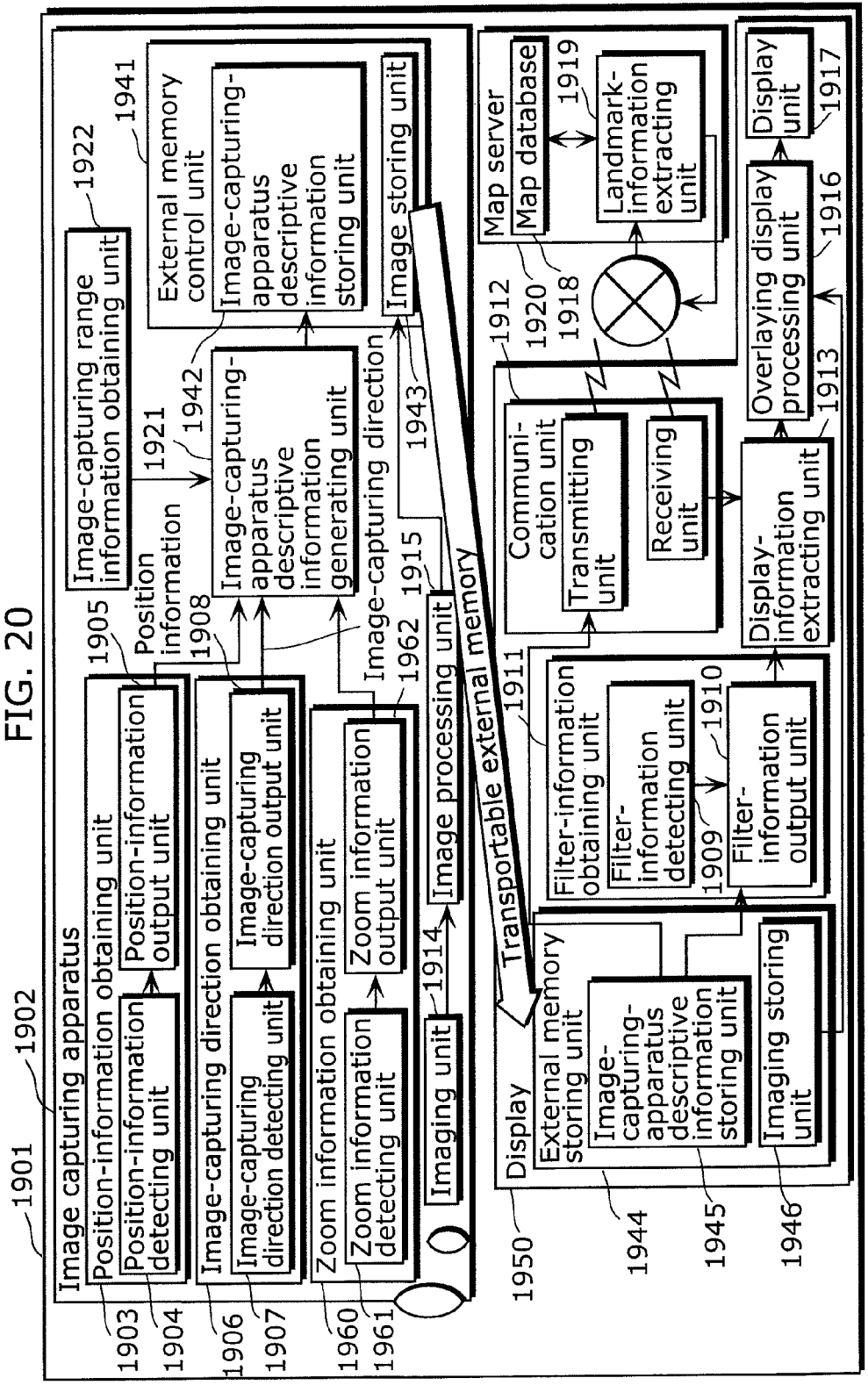
FIG. 20 illustrates an example of a configuration of Embodiment 2 according to the present invention.

FIG. 20 illustrates a configuration for an image capturing apparatus 1902 to store zoom information in a transportable external memory.

When filtering landmarks using the zoom information of the image capturing apparatus 1902, the image-capturing-apparatus descriptive information needs to include the zoom information of the image capturing apparatus 1902. FIG. 20 illustrates the configuration for the image capturing apparatus 1902 to obtain the zoom information and store it as the image-capturing-apparatus descriptive information in a transportable external memory. A zoom information obtaining unit 1960 includes a zoom information detecting unit 1961 that obtains a zoom ratio of the image capturing apparatus 1902, and a zoom information output unit 1962 that outputs the obtained zoom ratio.

The overlaying display processes and method for displaying the corresponding landmark information overlaid on image data selected by the user according to Embodiment 1 will be applied to Embodiment 2. On a screen included in the display 1950 according to Embodiment 2, landmarks are displayed in the overlaying manner: in the lower portion of the screen; horizontally; using genre information included in the landmark information; and according to Embodiment 1.

Although Embodiment 2 describes a method in which the image capturing apparatus transmits image information and image-capturing-apparatus descriptive information to the display using a transportable external memory, the transportable external memory is not necessarily used for transferring these information.

For example, a short-range radio device installed in each of the image capturing apparatus and the display can transfer data through a wireless communication, instead of the external memory control unit 1541. Although Ultra Wide Band (UWB) is preferable as a short-range radio system, ZigBee, an ad hoc wireless LAN, Bluetooth (trademark), and others may be used. The wireless communication instead of a transportable external memory eliminates the need for removing or inserting the transportable external memory respectively from or in an image capturing apparatus and a display by the user, and further can shorten a wait time for transferring data.

Furthermore, the short-range radio communication allows obtainment of data and image-capturing-apparatus descriptive information by sequential access to the image capturing apparatus, without copying information stored in the image capturing apparatus, to the external memory control unit of the display. Thereby, landmark information may be displayed in the overlaying manner without leaving information obtained by the image capturing apparatus in the display. For example, when a display installed by the third party displays landmark information, there is an advantage of eliminating the need for erasing data of the image capturing apparatus for protecting the privacy of a photographer.

Although Embodiment 2 describes receipt of an input of the user using the operation button and the remote control included in the display, the input is not limited by these operation input interfaces. For example, connecting a 2D pointing device, such as a mouse, to the display enables the user to manipulate the cursor displayed on the screen of the display and simultaneously to input a selection of landmark information displayed in the overlaying manner on the screen. Furthermore, with a motion sensor for detecting a posture and a movement of the user attached on a portion of a body of the user or placed in the display, the user may input an operation using the own posture and movement in the display. Receiving an input from the user using such a 2D pointing device and a motion sensor enables the user to perform an intuitive and smooth operation, compared to the operation using an operation button or a remote control, even when the user is distant from the display.

Although Embodiment 2 uses a television as a representative display, the display is not limited to this. For example, the display may be a personal computer, a hard disk recorder, and others each including (i) a large-capacity storage, such as a hard disk, and (ii) an external memory control unit capable of obtaining data stored in a transportable external memory. In a device including such a storage, image data captured by the user is often transferred from an transportable external memory to the storage device for storing the image data. With such a configuration, not only image data stored in the transportable external memory but also image data previously captured and transferred to a storage by the user may be displayed by overlaying landmark information thereon according to Embodiment 2.

Furthermore, when the display is, for example, a personal computer or a hard disk recorder, landmark information may be displayed to be overlaid on image data selected by the user through the operation interface of the display. Furthermore, when image data is selected from among a plurality of image data stored in a storage included in the image capturing apparatus and another image data is captured in a location closer to the location where the selected image data has been captured, the other image data may be reduced and displayed on the selected image data. With such a configuration, the user has an advantage of easily searching for image data previously captured in a location closer to a location where the selected image data has been captured.

Although the display filters landmark information corresponding to image data and displays the filtered landmark information overlaid on the image data in Embodiment 2, the landmark information may be stored in a storage region, such as a transportable external memory. For example, landmark information corresponding to image data is stored in a header data portion of the image data. With such a configuration, even when a transportable external memory that stores image data with landmark information is relocated to another device that has a difficulty in communicating with a map server, such as a digital still camera, the landmark information may be displayed to be overlaid on the image data on a screen of the other device.

Here, image data including a plurality of identical landmark information and capturing-location information may be listed, and stored in respective folders of a storage device of the image capturing apparatus. Furthermore, landmark information and capturing-location information may be used as a search key for image data so that retrieval performance for the image data can be improved.

Although the map server extracts landmark information corresponding to an image-capturing range and the display filters the extracted landmark information to display the filtered landmark information overlaid on an image in Embodiment 2, the display may display the landmark information filtered by the map server to be overlaid on an image.

Figure 21:
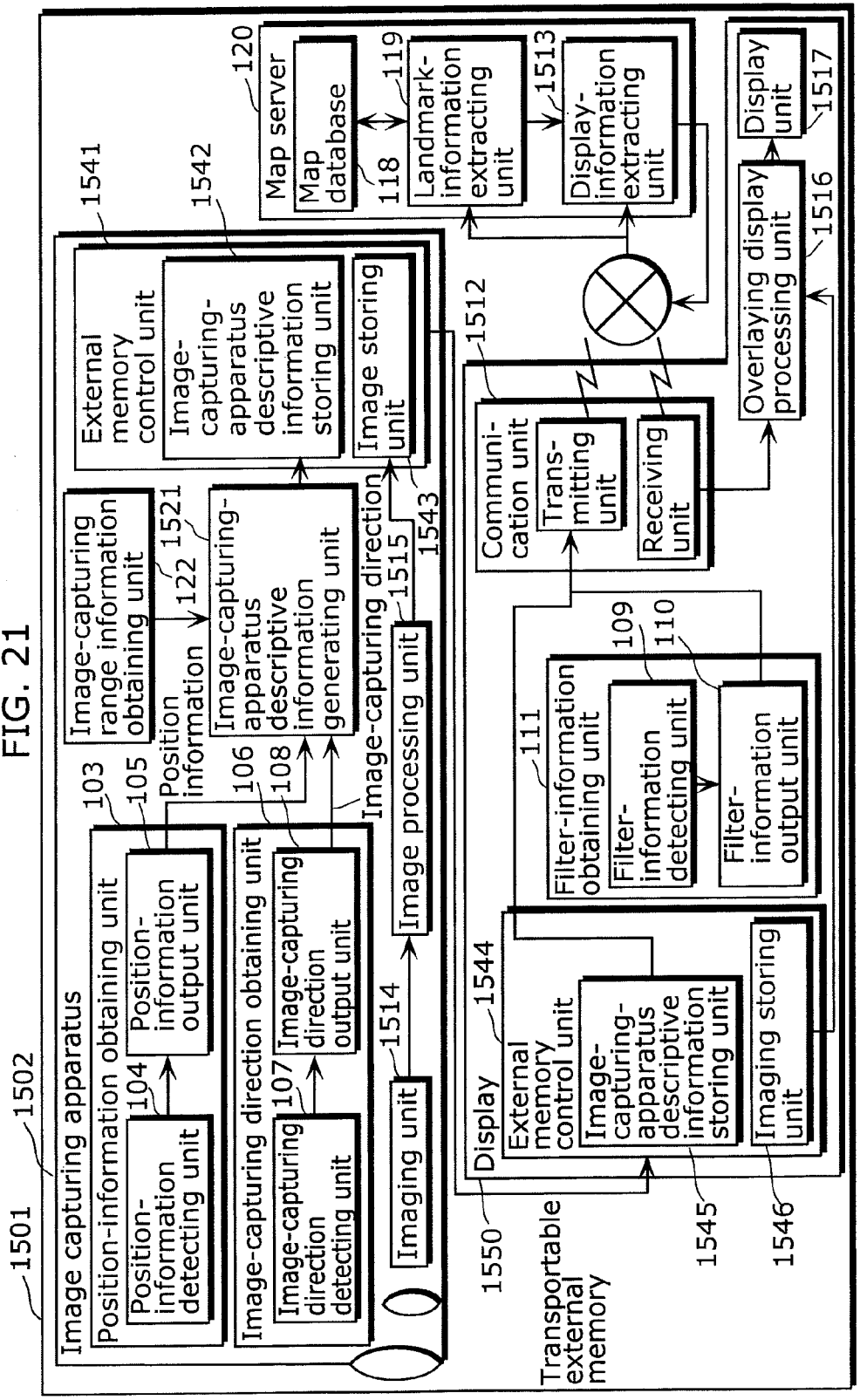
FIG. 21 illustrates an example of a configuration of Embodiment 2 according to the present invention.

FIG. 21 is an explanatory drawing that illustrates a configuration for filtering by a map server.

For example, as illustrated in FIG. 21, filter information outputted by the filter-information obtaining unit 111 is transmitted to the communication unit 1512 as a part of the image-capturing-apparatus descriptive information, and the communication unit 1512 transmits the image-capturing-apparatus descriptive information including the filter information to the map server 120. The map server 120 includes the display-information extracting unit 1513 that filters landmark information outputted by the landmark-information extracting unit 119 using the filter information included in the image-capturing-apparatus descriptive information transmitted from the display 1550, and then transmits the filtered landmark information to the display 1550.

Such a configuration makes it possible to improve a processing speed of the display and to reduce the cost, because the display does not filter landmark information having a relatively larger processing load.

Figure 22:
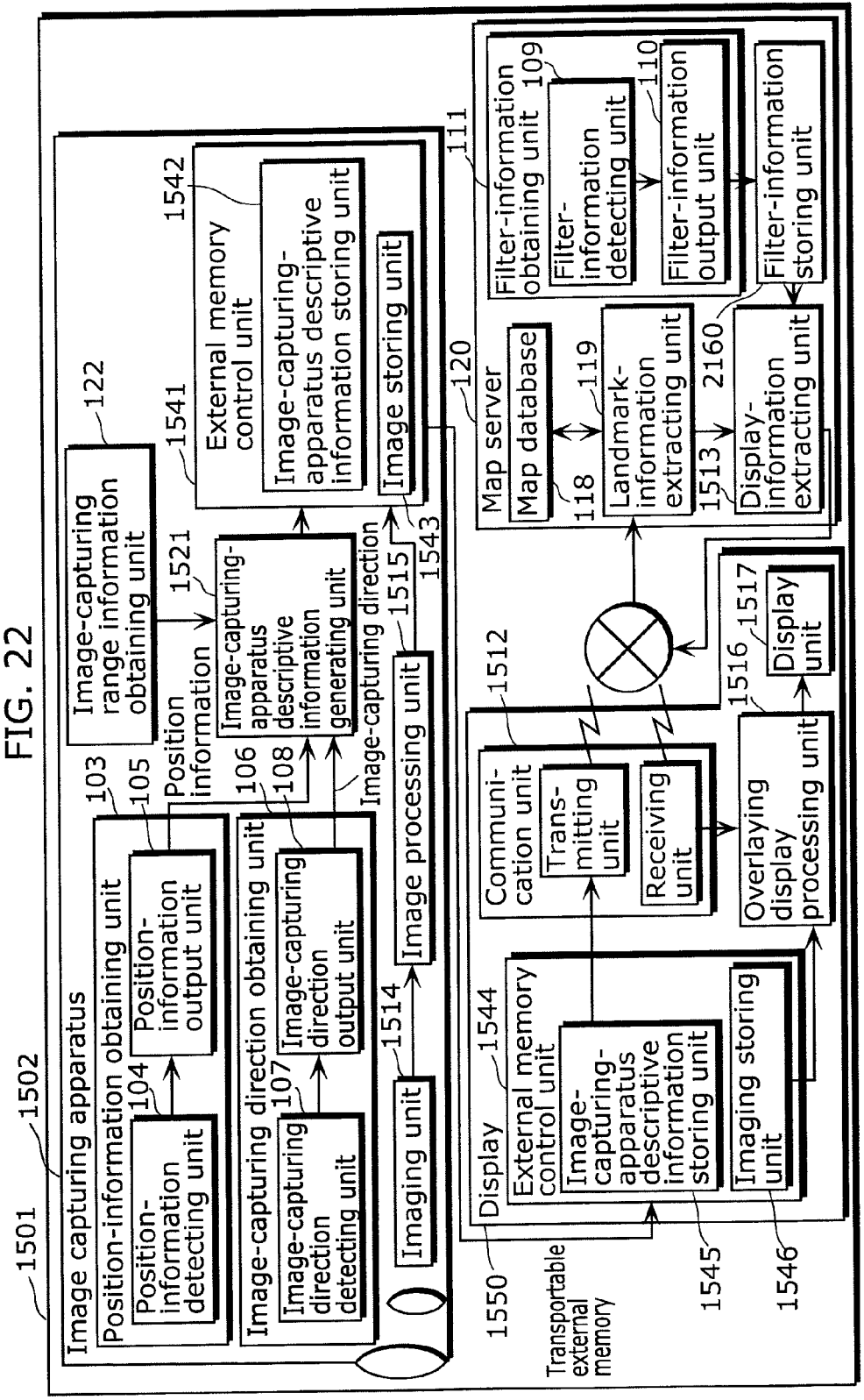
FIG. 22 illustrates an example of a configuration of Embodiment 2 according to the present invention.

FIG. 22 illustrates a system including the map server 120 including the filter-information obtaining unit 111 and other constituent elements.

As illustrated in FIG. 22 as another configuration, the map server 120 includes the filter-information obtaining unit 111 and a filter-information storing unit 2160. The filter-information storing unit 2160 holds filter information previously registered in the filter-information obtaining unit 111 through a web browser on an Internet terminal by the user, and filters landmark information in response to a request from the display 1550. With such a configuration, the display does not need to include a filter-information obtaining unit, thus improving a processing speed of the display and reducing the cost. Furthermore, filter information of plural users may be uniformly managed in the map server, thus enabling easy understanding of the user's utilization of the system according to Embodiment 2.

Embodiment 3

FIGS. 23 to 27 are drawings for Embodiment 3.

Embodiment 3 according to the present invention will be described hereinafter. Embodiment 3 uses preferences of a photographer in an internet forum, as a source for filtering landmark information to be displayed by an image capturing apparatus. Such filtering is referred to as Social Networking Service (SNS) filtering. A map server assigns priorities for displaying landmark information based on the preferences of a photographer in the internet forum.

Figure 23:
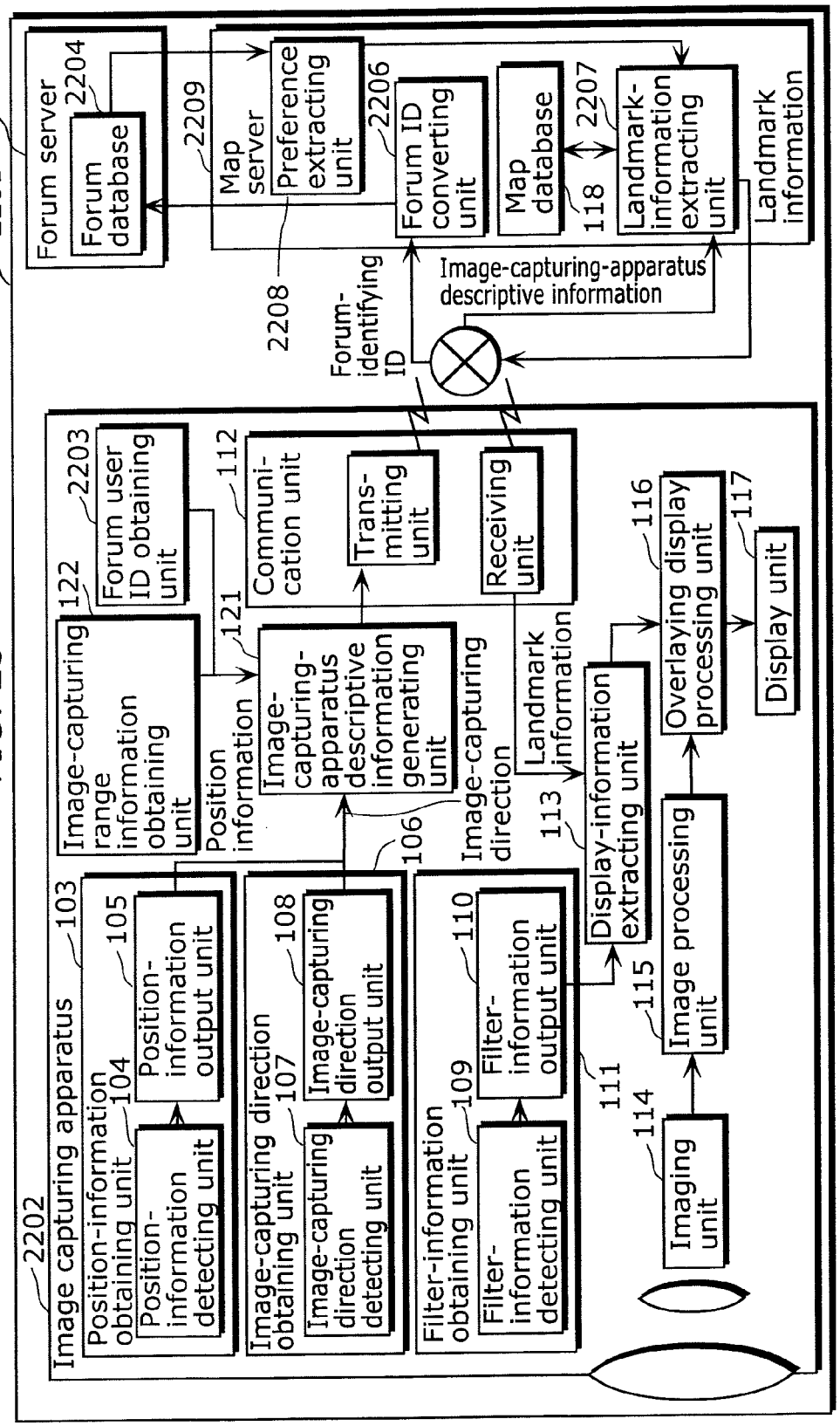
FIG. 23 illustrates an example of a configuration of Embodiment 3 according to the present invention.

FIG. 23 illustrates a configuration according to Embodiment 3.

The configuration in FIG. 23 according to Embodiment 3 of the present invention mainly includes an image capturing apparatus 2202, a map server 2209, and a forum server 2205.

The image capturing apparatus 2202 further includes a forum user ID obtaining unit 2203 in addition to the configuration according to Embodiment 1. The forum user ID obtaining unit 2203 obtains information for the map server 2209 accessing an internet forum. The obtained information includes a URL of an internet forum, and a user ID.

Although a forum user ID is desirably registered in an image capturing apparatus in advance, it may be registered by an user operation.

The image-capturing-apparatus descriptive information generating unit 121 adds information on a forum-identifying ID to a packet to be transmitted to the map server 2209 described with reference to FIG. 4 according to Embodiment 1. The forum-identifying ID information is information for identifying an ID of a forum in which a photographer has been registered. The ID is desired to be an ID of an internet forum, but is not limited to this. As long as an ID of an image capturing apparatus is registered in the internet forum in advance, the ID of the image capturing apparatus may be used as an alternative to an ID of an internet forum.

When a password authentication, for example, is needed for accessing an Internet forum, an image capturing apparatus previously storing a password may transmit the password together with an ID. Alternatively, when an internet forum receives an access from an image capturing apparatus that has been previously registered in the internet forum, only limited information for use in filtering may send back from the internet forum to the image capturing apparatus.

The map server 2209 includes a map database 118, a landmark-information extracting unit 2207, and a forum ID converting unit 2206.

The map database 118 holds information on landmarks (landmark information).

The forum ID converting unit 2206 converts a forum-identifying ID received from the image capturing apparatus 2202 to an internet forum ID, and transmits the internet forum ID to the forum server 2205. A forum database 2204 holds user data in the forum server 2205.

Hereinafter, a forum server will be described. Main purposes of forum servers are to provide a site for the users registering the forum servers to communicate with each other. The user shares, among other users, information, such as his or her profile, diaries, reviews of products, and acquaintances of the user.

A preference extracting unit 2208 obtains preference information of the user from the forum database 2204. The profile information of the user may be obtained from the profile section, and data mining may be performed using the content of the diaries of the user, but not limited to these. The preference information includes personal information, such as an age, sex, and a marital status, hobbies, special qualifications, annual earnings, and neighboring information.

The landmark-information extracting unit 2207 extracts landmark information having higher affinity with the preference of the user, from the map database 118 based on the preference information. Here, the landmark information having higher affinity with the preference of the user is prioritized. For example, landmark information of shrines and temples is prioritized for the user who is interested in the shrines and temples. Furthermore, landmark information on geographical information, such as mountains and rivers is prioritized for the user who is interested in mountain climbing.

FIG. 24 shows an example of a format of data to be transmitted from the image capturing apparatus 2202 to the map server 2209.

The data is added with a universal time coordinated, latitude information and longitude information indicating the captured position information, a traveling direction indicating an image-capturing direction due north, image-capturing range information, and ID information of the image capturing apparatus 2202. The ID information of the image capturing apparatus 2202 is used for recognizing which image capturing apparatus 2202 accesses the map server 2209. The ID may be any ID that uniquely identifies the image capturing apparatus 2202.

Furthermore, the data includes a URL of an Internet forum, and ID information for identifying the forum. URL information does not necessarily have to be transmitted as ID information for identifying a forum, as long as the map server 2209 associates an ID that uniquely identifies the image capturing apparatus 2202 with a URL of an Internet forum. Furthermore, as long as the map server 2209 previously registers ID information of an Internet forum and ID information for uniquely identifying the image capturing apparatus 2202, the forum-identifying ID information can be replaced with the ID of the image capturing apparatus 2202. Furthermore, there are cases where plural users share the image capturing apparatus 2202. The users switch information indicating which user uses the image capturing apparatus 2202, before capturing an image of a subject using the image capturing apparatus 2202. Since a forum ID differs in each user, the image capturing apparatus 2202 previously registering ID information of each user can transmit ID information of a user who uses the image capturing apparatus 2202 to the map server 2209 by operating a switch for switching between the users.

The procedures by the image capturing apparatus 2202 from capturing a scene to transmitting the image-capturing-apparatus descriptive information to the map server 2209 are the same as the ones in FIG. 5 according to Embodiment 1. The image-capturing-apparatus descriptive information generating unit 121 receives information transmitted from not only the position-information obtaining unit 103, the image-capturing direction obtaining unit 106, and the image-capturing range information obtaining unit 122 but also the forum user ID obtaining unit 2203. The format of data to be transmitted from the image capturing apparatus 2202 to the map server 2209 is the same as described for FIG. 24.

Figure 25:
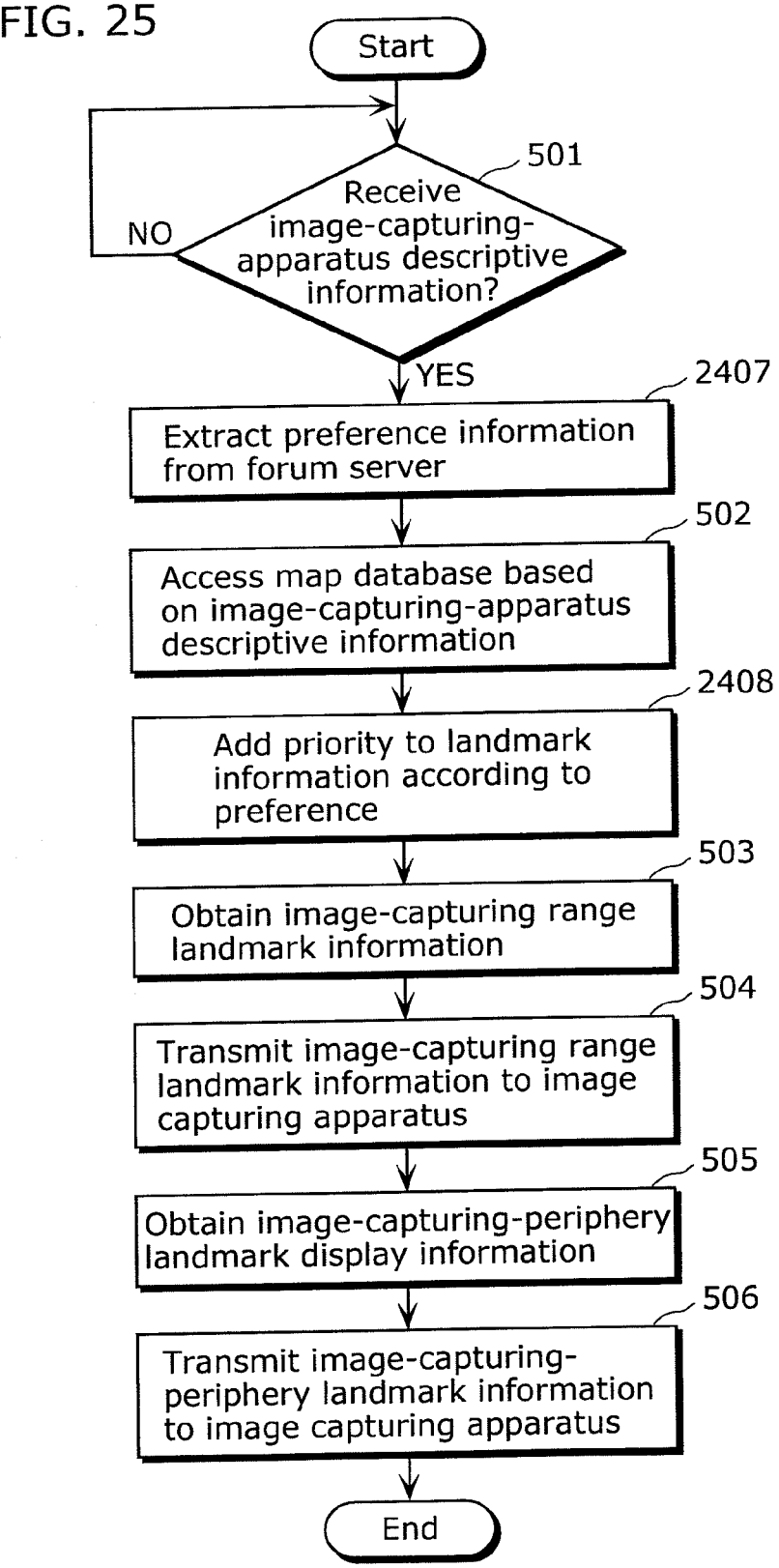
FIG. 25 shows a flowchart indicating an embodiment by a map server from generating landmarks to transmitting the landmarks to an image capturing apparatus.

FIG. 25 shows a flowchart indicating processes by the map server 2209 from receiving the image-capturing-apparatus descriptive information to transmitting the landmark information to the image capturing apparatus 2202. The map server 2209 first checks whether or not to receive the image-capturing-apparatus descriptive information (501).

Next, the map server 2209 accesses a forum server, and extracts preference information from the descriptive information of a photographer in the internet forum (2407).

After extracting the preference information, the map server 2209 accesses the map database (map DB) 118 (502), adds a priority to the landmark information according to the extracted preference (2408), and obtains the landmark information (image-capturing range landmark information) included in the scene captured by the image capturing apparatus (503). After transmitting the image-capturing range landmark information to the image capturing apparatus 2202, the map server 2209 obtains the landmark information in the periphery of the image-capturing range (image-capturing-periphery landmark information) (505), and transmits the obtained image-capturing-periphery landmark information to the image capturing apparatus 2202 (506).

Figure 26:
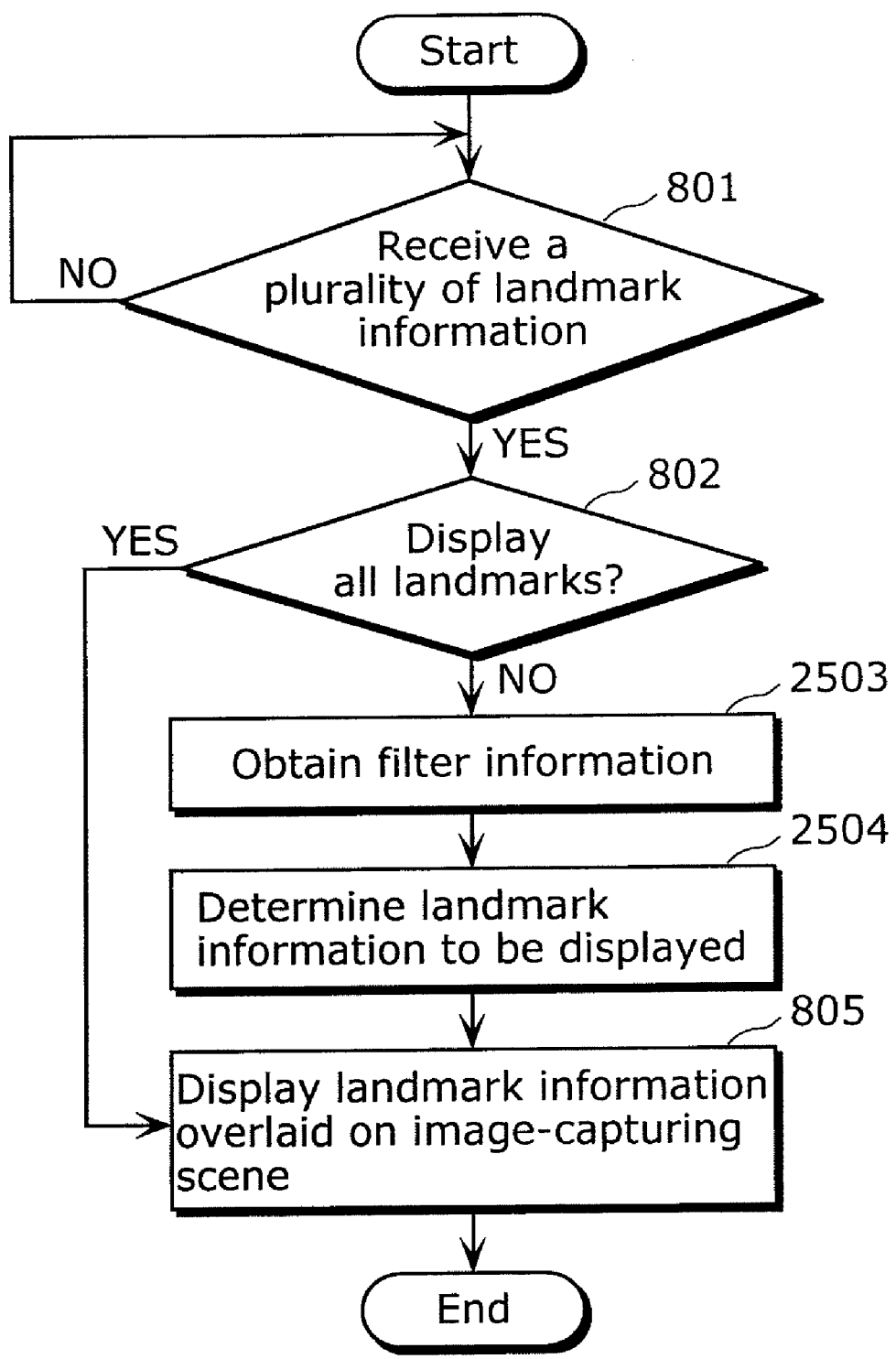
FIG. 26 shows a flowchart indicating an embodiment by an image capturing apparatus from obtaining landmarks to performing overlaying display of the landmarks.

FIG. 26 shows a flowchart of processing by the image capturing apparatus 2202 for displaying landmark information and causing the display unit 117 to display the landmark information in the overlaying manner.

Since the processing on the image-capturing range landmark information is basically the same as that of the image-capturing-periphery landmark information, these information are collectively referred to as landmark information, and the following will describe a method for filtering the landmark information.

The image capturing apparatus 2202 checks whether or not to obtain a plurality of landmark information from the map server 2209 (801). When the image capturing apparatus 2202 receives the plurality of landmark information, it determines whether or not to display all landmarks to be received next. The setting for display all landmarks is desired to be set by the user. For example, the all-landmark display mode and a mode in which only a filtered landmark is to be displayed may be switched by the landmark display button. When all landmarks are to be displayed, the image capturing apparatus 2202 displays the landmark information obtained from the map server 2209 to be overlaid on a captured scene obtained through a lens of the image capturing apparatus 2202 (805). In contrast, when all landmarks are not to be displayed, the image capturing apparatus 2202 obtains a priority through the SNS filtering based on a preference table of a photographer and information of the filter-information obtaining unit 111 (2503), and determines landmark information to be displayed based on the priority and the information (2504). The overlaying display processing unit 116 displays the determined landmark information overlaid on a scene image obtained by the image processing unit 115 (805).

FIG. 27 is an explanatory drawing for landmark information to be displayed.

The definition of ranges and fields are as described in Embodiment 1. In FIG. 27, values represent priority information for displaying landmarks using the SNS filtering. The image capturing apparatus 2202 limits a count of landmarks to be displayed for each field. More specifically, the image capturing apparatus 2202 first displays landmark information having the highest priority. Furthermore, when a plurality of landmark information have the same priority and a count of landmark information to be displayed is over the maximum count, a smaller range, in other words, landmark information oriented in an image-capturing direction of the image capturing apparatus 2202 is displayed with the higher priority. FIG. 27 illustrates priorities of all landmarks and landmarks that are to be actually displayed, assuming that the maximum displayed landmark count to be displayed per field is 2, for example. In the first field, 2 pieces of landmark information respectively corresponding to a landmark having a priority 3 and a landmark having a priority 2 are displayed. In the second field, 3 pieces of landmark information each corresponding to a landmark having the priority 3 are displayed. In this case, landmark information in the smaller range is displayed with the higher priority. In other words, landmark information present in the first range is displayed. In the third field, landmarks each having the priority 3 that is the most prioritized are displayed.

The display method according to Embodiment 1 is applied to Embodiment 2. In prioritized landmark display genres illustrated in FIG. 42, landmark information of the prioritized genre is displayed further according to a preference.

Here, the filtering method using the SNS and the display method according to Embodiment 1 can be switched according to Embodiment 3. Thus, the user may select a method for extracting landmark information from among other extraction methods that are large in number.

Embodiment 4

FIGS. 28 to 32 are drawings according to Embodiment 4.

Embodiment 4 describes a configuration in that the image capturing apparatus 102 adds information for filtering landmarks to be displayed, to the image-capturing-apparatus descriptive information to be transmitted to the map server 120, and that the map server 120 filters the landmarks to be displayed in the overlaying manner by the image capturing apparatus 102. Since Embodiment 4 is implemented by transferring, to the map server 120, the functions for filtering by the image capturing apparatus 102 according to Embodiments 1 to 3, Embodiment 4 will be described by altering Embodiment 1 as a representative example. Furthermore, Embodiment 4 will mainly describe operations different from those of Embodiment 1.

Figure 28:
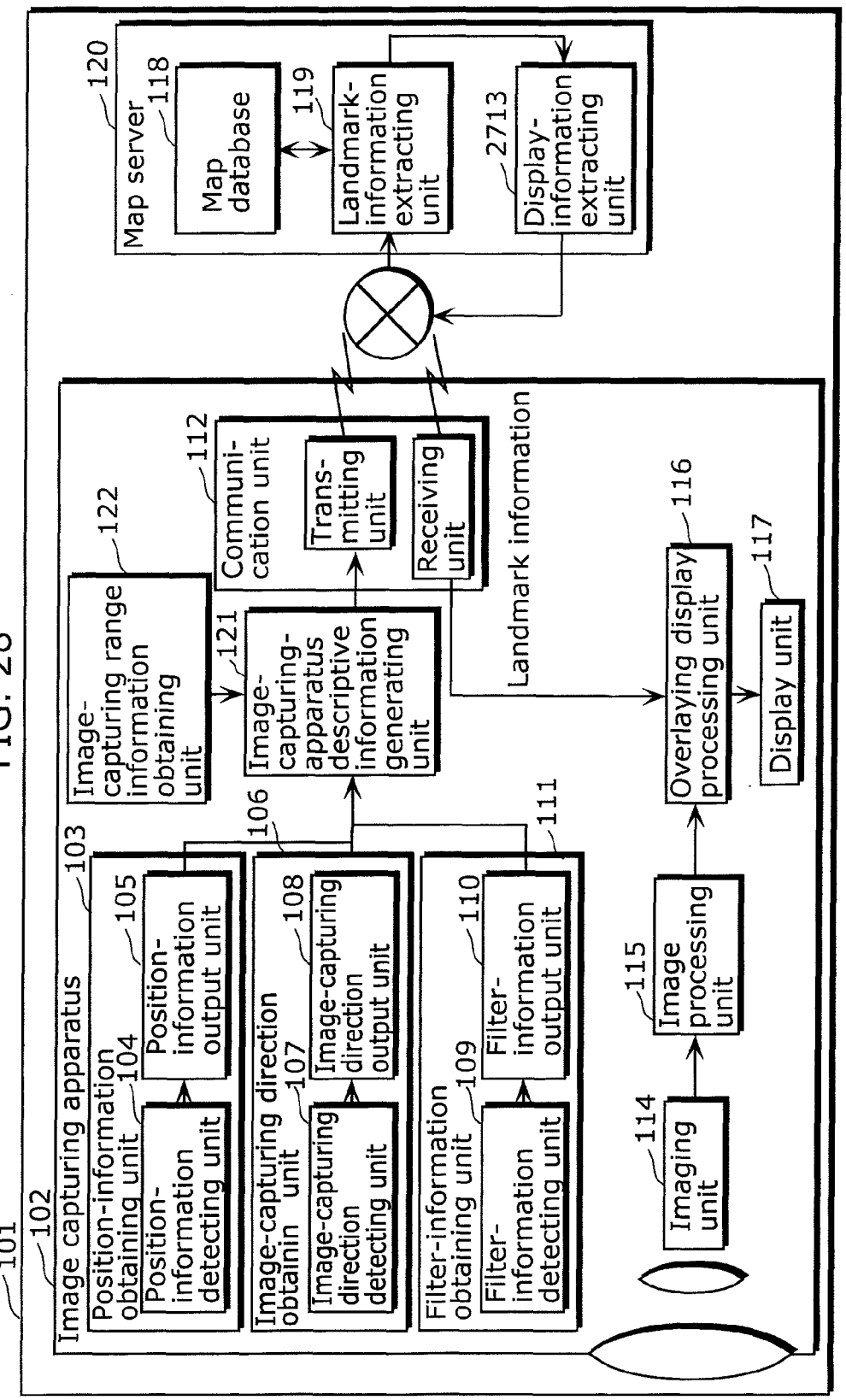
FIG. 28 illustrates an example of a configuration of Embodiment 4 according to the present invention.

FIG. 28 illustrates the configuration of a system according to Embodiment 4.

The image-capturing-apparatus descriptive information generating unit 121 generates image-capturing-apparatus descriptive information based on the position information obtained by the position-information obtaining unit 103, the image-capturing direction information obtained by the image-capturing direction obtaining unit 106, the filter information obtained by the filter-information obtaining unit 111, and the image-capturing range information obtained by the image-capturing range information obtaining unit 122, and transmits the resulting information to the map server 120. In the map server 120, the landmark-information extracting unit 119 obtains, from the map database 118, the landmark information included in an image-capturing range of the image capturing apparatus 102 in the image-capturing-apparatus descriptive information, and the display-information extracting unit 2713 extracts display landmark information using information from the filter-information obtaining unit 111. The image processing unit 115 processes image-capturing information obtained by the imaging unit 114. The overlaying display processing unit 116 of the image capturing apparatus 102 overlays the display landmark information on information of a scene obtained by the image processing unit 115. Then, the display unit 117 displays the landmark overlaid on the scene.

FIG. 29 shows an example of a format of data to be transmitted from the image capturing apparatus 102 to the map server 120.

In addition to the format described in Embodiment 1, information obtained by the filter-information obtaining unit 111 is added. The display method using filter information according to Embodiment 1 is applied to Embodiment 2. The operations of the image capturing apparatus 102 for transmitting the image-capturing-apparatus descriptive information to the map server 120 are described in Embodiment 1 with reference to FIG. 5.

Figure 30:
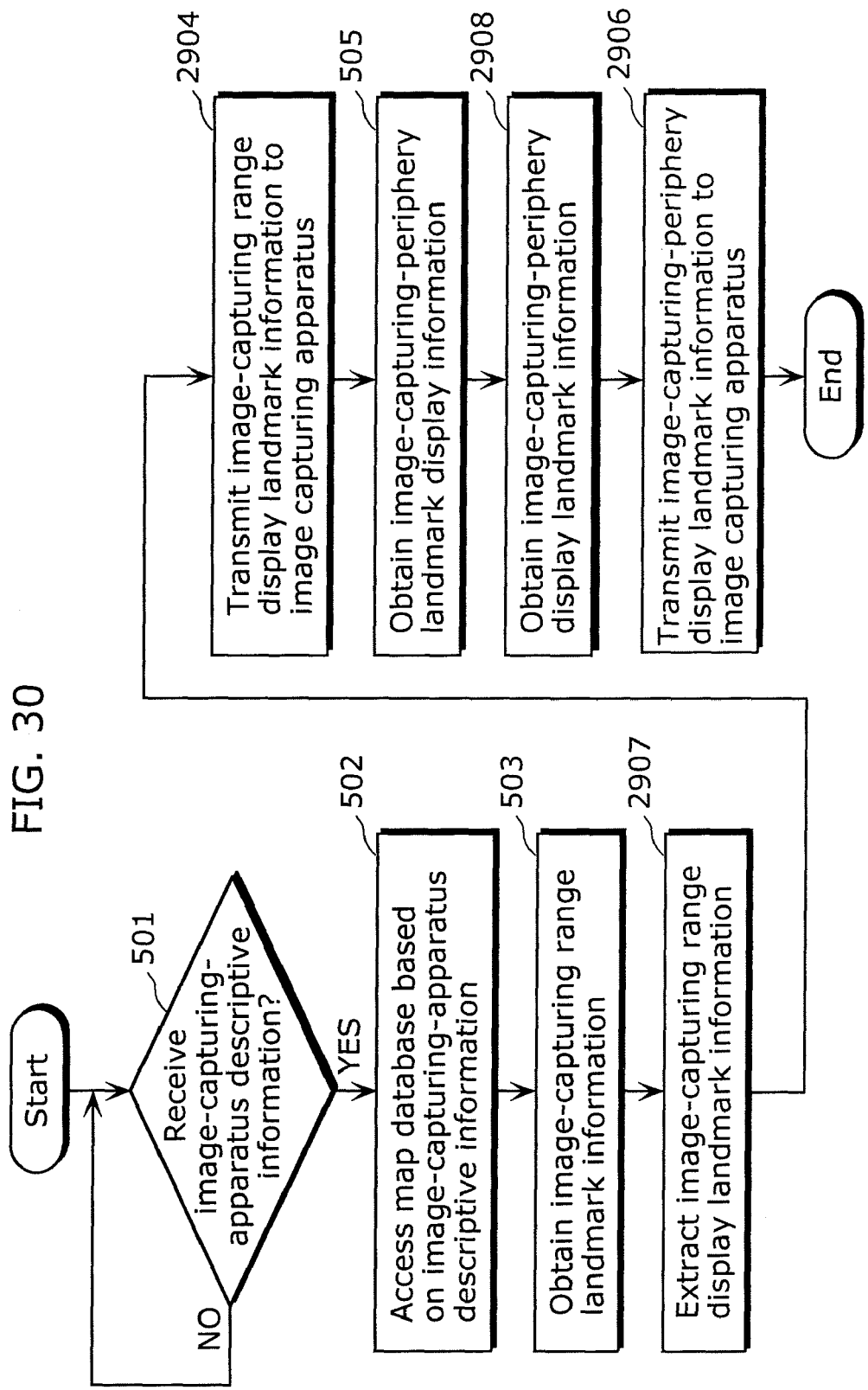
FIG. 30 shows a flowchart indicating an embodiment by a map server from generating landmarks to transmitting the landmarks to an image capturing apparatus.

FIG. 30 shows a flowchart indicating an example of processes by the map server 120 from capturing the image-capturing-apparatus descriptive information to transmitting the landmark information to be displayed in the overlaying manner by the image capturing apparatus 102.

After checking receipt of the image-capturing-apparatus descriptive information (501), the map server 120 accesses the map database 118 based on the image-capturing-apparatus descriptive information (502).

Figure 32:
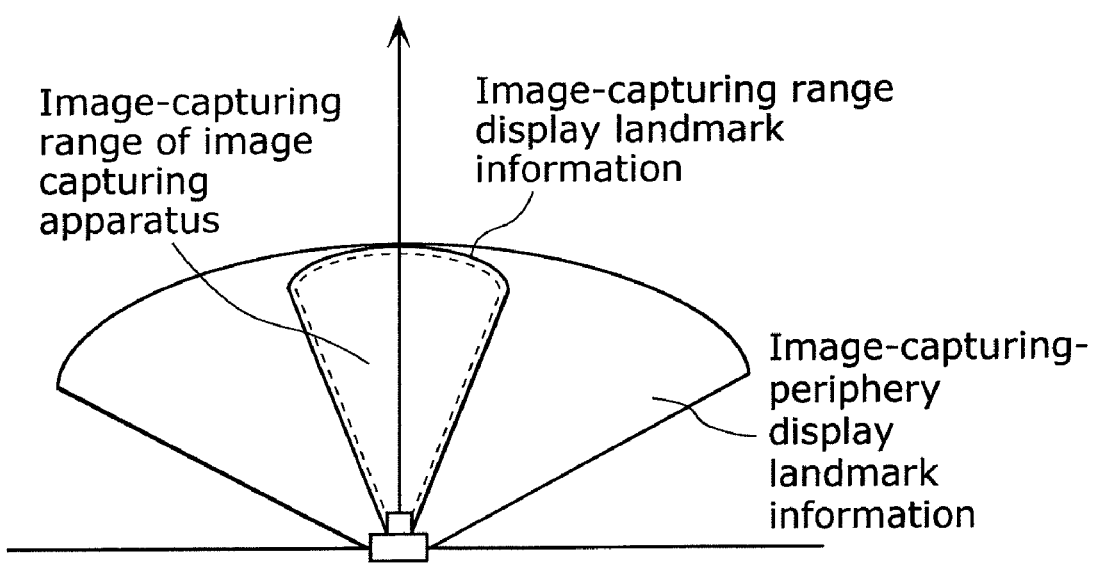
FIG. 32 shows an example of ranges of a landmark to be transmitted from a map server to an image capturing apparatus.

FIG. 32 illustrates a range to be captured by the image capturing apparatus 102.

The map server 120 first obtains landmark information in the image-capturing range illustrated in FIG. 32. Next, the map server 120 extracts image-capturing range display landmark information to be actually transmitted to the image capturing apparatus 102, from the image-capturing range display landmark information (2907), and transmits the extracted image-capturing range display landmark information to the image capturing apparatus 102 (2904). Upon transmission of display landmark information to image capturing apparatuses of a capturing group, the map server then obtains landmark information in the periphery of the image-capturing range of the image capturing apparatuses (505), obtains landmark information to be displayed when the image capturing apparatus pans (image-capturing-periphery display landmark information) (2908), and transmits the obtained information to the image capturing apparatuses (2906). According to Embodiment 4, the image capturing apparatus 102 retransmits the image-capturing-apparatus descriptive information to the map server 120 and updates the display landmark information when the position information and the image-capturing direction information vary by a value not smaller than a predetermined value. In the case of panning, when an image-capturing direction of the image capturing apparatus 102 is changed to a range of the image-capturing-periphery display landmark information, the image capturing apparatus 102 desirably retransmits the image-capturing-apparatus descriptive information to the map server.

Figure 31:
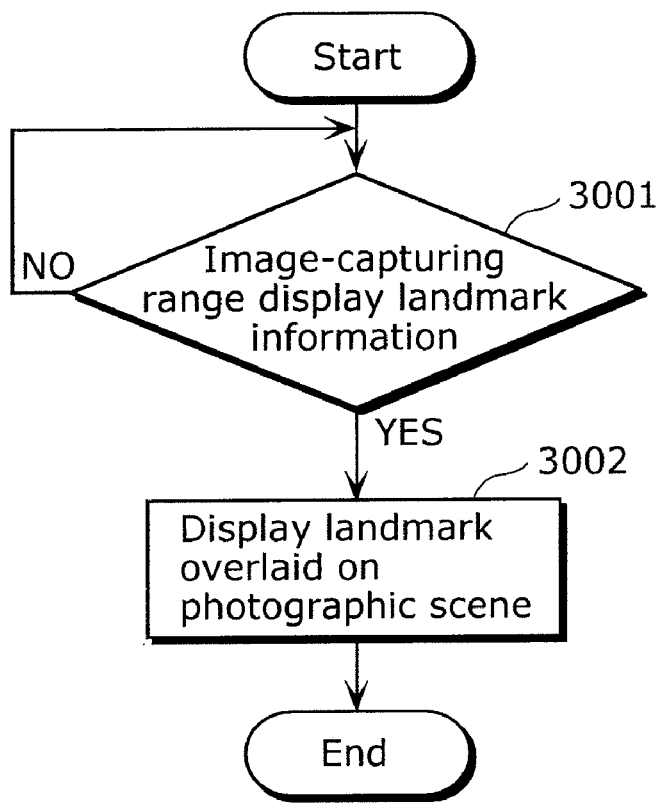
FIG. 31 shows a flowchart indicating an embodiment by an image capturing apparatus from obtaining landmarks to performing overlaying display of the landmarks.

FIG. 31 shows a flowchart indicating an example of processes by the image capturing apparatus 102 from obtaining landmark information to be displayed, to displaying the landmark information overlaid on a captured scene.

Upon receipt of the image-capturing range display landmark information, the image capturing apparatus immediately displays a scene overlaid on the landmark information according to Embodiment 4.

The overlay display method according to Embodiment 1 is applied to Embodiment 4.

Embodiment 5

(1) A first aspect of Embodiment 5 is a virtual world providing apparatus, including:

an image display unit configured to display an image obtained by capturing a portion of a real world;

a first correspondence holding unit configured to hold a first correspondence between the portion of the real world and an identical portion in a predetermined virtual world created by virtualizing the real world; and a virtual world providing unit configured to start to provide the virtual world from a portion of the virtual world having the first correspondence to the portion of the real world captured in the displayed image.

According to the first aspect, the virtual world starts to be provided from a portion corresponding to a portion of the captured real world. For example, the virtual world starts to be simply provided from an appropriate portion without any complicated operation for specifying a position, a direction, and a region of the start portion.

Here, while displaying the captured images, when predetermined start conditions are met, the virtual world providing unit may automatically start to provide the virtual world from the portion.

(2) The second aspect of Embodiment 5 is the virtual world providing apparatus according to the first aspect, further including:

an image-capturing position obtaining unit configured to obtain an image-capturing position of the image to be displayed; and a second correspondence holding unit configured to hold a second correspondence between the image-capturing position of the image and the portion of the real world captured in the image-capturing position, wherein the virtual world providing unit is configured to start to provide the virtual world from the portion of the virtual world having the held first correspondence to the portion of the real world having the held second correspondence with the image-capturing position.

According to the second aspect, for example, a simple configuration using an image-capturing position makes it possible to provide the virtual world from a corresponding portion by analyzing the details of the image, without any complicated processing for identifying a portion corresponding to a portion in the virtual world.

(2) The third aspect of Embodiment 5 is the virtual world providing apparatus according to the second aspect, further including:

an auxiliary obtaining unit configured to obtain the image-capturing direction (or the image-capturing direction and an angle of a view) in which the displayed image is captured, wherein in the second correspondence, the image-capturing position and the image-capturing direction (or the image-capturing position, the image-capturing direction, and the angle of the view) correspond to the portion of the real world, and wherein the virtual world providing unit is configured to start to provide the virtual world from the portion of the real world corresponding to the image-capturing position and the image-capturing direction (or the image-capturing position, the image-capturing direction, and the angle of the view).

With the third aspect, the portion from which the virtual world starts to be provided will be more precise to support the image-capturing direction and others, and the virtual world can be provided from an appropriate portion with higher precision.

FIGS. 52 to 62, and 64 are drawings for Embodiment 5.

Embodiment 5 describes a method for replacing an actual image displayed using a real image, with computer graphics created based on 3D projection data on a server, in other words, seamlessly with a CG image. Here, the real image is captured using an image capturing apparatus, such as a camera, a mobile phone with a camera, a notebook computer with a camera.

Figure 52:
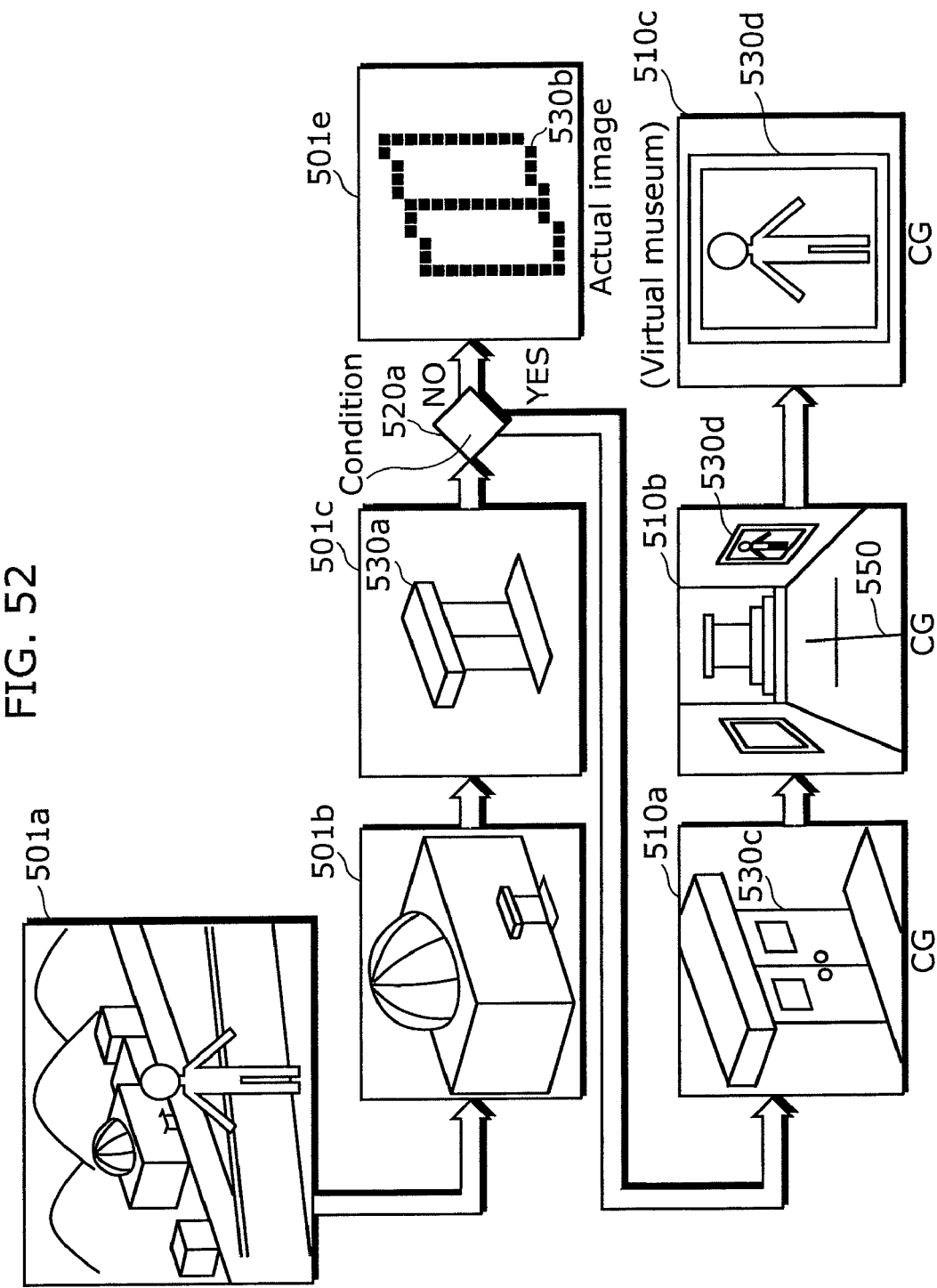
FIG. 52 illustrates display states of actual images and CG images according to an aspect of the present invention.

FIG. 52 illustrates an actual image 501*a* that is an image initially captured by a camera.

Electronically or optically zooming in the actual image 501*a*, for example, an actual image 501*b* and then an actual image 501*c* can be obtained. In Step 520*a* for further enlarging the view, when setting a mode in which an actual image is automatically switched to a CG image upon satisfaction of a predetermined condition, the actual image 501*c* is switched to a CG image 510*a*, and a high-definition CG image as an object 530*c* is displayed. More specifically, the predetermined condition is that when a substantial count of pixels within an actual image on a screen becomes not higher than a predetermined value, for example, R1, the actual image is automatically switched to a CG image. On the other hand, in a mode where an actual image is not switched to a CG image even when a resolution or the total pixel count becomes not higher than a predetermined value in Step 520*a*, or when there is no CG image corresponding to an object 530*a*, an enlarged actual image 501*e* is displayed as it is. In this case, for electronically enlarging the object 530*a* as it is, an object 530*b* is displayed. The object 530*b* is so rough that pixels or dots of the image can be viewed. According to the present invention, an actual image is automatically switched to the CG image 510*a*, so that there are advantages for the user to view an object as a high definition image, or enter a virtual shop or a virtual museum.

Describing a method for obtaining the CG image 510*a*, the image capturing apparatus 102 of the present invention obtains 3 pieces of information, the position information when an image is captured as illustrated in FIG. 1, an image-capturing direction, and an image-capturing range. These pieces of information are transmitted to the map server 120. Then, the map server 120 performs 3D image processing, using 3D information in the map database 118 based on the information of the image-capturing position, the image-capturing direction, and the image-capturing range, so that the high-definition CG image as the illustrated CG image 510*a* of FIG. 52 is generated. Then, the CG image is transmitted to the image capturing apparatus 102 using a network, such as the Internet, and is displayed on the display unit 117.

When the image capturing apparatus 102, such as a general consumer camera, has poor precision in information of a position, an image-capturing direction, and an image-capturing range of the image capturing apparatus 102, the image capturing apparatus 102 transmits data of the actual image 501*a* and/or data of the actual image 501*c*, or rough data to a server. The server generates the CG image 510*a* similar to the actual image in its position, direction, and range, and obtains the accurate position, image-capturing direction, and image-capturing range, through pattern matching between the generated CG image and the actual image. Checking the CG image 510 against the actual image 501 by the pattern matching can compensate for inaccuracy in captured data of a position, an image-capturing direction, and an image-capturing range of the image capturing apparatus 102.

The aforementioned CG image 510*a* in FIG. 52 shows that the present invention is not simply for obtaining a high definition image. When there is any 3D CG image inside the object 530*c*, pressing a forward button or an enlarge button enables entering a building through the object 530*c* that is an entrance of the building. Furthermore, a virtual rail 550 can be set on a virtual space according to the present invention, and thus the user can move in a simple operation. The details will be described later. A CG image 510*b* illustrates an inside view of the building. Here, pressing a forward button and a right-direction button in a cross-shaped switch, or rotating the image capturing apparatus 102, such as a mobile phone with a camera, to the right leads to detection of rotation to the right by an image-capturing direction sensor, such as a six-axis acceleration sensor an angular velocity sensor. Thus, a right painting 530*d* can be viewed as in a CG image 510*c*. Furthermore, tilting the image capturing apparatus 102 forward in a pitch direction allows the user to move forward, and tilting it backward in the pitch direction allows the user to go in reverse.

The following is an outline of an aspect of the present invention, and the operations will be described in detail with reference to drawings, such as FIG. 53.

Figure 53:
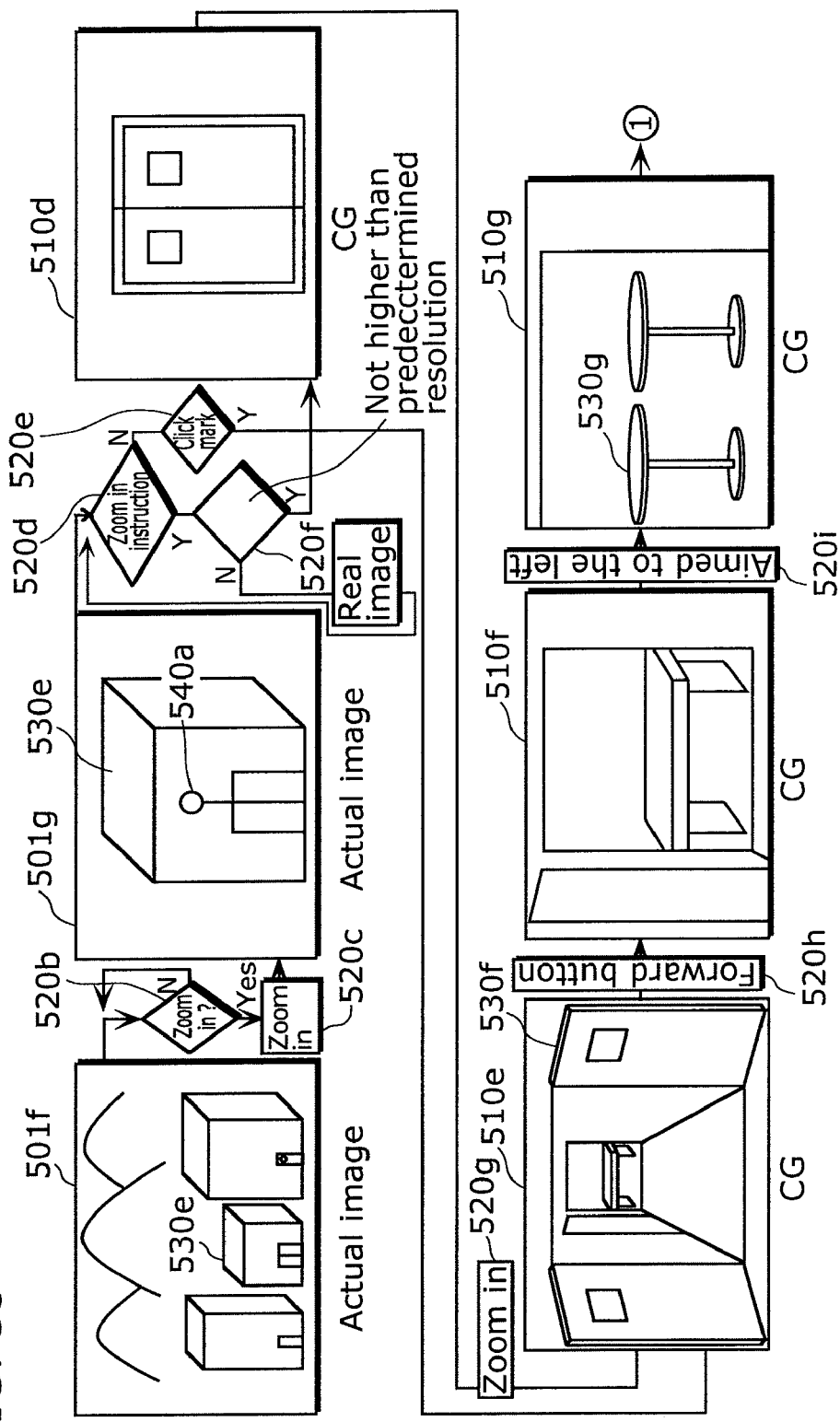
FIG. 53 illustrates display states of actual images and CG images according to an aspect of the present invention.
Figure 54:
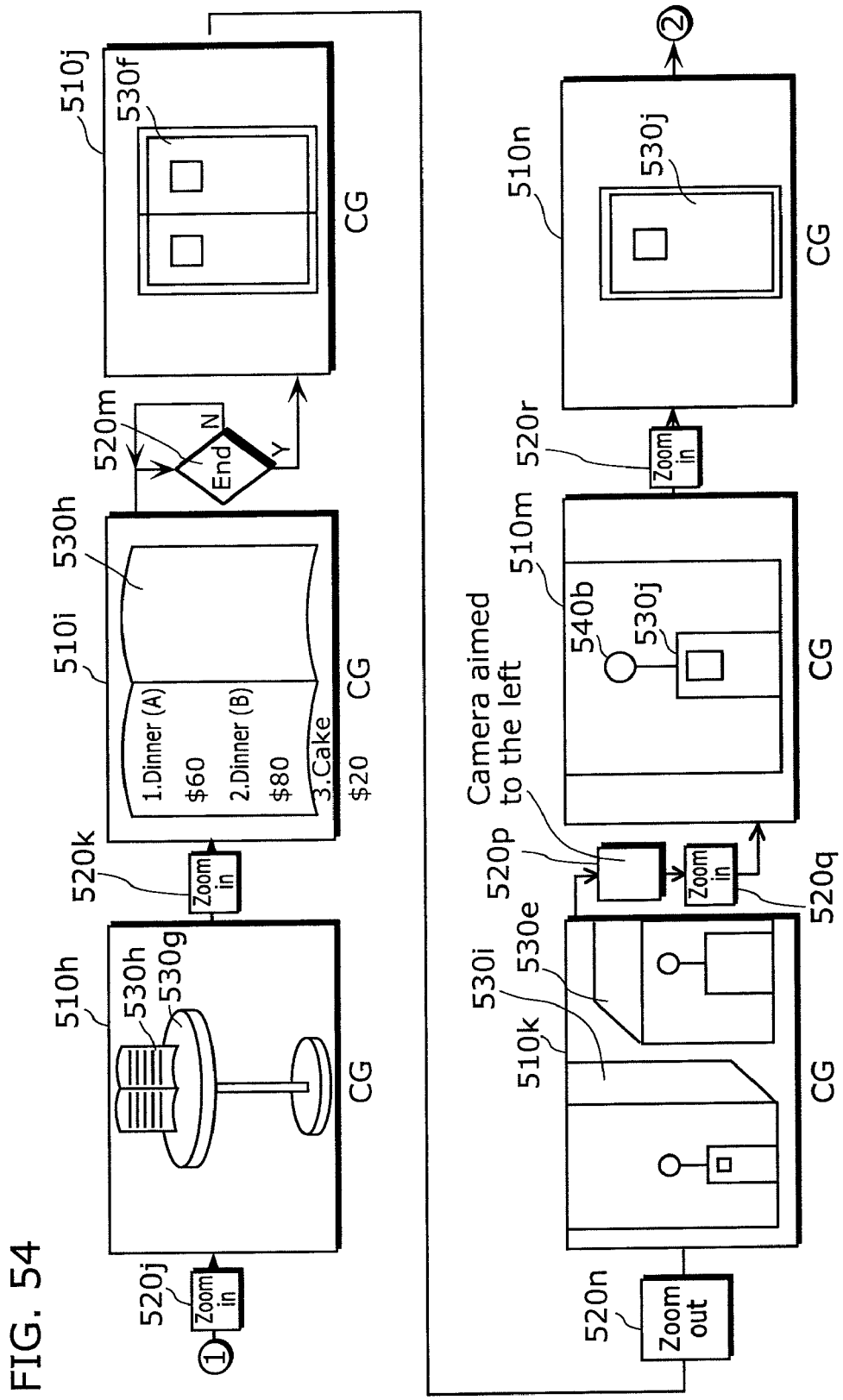
FIG. 54 illustrates display states of actual images and CG images according to an aspect of the present invention.

FIG. 53 illustrates an actual image 501*f* that has been actually captured.

Upon selection of "zoom in" in Step 520*b*, an image is zoomed in (enlarged) in Step 520C, resulting in enlargement of a building 530*e* in the actual image 501*g*. When the actual image 501g includes 3D data of the inside view of the building, a mark 540a is displayed on the screen.

When the "zoom in" is selected in Step 520d and the displayed image has a predetermined resolution or pixels with a count not higher than a predetermined value in Step 520f, the actual image 501g is turned to a 3D CG image as illustrated in a CG image 510d. Without the "zoom in" in Step 520d, the CG image 510d is switched to a CG image 510e, for example, by clicking the mark 540a in Step 520e for selection. With selection of the "zoom in" in Step 520g after the CG image 510d, a door 530f is opened as illustrated in the CG image 510e to allow the user to enter the building 530e seamlessly. The further selection of "forward" in Step 520h proceeds to a reception of a restaurant as illustrated in a CG image 510f. Rotating the image capturing apparatus 102 to the left or pressing a left arrow in Step 520i, a left room with respect to the reception and a table 530g can be viewed as illustrated in Step 510g. Here, displaying a still image of the actual restaurant instead of the CG image 510g can produce an advantage of conveying atmosphere in the restaurant to customers. Furthermore, displaying video of the room at present instead of the CG image 510g can produce an advantage of knowing the current status of crowds or availability of seats of the restaurant. Here, facial recognition is performed by, for example, coloring a portion of the face of the customer, for preventing personal information of a customer from being displayed on the screen, thus enabling protection of the personal information. Marking only a seat on which no customer is seated or placing a virtual person created by CG on a seat on which someone is seated can inform the operator of the availability and atmosphere of the restaurant while protecting the personal information.

Figure 55:
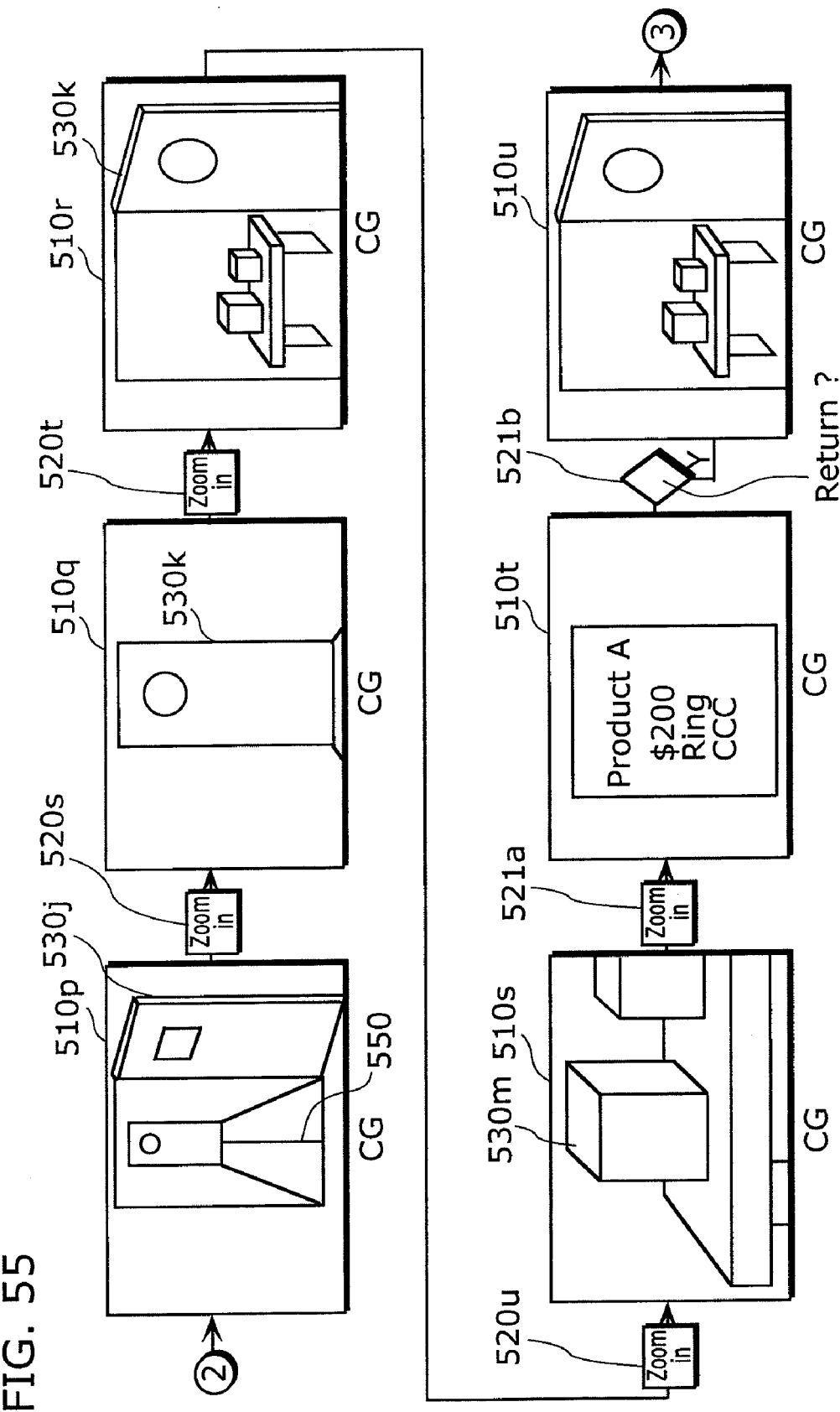
FIG. 55 illustrates display states of actual images and CG images according to an aspect of the present invention.
Figure 56:
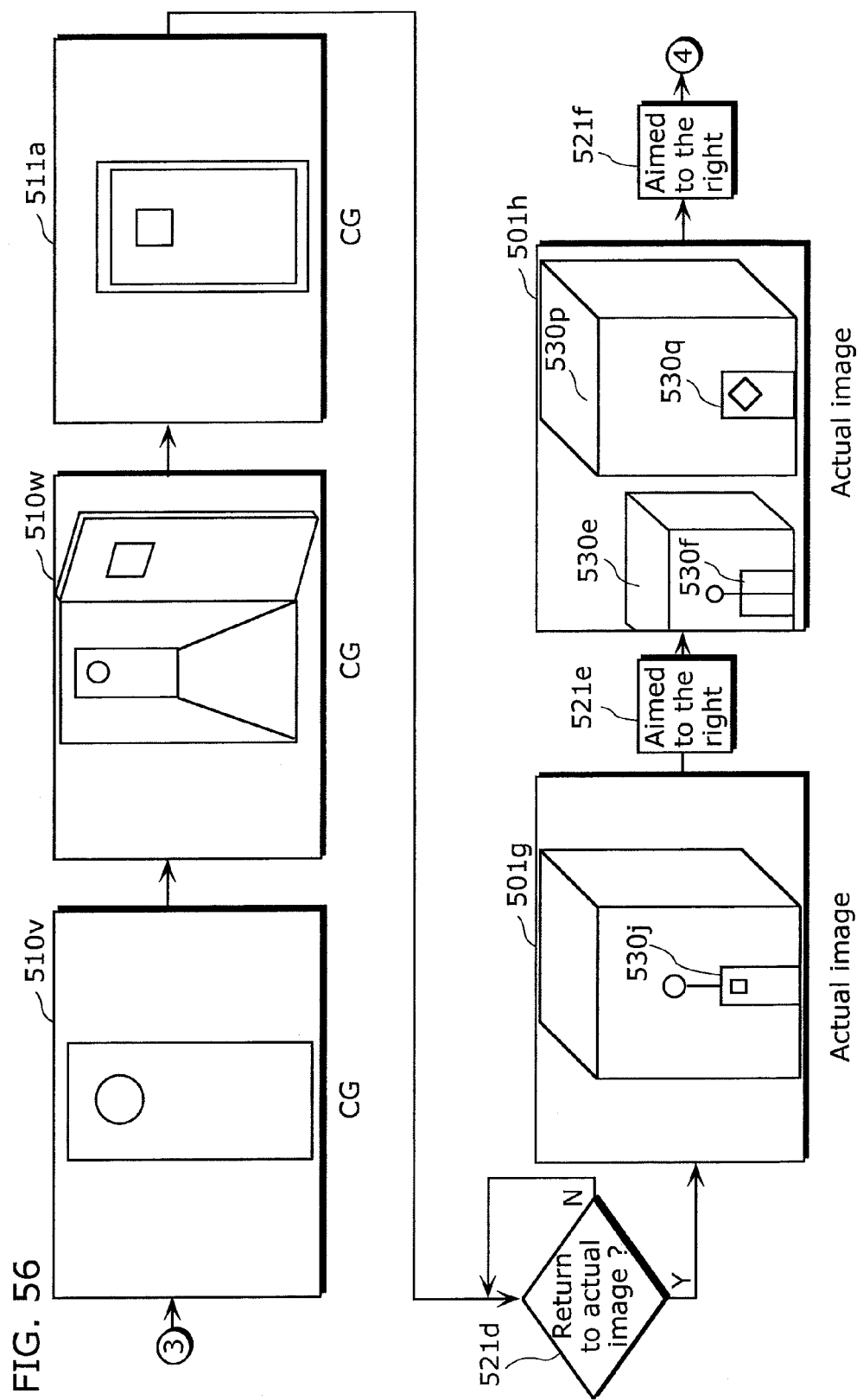
FIG. 56 illustrates display states of actual images and CG images according to an aspect of the present invention.

As illustrated in the CG image 510g in FIG. 53, when there is the table 530g and the "zoom in" is selected in Step 520j, a menu 530h is present on the table 530g as illustrated in a CG image 510h. Furthermore, when the "zoom in" is selected in Step 520k, items on the menu 530h are displayed in the CG image 510i. With selection of "end" in Step 520m, the user returns to an entrance where there is the door 530f as illustrated in a CG image 510j. When a "zoom out" is selected in Step 520n, a building 530i to the left in the CG image 510k is displayed in a hysteresis mode without returning to the actual image. Then, a camera is aimed to the left in Step 520p and the "zoom in" (enlargement) is selected in Step 520q, an entrance door 530j with a mark 540b is displayed as illustrated in a CG image 510m. When the image is further zoomed in Step 520r, the entrance door 530j is enlarged as illustrated in a CG image 510n. When the image is further zoomed in or the user proceeds along a rail 550, the entrance door 530j is opened as illustrated in FIG. 55 to allow the user to enter the building seamlessly. When the image is further zoomed in Step 520s, an entrance door 530k is seen in the back. When the image is further zoomed in Step 520t, the entrance door 530k is opened as illustrated in a CG image 510r. When the image is further zoomed in Step 520u, a product 530m is displayed in a CG image 510s. With further selection of the "zoom in" or "forward" in Step 521a, descriptive information of the product 530m, such as the price is displayed as in a CG image 510t. When "return" is selected in Step 521b, the CG image returns to the entrance door 530j of the building as in a CG image 511a sequentially through images 510u, 510v, and 510w, as illustrated in FIG. 56. With selection of "return to real image" in Step 521d, the image returns to an actual image as an actual image 501g.

Figure 57:
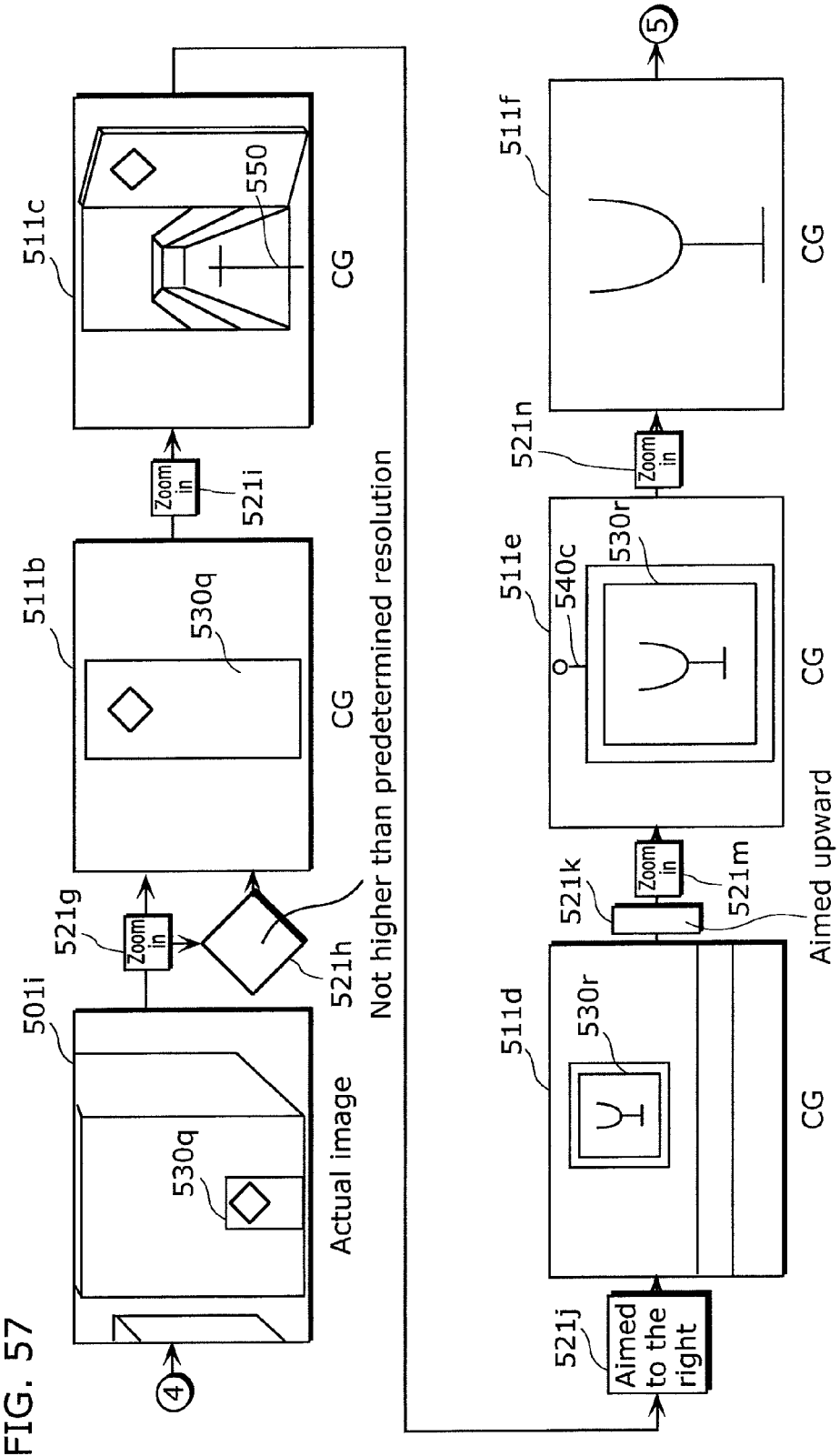
FIG. 57 illustrates display states of actual images and CG images according to an aspect of the present invention.

When the camera is aimed to the right in Step 521e, a building 530p that is 2 buildings to the right is displayed. When the camera is aimed to the right in Step 521f, an entrance door 530q is displayed in the center as illustrated in FIG. 57. With selection of the "zoom in" in Step 521g, the image is further enlarged or the user proceeds along the rail 550. When a resolution or the total pixel count of the image becomes not higher than a predetermined value, the image is switched from the actual image to a CG image 511b. With further selection of the "zoom in" in Step 521i, an inside view of the building is seamlessly displayed as in a CG image 511c. Proceeding along the rail 550, the camera is aimed to the right in Step 521j or a right arrow on the cross-shaped switch is selected, so that a right painting 530r can be viewed as in a CG image 511d. Without the rail 550, the camera is aimed upward in Step 521k. With selection of the "zoom in" in Step 521m, a mark 540 and a painting 540c are displayed as in a CG image 511e. With further enlargement in Step 521n, a CG image 511f is displayed. Although there is a problem that a beginner has a difficulty of movement in a 3D space due to difficult 3D input, the rail 550 to be described later can solve the problem. With selection of the "zoom out" in Step 521p in FIG. 58, the image is reduced to a CG image 511g, for example. When a setting 1 is on in Step 521q, the step proceeds to Step 521r, the camera is aimed upward. When the center of the screen is matched to a mark 540c and "enter" is selected in Step 522a, product information of the painting 530r, for example, its price, size, and material as in a CG image 511i is displayed. When the setting 1 is off in Step 521q, the step proceeds to Step 522b, a description SW is turned on, so that the CG image 511i is displayed. When the operator selects "purchasing" in Step 522c, a CG image 511j on which billing information is displayed, and the service is charged in Step 522b. When the operator does not select "purchasing" in Step 522c, the step proceeds to Step 522e. With selection of the "zoom out", the image is reduced to a CG image 511k. With selection of the "zoom out" in Step 522f and a setting 3 in Step 522g, a CG image 511m that is reduced and an arrow 540d pointing to the left are displayed for indicating a direction to return to the entrance where the operator has initially entered.

Figure 59:
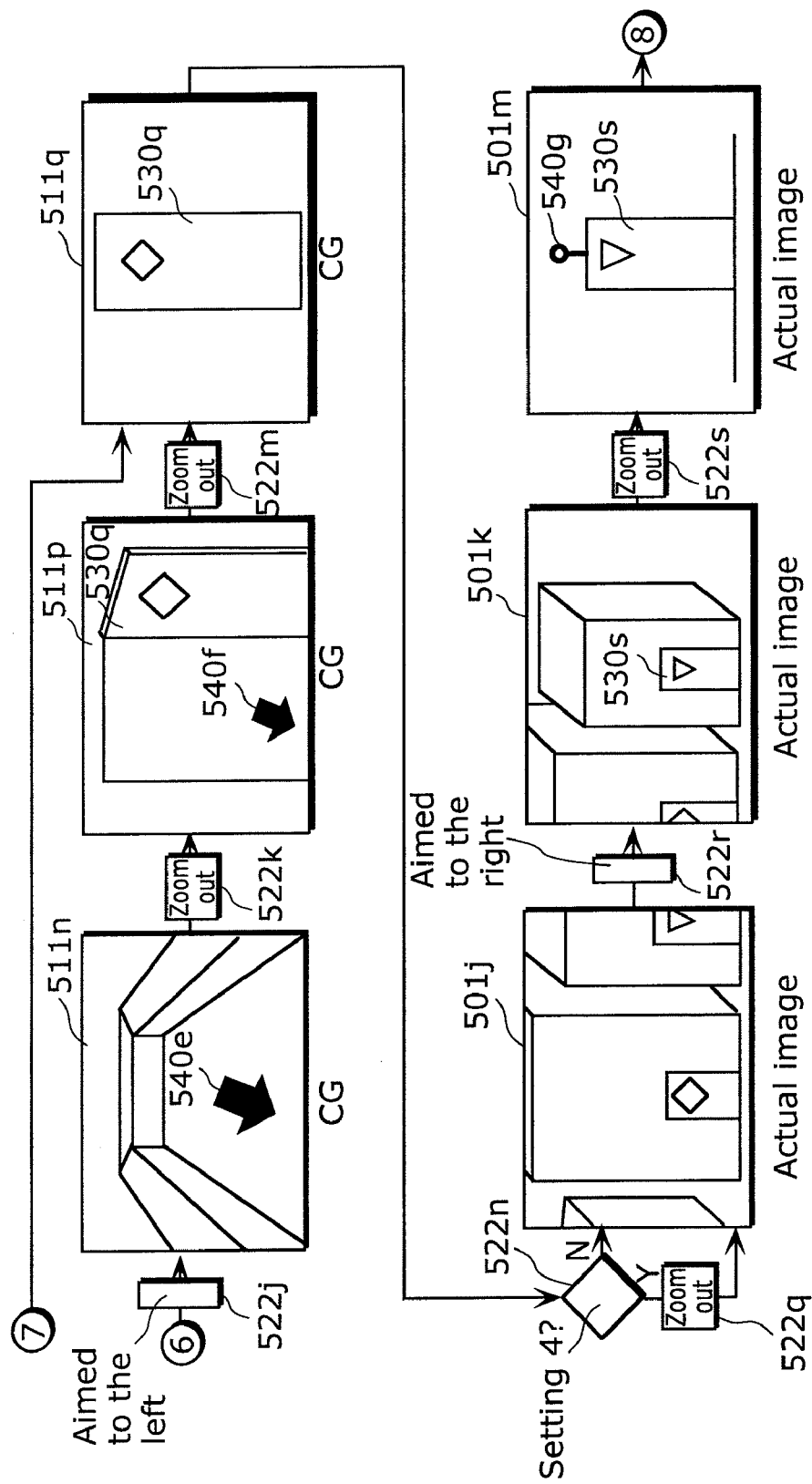
FIG. 59 illustrates display states of actual images and CG images according to an aspect of the present invention.

Proceeding to Step 522j in FIG. 59, when the camera is aimed to the left, a CG image 511n and an arrow 540e pointing to a direction for returning are displayed. With selection of the "zoom out" in Step 522k, the entrance door 530q where the operator has initially entered and an arrow 540f pointing to a direction for returning as in a CG image 511p are displayed. With selection of the "zoom out" in Step 522m, the entrance door 530q as in a CG image 511q is displayed.

Figure 58:
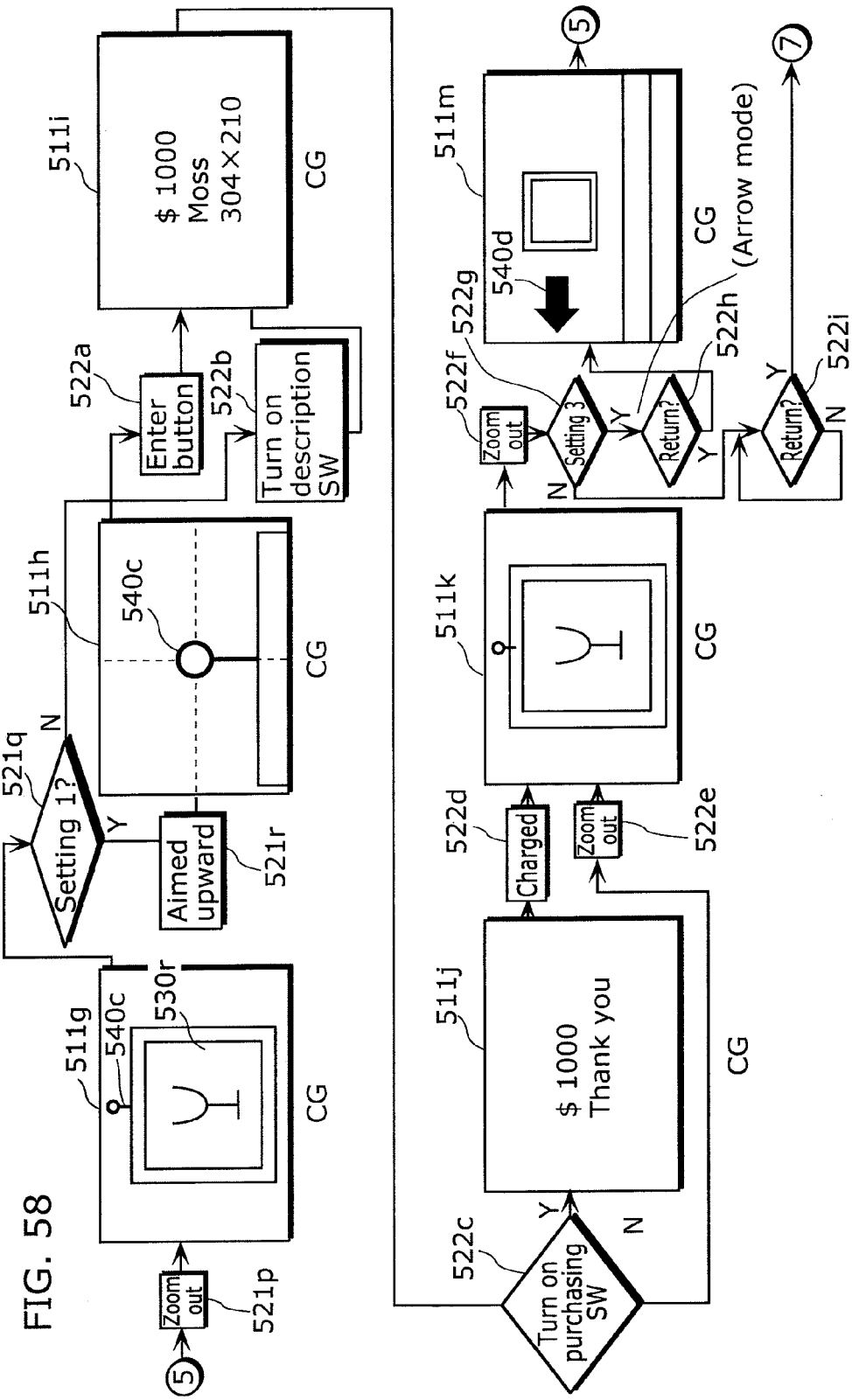
FIG. 58 illustrates display states of actual images and CG images according to an aspect of the present invention.

Back to Step 522g in FIG. 58 where the setting 3 is off, when the operator proceeds to Step 522i and selects "return", the steps jumps to the CG image 511q in next FIG. 59. Proceeding to Step 522n, when a setting 4 is on, the image is zoomed out to display an actual image 501j. When the setting 4 is off in Step 522m, the step automatically returns to the actual image 501j. Proceeding to Step 522r, when the camera is aimed to the right, an entrance 530s of a building to the right is displayed as in an actual image 501k. Proceeding to Step 522s, when the "zoom in" is selected, a mark 540g and the entrance 530s are displayed as in an actual image 501m. Here, back to Step 522n, when the setting 4 is on, the image is zoomed out in Step 522q, and a resolution or the total pixel count of the image becomes not higher than a predetermined value, the image is switched from the CG image to the actual image 501j.

Figure 60:
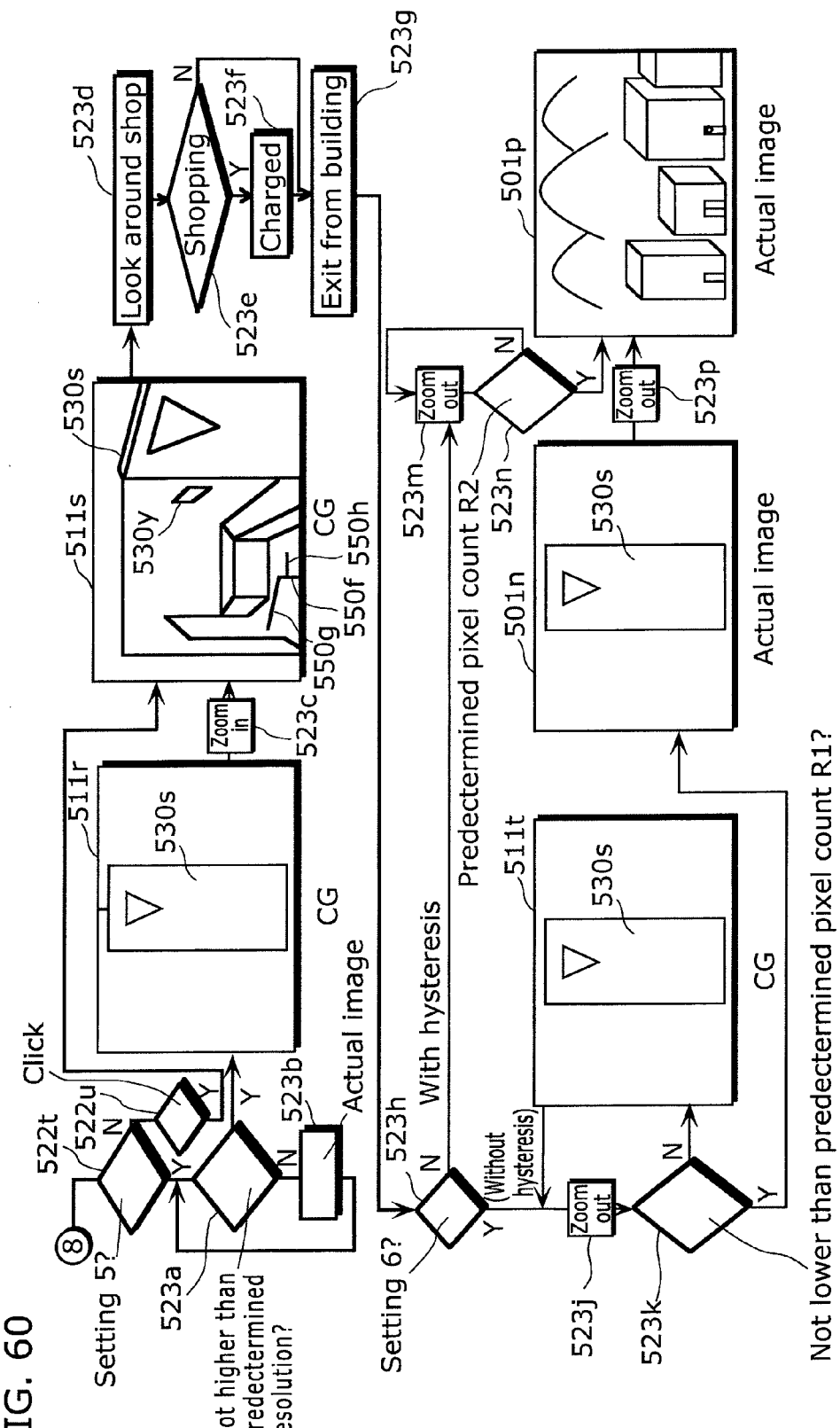
FIG. 60 illustrates display states of actual images and CG images according to an aspect of the present invention.

Proceeding to Step 522t in next FIG. 60, when a setting 5 is on, the image is zoomed in (enlarged) in Step 523a. When a resolution or the total pixel count of the image becomes higher than a predetermined value, the step proceeds to Step 523b, and the actual image is displayed as it is. When the resolution or the total pixel count of the image becomes not higher than the predetermined value, the image is switched from the actual image to a CG image to 511r. Proceeding to Step 523c, when the image is zoomed in, a door 530s is opened, and enabling entering, for example, a virtual shop. When the setting 5 is off in Step 522t, proceeding to Step 522u, the image jumps to a CG image 511s with a click. The virtual shop provided with rails 550f, 550h, and 550g will facilitate the operations. The details will be described later. Proceeding to Step 523d, when the user looks around the virtual shop, and does shopping in Step 523e, the user is charged for the purchase in Step 523f, and exits from the building in Step 523g. Back to Step 523e, when the user does not do the shopping, the user exits from the building in Step 523g.

When a setting 6 is off in Step 523h, hysteresis characteristics are given to the image. When the setting 6 is on, the image has no hysteresis characteristics. Back to FIG. 52, when the total pixel count on a display screen reaches R1 in Step 510a, the actual image is automatically switched to a CG image. Proceeding to Step 523j in FIG. 60, when the image is zoomed out, the step proceeds to Step 523k. Then, when the image has R1 that is a resolution same as that of the CG image switched from the actual image, the CG image is automatically switched to an actual image 501n.

When the setting 6 is off in Step 523h, since the image has the hysteresis characteristics, the step proceeds to Step 523m, and the image is zoomed out. In Step 523n, when the image reaches the total pixel count R1 that is previously counted when the image is not switched from the actual image to the CG image, the CG image is not switched to the actual image. When the total pixel count R1 becomes a pixel count R2, in other words, a pixel count R1>R2, the image is switched from the CG image to an actual image 501p. With such hysteresis characteristics, frequently, the CG image and the actual image are alternately switched prior to or subsequent to the total pixel count R1 that is a switching point, thus preventing the screen from flickering. Furthermore, when the setting 6 is off to provide the image with the hysteresis characteristics, the operator may be present in a virtual space for a long period of time.

The total pixel count R1 that is a point for switching from an actual image to a CG image according to the present invention is changed depending on a count of objects or landmarks in an initial image. When there is a large count of objects or landmarks as in the actual image 501a in FIG. 52 with electronic zooming, the substantial total pixel count R1 for switching between images is set to a smaller value than a count when a count of objects is less.

Conversely, when there is a small count of objects or landmarks in an initial image, the total pixel count R1 for switching is set to a larger value.

When an actual image of an object is electronically zoomed in, the image gradually becomes rough. However, when a count of objects is less and an actual image is zoomed in, in the case where the actual image includes a larger count of pixels in total, the actual image is switched to a CG image at an earlier stage of the zoom in. When a count of objects is less, the actual image is switched to a CG image with electronic zooming at the earlier stage. Thus, there is an advantage of rapidly converting an actual image into a CG image. When there is a larger count of objects, the electronic zooming needs to be performed to a certain extent. Thus, the actual image is switched to a CG image slowly. Thus, there is an advantage of rapidly performing the operation.

Furthermore, when the optical zooming is used, an actual image is automatically switched to a CG image according to a total pixel count per object. The actual image 501a in FIG. 52 has a less total pixel count per object. However, optical zooming causes an image to have a larger total pixel count per object as the actual image 501c. Thus, when a total pixel count P1 per object becomes a predetermined value or more in the optical zooming, an actual image is switched to a CG image. Thus, when there are less objects, there is an advantage of automatically switching an actual image to a CG image with rapidity.

Figure 61:
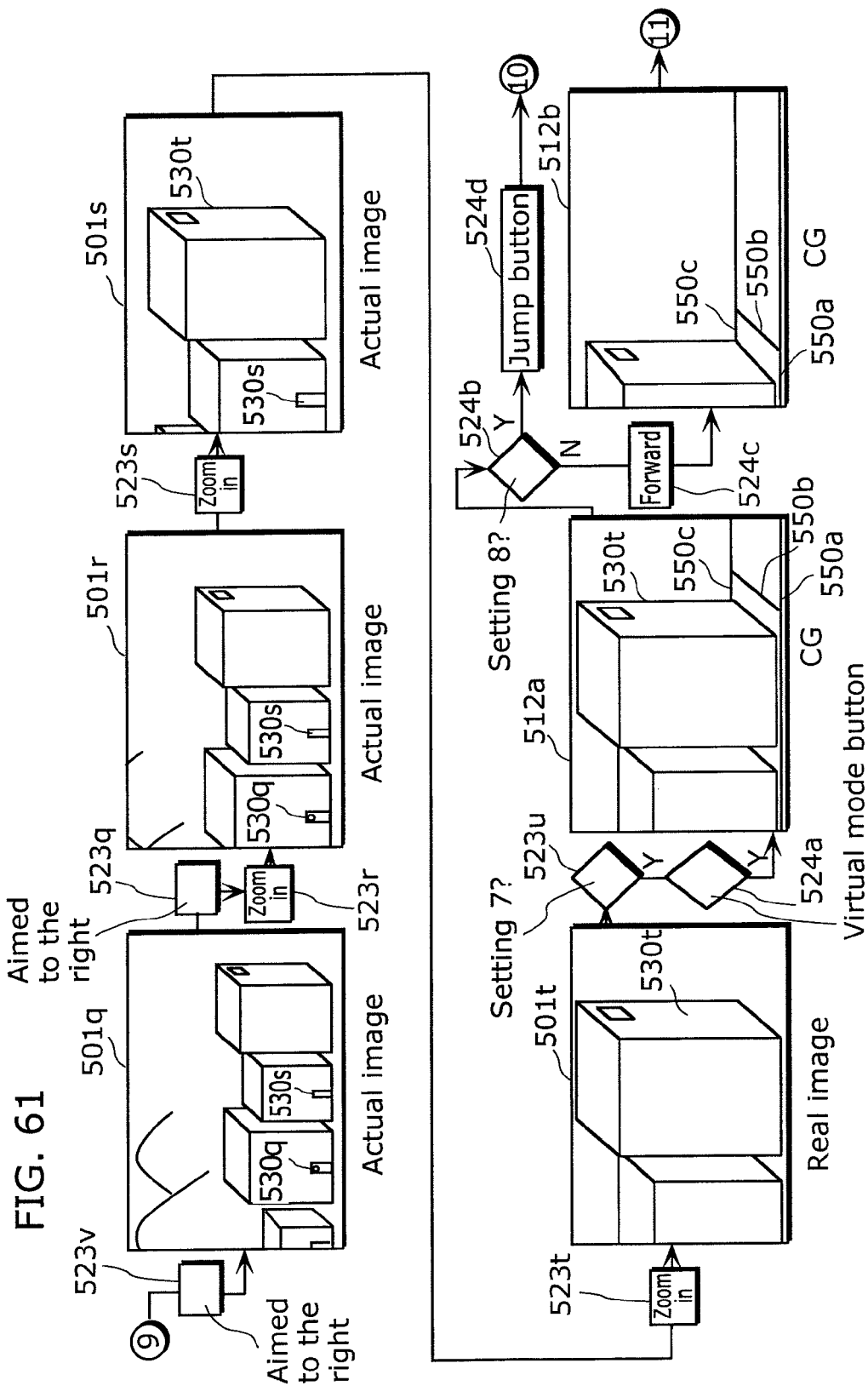
FIG. 61 illustrates display states of actual images and CG images according to an aspect of the present invention.
Figure 62:
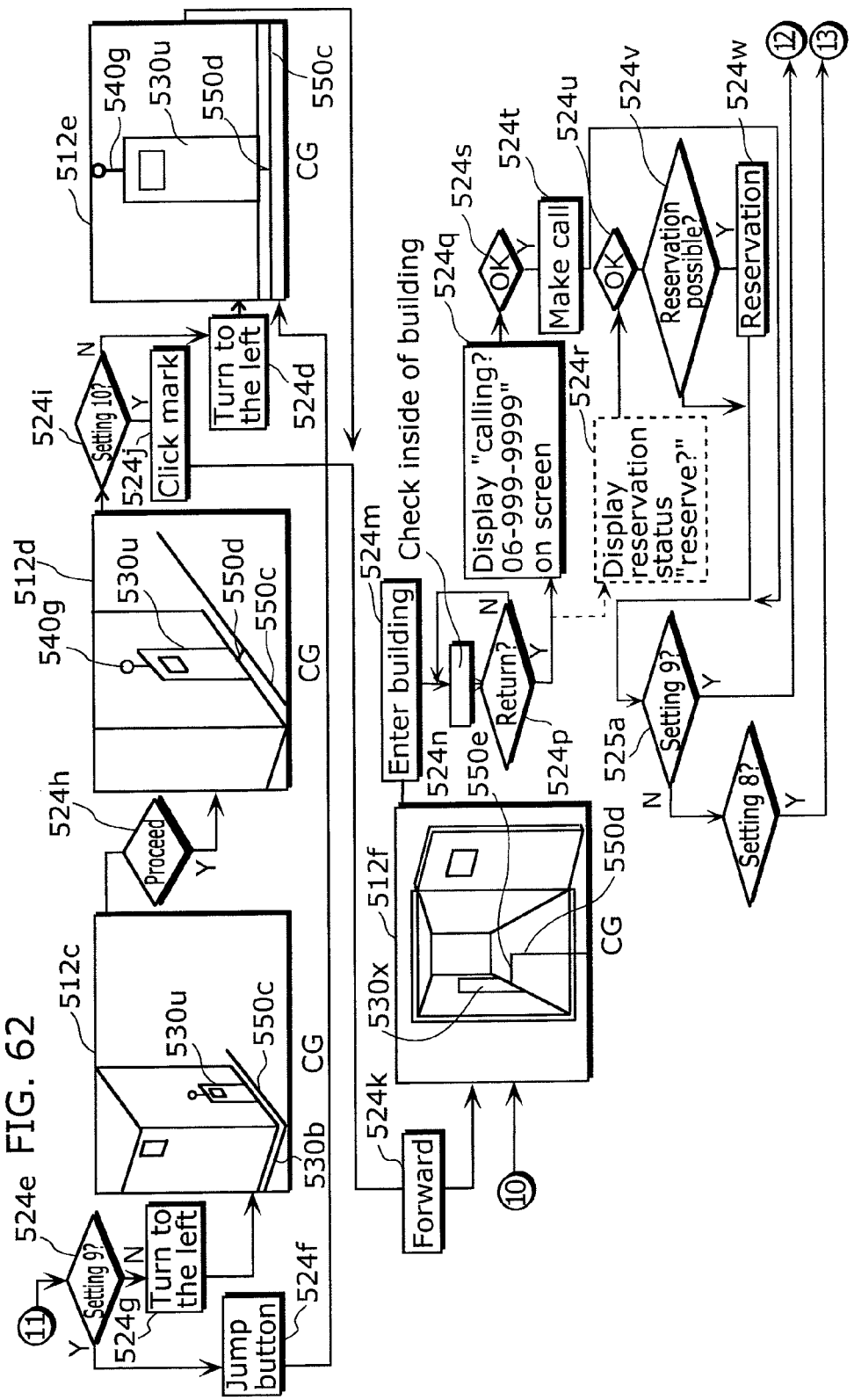
FIG. 62 illustrates display states of actual images and CG images according to an aspect of the present invention.
Figure 63:
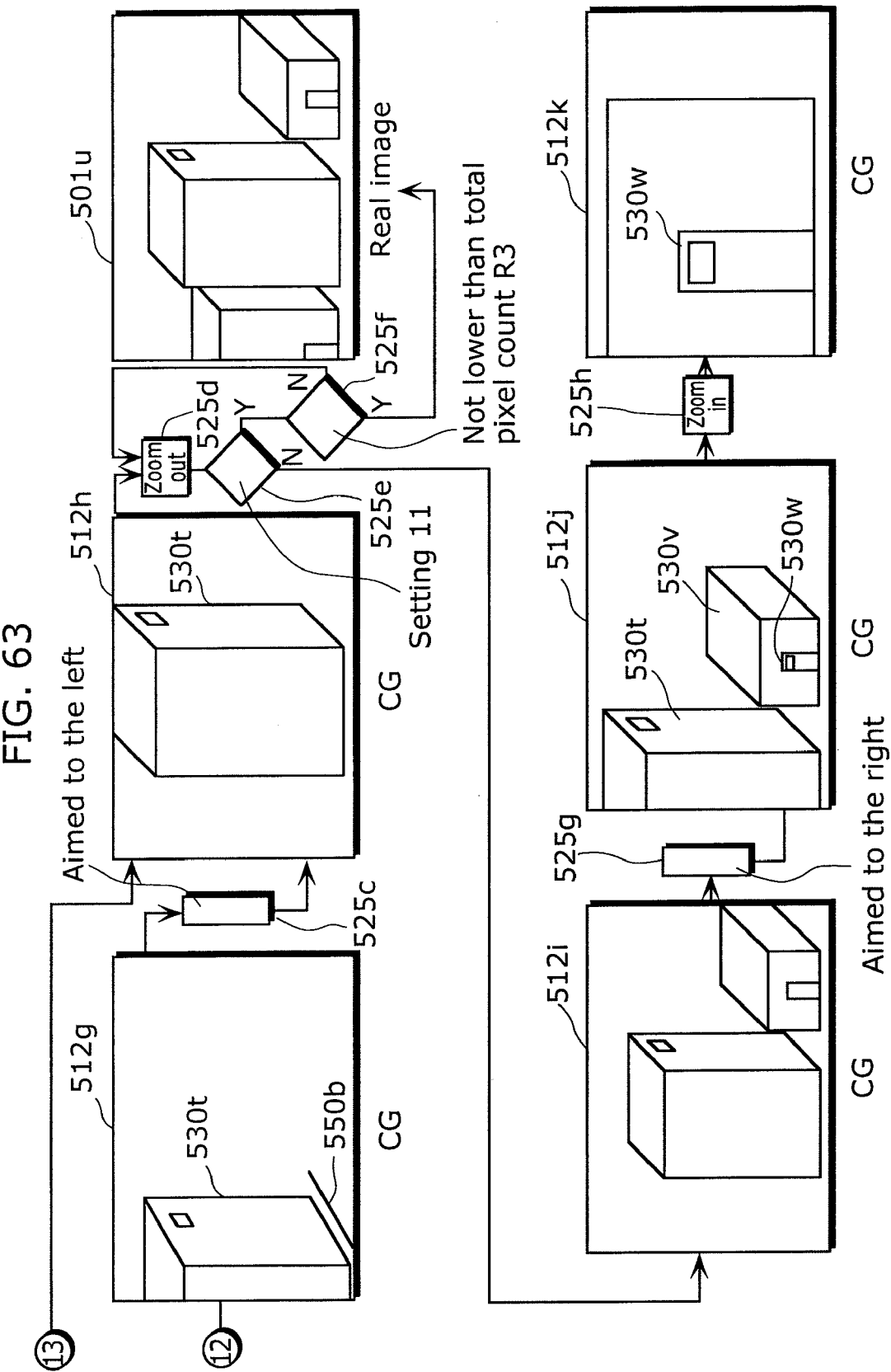
FIG. 63 illustrates display states of actual images and CG images according to an aspect of the present invention.

In next FIG. 61, aiming the camera to the right in Step 523v leads to obtainment of an actual image 501q. In Step 523q, the camera is aimed to the right, and the image is zoomed in, in Step 523r. Thereby, an enlarged actual image 501r is obtained. When the image is further zoomed in, in Step 523s, a further enlarged actual image 501s is obtained.

With the "zoom in" in Step 523t, an actual image 501t is obtained, where a building 530t is enlarged. Here, since there is no entrance to the building 530t that is different from other buildings, the operator cannot enter the building 530t simply by enlarging the actual image. Thus, when a setting 7 is on in Step 523u, selection of a virtual mode in Step 524a enables the image to switch to a CG image 512a and the operator to enter the virtual space even the image includes a large count of pixels. Since the CG image 512a is provided with rails 550a, 550b, and 550c, proceeding along each of the rails 550a, 550b, and 550c eliminates a need for performing 3D complicated operations, thus simplifying the operations. When a setting 8 is off in Step 524b, the operator proceeds to Step 524c, and proceeds along the rail 550b. When a setting 9 is off in Step 524e of next FIG. 62, the operator turns to the left on a rail 550b in Step 524g, and proceeds along a rail 550c. With selection of "proceed" in Step 524h, the operator reaches an intersection point of the rail 550c and a rail 550d. When a setting 10 is off in Step 524i, the operator turns to the left at the intersection point of the rails 550c and 550d in Step 524d, and an entrance 530u is viewable in front as illustrated in a CG image 512e. With selection of "forward" in Step 524k, the operator proceeds along the rail 550d and can enter the building as in a CG image 512f. In Step 524m, the operator enters the building. Inside the building, proceeding along the rail 550d and a rail 550e, the operator can automatically enter a left room 530x.

Here, a virtual rail 550 provided in the 3D space simplifies operations of the operator. With a rail, the operations are limited to "forward", "return", "right turn", and "left turn" performed by 4 switches. Thus, there is an advantage of enabling movement within a virtual space using one operation button. The virtual rail is set in advance by associating a view direction, a view height, and a view range of a position of a virtual human on a rail, with position information on the rail. Thus, as illustrated in the CG image 511s in FIG. 60 that is 2 drawings prior to FIG. 62, a virtual human entering the virtual shop first proceeds along the rail 550f. With selection of "right turn" at an intersection point of the rails 550f and 550h, the virtual human aims to a direction of a painting 530y. With selection of "forward" on the rail 550h, the virtual human comes in front of the painting 530y. When the virtual human reaches a terminal end of the rail 550h, an image is set in a position on the rail 550h where a "image-capturing direction of a virtual camera", "view height (viewpoint)", and "view range (zooming)" are predetermined. Thus, there is an advantage of obtaining an image that is easily viewable, for example, as illustrated in the CG image 511e in FIG. 57.

The conventional method without using any rail needs a human control on a 3D direction as illustrated in a previous drawing of FIG. 57. Thus, it is necessary that: (i) the camera is aimed to the right in Step 521j; (ii) the camera is aimed upward in Step 521k after the operator proceeds forward; and (ii) the image is zoomed in, in Step 521m. Since the operations need to be performed in a delicate manner, the beginner who is unskilled needs complicated operations in a 3D space until entering the virtual shop and viewing the painting 530r, thus requiring operations a couple dozens times. However, since a virtual rail is provided, and a view direction, a view height, and a view range are set in advance per position of the virtual rail according to the present invention, the operator has only to press the "forward", "right turn", and "forward" buttons until reaching the CG image 511e with the painting 530r in FIG. 57, and to turn on and off a setting. Thus, there are striking advantages of decreasing the number of inputs by the operator, and improving the operability.

Here, back to Step 524b in FIG. 61, when the setting 8 is on, pressing a jump button in Step 524d allow the operator to jump to the CG image 512f to enter the virtual shop from the entrance of the building 530f. Furthermore, back to Step 524i in FIG. 62, when the setting 10 is on, the operator can enter the virtual shop only by clicking the mark 540g (Step 524j). The operator enters the building in Step 524m, and checks inside of the building (Step 524n). With selection of "return" in Step 524p, "calling?" and "telephone number" are displayed in Step 524g. With selection of "OK" in Step 524s, automatically a call is made to the telephone number using a mobile phone with a camera in Step 524t, and the operator proceeds to Step 525a. Furthermore, as in Step 524r, a reservation status and a question of "reserve?" are displayed. With selection of "OK" in Step 524u, and when and "reservation is possible" in Step 524v, the operator makes the reservation in Step 524w, and proceeds to Step 525a. Here, when the operator obtains availability information in the CG space, a step of reserving a seat in the virtual shop may be added to Step 524w. Thereby, the user can make reservations to a shop and a seat after understanding a favorite seat in the CG space. Furthermore, when the operator obtains availability information in the CG space, he/she may activate the reservation screen of seats by pressing a reservation button in front of an available seat or further zooming in the seat, so that the operator can make reservations to a shop and a desirable seat in front of the available seat in the CG space. Thus, the user can know a conceptual image of a seat to be seated in advance, and reserve a seat similar to the conceptual image of a desirable seat. When the setting 9 is on in Step 525a, the operator proceeds to a CG image 512g. When the setting 9 is off in Step 525a, the user jumps to a CG image 512h, and proceeds forward. Hereinafter, an image in the case of derailing from the rail 550 will be described. After the CG image 512g is displayed, aiming the camera to the left, the CG image 512h including a building 530t in the center is displayed. With (i) selection of "zoom out" in Step 525d, (ii) selection of "Y" in Step 525e checking "setting 11", and (iii) the actual image having a resolution or the total pixel count not lower than a predetermined value R3 in Step 525f, the CG image is switched to an actual image 501u to be displayed. In other words, when the setting 11 is on, the image is zoomed out. Upon reaching the predetermined resolution, the image is automatically switched to an actual image having the hysteresis characteristics. When the setting 11 is off, the image is not switched to an actual image, thus enabling the operator to view a CG image in an orientation of the camera, as a CG image 512i.

With the CG image 512i being displayed, when the camera is aimed to the right in Step 525g, a building to the immediate right is displayed in the center of the screen as in a CG image 512j. With selection of the "zoom in" in Step 525h, an enlarged image of an entrance 530w is displayed as in a CG image 512k. With selection of "zoom in", the door is opened to allow the viewer to enter a building 530v.

Thereby, the operability will be significantly improved with a rail in a virtual space. Furthermore, since the image is provided with the hysteresis characteristics upon switching from an actual image to a CG image, there is an advantage of stabilizing display of an image.

Figure 64:
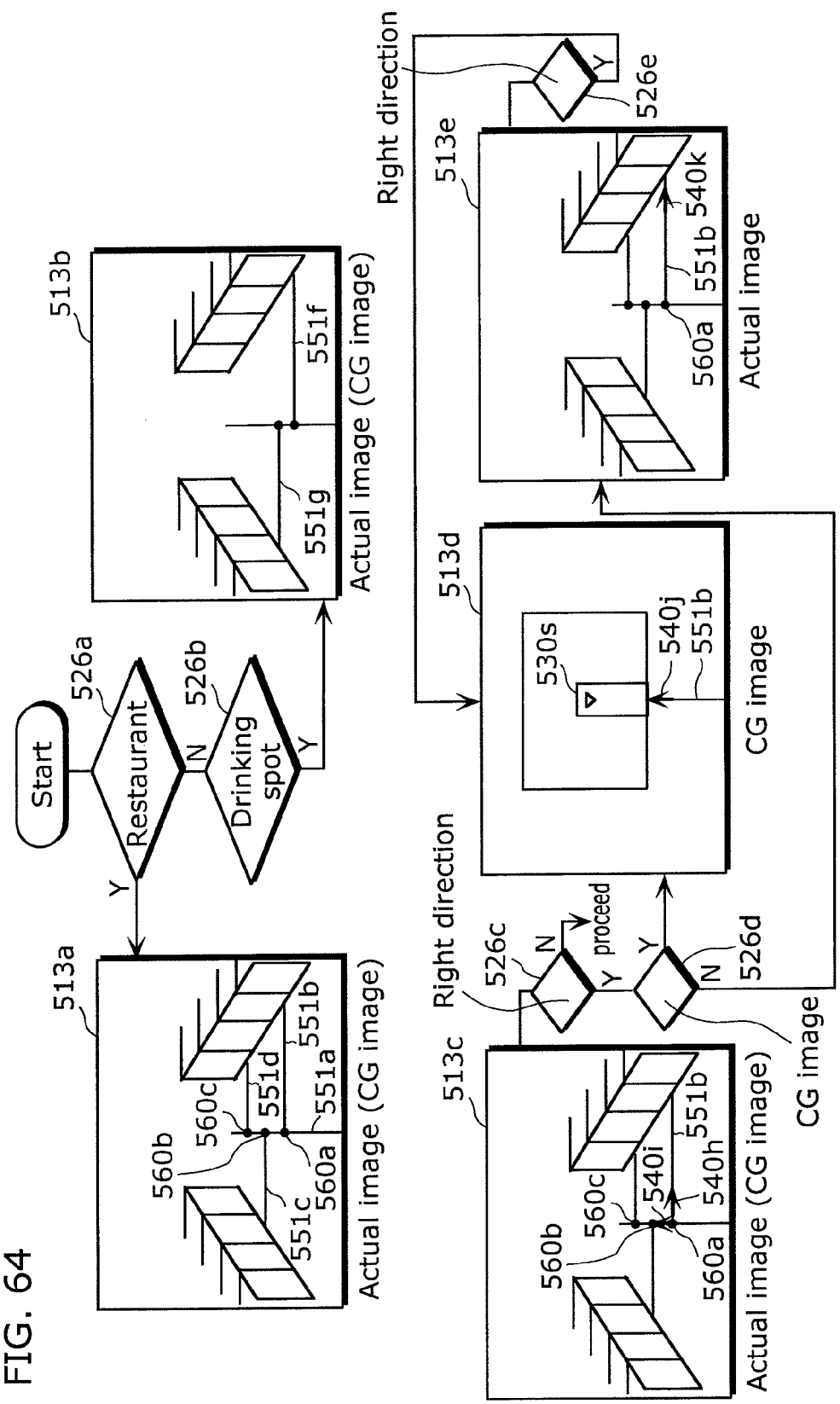
FIG. 64 illustrates display states of actual images and CG images according to an aspect of the present invention.

Although the rail 550 that is displayed to be overlaid on a CG image according to Embodiment 5, a rail 551a may be displayed on an actual image 513a as illustrated in FIG. 64. Here, a displacement between the actual image and the CG image is corrected by pattern matching therebetween. Then, displaying, within the CG image, only the rail 551a to a rail 551d to be overlaid on the actual image enables a rail 551 to be displayed on the image 513a. Here, since the image-capturing direction of the camera is changed from side to side and up and down according to camera shake and the like, a six-axis acceleration sensor and an angular velocity sensor detect an amount of the shake. A road or a walkway in an actual image can match the rail 551 by measuring the amount of shake in an image-capturing direction of the camera and panning the rail 551 on the image according to the amount of shake. Here, correcting the camera shake using a shake correction function can reduce an amount of correction of a rail.

Furthermore, when the user desires to look for a shop of a specific category, for example, a restaurant, a display mode is set to "restaurant" in Step 526a, and then the rails 551b, 551c, and 551d each indicating only an intersection point to a restaurant are displayed on the image 513a. Here, when the user sets an available price limit to 50 dollars or less, only the rails 551c and 551d each indicating an intersection point to the restaurant are displayed. Furthermore, the rail 551 to the restaurant outside office hours is not displayed or is indicated by a dotted line. Although only the image 513a is displayed, the same advantage can be obtained even when the image 513a is a CG image.

When the display mode is set to "drinking spot" in Step 526b, rails 551f and 551g each indicating only an intersection point to a drinking spot are displayed on an image 513b. Here, an actual image and a CG image to be displayed may obtain the same advantage. In an actual image, a rail, such as the rail 551a is panned according to a movement of the camera so that an actual image of the rail and the rail 551a match, for example. In a CG image, for example, when the camera is aimed to the right, an acceleration sensor or an angular velocity sensor detects the movement of the camera, so that the CG image and the rail 550 are corrected to match the actual image and the CG image in an image-capturing direction of the camera. While a CG image is displayed, the CG image may be corrected by detecting a motion of an actual image captured by a camera, or a displacement between the actual image and the CG image may be corrected by pattern matching between the actual image and the CG image.

Arrows 540h and 540i each indicating a rail through which the operator can proceed to the next intersection point are displayed on the screen as a method for displaying a rail 551, as in an image 513c. When the user presses a right-direction button in Step 526c and a CG image is displayed in Step 526d, a door of a shop as in a CG image 513d is displayed. When the forward button is pressed in front of a door as in Step 523c in FIG. 60, the operator may enter the shop as in the CG image 511s. Proceeding along the rails 550f, 550h, and 550g in the shop, the operator can view the menus and products in the shop. According to the present invention, although a rail to a restaurant outside office hours is indicated by a dotted line, the user may enter the restaurant outside office hours. When the user enters the restaurant and finds it attractive, he/she can reserve the restaurant. Thus, there is an economic advantage of preventing the restaurant from missing a possible customer. Since the following steps are previously described in detail, the description is omitted.

Back to Step 526d, when the image 513c illustrates an actual image, an actual image 513e, and a rail 551b and an arrow 540k are displayed. Here, when the user selects "right direction" in Step 526e, the actual image is switched to a CG image, and a door 530s as in a CG image 513d is displayed. Then, proceeding to Step 523c in FIG. 60, with selection of "forward (upward)" button, the user can enter the virtual shop as in the CG image 511s. Here, the user may proceed from the actual image in Step 526e to the CG image 510d and Step 520g in FIG. 53, and to Step 520r in FIG. 54.

Accordingly, even when the user does not enter an actual shop, he/she may know atmosphere of the shop inside, a status of crowds, or a price of the shop. Furthermore, the user can make a reservation to a restaurant and purchase products there. Thus, the present invention can improve the convenience of the user.

As described above, the present invention can switch between an actual image and a CG image in a virtual space. Thus, when the user captures an actual image using a mobile phone with a camera, he/she can obtain a striking advantage of automatically entering an CG image in the virtual world from the real world as necessary, as described in Embodiment 5.

Although the automatic process of combining photographs is ended in Steps 622m and 623h, the user may move on to a step for manually selecting a background photograph to be combined, and combining a portrait with the selected background photograph after Steps 622m and 623h. In this manner, even when a photograph is a background photograph including an unnecessary object, the user can select a photograph that can be tolerated for combining a portrait with the selected photograph, and obtain a composite photograph including the portrait.

When the user refuses to purchase a composite photograph in Step 624f, the process is stopped in Step 624g. However, the user may later purchase the high-definition composite photograph without a watermark. For example, when the user refuses to purchase a composite photograph, a composite photograph with a watermark or a composite photograph having a lower definition is stored in a terminal, and a high-definition composite photograph without a watermark is stored in a server for a predetermined period of time (for example, 7 days). Once the user refuses to purchase a composite photograph, the composite photograph with a watermark or the composite photograph having a lower definition is reproduced and displayed, the user is again inquired about whether or not to purchase the composite photograph. In this manner, even when the user desires to purchase the composite photograph later, there is no need to repeat the composite processing, thus decreasing a processing load of the server. Furthermore, calling up one of the composite photograph with a watermark and the composite photograph having a lower definition that are stored in the terminal enables the user to purchase a high-definition composite photograph, thus improving the convenience of the user.

Hereinafter, a specific operation method will be described.

According to an aspect of the present invention, there are 3 modes including; a mode that allows the user to move freely within a 3D space; a 2D mode that limits the movement up to a height of a viewpoint of a person who stands on a surface of a 3D space or on a floor of a building or stairs; and a rail mode (1D) that allows the user to move along a rail provided on the 2D space. The methods for switching from the 2D or 3D mode to the rail mode include a method for automatically switching to the rail mode when the user moves onto a rail, as an initial step. When the user moves onto a rail, as the next step, there is a method for switching to the rail mode, with a press or click of a button for the rail mode.

In switching from the 2D or 3D mode to the rail (1D) mode, assuming an intersection point 560a between the rails 551a and 551b is an n-th intersection point in the image 513a of FIG. 64, a image is displayed from a viewpoint with a height obtained when a person stands on a position of an (n−1)-th intersection point or on a point of the rail 551 that is anterior to the intersection point 560a. Embodiment 5 describes an example where the right-direction button is pressed in Step 526c. In contrast, assuming the forward button is pressed instead of the right-direction button, the viewpoint pans to the intersection point 560a, and an intersection point 560b is displayed at the most anterior position. When the intersection point 560b is displayed and the forward button is pressed, the viewpoint pans to the intersection point 560b, and an intersection point 560c is displayed at the most anterior position.

In this manner, since the viewpoint pans one at a time with a one-time press of a button or one click, the rail, namely, 1D mode basically enables panning in a 1D space intermittently, thus producing an advantage of significantly simplifying the operations compared with the ones in the 3D or 2D mode.

However, when a distance between intersection points is longer and there is no intersection point at a short distance, the viewpoint jumps to a far distance with just one click. In such a case, the user may lose sight of his/her position. When a distance between intersection points is larger, setting a viewpoint stop position prevents a viewpoint from being significantly changed with one click. The viewpoint stop position is set (i) for each building that is given a landmark and is on both sides of a rail, or (ii) in a position obtained by dividing a distance between 2 intersection points into equal lengths.

It is expected, in the future, that there occurs a problem that the user loses sight of his/her position when a viewpoint is significantly changed with one click of a button as described above. However, since the present invention can prevent a viewpoint from being significantly changed, there is an advantage of preventing the user from losing sight of his/her position. Although Embodiment 5 describes a case where a rail is provided on a 2D plane, the user may move to higher and lower layers having different heights, using a rail on stairs or a floor of an elevator. According to this method, the rail mode enables the movement except in the air. With a press of a mode change button, the user may return to the 2D or 3D mode from the rail mode.

Embodiment 6

An image capturing apparatus according to Embodiment 6 includes a person selecting unit configured to receive a predetermined operation for selecting a person from among persons in the digital image displayed by the display unit, wherein the detailed-information obtaining unit is configured to obtain, as the detailed information, an image showing a corresponding one of the objects of the plurality of additional information from a predetermined server on a network, and the display unit is configured to combine the obtained image on an image area showing the persons other than the selected person and including corresponding one or more of the objects in the digital image.

An additional information providing server according to Embodiment 6: receives, from the other device, specific information for specifying an unedited area in which an image showing one or more of persons and a similar image are not combined; obtains, from the database, the similar image (i) showing the corresponding one of the objects of the plurality of additional information and (ii) being captured prior to the digital image; and combines the obtained similar image on an image area other than the unedited area of the received digital image, the image area of the corresponding one of the objects showing a person.

FIGS. 65 to 68 are drawings for Embodiment 6.

Embodiment 6 describes a method for erasing an object other than a particular person in a portrait.

Figure 65:
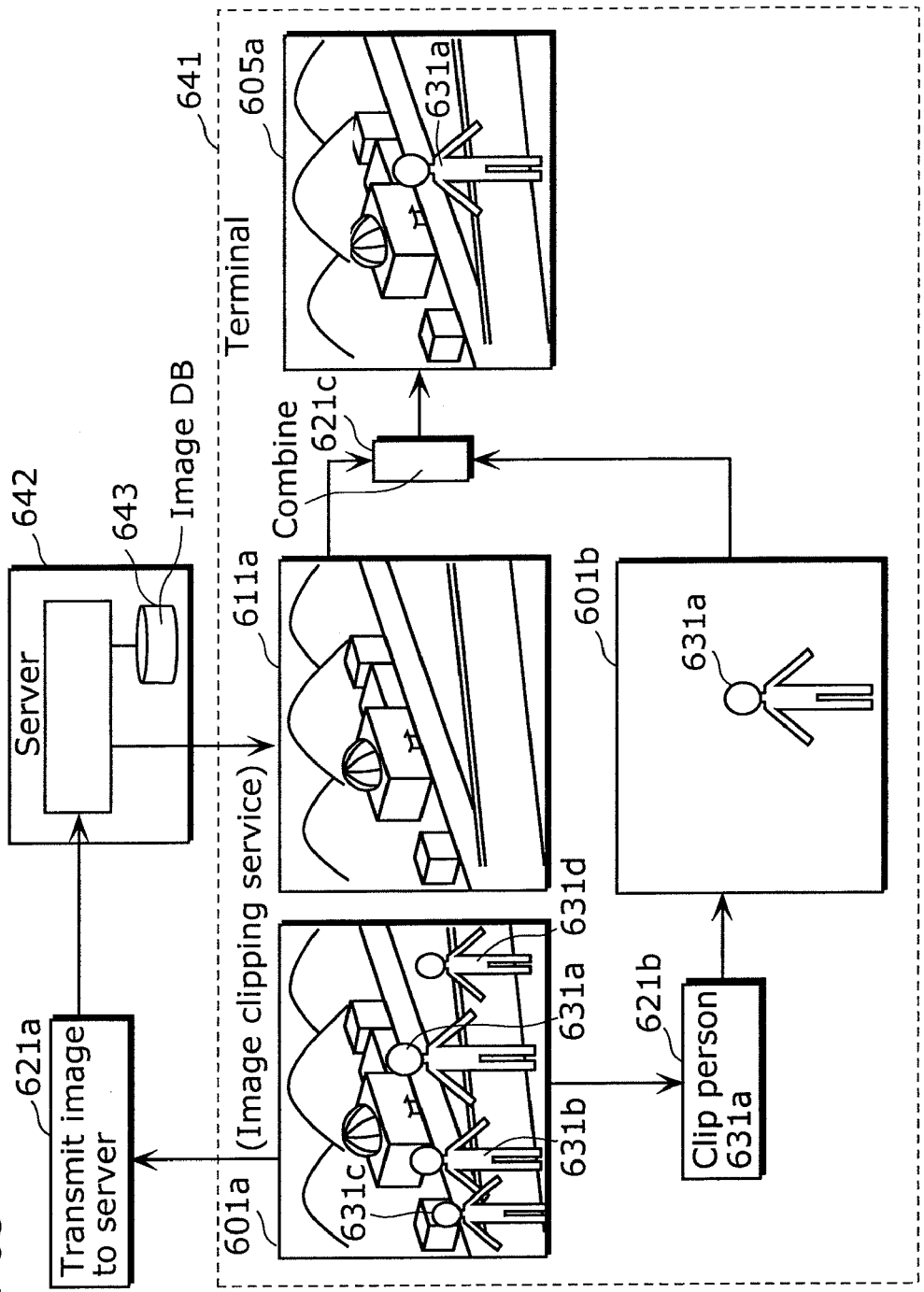
FIG. 65 illustrates a method for combining an actual image with another image according to an aspect of the present invention.

FIG. 65 illustrates a terminal 641 and a server 642.

First, a method for obtaining an actual image 601a showing persons 631a, 631b, 631c, and 631d and a background image 611a as illustrated in FIG. 65 will be briefly described.

In Step 621a, the terminal 641 transmits, to the server 642, data including image data, a location, an image-capturing direction, a capturing height, and an image-capturing range of the actual image 601a.

Upon receipt of the image data and others, the server 642 searches an image database 643 stored in the server 642 for an image that is the most similar to the actual image 601a in its position data, image-capturing direction, capturing height, and image-capturing range, extracts or creates through combination, the background image 611a showing no person, and transmits the obtained background image 611a to the terminal 641 such as a camera and a personal computer.

Next, in Step 621b, the terminal 641 creates an actual image 601b showing only a portrait of the person 631a by clipping the actual image 601b from the actual image 601a.

Then, in Step 621c, the terminal 641 combines the actual image 601b that shows only one person and is created by the terminal 641, with the background image 611a transmitted from the server 642 to create a combined image 605a.

Next, detailed operations will be described with reference to flowcharts of FIGS. 66, 67, and 68.

Figure 66:
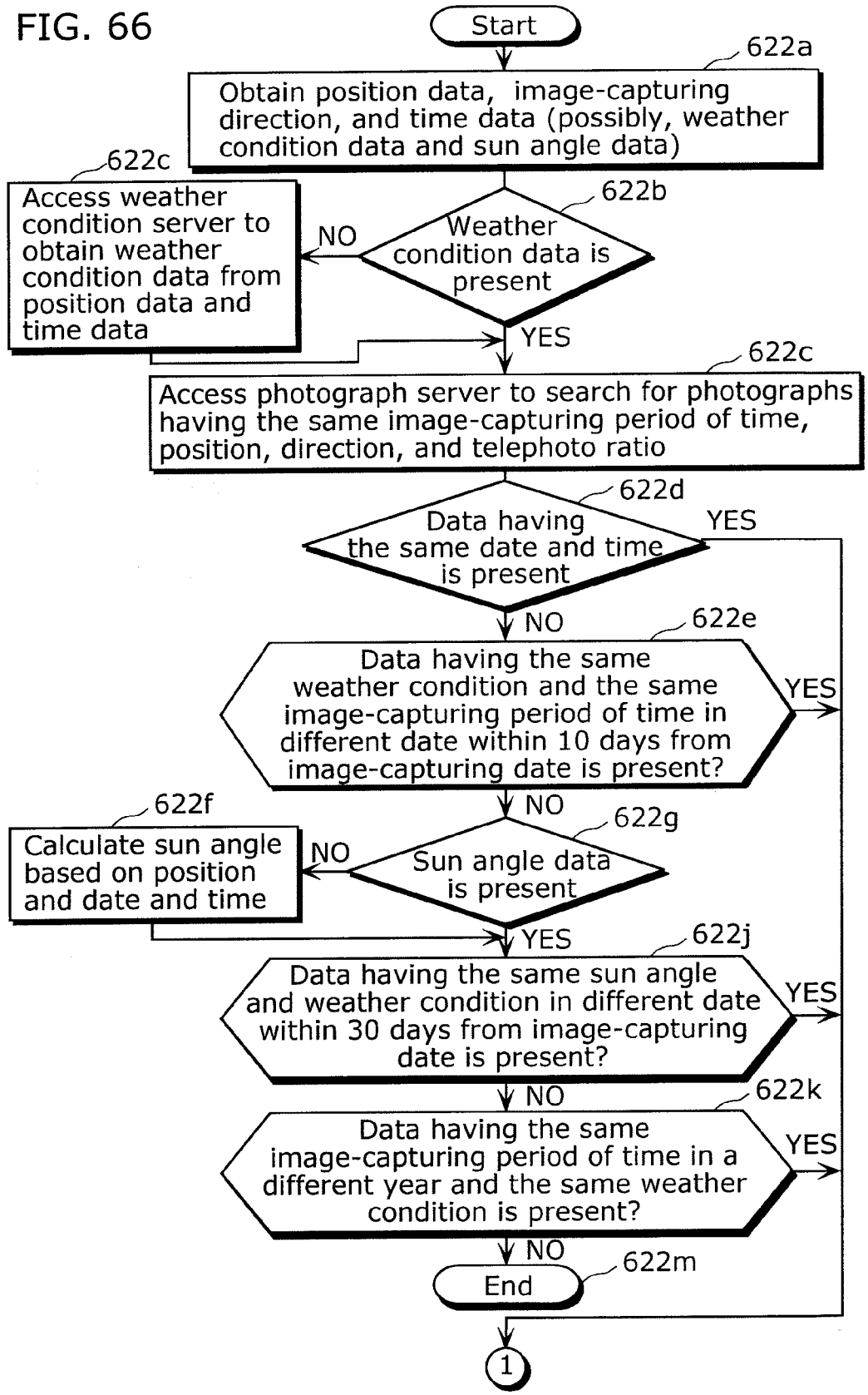
FIG. 66 shows a flowchart of a method for combining images according to an aspect of the present invention.

FIG. 66 shows the flowchart of a system according to Embodiment 6.

The flowchart of FIG. 66 will be described.

In Step 622a, the terminal 641 obtains position data, an image-capturing direction, and an image-capturing period of time of a camera, and possibly data including a weather condition and a sun angle, and transmits the obtained position data and others to the server 642. Here, when the weather condition data is not present in Step 622b, proceeding to Step 622c, the terminal 641 accesses a weather condition server to obtain the position data and time data to the weather condition data of a region where the image is captured in the image-capturing period of time. When the server 642 receives the weather condition data, the step proceeds to Step 622c.

In Step 622c, the server 642 accesses the photograph database 643 (FIG. 65) storing data of photographs in the server 642 to search for photographs having the same image-capturing period of time, position, direction, and telephoto ratio (image-capturing range).

In Step 622d, when the server 642 checks, through performing checking or determining the database 643 for example, that plural image data having the same date and time are present (Yes) is present in the database 643, the step proceeds to Step 623a. When there is no image data having the same date and time (No), in Step 622e, the server 642 checks whether or not photographic data having the same weather condition and the same image-capturing period of time in a different date within 10 days from the image-capturing date is present in the database 643. With selection of "Yes" in 622e, the step proceeds to Step 623a. With selection of "No" in Step 622e, proceeding to Step 622g, the server 642 checks whether or not the sun angle data during capturing an image is present in the database 643. With selection of "No", proceeding to Step 622f, the sun angle is calculated based on data, such as the image-capturing position and the date and time in the server. Then, the step proceeds to Step 622j. In Step 622j, the server 642 checks whether or not photographic data having the same sun angle and weather condition in a different date within 30 days from the image-capturing date is present in the database 643. With selection of "Yes", the step proceeds to Step 623a. With selection of "No", proceeding to Step 622k, the server 642 checks whether or not the image data having the same image-capturing period of time in a different year and the same weather condition is present in the database 643. With selection of "Yes", the step proceeds to Step 623a, and with selection of "No", the step ends in Step 622m.

Figure 67:
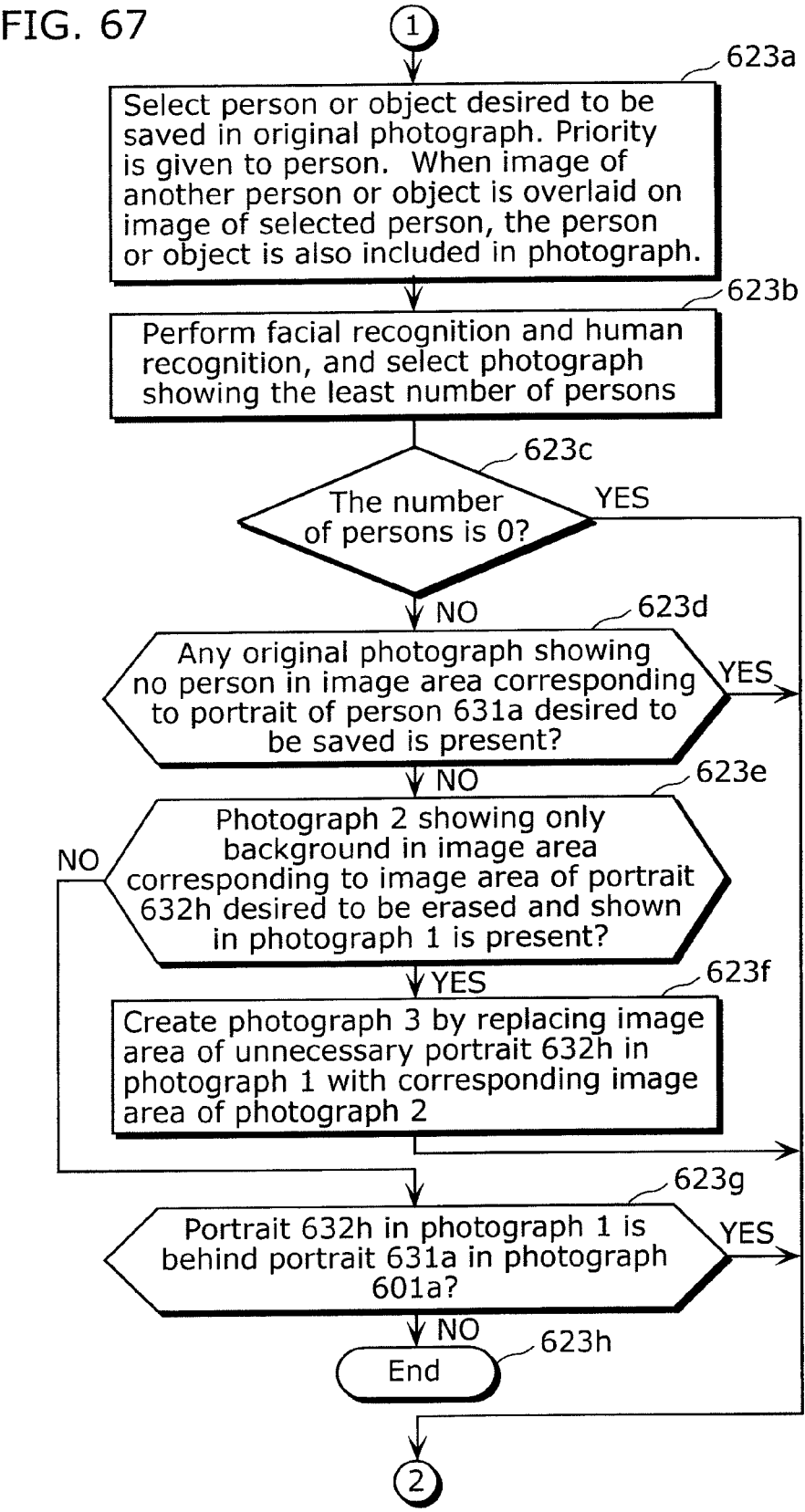
FIG. 67 shows a flowchart of a method for combining images according to an aspect of the present invention.

FIG. 67 shows a flowchart following the flowchart in FIG. 66.

In Step 623a of next FIG. 67, a particular person is selected for clipping a person or an object that is desired to be saved, from the original photograph 601a. Here, the particular person is selected by facial recognition technology. When there are plural persons to be saved, priority is given to each of the persons. When an image of another person or object is overlaid on an image of the selected person, the person or object is also included in the photograph. In Step 623b, facial recognition and human recognition are performed on the background image 611a to be a background, and a photograph showing the least number of persons is selected. Checking whether or not the number of persons shown in the photograph is 0 in Step 623c, with selection of "Yes", the step proceeds to Step 624a. With selection of "No", whether or not the original image 601a shows any person in an image area of a background photograph 1 (611b) is checked. Here, the image area corresponds to an image area showing the portrait of the person 631a that is desired to be saved. With selection of "Yes", in other words, when there is no obtrusive image, the step proceeds to Step 624a. With selection of "No", in other words, when there is an obtrusive image, in Step 623e, images in the database 643 included in the photographic server 642, such as actual images 601c and 602e are searched for a photograph 2 (601e) showing no person corresponding to an obtrusive portrait 631h in the image area. With selection of "Yes" in Step 623f, a background photograph 3 (601f) in which only an image area of the unnecessary portrait 631h in a background photograph 1 (601d) is replaced with a corresponding image area of the unnecessary portrait 631h in the background photograph 2 is created, and the step proceeds to Step 604a. In other words, the background photograph 3 (601f) does not show any obtrusive image in the image area showing the portrait of the person 631a. Back to Step 623e, with selection of "No", whether or not a portrait 631h of another person in the background photograph 1 (611b) is behind the portrait of the person 631a in the actual image 601a is checked in Step 623g. With selection of "Yes", since the background photograph showing the unnecessary person is behind the portrait of the person 631a and can be used as a background photograph, the step proceeds to Step 624a. With selection of "No" in Step 623g, since the unnecessary portrait cannot be erased, the step ends in Step 623h.

Figure 68:
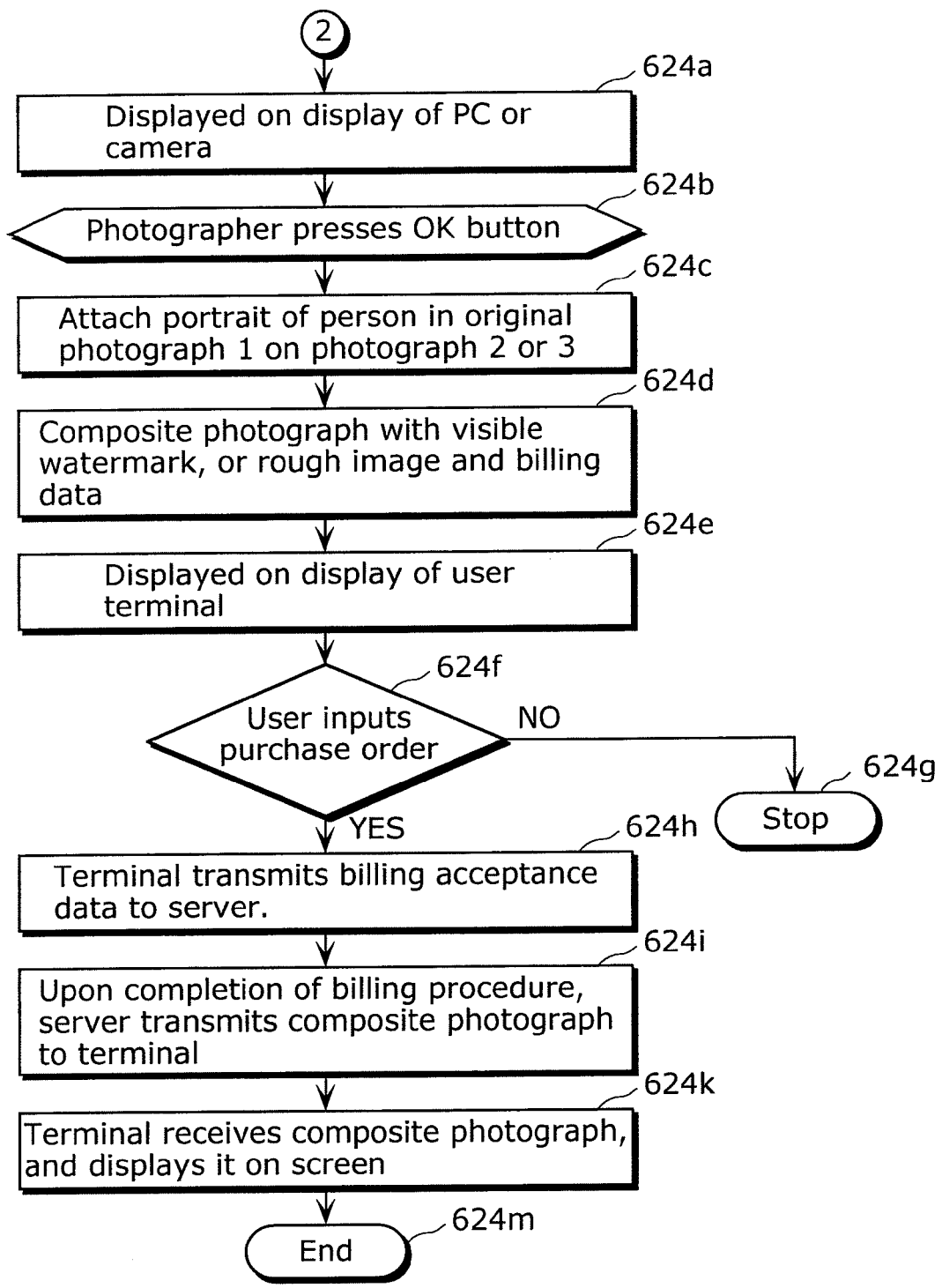
FIG. 68 shows a flowchart of a method for combining images according to an aspect of the present invention.

FIG. 68 shows a flowchart following the flowchart in FIG. 67.

In FIG. 68, a background photograph is displayed on a display of a terminal, such as a PC and a camera in Step 624a. With selection of "OK" in Step 624b by the photographer, the server creates a composite photograph by attaching the clipped image of the portrait of the person 631a on the background photograph 2 or 3 in Step 624c. In Step 624d, the server transmits, to the terminal, such as a camera, a composite photograph with a visible watermark, or a composite image obtained by making an image of the composite photograph rough and billing data indicating a charged price to the obtained composite photograph. In Step 624e, the data is displayed on a display of a user terminal. Only when the user inputs a purchase order ("Yes") in Step 624f, the terminal transmits billing acceptance data including a credit card number and electronic money information to the server. Upon completion of the billing procedure for the settlement in Step 624i, the server transmits a high-definition composite photograph without a watermark to the terminal. In Step 624k, the terminal receives data of the composite photograph, and displays it on the screen. Then, the operations end in Step 624m.

Embodiment 7

An additional information filtering system according to Embodiment 7 includes: an image capturing apparatus configured to capture a digital image; and an additional information providing server that transmits a plurality of additional information of objects to be captured, to the image capturing apparatus, wherein the image capturing apparatus includes: an imaging unit configured to capture the digital image; a zoom ratio obtaining unit configured to obtain a zoom ratio used when the imaging unit captures the digital image; an image-capturing position obtaining unit configured to obtain an image-capturing position in which the imaging unit captures the digital image; a transmitting unit configured to transmit the zoom ratio and the image-capturing position that are obtained, to a predetermined additional information providing server; an additional-information obtaining unit configured to obtain the plurality of additional information from the additional information providing server, the plurality of additional information (i) each corresponding to the objects included in the digital image captured by the imaging unit and (ii) corresponding to the image-capturing position and the zoom ratio that are transmitted by the transmitting unit; a direction input unit configured to receive an input from an operator and obtain a direction designated by the operator through the input; and a display unit configured to display the digital image captured by the imaging unit, according to the direction obtained by the direction input unit, select a corresponding one of the plurality of additional information from among the plurality of additional information obtained by the additional-information obtaining unit, and display the selected corresponding one of the plurality of additional information overlaid on the digital image, the plurality of additional information respectively includes positions of the objects, and the additional information providing server includes: a database that holds the plurality of additional information of the objects; a receiving unit configured to receive the image-capturing position and the zoom ratio that are transmitted; an additional information extracting unit configured to extract, from the database, one or more of the plurality of additional information (i) respectively corresponding to the objects included in the digital image and (ii) corresponding to the image-capturing position and an image-capturing direction that are received by the receiving unit, based on received information; a selecting unit configured to select a corresponding one of the plurality of additional information corresponding to the image-capturing position and the zoom ratio that are received by the receiving unit, from among the plurality of additional information extracted by the additional information extracting unit; and a transmitting unit configured to transmit the selected corresponding one of the plurality of additional information, to the image capturing apparatus.

FIGS. 69 to 71, 32, 33 to 36, 14, and 50 are drawings for Embodiment 7.

Embodiment 7 describes a configuration for filtering a landmark to be displayed on an image capturing apparatus, without using information indicating a direction in which an image capturing apparatus is oriented when capturing an image. In Embodiment 7, the map server 120 is assumed to have a function for filtering a landmark. The method for filtering a landmark is the same as the filtering method described in Embodiments 1 and 2, and the configuration for filtering in the map server 120 is the same as that of Embodiment 4. Thus, differences with Embodiment 4 will be mainly described hereinafter.

Figure 69:
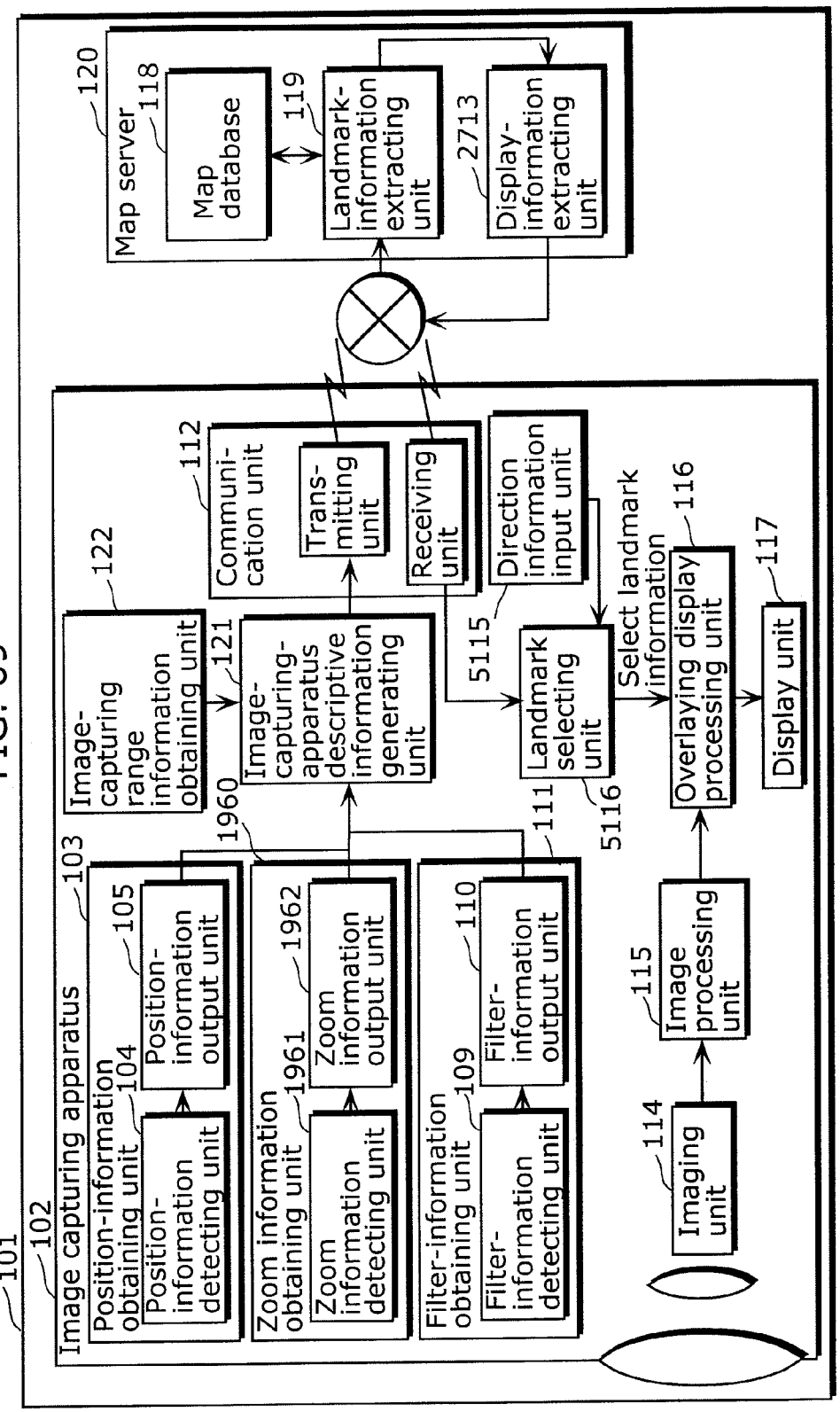
FIG. 69 illustrates a configuration of Embodiment 7 according to the present invention.

FIG. 69 illustrates a configuration of a system 101 according to Embodiment 7.

The image-capturing-apparatus descriptive information generating unit 121 generates image-capturing-apparatus descriptive information based on the position information obtained by the position-information obtaining unit 103, the image-capturing direction information obtained by the zoom information obtaining unit 1960, the filter information obtained by the filter-information obtaining unit 111, and the image-capturing range information obtained by the image-capturing range information obtaining unit 122, and transmits the resulting information to the map server 120.

Although FIG. 7 schematically illustrates an image-capturing range according to Embodiment 1, Embodiment 7 does not handle the image-capturing direction of the image capturing apparatus. Thus, an image-capturing range is assumed to be 360 degrees around an image-capturing position for convenience, and the landmark information around the image-capturing position is subject to extraction.

The map server 120 obtains, from the map database 118, the landmark information in which the position of the landmark information is included in an image-capturing range of the image capturing apparatus 102. Here, the landmark-information extracting unit 119 identifies the image-capturing range from the image-capturing-apparatus descriptive information. Then, the display-information extracting unit 2713 extracts display landmark information using information from the filter-information obtaining unit 111. The display-information extracting unit 2713 sets fields according to zoom ratio information illustrated in FIGS. 8 to 12, and filters the landmark information. As described above, the image-capturing range is assumed to be 360 degrees around an image-capturing position.

The image processing unit 115 processes captured information obtained by the imaging unit 114.

A direction information input unit 5115 receives an input of the user through the operation interface of the image capturing apparatus 102, and obtains a direction in which the user desires to display a landmark. A landmark selecting unit 5116 selects landmark information positioned in the direction designated by the user through the direction information input unit 5115, from a plurality of the landmark information received from the map server 120.

The overlaying display processing unit 116 of the image capturing apparatus 102 overlays the selected landmark information on information of a scene obtained by the image processing unit 115. Then, the display unit 117 displays the scene and the landmark in the overlaying manner.

The procedures by the map server 120 from receipt of the image-capturing-apparatus descriptive information to transmission of landmark information to be displayed in the overlaying manner by the image capturing apparatus 102 are the same as those shown in FIG. 30 according to Embodiment 2.

Figure 70:
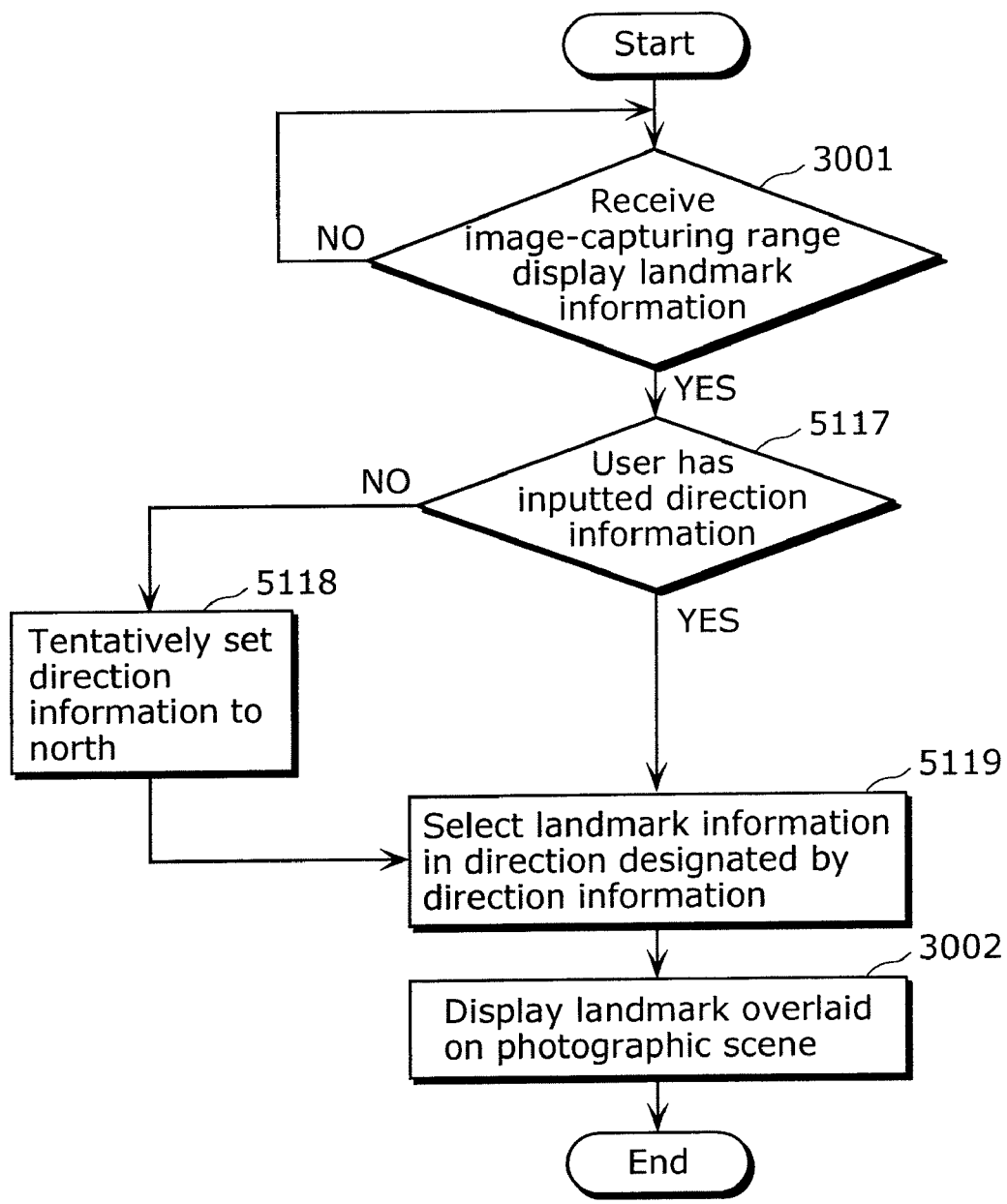
FIG. 70 shows a flowchart indicating an embodiment until an image capturing apparatus displays landmarks in an overlaying manner based on an input direction.

FIG. 70 shows a flowchart indicating an example of processes by the image capturing apparatus 102 from obtaining landmark information to displaying the landmark information overlaid on a captured scene.

The image capturing apparatus 102 obtains direction information inputted by the user (5117), selects the landmark information designated by the inputted direction information based on the position information included in the landmark information (5119), and displays the selected landmark information overlaid on the captured image (3002). Upon receipt of the landmark information from the server, when the user has not inputted the direction information, a direction for selecting a landmark is tentatively set to a predetermined direction, for example, north.

Figure 71:
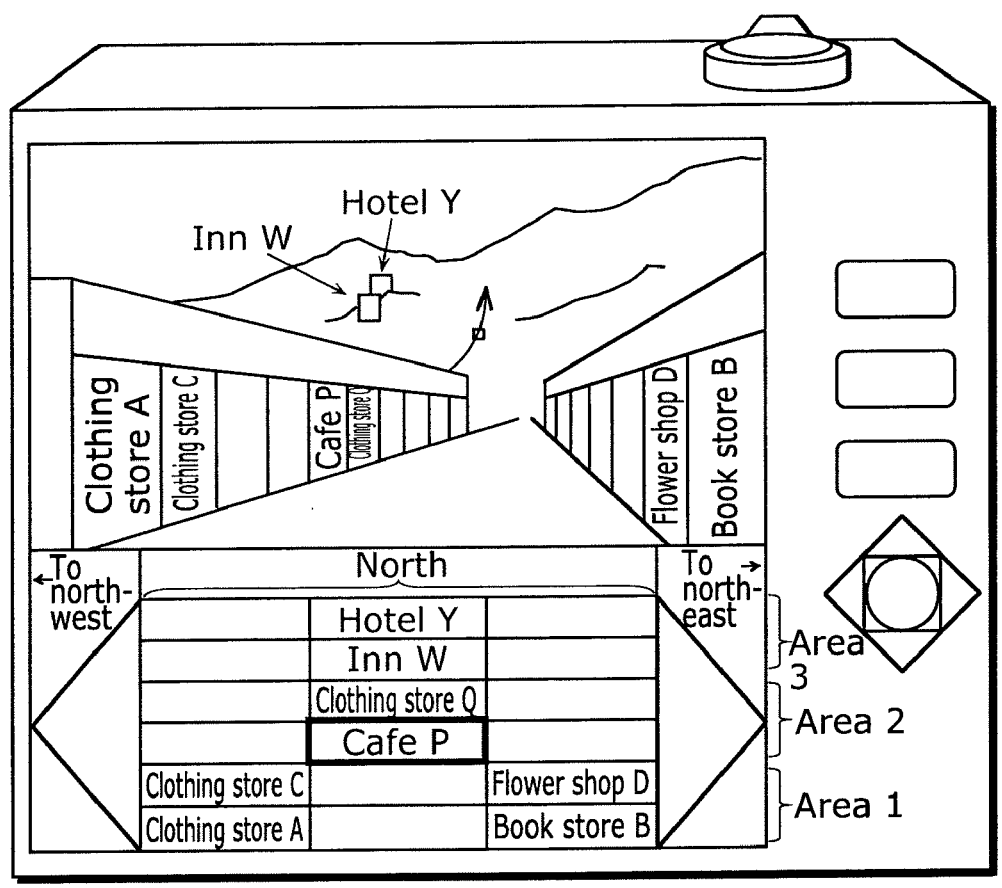
FIG. 71 illustrates an example of displaying a plurality of landmark information, together with each direction in which an image is captured.

FIG. 71 illustrates a display example of landmarks.

In FIG. 71, a landmark display area is provided in the lower portion of the screen. The upper middle of the landmark display area displays a direction of landmarks currently being displayed, and the upper sides of the landmark display area respectively display west and east directions following the direction of the landmarks currently being displayed. In the display example illustrated in the landmark display area of FIG. 71, "Cafe P" is selectable. For example, with a press of the right-direction button, "Flower shop D" becomes selectable. With a further press of the right-direction button, the northeast that is a direction next to the east becomes selectable. Here, with a press of the right-direction button or the enter button, the displayed landmark is switched from a landmark positioned in the "north" to a landmark positioned in the "northeast".

The aforementioned configuration does not need to use information of an orientation of the image capturing apparatus 102 when an image is captured. Since the image capturing apparatus performs filtering, searching, and displaying a landmark, the configuration using a electromagnetic compass for detecting a direction is not necessary, thus making the image capturing apparatus 102 inexpensive.

Furthermore, according to Embodiment 7, when the map server 120 extracts landmark information, it performs filtering entirely around an image-capturing position as an image-capturing range because the image-capturing direction information is not available. However, a direction in which an image is captured may be estimated, based on image-capturing details of an image transmitted from the image capturing apparatus 102 to the map server 120 and received by the map server 120. For example, the map server 120 includes a field checking unit that performs pattern matching on an image, such as the pattern matching between a construction in a known position and its captured image. When they match each other, an image-capturing direction may be estimated using an image-capturing position and a position of a subject having a match with the two-dimensional coordinates of the subject in the image. As such, when the map server 120 can estimate a direction when an image is captured, the direction eliminates the need for extracting landmarks entirely around the image-capturing position, thus accelerating the filtering and improving the precision of the filtering.

The present invention enables displaying landmark information immediately after the image capturing apparatus 102 pans while displaying a landmark. Thus, the map server 120 transmits landmark information in an image-capturing range of the image capturing apparatus 102, and transmits landmark information around the image-capturing range in the background where overlaying display processing is performed by the image capturing apparatus 102. However, the map server 120 does not have to transmit the landmark information around the image-capturing range, and may only transmit the landmark information in the image-capturing range in which the image capturing apparatus 102 captures an image. Accordingly, since there are cases where the image capturing apparatus 102 does not pan, the user can expect an advantage of reducing the data amount to be transmitted from the map server 120 to the image capturing apparatus 102.

Figure 33:
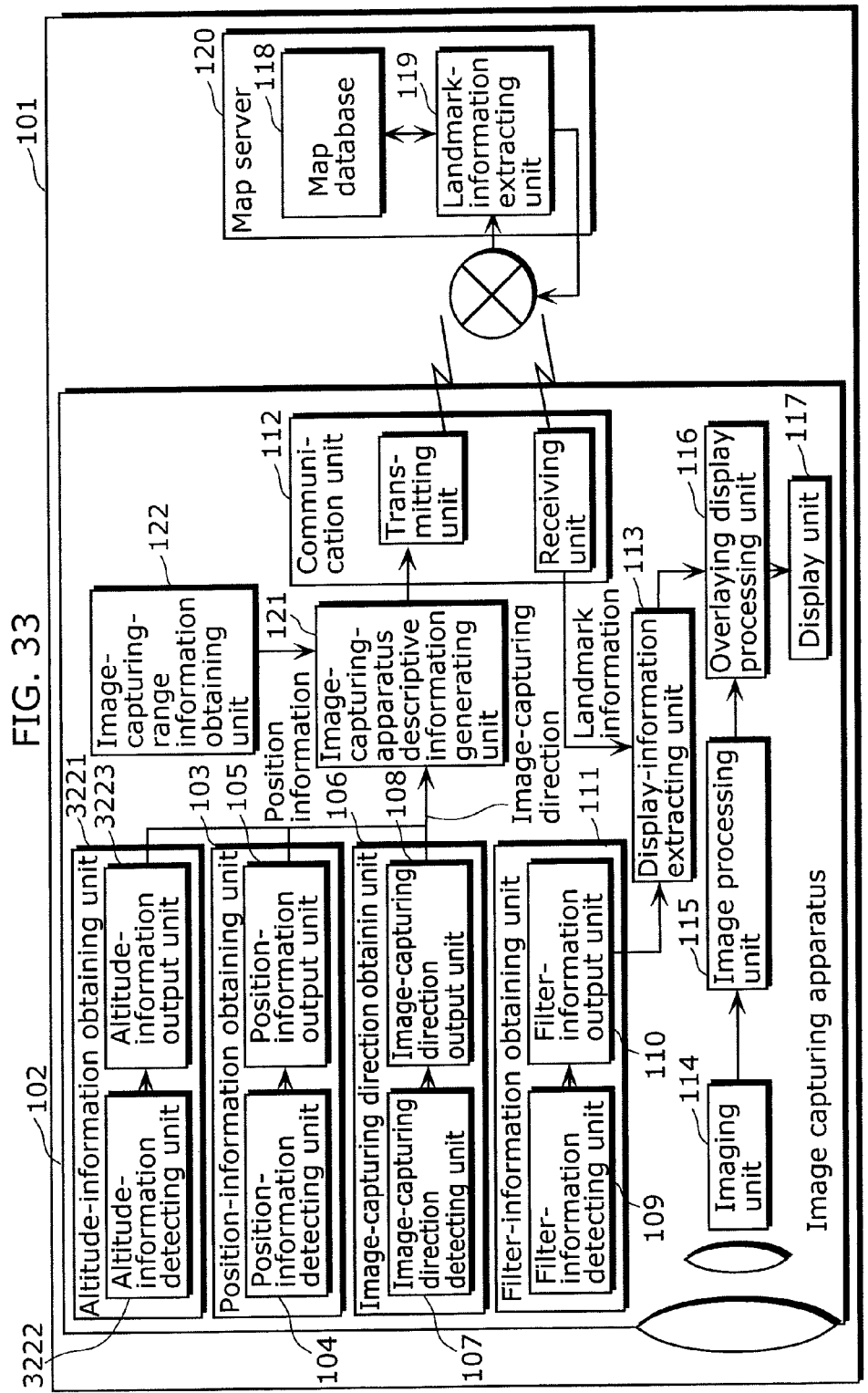
FIG. 33 illustrates an example of a configuration of an aspect of the present invention.

FIG. 33 illustrates a system 101 for measuring height information of the image capturing apparatus 102.

Embodiment 7 according to the present invention may have a configuration as in FIG. 33 for measuring height information of the image capturing apparatus 102. An altitude-information obtaining unit 3221 includes an altitude-information detecting unit 3222 that detects altitude information and an altitude-information output unit 3223 that transmits the detected altitude information to the image-capturing-apparatus descriptive information generating unit 121

FIG. 34 illustrates an example of a data format to be transmitted from the image-capturing-apparatus descriptive information generating unit 121 through the communication unit 112.

The map server 120 can know a distance from the image capturing apparatus 102 to the horizon by obtaining height information. Thereby, the image capturing apparatus 102 can know a range of landmark information to be transmitted with high precision, for example, distant landmark information from a rooftop of a building. Without the altitude-information obtaining unit 3221, the map server 120 may calculate altitude information of the image capturing apparatus 102 using position information of the image capturing apparatus 102 and contour lines information of a map.

Figure 35:
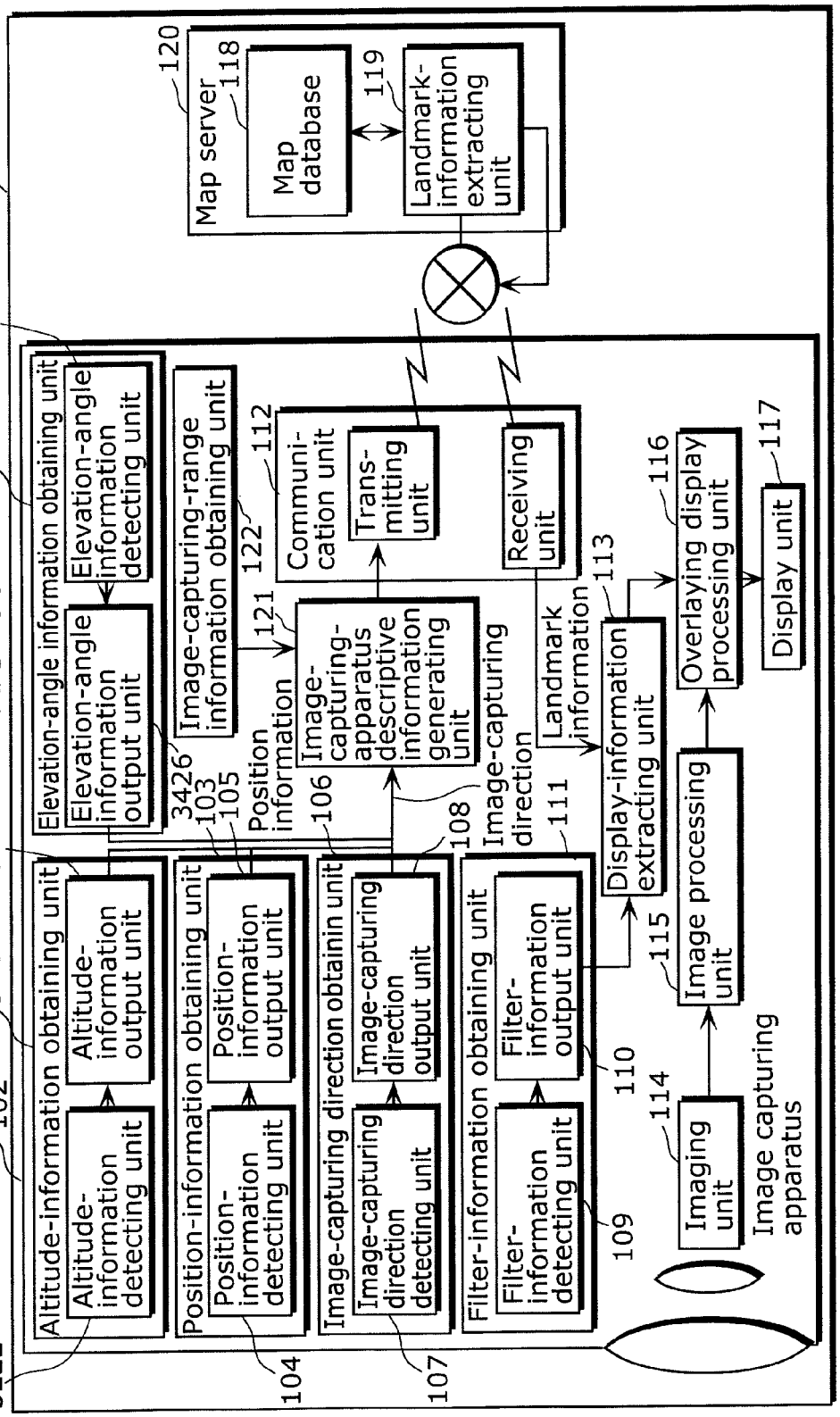
FIG. 35 illustrates an example of a configuration of an aspect of the present invention.

Embodiment 7 according to the present invention may further have a configuration as in FIG. 35 for measuring height information of the image capturing apparatus 102. The altitude-information obtaining unit 3221 includes the altitude-information detecting unit 3222 that detects altitude information and the altitude-information output unit 3223 that transmits the detected altitude information to the image-capturing-apparatus descriptive information generating unit 121. Furthermore, an elevation-angle information obtaining unit 3424 includes an elevation-angle information detecting unit 3425 and an elevation-angle information output unit 3426.

FIG. 36 illustrates an example of a data format to be transmitted from the image-capturing-apparatus descriptive information generating unit 121 through the communication unit 112.

The map server 120 can know an image-capturing range of the image capturing apparatus 102 using the position information, image-capturing range information, altitude information, and elevation angle information of the image capturing apparatus 102 with high precision. Thereby, the map server 120 can know a range of the landmark information to be transmitted to the image capturing apparatus 102 with high precision.

The SNS filter may be combined with a zoom filter. For example, the configuration for changing a display area and Embodiment 3 may be combined using the zoom information. The zoom information determines a display area. Furthermore, information with a higher priority is displayed using the SNS filter in the display area, so that the user can display landmark information that matches preferences of the user, within an area in which the user desires to know the landmark information.

The operation histories of an image capturing apparatus of each user may be stored in respective memories, and filtering may be performed using a filtering method having a higher use frequency.

The SNS filter may determines a preference of the user based on information of a forum where the user belongs to, information of a website having the higher URL hit count by the users, forum information, key words that are frequently used for search, and other information.

A range of landmark information to be transmitted from a server may be divided into certain levels, and the obtained levels may be changed according to a remaining battery level and a field intensity. For example, the range of landmark information may be divided into 3 levels, that is, all landmark information "within a 5 km square", landmark information "within a sector with an image-capturing angle", and "no landmark information obtained". When the remaining battery level is a predetermined level or lower, the range of landmark information is determined as "no landmark information obtained". Thus, the communication with the map server is suspended and an image-capturing operation is prioritized rather than displaying landmark information. When the radio field intensity is lower, obtainment of landmark information within the 5 km square may produce an advantage of cutting battery drain through reducing the access count to the map server. Furthermore, external memories in which landmark information is stored, are distributed in a place, such as a sightseeing area and an amusement park. In this way, the external memories can obtain the landmark information even in a place where the communication with a map server is not possible.

Furthermore, in a place where the communication is difficult, the communication with a map server may be suspended until the position information is changed so that the battery drain occurring through unnecessary communication can be prevented.

Furthermore, when the position-information obtaining unit cannot be used due to the breakdown, the communication with the map server may be suspended so that the battery drain occurring through unnecessary communication can be prevented.

Furthermore, the profile information of SNS may be rewritten according to the descriptive information of landmark information of a subject captured by the user. For example, when a form "recent interests" is provided within a profile section of an internet forum and the user has much information about landmark information on the shrines and temples, information of the shrines and temples are automatically written in the form. Thereby, the unaware and potential interests of the user can be known.

The position-information obtaining unit 103 in FIG. 1 is not necessarily limited to a GPS. For example, position information can be measured by calculating a position relative to access points, according to an intensity of receiving a wireless LAN signal.

Furthermore, according to the present invention, a method for obtaining position information not by using a wireless LAN but by calculating a distance relative to a mobile phone or a PHS base station is available.

Furthermore, although the position-information obtaining unit 103 included in the image capturing apparatus 102 obtains position information, the present invention is not limited to this. The position-information detecting unit 104 and the image-capturing direction detecting unit 107 may be separated from the image capturing apparatus 102 and provided in another device. For example, a receiving unit of the image capturing apparatus 102 may receive position information and an image-capturing direction that are obtained by a mobile phone including the position-information detecting unit 104 and the image-capturing direction detecting unit 107. Furthermore, the GPS function of another device, such as a mobile phone may be obtained through the short-range communication and other means.

Furthermore, assuming that the transportation means, such as an airplane and a train includes a position information measuring unit with high precision, the measured position information may be broadcast using a wireless signal, and a wireless terminal may obtain the position information through by reception.

Here, according to Embodiments 1 to 3 of the present invention, the map server 120 may be configured as follows to reduce landmark information to be transmitted to an image capturing apparatus.

FIG. 37 shows an example of a format of data to be transmitted from the image capturing apparatus to the map server.

The image capturing apparatus transmits information on the maximum displayed landmark count per field, as the image-capturing-apparatus descriptive information to be transmitted to the map server, as shown in FIG. 37. The map server narrows the hierarchical levels of landmarks to be transmitted, according to the received maximum displayed landmark count of landmarks. According to the filtering method of the image capturing apparatus of Embodiment 1, the map server transmits only landmark information in a deepest hierarchical level and within a range of landmarks to be displayed by the image capturing apparatus, in other words, within a range that does not exceed the landmark count displayable per field. When the count of landmarks in the highest rank exceeds the maximum displayed landmark count per field, the map server transmits the landmarks in a mesh field and within a range closer to the center of the ranges so as not to exceed the maximum displayed landmark count per field. Thereby, the landmark information to be transmitted from the map server to the image capturing apparatus will be reduced, the response for displaying a landmark becomes faster, and the convenience of the user may be improved.

FIG. 15 illustrates that the map server transmits landmark information in a deeper hierarchical level.

Furthermore, the map server may transmit not only the landmark information transmitted from the image capturing apparatus but also landmarks to hierarchical levels in each of which the maximum displayed landmark count per field is set. After the transmission, the image capturing apparatus may transmit landmarks in a much deeper hierarchical level to the map server. Thereby, since the landmark information to be transmitted from the map server to the image capturing apparatus will be reduced compared with the configuration according to Embodiment 1, the information amount to be transmitted will be reduced and further the transmission period of time will be shortened. Furthermore, when the user narrows a display area of landmarks, the image capturing apparatus can display the landmarks without requesting the map server to transmit the landmark information again. Thereby, the response for displaying the landmarks will become faster, and thus the user can expect that the convenience of the user will be improved.

Distances from image capturing apparatuses to each field do not have to be equal, and may be variable, for example, according to a zoom ratio. When the zoom ratio is lower, probably the user strongly desires to know landmark information of a closer subject in the first field. In contrast, when the zoom ratio is higher, probably the user strongly desires to know landmark information of a distant subject in the third field. Thus, for example, when the zoom ratio is lower, a field radius of the first field is set smaller and a field radius of the third field is set larger. Furthermore, as the zoom ratio becomes larger, relatively, the field radius of the first field is set larger and the field radius of the third field is set smaller. Since the landmark count to be displayed per field is limited, such a configuration makes it possible to display a large count of landmark information of subjects in a field that the user desires to know.

The user may set the image capturing apparatus so that the size of a mesh field is variable. In other words, a field range and a width of a range (an angle of a range) may be variable using a user switch and others. Thereby, a landmark in a mesh field that the user desires to obtain can be displayed, thus improving the convenience of the user.

The display filtering method according to the present invention is not necessarily limited to the method as described with reference to FIG. 11, that is, the method for displaying landmarks in the deepest hierarchical level, without exceeding the landmark count to be displayable per field.

For example, a priority may be given to each landmark, and the landmarks may be displayed in an order from a landmark having the highest priority in the lowest hierarchical level, without exceeding the landmark count to be displayable per field. There is a method, for example, for prioritizing a higher construction. The method can lower a possibility of displaying a landmark of a subject that is not actually viewed by the image capturing apparatus due to the higher construction standing in front of the subject. Alternatively, display of a landmark of a subject having a higher possibility of being viewed by the image capturing apparatus can be prioritized.

Furthermore, a priority is given to each subject according to a frequency of accessing the landmark of the subject to be displayed by the image capturing apparatus. In other words, the map server may manage histories of landmarks displayed by the image capturing apparatus, and prioritize a subject having a stronger request for displaying the landmark. A landmark of a famous tourist spot is assumed to have the larger number of times to be displayed. With these methods, there are advantages of prioritizing the tourist spots and knowing information of a famous tourist spot in an unfamiliar place to the user, with ease.

Figure 51:
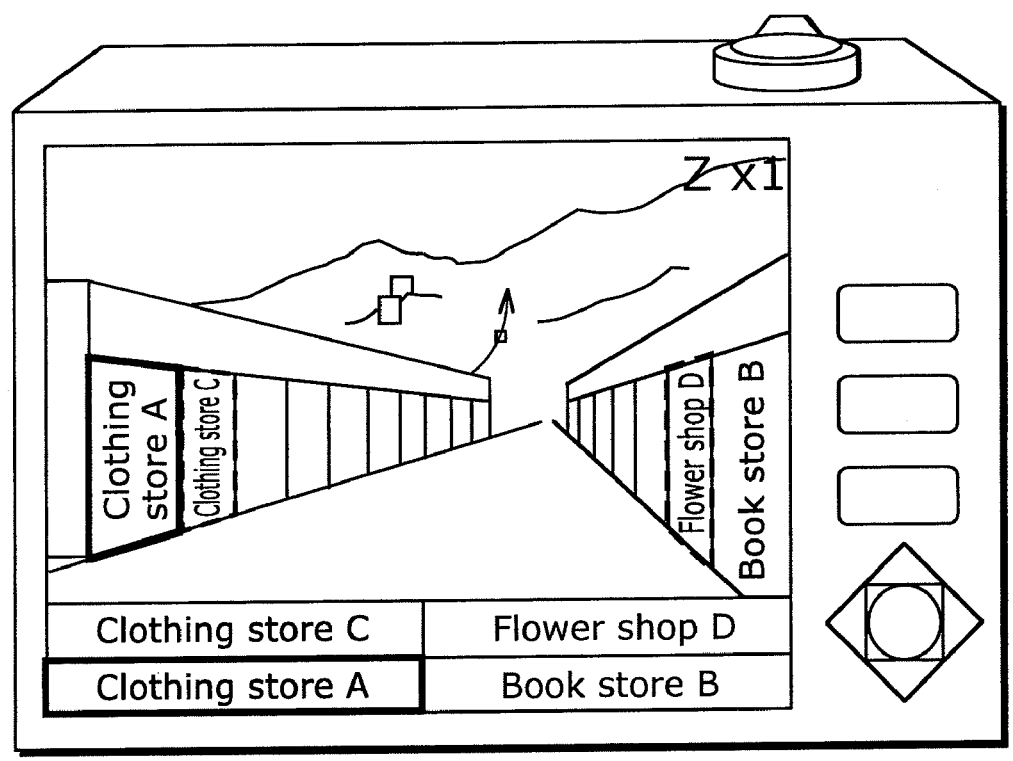
FIG. 51 illustrates an example of a method for displaying landmark information in an overlaying manner.

FIG. 51 illustrates an image capturing apparatus that displays a box.

The image capturing apparatus may be provided with an image recognition function for the overlaying display method as disclosed in Embodiments of the present invention. As illustrated in FIG. 51, the landmark on which the cursor is placed in the display area can be highlighted by a box on a corresponding portion of the scene. A landmark having detailed information may be displayed in another display method (for example, displaying a dotted box around a portion of a scene). Since it is assumed that the image capturing apparatus normally displays a scene including subjects, there is an advantage in that the photographer can know which landmark is selected with ease by highlighting an outline of a subject on which the cursor is placed. Furthermore, an outline of a subject that can be displayed in detail is highlighted in another highlighting method, so that the user can intuitively understand which subject has the details, thus improving the operability.

FIG. 72 shows an example of a format of data to be transmitted from the image capturing apparatus 102 to the map server 120. The elements included in the format are a collection of all elements in each format described with reference to FIGS. 4 and 24. The image capturing apparatus may transmit data having such a format to the map server. Here, upon transmission of the data having the format, the system may execute 2 types of processing described in the different portions above, despite the processing subject to a change in the processing depending on whether or not a predetermined condition is satisfied.

The functional blocks described according to Embodiments of the present invention are typically achieved in the form of an integrated circuit or a Large Scale Integrated (LSI) circuit. The LSIs may be made as separate individual chips, or as a single chip to include a part or all thereof.

The LSI is mentioned but there are instances where, due to a difference in the degree of integration, an Integrated Circuit (IC), a System-LSI, a super LSI, and an ultra LSI are used.

Furthermore, the means for circuit integration is not limited to an LSI, and implementation with a dedicated circuit or a general-purpose processor is also available. It is also acceptable to use a field programmable gate array (FPGA) that is programmable after the LSI has been manufactured, and a reconfigurable processor in which connections and settings of circuit cells within the LSI are reconfigurable. Alternatively, the processor may perform control by executing a control program stored in a ROM, with a hardware resource including a processor and a memory.

Furthermore, when integrated circuit technology that replaces LSIs appears through progress in the semiconductor technology or other derived technology, that technology can naturally be used to integrate the functional blocks. Biotechnology is anticipated to be applied to the integrated circuit technology.

INDUSTRIAL APPLICABILITY

The present invention is useful as a technique to display only landmark information desired by the user, out of an image having a plurality of landmark information.

The invention claimed is:

1. An image capturing apparatus, comprising:
an imaging unit configured to capture a digital image;
an image-capturing position obtaining unit configured to obtain image-capturing position information indicating a position at which the digital image is captured;
an image-capturing direction obtaining unit configured to obtain image-capturing direction information indicating a direction in which the digital image is captured;
an additional-information obtaining unit configured to obtain a plurality of additional information from an additional-information storing device that stores the plurality of additional information, the plurality of additional information each corresponding to a predetermined object of a plurality of predetermined objects and each including object position information indicating a position of a corresponding one of the predetermined objects;
a selecting unit configured to divide, into sub-fields, a view space determined from the image-capturing position information and the image-capturing direction information, and select, for each of the sub-fields, corresponding one or more of the plurality of additional information having a count not larger than a count that is set in a corresponding one of the sub-fields, from among the plurality of additional information including a plurality of object position information respectively indicating the positions included in the sub-fields; and
a display unit configured to display the corresponding one or more of the plurality of additional information overlaid on the digital image, the corresponding one or more of the plurality of additional information being selected by said selecting unit, wherein the sub-fields are fields obtained by dividing the view space according to a distance from the position indicated by the image-capturing position information, wherein the image capturing apparatus further comprises a zoom ratio obtaining unit configured to obtain zoom ratio information indicating a zoom ratio used when said imaging unit captures the digital image, and wherein said selecting unit is configured:

to select at least one of the sub-fields according to the zoom ratio indicated by the zoom ratio information, from among the sub-fields, to select a corresponding one of the plurality of additional information to be displayed and having the count not larger than the count that is set, in the selected one of the sub-fields, and not to select any of the plurality of additional information to be displayed in the sub-fields other than the selected one of the sub-fields; and to select a corresponding one of the sub-fields that is more distant from the position indicated by the image-capturing position information, as the zoom ratio indicated by the zoom ratio information is higher.

2. The image capturing apparatus according to claim 1, wherein each of the predetermined objects corresponding to the plurality of additional information is categorized into one of hierarchical levels, and a second object is categorized into a second hierarchical level lower than a first hierarchical level, the second object being a portion of a first object categorized into the first hierarchical level, wherein each of the plurality of additional information further includes hierarchical information indicating a corresponding one of the hierarchical levels to which the predetermined objects belong, and wherein said selecting unit is configured to select a lowest hierarchical level from among the hierarchical levels for each of the sub-fields, and a corresponding one of the plurality of additional information, the lowest hierarchical level corresponding to one or more of the plurality of additional information respectively including the plurality of object position information and the plurality of hierarchical information, the corresponding one of the plurality of additional information including: (i) a corresponding one of the plurality of object position information indicating a position in a corresponding one of the sub-fields; and (ii) a corresponding one of the plurality of hierarchical information indicating the lowest hierarchical level, and the one or more of the plurality of additional information having the count not larger than the count that is set.

3. The image capturing apparatus according to claim 1, wherein said selecting unit is configured to select the one or more of the plurality of additional information to be displayed and having the count not larger the count that is set, in at least one of the sub-fields, and not to select any of the plurality of additional information in the sub-fields other than the at least one of the sub-fields.

4. The image capturing apparatus according to claim 1, wherein the sub-fields are fields obtained by dividing a view angle of the view space per predetermined unit angle.

5. The image capturing apparatus according to claim 1, further comprising:

a detailed-information request receiving unit configured, when a zoom operation for enlarging an image of an object included in the digital image is performed, to receive the zoom operation as a detailed-information obtainment request of detailed information of the object that has been enlarged; and a detailed-information obtaining unit configured, when said detailed-information request receiving unit receives the detailed-information obtainment request, to obtain the detailed information of the enlarged object, from a detailed information holding device that stores the detailed information of the enlarged object.

6. An additional information providing apparatus, comprising:

a database that holds a plurality of additional information each of which corresponds to a predetermined object of a plurality of predetermined objects and includes object position information indicating a position of a corresponding one of the predetermined objects;

a receiving unit configured to receive position information indicating a predetermined position and direction information indicating a predetermined direction from another device;

a selecting unit configured to divide, into sub-fields, a view space oriented in the direction indicated by the direction information with respect to the position indicated by the position information, and select, for each of the sub-fields, corresponding one or more of the plurality of additional information having a count not larger than a count that is set in a corresponding one of the sub-fields, from among the plurality of additional information including a plurality of object position information respectively indicating positions included in the sub-fields; and a transmitting unit configured to transmit, to the other device, the corresponding one or more of the plurality of additional information selected by said selecting unit, wherein the sub-fields are fields obtained by dividing the view space according to a distance from the position indicated by the image-capturing position information, wherein said selecting unit is configured to further receive zoom ratio information indicating a zoom ratio from the other device, the zoom ratio being used when a digital image is captured at the position indicated by the position information and in the direction indicated by the direction information, and wherein said selecting unit is configured:

to select at least one of the sub-fields according to the zoom ratio indicated by the zoom ratio information, from among the sub-fields, to select a corresponding one of the plurality of additional information to be displayed and having the count not larger than the count that is set, in the selected one of the sub-fields, and not to select any of the plurality of additional information to be displayed in the sub-fields other than the selected one of the sub-fields; and to select a corresponding one of the sub-fields that is more distant from the position indicated by the image-capturing position information, as the zoom ratio indicated by the zoom ratio information is higher.

7. The additional information providing apparatus according to claim 6, wherein each of the predetermined objects corresponding to the plurality of additional information is categorized into one of hierarchical levels, and a second object is categorized into a second hierarchical level lower than a first hierarchical level, the second object being a portion of a first object categorized into the first hierarchical level, wherein each of the plurality of additional information further includes hierarchical information indicating a corresponding one of the hierarchical levels to which the predetermined objects belong, and wherein said selecting unit is configured to select a lowest hierarchical level from among the hierarchical levels for each of the sub-fields, and a corresponding one of the plurality of additional information, the lowest hierarchical level corresponding to one or more of the plurality of additional information respectively including the plurality of object position information and the plurality of hierarchical information, the corresponding one of the plurality of additional information including: (i) a corresponding one of the plurality of object position information indicating a position in a corresponding one of the sub-fields; and (ii) a corresponding one of the plurality of hierarchical information indicating the lowest hierarchical level, and the one or more of the plurality of additional information having the count not larger than the count that is set.

8. The additional information providing apparatus according to claim 6, wherein said selecting unit is configured to select the one or more of the plurality of additional information to be displayed and having the count not larger the count that is set, in at least one of the sub-fields, and not to select any of the plurality of additional information in the sub-fields other than the at least one of the sub-fields.

9. The additional information providing image capturing apparatus according to claim 6, wherein the sub-fields are fields obtained by dividing a view angle of the view space per predetermined unit angle.

10. A method, comprising:
capturing a digital image;
obtaining image-capturing position information indicating a position at which the digital image is captured;
obtaining image-capturing direction information indicating a direction in which the digital image is captured;
obtaining a plurality of additional information from an additional-information storing device that stores the plurality of additional information, the plurality of additional information each corresponding to a predetermined object of a plurality of predetermined objects and each including object position information indicating a position of a corresponding one of the predetermined objects;
dividing, into sub-fields, a view space determined from the image-capturing position information and the image-capturing direction information, and selecting, for each of the sub-fields, corresponding one or more of the plurality of additional information having a count not larger than a count that is set in a corresponding one of the sub-fields, from among the plurality of additional information including a plurality of object position information respectively indicating positions included in the sub-fields; and
displaying the corresponding one or more of the plurality of additional information overlaid on the digital image, the corresponding one or more of the plurality of additional information being selected in said selecting,
wherein the sub-fields are fields obtained by dividing the view space according to a distance from the position indicated by the image-capturing position information,
wherein the method further comprises obtaining zoom ratio information indicating a zoom ratio used when said capturing captures the digital image, and
wherein said selecting includes:
selecting at least one of the sub-fields according to the zoom ratio indicated by the zoom ratio information, from among the sub-fields, to select a corresponding one of the plurality of additional information to be displayed and having the count not larger than the count that is set, in the selected one of the sub-fields, and not to select any of the plurality of additional information to be displayed in the sub-fields other than the selected one of the sub-fields; and
selecting a corresponding one of the sub-fields that is more distant from the position indicated by the image-capturing position information, as the zoom ratio indicated by the zoom ratio information is higher.

11. A method for use in an additional information providing apparatus that stores a plurality of additional information each of which corresponds to a predetermined object of a plurality of predetermined objects and includes object position information indicating a position of a corresponding one of the predetermined objects, said method comprising:
receiving position information indicating a predetermined position and direction information indicating a predetermined direction from a predetermined other device;
dividing, into sub-fields, a view space oriented in the direction indicated by the direction information with respect to the position indicated by the position information, and selecting, for each of the sub-fields, corresponding one or more of the plurality of additional information having a count not larger than a count that is set in a corresponding one of the sub-fields, from among the plurality of additional information including a plurality of object position information respectively indicating positions included in the sub-fields; and
transmitting, to the other device, the corresponding one or more of the plurality of additional information selected in said selecting,
wherein the sub-fields are fields obtained by dividing the view space according to a distance from the position indicated by the image-capturing position information,
wherein said selecting receives zoom ratio information indicating a zoom ratio from the predetermined other device, the zoom ratio being used when a digital image is captured at the position indicated by the position information and in the direction indicated by the direction information, and
wherein said selecting includes:
selecting at least one of the sub-fields according to the zoom ratio indicated by the zoom ratio information, from among the sub-fields, to select a corresponding one of the plurality of additional information to be displayed and having the count not larger than the count that is set, in the selected one of the sub-fields, and not to select any of the plurality of additional information to be displayed in the sub-fields other than the selected one of the sub-fields; and
selecting a corresponding one of the sub-fields that is more distant from the position indicated by the image-capturing position information, as the zoom ratio indicated by the zoom ratio information is higher.

12. An image capturing apparatus, comprising:
an imaging unit configured to captures a digital image;
an image-capturing position obtaining unit configured to obtain image-capturing position information indicating a position at which the digital image is captured;
an image-capturing direction obtaining unit configured to obtain image-capturing direction information indicating a direction in which the digital image is captured;
an additional-information obtaining unit configured to obtain a plurality of additional information from an additional-information storing device that stores the plurality of additional information, the plurality of additional information each corresponding to a predetermined object of a plurality of predetermined objects and each including object position information indicating a position of a corresponding one of the predetermined objects;

a selecting unit configured to divide, into sub-fields, a view space determined from the image-capturing position information and the image-capturing direction information, and select, for each of the sub-fields, one or more of the plurality of additional information having a count not larger than a count that is set in a corresponding one of the sub-fields, from among the plurality of additional information including a plurality of object position information respectively indicating positions included in the sub-fields;

a display unit configured to display the corresponding one or more of the plurality of additional information overlaid on the digital image, the corresponding one or more of the plurality of additional information being selected by said selecting unit; and a zoom ratio obtaining unit configured to obtain zoom ratio information indicating a zoom ratio used when said imaging unit captures the digital image, wherein said selecting unit is configured:

to select one of the sub-fields, to select the additional information corresponding to the selected sub-field, and not to select the additional information corresponding to another one of the sub-fields; and to select a corresponding one of the sub-fields that is more distant from the position indicated by the image-capturing position information, as the zoom ratio indicated by the zoom ratio information is higher.

* * * * *